United States Patent [19]

Murdock

[11] Patent Number: 5,517,644
[45] Date of Patent: May 14, 1996

[54] OFFICE AUTOMATION SYSTEM WITH INTERRUPT FEATURE

[75] Inventor: David M. Murdock, New Milford, N.J.

[73] Assignee: CISGEM Technologies, Inc., Simsbury, Conn.

[21] Appl. No.: 249,034

[22] Filed: May 25, 1994

Related U.S. Application Data

[62] Division of Ser. No. 954,416, Sep. 30, 1992, Pat. No. 5,317,733, which is a continuation of Ser. No. 471,290, Jan. 26, 1990, abandoned.

[51] Int. Cl.$^6$ ............................................. G06F 17/00
[52] U.S. Cl. ............... 395/650; 364/225.6; 364/236.2; 364/237.2; 364/234.0; 364/DIG. 1
[58] Field of Search ................................ 395/650, 700

[56] References Cited

U.S. PATENT DOCUMENTS

| | | | |
|---|---|---|---|
| 4,429,360 | 1/1984 | Hoffman et al. | 364/200 |
| 4,486,831 | 12/1984 | Wheatley et al. | 364/200 |
| 4,503,499 | 5/1985 | Mason et al. | 364/200 |
| 4,646,231 | 2/1987 | Green et al. | 364/200 |
| 4,658,351 | 4/1987 | Teng | 395/650 |
| 4,794,515 | 12/1988 | Hornung | 364/200 |
| 4,845,644 | 7/1989 | Anthias et al. | 364/521 |
| 4,860,247 | 8/1989 | Uchida et al. | 364/900 |
| 4,912,628 | 3/1990 | Briggs | 364/200 |
| 4,918,588 | 4/1990 | Barrett et al. | 364/200 |
| 4,949,251 | 8/1990 | Griffin et al. | 364/200 |
| 4,951,194 | 8/1990 | Bradley et al. | 364/200 |
| 4,959,769 | 9/1990 | Cooper et al. | 395/600 |
| 4,985,831 | 1/1991 | Dulong et al. | 364/200 |
| 5,072,412 | 12/1991 | Henderson, Jr. et al. | 395/159 |
| 5,161,226 | 11/1992 | Wainer | 395/650 |
| 5,175,853 | 12/1992 | Kardash et al. | 395/650 |
| 5,201,033 | 4/1993 | Eagen et al. | 395/155 |
| 5,220,665 | 6/1993 | Coyle, Jr. et al. | 395/650 |
| 5,241,677 | 8/1993 | Naganuma et al. | 395/650 |
| 5,257,375 | 10/1993 | Clark et al. | 395/650 |
| 5,261,099 | 11/1993 | Bigo et al. | 395/650 |
| 5,263,134 | 11/1993 | Paal et al. | 395/158 |

FOREIGN PATENT DOCUMENTS

| | | | |
|---|---|---|---|
| 6041138 | 4/1985 | Japan | G06F 9/46 |
| 3282941 | 12/1991 | Japan | G06F 9/46 |
| 4373026 | 12/1992 | Japan | G06F 9/46 |

*Primary Examiner*—Kevin A. Kriess
*Assistant Examiner*—John Q. Chavis
*Attorney, Agent, or Firm*—Elman & Fried

[57] ABSTRACT

A system is disclosed for the automation of virtually all clerical functions in an office, such as for example, an insurance agency. Virtually any document generated by the office may be printed without the need for pre-printed forms, as the system prints such forms on a laser printer near the worker requesting the form, using a page description language (PDL) appropriate to the printer. The clerical activity involved in maintaining, updating, retrieving, displaying and printing information relating to the functions of the office is supported. A complete audit history of all activity to a specific database (DB) file record is maintained without saving the entire DB record in a historical file. The system also supports a worker when it is desired to interrupt a particular task and execute a different task, without losing information already entered for the first task, but without allowing the worker to exit the system without completing or accounting for the first task.

19 Claims, 65 Drawing Sheets

GEMINI II Agency Automation System

Printed by David M. Murdock on 01/22/90, at 17:09:14.

```
Ref: CP.100$7.1            CISCO Demo Agency (Accrual)        Last Changed  DMM
                             Basic Client Information         01/20/90 10:50:33

Client Code: MURDOCK            BillTo: MURDOCK          Ref.Code:
Client Name: David M. Murdock                            Statuses: NBB :     :
Address #1 : 625 Duke Road                               Producer: DMM :
Address #2 : SUITE 202                                   Servicer: DMM :     :
ZIP=City+St: 07646         New Milford              NJ   Cr.Terms: 1    Net%: 15.00
Phone#1 Ext: 201 265-6206       #2: 201 265-6563         Fax No..:
Categories : CAL    :       :        :       :           Source..: DMM : 09/24/87
Commentary :
 L# Contact / Alternate Name      Salutation (no Dear) Typ Occup./Title Birthday
  1 Mr.David Murdock              Dave                  1               02/23/45
  2 Mrs. Eileen A. Murdock        Eileen                SP1
  3 Mr. Sean E. Murdock           Sean                  2               12/22/49
  3 No. of Contact Lines
 Policies       Written Premium             Annual           #Locations
 Comm. %        Commission Amt.             Annual           #Vehicles
 #Losses        Total Paid Amt.                              #Memos Due Total Balance  Current Balance  30-60 Balance  60-90 Balance  Over 90 Balance

|Doc |CERT|       |SCHI|    |   |    |   |    |CALC|    |    |Revw|
 Exit|File|Help|Cmd?| POL|LOSS| MKT|MEMO|INV|CERT|NEW#|Xref|Disp|Srch|Menu|Quit
```

FIG. 6

GEMINI II Agency Automation System
Printed by David M. Murdock on 01/22/90, at 17:20:19.

```
Ref: CP.100$7.1          CISCO Demo Agency (Accrual)      Last Changed  CFH
                          Basic Client Information          12/07/88 16:10:16

Client Code: MURDOCK        BillTo: WHEATLY        Ref.Code:
Client Name: David M. Murdock ZZ9Z                 Statuses: NBB :     :
Address #1 : 625 Duke Road                         Producer: EAM :     :
Address #2 : 1nd. Floor                            Servicer: EAM :     :
ZIP=City+St: 07646      New Milford           NJ   Cr.Terms: 1    Net%: 15.00
Phone#1 Ext: 201 265-6206      #2: 201 265-6563    Fax No..:
Categories : CAL     :         :        :          Source..: DMM : 09/24/87
Commentary :
 L# Contact / Alternate Name     Salutation (no Dear) Typ Occup./Title Birthday
  1 Mr.David Murdock              Dave                                 02/23/45
  2
  3
  5 No. of Contact Lines
 Policies      Written Premium            Annual          #Locations
 Comm. %       Commission Amt.            Annual          #Vehicles
 #Losses       Total Paid Amt.                            #Memos Due Total Balance  Current Balance  30-60 Balance  60-90 Balance  Over 90 Balance Doc  CERT              SCHI                          CALC              Revw
 Exit File Help Cmd?  POL LOSS  MKT MEMO INV CERT NEW# Xref Disp Srch Menu Quit
```

FIG. 7

GEMINI II Agency Automation System

Printed by David M. Murdock on 01/22/90, at 17:22:48.

```
Ref: CP.100$7.1          CISCO Demo Agency (Accrual)         Last Changed  DMM
                          Basic Client Information            10/11/88 13:10:26

Client Code: MURDOCK           BillTo: WHEATLEY         Ref.Code:
Client Name: David M. Murdock ZZ9Z                      Statuses: NBB  :        :
Address #1 : 625 Duke Road                              Producer: EAM  :
Address #2 : 2nd. Floor                                 Servicer: EAM  :        :
ZIP=City+St: 07646      New Milford              NJ     Cr.Terms: 1    Net%: 15.00
Phone#1 Ext: 201 265-6206      #2: 201 265-6563         Fax No..:
Categories : CAL    :        :        :        :        Source..: DMM : 09/24/87
Commentary :
 L# Contact / Alternate Name        Salutation (no Dear) Typ Occup./Title Birthday
  1 Mr. David Murdock               Dave                                  02/23/45
  2
  3
  5 No. of Contact Lines
 Policies      Written Premium            Annual           #Locations
 Comm. %       Commission Amt.            Annual           #Vehicles
 #Losses       Total Paid Amt.                             #Memos Due Total Balance  Current Balance  30-60 Balance  60-90 Balance  Over 90 Balance

|Doc |CERT|    |    |SCHI|    |   |    |    |    |CALC|    |    |Revw
  Exit|File|Help|Cmd?| POL|LOSS| MKT|MEMO|INV|CERT|NEW#|Xref|Disp|Srch|Menu|Quit
```

FIG. 8

GEMINI II Agency Automation System

Printed by David M. Murdock on 01/22/90, at 17:23:06.

```
Ref: CP.100$7.1           CISCO Demo Agency (Accrual)    Last Changed DMM
                            Basic Client Information     09/24/87 15:13:48

Client Code: MURDOCK        BillTo: MURDOCK         Ref.Cod
Client Name: David M. Murdock                       Statuses:    :     :
Address #1 : 625 Duke Road                          Producer: EAM :     :
Address #2 :                                        Servicer: EAM :     :
ZIP=City+St: 07646      New Milford         NJ      Cr.Terms: 1    Net%: 15.00
Phone#1 Ext: 201 265-6206      #2: 201 265-6563     Fax No..:
Categories :        :        :        :        :    Source..: DMM : 09/24/87
Commentary :
 L# Contact / Alternate Name       Salutation (no Dear) Typ Occup./Title Birthday
  1 Mr. David Murdock              Dave                                  02/23/45
  2
  3
  1 No. of Contact Lines
 Policies       Written Premium            Annual           #Locations
 Comm. %        Commission Amt.            Annual           #Vehicles
 #Losses        Total Paid Amt.                             #Memos Due Total Balance  Current Balance   30-60 Balance   60-90 Balance   Over 90 Balance Doc  CERT           SCHI                          CALC                Revw
 Exit File Help Cmd?  POL LOSS  MKT MEMO INV CERT NEW# Xref Disp Srch Menu Quit
```

FIG. 9

```
                    GEMINI II Agency Automation System
          Printed by David M. Murdock on 01/22/90, at 17:23:26.
Ref: CP.100$7.1           CISCO Demo Agency (Accrual)     Last Changed  DMM
                             Basic Client Information    01/20/90 10:50:33

Client Code: MURDOCK         BillTo: MURDOCK         Ref.Code:
Client Name: David M. Murdock                        Statuses: NBB :      :
Address #1 : 625 Duke Road                           Producer: DMM :      :
Address #2 : SUITE 202                               Servicer: DMM :      :
ZIP=City+St: 07646      New Milford              NJ  Cr.Terms: 1    Net%: 15.00
Phone#1 Ext: 201 265-6206      #2: 201 265-6563      Fax No..:
Categories : CAL   :      :      :      :            Source..: DMM : 09/24/87
Commentary :
 L# Contact / Alternate Name     Salutation (no Dear) Typ Occup./Title Birthday
  1 Mr. David M. Murdock          Dave                 1               02/23/45
  2 Mrs. Eileen A. Murdock        Eileen              SP1              12/22/49
  3 Mr. Sean E. Murdock           Sean                 2
  3 No. of Contact Lines
  Policies      Written Premium           Annual           #Locations
  Comm. %       Commission Amt.           Annual           #Vehicles
  #Losses       Total Paid Amt.                            #Memos Due Total Balance  Current Balance  30-60 Balance  60-90 Balance  Over 90 Balance Doc  CERT        SCHI                        CALC              Revw
 Exit File Help Cmd?  POL LOSS  MKT MEMO INV CERT NEW# Xref Disp Srch Menu Quit
```

FIG. 10

```
                    GEMINI II Agency Automation System
           Printed by David M. Murdock on 01/22/90, at 17:23:45.
Ref: CP.100$7.1          CISCO Demo Agency (Accrual)       Last Changed  DMM
                           Basic Client Information        01/20/90 10:50:06

Client Code: MURDOCK         BillTo: MURDOCK        Ref.Code:
Client Name: David M Murdock                        Statuses: NBB  :      :
Address #1 : 625 Duke Road                          Producer: DMM  :      :
Address #2 : SUITE 202                              Servicer: DMM  :      :
ZIP=City+St: 07646        New Milford           NJ  Cr.Terms: 1    Net%: 15.00
Phone#1 Ext: 201 265-6206       #2: 201 265-6563    Fax No..:
Categories : CAL      :         :         :         Source..: DMM : 09/24/87
Commentary :
 L# Contact / Alternate Name      Salutation (no Dear) Typ Occup./Title Birthday
  1 END David M Murdock           Dave                  1                02/23/45
  2 Mrs. Eileen A. Murdock        Eileen               SP1               12/22/49
  3 Mr. Sean E. Murdock           Sean                  2
  5 No. of Contact Lines
 Policies       Written Premium              Annual            #Locations
 Comm. %        Commission Amt.              Annual            #Vehicles
 #Losses        Total Paid Amt.                               #Memos Due Total Balance  Current Balance   30-60 Balance  60-90 Balance  Over 90 Balance Doc  CERT              SCHI                         CALC              Revw
 Exit File Help Cmd?   POL LOSS  MKT MEMO INV CERT NEW# Xref Disp Srch Menu Quit
```

FIG. 11

```
GEMINI II Agency Automation System
Printed by David M. Murdock on 01/22/90, at 17:24:05.
```

| Ref: CP.100$7.1 | CISCO Demo Agency (Accrual) | Last Changed DMM |
|---|---|---|
| | Basic Client Information | 12/08/89 13:17:48 |

```
Client Code: MURDOCK        BillTo: MURDOCK        Ref.Code:
Client Name: David M. Murdock                      Statuses: NBB :       :
Address #1 : 625 Duke Road                         Producer: DMM :       :
Address #2 : SUITE 202                             Servicer: DMM :       :
ZIP=City+St: 07646      New Milford          NJ    Cr.Terms: 1    Net%: 15.00
Phone#1 Ext: 201 265-6206       #2: 201 265-6563   Fax No..:
Categories : CAL    :       :       :       :      Source..: DMM : 09/24/'87
Commentary :
 L# Contact / Alternate Name      Salutation (no Dear) Typ Occup./Title Birthday
  1 Mr. David M. Murdock          Dave                  1                02/23/45
  2 Mrs. Eileen A. Murdock        Eileen                SP1              12/22/49
  3 Mr. Sean E. Murdock           Sean                  2
  5 No. of Contact Lines
 Policies       Written Premium           Annual            #Locations
 Comm. %        Commission Amt.           Annual            #Vehicles
 #Losses        Total Paid Amt.                             #Memos Due Total Balance   Current Balance  30-60 Balance  60-90 Balance  Over 90 Balance Doc  CERT         SCHI                      CALC              Revw
 Exit File Help Cmd?  POL LOSS MKT MEMO INV CERT NEW# Xref Disp Srch Menu Quit
```

FIG. 12

GEMINI II Agency Automation System

Printed by David M. Murdock on 01/22/90, at 17:54:05.

```
01/22/90              The GEMINI II Insurance System           05:53:51PM
Menu: DMM
                       CISCO Demo Agency (Accrual)
                    1. Client Marketing & Servicing
                    2. Accounts Receivable Menu
                    3. Accounts Payable Menu
                    4. Financial Management Menu
                    5. Insurance Forms & Reports Menu
                    6. Insurance Codes & Lists Menu
                    7. Accounting Codes & Lists Menu
                    8. Nightly Sleep Save
                    9. Monthly Reports Menu
                   10. Memo & Word Processing Menu
                   11. System Coordinator's Menu
                   12. The CICSO Development Menu
                   13. The Report Builder Menu
                   14. Project Status Menu
                   15. The Interface Menu
                   16. Copyright Preparation Enter Selection #; (OFF); or <Return>:

|Exit|    |Help|Cmd?|    |    |    |    |    |    |Disp|    |Quit|
```

FIG. 18

```
                    GEMINI II Agency Automation System
            Printed by David M. Murdock on 01/22/90, at 17:54:36.
┌─────────────────────────────────────────────────────────────────────────────
│Ref: CP.100$7.1          CISCO Demo Agency (Accrual)       Last Changed
│                            Basic Client Information
│
│Client Code:              BillTo:                   Ref.Code:
│Client Name:                                        Statuses:   :      :
│Address #1 :                                        Producer:   :      :
│Address #2 :                                        Servicer:   :      :
│ZIP=City+St:                                        Cr.Terms:       Net%:
│Phone#1 Ext:              #2:                       Fax No..:
│Categories :      :      :      :      :            Source..:   :
│Commentary :
│ L# Contact / Alternate Name    Salutation (no Dear) Typ Occup./Title Birthday
│
│
│     No. of Contact Lines
│ Policies       Written Premium          Annual             #Locations
│ Comm. %        Commission Amt.          Annual             #Vehicles
│ #Losses        Total Paid Amt.                             #Memos Due
│
│ Total Balance  Current Balance  30-60 Balance  60-90 Balance  Over 90 Balance
│
│
│       Doc  CERT              SCHI                         CALC             Revw
│ Exit|File|Help|Cmd?| POL|LOSS| MKT|MEMO|INV|CERT|NEW#|Xref|Disp|Srch|Menu|Quit
```

FIG. 19

```
GEMINI II Agency Automation System
Printed by David M. Murdock on 01/22/90, at 17:55:06.
Ref: CP.100$7.1            CISCO Demo Agency (Accrual)         Last Changed  DMM
                            Basic Client Information            01/20/90 10:50:33
Client Code: MURDOCK         BillTo: MURDOCK          Ref.Code:
Client Name: David M. Murdock                         Statuses: NBB :        :
Address #1 : 625 Duke Road                            Producer: DMM :        :
Address #2 : SUITE 202                                Servicer: DMM :        :
ZIP=City+St: 07646       New Milford          NJ      Cr.Terms: 1    Net%: 15.00
Phone#1 Ext: 201 265-6206      #2: 201 265-6563       Fax No..:
Categories : CAL    :       :       :       :         Source..: DMM : 09/24/87
Commentary :
 L# Contact / Alternate Name         Salutation (no Dear) Typ Occup./Title Birthday
 1 Mr. David M. Murdock              Dave                  1                02/23/45
 2 Mrs. Eileen A. Murdock            Eileen                SP1              12/22/49
 3 Mr. Sean E. Murdock               Sean                  2
 3 No. of Contact Lines
 Policies    8  Written Premium          0 Annual             #Locations    8
 Comm. %     0  Commission Amt.          0 Annual             #Vehicles    13
 #Losses     0  Total Paid Amt.          0                    #Memos Due   14

Total Balance  Current Balance   30-60 Balance  60-90 Balance   Over 90 Balance
      4,760             0                0              0              4,760

Exit|File|Doc |CERT|    |SCHI|    |    |    |    |    |    |CALC|    |    |Revw
         |Help|Cmd?| POL|LOSS| MKT|MEMO|INV |CERT|NEW#|Xref|Disp|Srch|Menu|Quit
```

FIG. 20

```
                    GEMINI II Agency Automation System
              Printed by David M. Murdock on 01/22/90, at 17:57:09.

┌─────────────────────────────────────────────────────────────────────────────┐
│Ref: PI.100$6            CISCO Demo Agency (Accrual)                         │
│                            Policy Selection List                            │
│Client Code: MURDOCK          BillTo MURDOCK         Ref.Code                │
│Client Name  David M. Murdock                        Statuses NBB            │
│Address #1   625 Duke Road                           Producer DMM            │
│ Ln#      -- Policy Number --  Ins Cov Eff.Date Exp.Date B -CNR Date-  Premium│
│   1      1DRIVER2VEHICLES     AET PA  01/01/90 01/01/91 A                   │
│   2      TESTING&PREFILL      AET PA  01/01/90 01/01/91 A                   │
│   3      BINDER2676           AET PA  01/01/90 01/01/91 A                   │
│   4      SAFARI1111111111111  AET PA  01/01/90 01/01/91 A                   │
│   5      128345045            AET PA  12/12/89 12/12/90 A                   │
│   6      APP644               AET PA  07/01/97 07/01/98 A                   │
│   7      APP2254              AET PA  12/01/89 12/01/90 A                   │
│   8      APP2202              AET PA  01/01/89 01/01/90 A R 01/01/90        │
│   9      APP1983              GA  PA  01/01/91 01/01/92 A                   │
│  10      APP644               AET PA  07/01/96 07/01/97 A R 07/01/97        │
│  11      APP644               AET PA  01/01/96 07/01/96 A R 07/01/96        │
│  12      APP644               AET PA  01/01/95 01/01/96 A R 01/01/96        │
│  13      APP644               AET PA  01/01/94 01/01/95 A R 01/01/95        │
│  14      APP644               AET PA  01/01/93 01/01/94 A R 01/01/94        │
│  38 Lines                                                                   │
│Ln#: 1   Tran: COR (NEW/END/AUD/CAN/REI/REW/REN/NRW/COR/DIS) Eff.Date:       │
│                                                                             │
│ APP BIND      CERT LNOT    SCHI           AAID CLPR           Copy          │
│ Exit File Help Cmd?  POL LOSS      Memo               Xref Disp Srch Menu Quit│
└─────────────────────────────────────────────────────────────────────────────┘
```

FIG. 21

```
                   GEMINI II Agency Automation System
           Printed by David M. Murdock on 01/22/90, at 18:01:37.
```

```
Ref: PI.101$11          CISCO Demo Agency (Accrual)      Entry 01/22/90 DMM
                          Basic Policy Information     Effective 01/20/90  14

Policy Seq. #:    2810   Division No.: 1          Client Code: MURDOCK
Policy Number: 1DRIVER2VEHICLES        State: NJ BillTo Code: MURDOCK
Named Insured: David M. Murdock
Inurer Code:   AET Aetna Casualty & Surety Producer Code1: DMM   2:    3:
Coverage Code: PA Personal Automobile    Bill Meth. A/C:A Agency Bill
Term / Status: A / NEW                   Cancel Method :
Eff.Date/Time: 01/01/90   : 12:01AM      Premium Amount:
Exp.Date/Time: 01/01/91   : 12:01AM      Comm:        % $
Orig. Incept.: 01/01/90                                Written    Annualized
Binder Effect:            :              Premium $
Binder Expire:            :              Agt.Comm$
Binder Reason:                           Prd.Comm$
Misc. Remarks:
:
  <LOC>     1 Location & Building Info. <INV>    1 Inv & Prem Trans   N Inst?
  <DRI>     2 Driver Information        <PHO>    0 Prior History & Other Ins.
  <VEH>     2 Vehicle Information       <REM>    0 Remarks & Attachments
  <SCH>     0 Scheduled Property Info.  <AOI>    0 Additional/Other Interests
  <COV>     2 Coverage Information      <URI>    4 Underwriting & Rating Info.

APP BIND CHNG CERT LNOT LOSS SCHI Memo EPI AIID CLPR SAFA Disp Next Copy Revw
 Exit File Help LOC  DRI  VEH  SCH  COV INV PHO  REM  AOI  URI  Srch Menu Quit
```

FIG. 22

```
                    GEMINI II Agency Automation System
         Printed by David M. Murdock on 01/22/90, at 17:58:09.
┌─────────────────────────────────────────────────────────────────────┐
│01/22/90            The GEMINI II Insurance System         05:57:53PM│
│Menu: DMM                                                            │
│                    CISCO Demo Agency (Accrual)                      │
│                 1. Client Marketing & Servicing                     │
│                 2. Accounts Receivable Menu                         │
│                 3. Accounts Payable Menu                            │
│                 4. Financial Management Menu                        │
│                 5. Insurance Forms & Reports Menu                   │
│                 6. Insurance Codes & Lists Menu                     │
│                 7. Accounting Codes & Lists Menu                    │
│                 8. Nightly Sleep Save                               │
│                 9. Monthly Reports Menu                             │
│                10. Memo & Word Processing Menu                      │
│                11. System Coordinator's Menu                        │
│                12. The CICSO Development Menu                       │
│                13. The Report Builder Menu                          │
│                14. Project Status Menu                              │
│                15. The Interface Menu                               │
│                16. Copyright Preparation                            │
│                                                                     │
│         Enter Selection #; (OFF); or <Return>:                      │
│                                                                     │
│                                                                     │
│ ┌────┐ ┌────┬────┐ ┌──┬──┬──┬──┬──┐ ┌──┬──┐ ┌────┐ ┌──┬──┐ ┌────┐  │
│ │Exit│ │Help│Cmd?│ │  │  │  │  │  │ │  │  │ │Disp│ │  │  │ │Quit│  │
│ └────┘ └────┴────┘ └──┴──┴──┴──┴──┘ └──┴──┘ └────┘ └──┴──┘ └────┘  │
└─────────────────────────────────────────────────────────────────────┘
```

FIG. 23

GEMINI II Agency Automation System

Printed by David M. Murdock on 01/22/90, at 17:58:24.

```
01/22/90                CISCO Demo Agency (Accrual)           05:58:12PM
Menu: AR.000
                        Accounts Receivable Menu 1. Preliminary Invoice Register
             2. Invoice Print & Update
             3. Invoice Correction Screen
             4. Cash Receipts Entry Screen
             5. Cash Receipts Report & Update
             6. Check Disbursements Entry Screen
             7. Check Disbursements Print& Update
             8. Accounts Receivable Adjustments
             9. Adjustments Report & Update
            10. Direct Bill Insurance Receipts
            11. Direct Bill Ins Receipts Prt & Upd Enter Selection #; (OFF); or <Return>:

Exit    Help Cmd?                                      Disp          Quit
```

Fig. 24

GEMINI II Agency Automation System

Printed by David M. Murdock on 01/22/90, at 18:00:45.

```
Ref: AR.105$6            CISCO Demo Agency (Accrual)
                              Cash Receipts
Division No. :  1        CISCO Demo Agency (Accrual)
Reference No.:     1394
Bank Code    : HFT       Bank of Hartford
Deposit Date : 01/22/90  Period End Date: 01/31/90
Client Code  : JONES     JOE JONES             Balance      2,890.00
G/L Acct. No.: 1.1100.00 Accounts Receivable
Check Number : 12345                     Remains to Post      0.00
Check Amount :        100.00
Check Comment: ON ACCOUNT CASH RECEIPT
 Ln#   Inv.# Inv.Date Trn Policy No Cov Eff.Date Inv. Balance   Post Amounts
   1 OA1394 01/22/90 COA                                     *        100.00
   2   4323 12/15/89 NEW              01/01/90     2,222.00 B
   3   4323 12/15/89 NEW              01/01/90     2,222.00 B
   4   4327 12/15/89 FEE              12/11/89     2,990.00 *
   5
   6
   7
   8
   9
  10

Doc
Exit File Help Cmd?                               Xref Disp Srch Menu Quit
```

FIG. 25

GEMINI II Agency Automation System
Printed by David M. Murdock on 01/22/90, at 18:01:03.

```
01/22/90              CISCO Demo Agency (Accrual)              06:00:51PM
Menu: AR.000
                       Accounts Receivable Menu 1. Preliminary Invoice Register
                  2. Invoice Print & Update
                  3. Invoice Correction Screen
                  4. Cash Receipts Entry Screen
                  5. Cash Receipts Report & Update
                  6. Check Disbursements Entry Screen
                  7. Check Disbursements Print & Update
                  8. Accounts Receivable Adjustments
                  9. Adjustments Report & Update
                 10. Direct Bill Insurance Receipts
                 11. Direct Bill Ins Receipts Prt & Upd Enter Selection #; (OFF); or <Return>:

Exit     Help Cmd?                              Disp         Quit
```

Fig. 26

GEMINI II Agency Automation System

Printed by David M. Murdock on 01/22/90, at 18:01:17.

```
01/22/90            The GEMINI II Insurance System            06:01:05PM
Menu: DMM
                       CISCO Demo Agency (Accrual)
                 1.  Client Marketing & Servicing
                 2.  Accounts Receivable Menu
                 3.  Accounts Payable Menu
                 4.  Financial Management Menu
                 5.  Insurance Forms & Reports Menu
                 6.  Insurance Codes & Lists Menu
                 7.  Accounting Codes & Lists Menu
                 8.  Nightly Sleep Save
                 9.  Monthly Reports Menu
                 10. Memo & Word Processing Menu
                 11. System Coordinator's Menu
                 12. The CICSO Development Menu
                 13. The Report Builder Menu
                 14. Project Status Menu
                 15. The Interface Menu
                 16. Copyright Preparation Enter Selection #; (OFF); or <Return>:

Exit    Help Cmd?                                    Disp       Quit
```

FIG. 27

```
                    GEMINI II Agency Automation System
          Printed by David M. Murdock on 01/22/90, at 18:01:37.
┌─────────────────────────────────────────────────────────────────────────┐
│Ref: PI.101$11         CISCO Demo Agency (Accrual)    Entry 01/22/90 DMM │
│                       Basic Policy Information    Effective 01/20/90  14│
│                                                                         │
│Policy Seq. #:   2810    Division No.: 1       Client Code: MURDOCK      │
│Policy Number: 1DRIVER2VEHICLES      State: NJ BillTo Code: MURDOCK      │
│Named Insured: David M. Murdock                                          │
│Inurer Code:   AET Aetna Casualty & Surety Producer Code1: DMM  2:   3:  │
│Coverage Code: PA Personal Automobile     Bill Meth. A/C: A Agency Bill  │
│Term / Status: A / NEW                     Cancel Method :               │
│Eff.Date/Time: 01/01/90  : 12:01AM         Premium Amount:               │
│Exp.Date/Time: 01/01/91  : 12:01AM         Comm:        % $              │
│Orig. Incept.: 01/01/90                              Written    Annualized│
│Binder Effect:           :                 Premium $                     │
│Binder Expire:           :                 Agt.Comm$                     │
│Binder Reason:                             Prd.Comm$                     │
│Misc. Remarks:                                                           │
│ :                                                                       │
│  <LOC>    1 Location & Building Info. <INV>  1 Inv & Prem Trans  N Inst?│
│  <DRI>    2 Driver Information        <PHO>  0 Prior History & Other Ins.│
│  <VEH>    2 Vehicle Information       <REM>  0 Remarks & Attachments    │
│  <SCH>    0 Scheduled Property Info.  <AOI>  0 Additional/Other Interests│
│  <COV>    2 Coverage Information      <URI>  4 Underwriting & Rating Info.│
│                                                                         │
│ APP BIND CHNG CERT LNOT LOSS SCHI Memo EPI AIID CLPR SAFA Disp Next Copy Revw│
│ Exit File Help LOC  DRI  VEH  SCH  COV INV PHO  REM  AOI  URI Srch Menu Quit│
└─────────────────────────────────────────────────────────────────────────┘
```

FIG. 28

GEMINI II Agency Automation System

Printed by David M. Murdock on 01/22/90, at 18:11:39.

```
Ref: ACRD.FRMS$2.1          CISCO Demo Agency (Accrual)
                      ACORD Forms Generation Parameters                    P/L
ACORD Form #: 1    Description: ACORD 1 Property Loss Notice p. 1          P
-----------------------------------Lines and Boxes-----------------------------
Line Horiz Vert   Height  Width  Wt T Patt ----- Comments -----------------
 1    1.00  2.00   63.50  81.00  10 0
 2   66.00  4.50    1.00  16.00   1 0
 3   32.00  6.50    1.00  50.00   1 0
 4   32.00  8.50    1.00  50.00   1 0
 5   32.00  9.50    1.00  50.00   1 0
 - Check Off Boxes-    ----------------Printing Offsets --------------------
    1   67.00     4.00  -------- Background --------  --------Foreground -------
    2                       Horiz:         Vert:   1.50   Horiz:       Vert: -1.75
------Horiz---Vert-O-Pt-Wt----- Background Text --------------------------
    1    3.00    3.10 H 16 B ACORD
    2   13.50    3.25 H 18 B PROPERTY LOSS NOTICE
    3   67.00    2.50 H  6 B DATE
    4   70.00    2.50 H  6 M (MM/DD/YY)
    5    2.00    4.55 H  6 B PRODUCER
    6   33.00    4.55 H  6 B PRODUCER PHONE
    7   42.00    4.55 H  6 B (A/C, No., Ext.)
    8   51.00    4.55 H  6 B MISCELLANEOUS INFORMATION Exit File Help Cmd?                                          Srch Menu Quit
```

| ACORD. PROPERTY LOSS NOTICE | | | DATE (MM/DD/YY) 07/22/89 | |
|---|---|---|---|---|
| PRODUCER GEMINI II Demo Agency 95 Grand Avenue P.O. Box 1000 CODE 4564161   SUB CODE | PRODUCER PHONE (A/C, No., Ext.) 516 798 1000 | MISCELLANEOUS INFORMATION (Site & Location Code) | | |
| | COMPANY Aetna Casualty & Surety | | POLICY NUMBER 1234567890 | CAT.# |
| | POLICY EFF. DATE (MM/DD/YY) 01/01/89 | POLICY EXP. DATE (MM/DD/YY) 01/01/90 | DATE (MM/DD/YY) & TIME OF LOSS 07/19/89  A.M. / P.M. | PREVIOUSLY REPORTED YES / NO |

INSURED

| NAME AND ADDRESS David M. Murdock 625 Duke Road SUITE 1 New Milford, NJ  07646 | INSURED'S RESIDENCE PHONE (A/C, No.) 201 265-6206 | INSURED'S BUSINESS PHONE (A/C, No., Ext.) 201 265-6563 |
|---|---|---|
| | PERSON TO CONTACT Mr. David M. Murdock | WHERE TO CONTACT WHEN |
| | CONTACT'S RESIDENCE PHONE (A/C, No.) 201 265-6206 | CONTACT'S BUSINESS PHONE (A/C, No., Ext.) 201 265-6563 |

LOSS

| LOCATION OF LOSS See Remarks for Location of Loss | POLICE OR FIRE DEPT. TO WHICH REPORTED |
|---|---|
| KIND OF LOSS (Fire, Wind, Explosion, Etc.) Property | PROBABLE AMOUNT ENTIRE LOSS |

DESCRIPTION OF LOSS & DAMAGE (Use additional pages, if necessary)
WIND BLEW DOWN A TREE BRANCH ON THE HOUSE

POLICY INFORMATION

MORTGAGEE (If none so indicate)

HOMEOWNER POLICIES SECTION I ONLY (Complete for coverages A, B, C, D & additional coverages. For Homeowners Section II Liability Losses, use ACORD 3.)

| COVERAGE A | COVERAGE B | COVERAGE C | COVERAGE D | DESCRIBE ADDITIONAL COVERAGES PROVIDED |
|---|---|---|---|---|
| DWELLING | APPURTENANT PRIVATE STRUCTURES | UNSCHEDULED PERSONAL PROPERTY | ADDITIONAL LIVING EXPENSES | ON |
| | | | | ON |
| SUBJECT TO FORMS (Insert form nos. & edition dates, special deductibles) | | | | DEDUCTIBLES |

FIRES, ALLIED LINES & MULTI-PERIL POLICIES (Complete only those items involved in loss)

| ITEM | AMOUNT | BLDG. | CONTENTS | OTHER | %COINS | DEDUCTIBLE | COVERAGE AND/OR DESCRIPTION OF PROPERTY INSURED |
|---|---|---|---|---|---|---|---|
| 1 | 15000000 SeeRemarks | See> XXXX | | | 50 | 1000 | Blanket #: 5 |
| 2 | 25000 SeeRemarks | | | See----> XXXX | | 5000 | Blanket #: 5 Trees, Shrubs & Plants |
| 3 | 150000 | | XXXX | XXXX | 90 | 500 | |

SUBJECT TO FORMS (Insert form nos. & edition dates, special deductibles)

MISCELLANEOUS INFORMATION

OTHER INSURANCE (List companies, policy numbers, coverages & policy amounts)

| REMARKS ---------- Location of Loss ---------- 625 Duke Road; SUITE 1 New Milford, NJ  07646 (Continued on additional Remarks page.) | |
|---|---|
| ADJUSTER ASSIGNED | DATE ASSIGNED (MM/DD/YY) |
| REPORTED BY | REPORTED TO David M. Murdock | SIGNATURE OF PRODUCER OR INSURED |

ACORD 1 (2/88) 1 of 3   # 260   NOTE: IMPORTANT STATE INFORMATION ON NEXT PAGE   © ACORD CORPORATION 1988

FIG. 38

GEMINI II Agency Automation System
Printed by David M. Murdock on 01/26/90, at 15:12:13.

```
Ref: BANKS$3              CISCO Demo Agency (Accrual)     Last Changed:MCB
                          Add/Change Bank Codes           08/12/88 11:23:09

Bank Code: CHP
Bank Name: Chase Manhattan Bank
Bank G/L#: 1.1021.00              PREMIUM TRUST - CHASE
1st Chk #: 50000
Last Chk#: 50171
Address  : Main Street
Zip Code : 11743        City: Huntington            State: NY
Routing Code                : 01-216/212
Print Checks on Printer (Y/N): Y
Print Check Stubs (Y/N)     : N
Adjustment G/L Number       : 1.6080.00
Bank Transit Number         :       02800024
Account Number              : 343 1 101215
Spaces in MICR Line (Y/N)   :

Order of (C)heck#-(T)ransit#-(A)ccount# MICR Output (e.g., TCA):

Doc
Exit File Help Cmd?                                    Disp Srch Menu Quit
```

FIG. 39

OFFICE AUTOMATION SYSTEM WITH INTERRUPT FEATURE

This is a division of application Ser. No. 07/954,416 filed on Sep. 30, 1992, now U.S. Pat. No. 5,317,733 issued May 31, 1994, which is a continuation of application Ser. No. 07/471,290 filed on Jan. 26, 1990, now abandoned.

A portion of the disclosure of this patent document contains material which is subject to copyright protection. The copyright owner has no objection to the facsimile reproduction by anyone of the patent disclosure, as it appears in the PTO patent file or records, but otherwise reserves all copyright rights whatsoever.

BACKGROUND OF THE INVENTION

1. Field of the Invention

The present invention relates to office automation and specifically to the automation of virtually all clerical functions in an office, such as for example, an insurance agency. It involves means for the creation of virtually any document generated by the office without the need for preprinted forms and the automation of clerical activity involved in maintaining, updating, retrieving, displaying and printing information relating to the functions of the office.

One feature of this invention relates to means for storing a complete audit history of all activity to a specific database (DB) file record without saving the entire DB record in a historical file.

Another feature of this invention relates to means for permitting a worker to interrupt a particular task and execute a different task, without losing information already entered for the first task, and without being permitted to exit the system without completing or accounting for the first task.

A further feature of the present invention relates to a method of generating printed forms on a laser or equivalent printer without the user needing to learn the specific Page Description Language (PDL) of a particular brand of laser printer.

2. State of the Art

Although there has been much publicity given to the idea that widespread use of computers would usher in an age of the "paperless office" or "electronic office," for the most part such predictions are yet to be realized. The present inventor believes that certain inadequacies of current computer technology prevent available systems from achieving this potential. By addressing and overcoming these inadequacies, the present invention permits the implementation of computer systems which can truly be said to achieve the primary goals of office automation.

When a body of information is to be shared and accessed in common by more than one worker in an office, a system with greater power than a conventional personal computer is needed. The present invention involves a system including a multi-terminal business computer with the ability to create and access a common database while maintaining an audit history of all additions and changes, with the ability to produce filled-in forms on an as-needed basis, and with the ability to permit the operator to interrupt a current task in favor of a more urgent one, without losing data and the ability to return where the first task was left off.

As the body of information in a database (DB) is created, added to, and changed as new and corrected data is entered, it is important to be able to determine when and under what circumstances each entry was made. The purpose of such a feature is to be able to isolate any errors, either systematic errors or inadvertent errors, that may have been made in the data, so that they may be corrected; a further advantage of such a feature is to be able to determine what the state of facts was at any time in the past. For accounting systems, and more generally for DBs that maintain such information, a trail of entries modifying a particular record is generally known as an "audit trail," and in general the information comprising the history of a given DB or portion of a DB is known as an "audit history."

It has been customary in the past to maintain an audit history of a DB file by saving complete copies of each DB record in a historical file. As time passes, and the number of changes made to any specific record increases, enormous amounts of disk storage are required to maintain the audit history of the DB files. This causes the system designer to make several compromises. The number of DB files for which history will be maintained is severely limited, or there must be a periodical compression of the history images to conserve disk space, with the consequence that detail of audit information is lost. The ability to maintain audit history on a wide range of DB files without the necessity of compressing out the detail would be a valuable tool to any system designer.

One of the primary failures of many multi-user office automation systems is that the programs do not operate in the same way an employee would operate manually. Specifically, workers are constantly being interrupted by requests for information by other employees or by outside clients.

Using past systems, when a worker is involved in a computer-related function (e.g. adding a new client or customer to the database) and is interrupted by a phone call from an existing client who has a question about last month's statement, the employee would have to choose from among the following alternatives:

1. Take down some basic information from the client, offer to call the client back once the information has been found, finish up the computer operation currently in progress, and then call up the necessary programs to answer the client's inquiry. In that event, the client would have to wait for a callback.
2. Throw away the work done so far by aborting the current computer operation and then call up the programs necessary to answer the client's inquiry. Later, the work thrown away would have to be reentered.
3. Place the client on hold, get up from the workstation, find another workstation where the terminal is free, ask the employee sitting there to move, and then use that terminal to call up the programs to answer the client's question. The worker and possibly one other employee are displaced while the question is being answered, and the worker is away from any notes or other information that may also help respond to the client.

Each of the choices described above has undesirable consequences. And even though this problem has been addressed on some graphics-based operating environments, e.g. on Macintosh personal computers as well as Microsoft Windows and IBM OS/2, they remain as serious problems on multi-user computer systems that utilize ASCII terminals as their primary input device.

Modern laser printers are delivered to the end user with a command language built in. While the Page Description Language (PDL) may differ from one manufacture to another, each of the PDLs provided will allow the end user to perform various tasks such as to draw a line or draw a circle. The languages differ in capability and style, but all PDLs provide a basic graphics capability to the end user. However, in general these PDLs are difficult to learn and use. The commands tend to be very difficult to specify, and often the user needs many trials and errors before achieving the desired result on the page.

There are several products currently on the market that will allow an end user to graphically build an image of the desired form on the monitor and then generate that image on a printer. However, these products build "bit-mapped" images, which require large amounts of disk space for storage and take a long time to print. Moreover these products are based on personal computers and require a bit-mapped monitor to use. Because the products do not utilize the PDL that is provided with the printer to generate the documents, very substantial amounts of printing time are consumed for each page that is printed, so much so that such products are not well suited for generating filled-in forms on an as-needed basis in a busy office.

SUMMARY OF THE INVENTION

The present invention involves an integrated system providing a workstation having access to a common database of information for each of a plurality of office workers (operators). The system supports workstations that are capable of displaying on demand whatever information is needed or requested by the operator. The operator also updates information in the database by entering it into the workstation. A feature of the present invention is that the system has the capability of re-creating and displaying the information as it existed in the database at any time in the past, utilizing audit history data, and optionally of displaying the information as it is expected to be at some future date.

The system is especially useful for information-intensive service businesses, for example an insurance agency, an accounting firm, or a law office, as well as nonprofit organizations, e.g. a hospital, and governmental agencies, e.g. a taxing authority. For many such functions, inquiries and new information may arrive on an unpredictable basis, such as by telephone or walk-in, and it is desirable that any system serving that office be capable of responding immediately to an inquiry and that any task of more than one step be susceptible of being interrupted in favor of a more urgent task.

The system has the capability of producing printouts, e.g. forms, documents, correspondence, and checks, close to the time they are requested and in most instances at a location in proximity to the operator requesting the printout, because the amount of pre-printed material can be limited and most forms can be generated on an as-needed-and-used basis, with all information already filled in.

Desirably each workstation is a terminal of a multi-terminal general purpose business computer, for example a microcomputer serving from two to eight or nine terminals, and preferably a minicomputer serving up to about 120 ASCII terminals or the like. The system of the present invention could also be incorporated in a mainframe computer, such as one serving hundreds of terminals, if desired. Each terminal comprises a conventional keyboard and display screen, with the capability of displaying conventional ASCII characters. An advantage of the present invention is that the features are implemented without the need for graphics display capabilities which could require more expensive communication links and terminal hardware.

Audit History Feature

In accordance with the audit history feature of the present invention, all programs that are written or generated that utilize a file that maintains history, will call a particular program. This program will compare the record as it resides on disk and the record as it is about to be written back to disk, and create one audit history record that records all of the changes that have transpired. One record is created each time that the record is written to disk. These records become the audit trail for the record. In the preferred embodiment of the invention described in greater detail below, this program is named STD.HISTORY.SUB.

If the operator wishes to examine the history for a record, a command is entered that will call the STD.HISTORY.SUB program. The operator is prompted for information about how the audit history is to be displayed. The program will then utilize the audit records created earlier to recreate the record as of the date desired. The display logic of the program will then display the version to the operator, with all changes displayed in a special graphical format such as reverse video or some other highlighting technique. The operator may then examine other versions of the historical record by entering various commands.

There are two variations to displaying record history as follows:

1. Strictly in the order that they were made based on the date and time of original entry.
2. Sorted and displayed in an alternate order that the developer may designate. In a preferred embodiment of the system (i.e. for insurance agency management), the alternate order is by the Effective Date of the change. For example, changes may be entered into the system to be effective in the past or the future. Changes effective in the future anticipate certain events, such as the date a student will be leaving for college and going off the policy. Changes made in the past record events that have happened but which, for one reason or another, are not recorded until some later date, such as the purchase of an additional family car.

Interrupt Feature

This feature of the present invention provides the operator with the ability to temporarily suspend the current operation and initiate an entirely new operation. The software allows the operator to be "interrupt-driven" as required by the working environment. A preferred embodiment of this feature will allow the operator to perform the interruption process up to twelve times before the system requires the operator to conclude a previously interrupted task. The system prevents the operator from logging off for the day without resolving each of the suspended sessions. Various pieces of information are passed from level to level by the program, thus allowing for seamless operation of multi-level tasks.

Utilizing this feature in the example mentioned in the State of the Art section above, the operator enters the (M)enu command regardless of where the focus of activity (i.e. the curser) happens to be in any screen. The system will thereupon perform the following steps:

1. Suspend the current operation (adding the new client).
2. Initiate a new computer task.
3. Execute the Menu Program, which permits the operator to perform any computer operation necessary to satisfy the client's question.

Once finished with the new task, the operator enters (E)xit from the menu program and the system will:

4. Re-establish the original program.

5. Re-display the original program background and data.
6. Place the operator back into the field from which the interruption was initiated.

Forms Builder Feature

The forms builder feature of the present invention permits an unskilled operator to design a form without ever having to learn the PDL of the device being used to print the forms. This feature of the invention does not require the use of a bit-mapped monitor and generates a printer-compatible series of commands in the PDL of the printer. Armed with nothing more than a standard forms ruler, the developer can enter in all of the necessary information to allow the Forms Builder to build the form.

Two steps are required to generate each form. The operator enters the image specifics into a database record via a screen entry program. Once complete, the system interprets the "Source" information and generates the printer-compatible "Object" commands.

Because of the virtually universal acceptance of the Hewlett-Packard PDL throughout the laser printer industry, this PDL is implemented as the language of choice in the preferred embodiment of this invention.

BRIEF DESCRIPTION OF THE DRAWINGS

FIG. 6 to FIG. 12 are screen images depicting the various historical data presentations generated by the audit history program.

FIG. 18 to FIG. 28 are a series of screen images that illustrate the interruption function.

FIG. 36 is a screen image of the Forms Generation Parameter entry screen. A portion of the information necessary to generate a form is also displayed.

Figure 37:
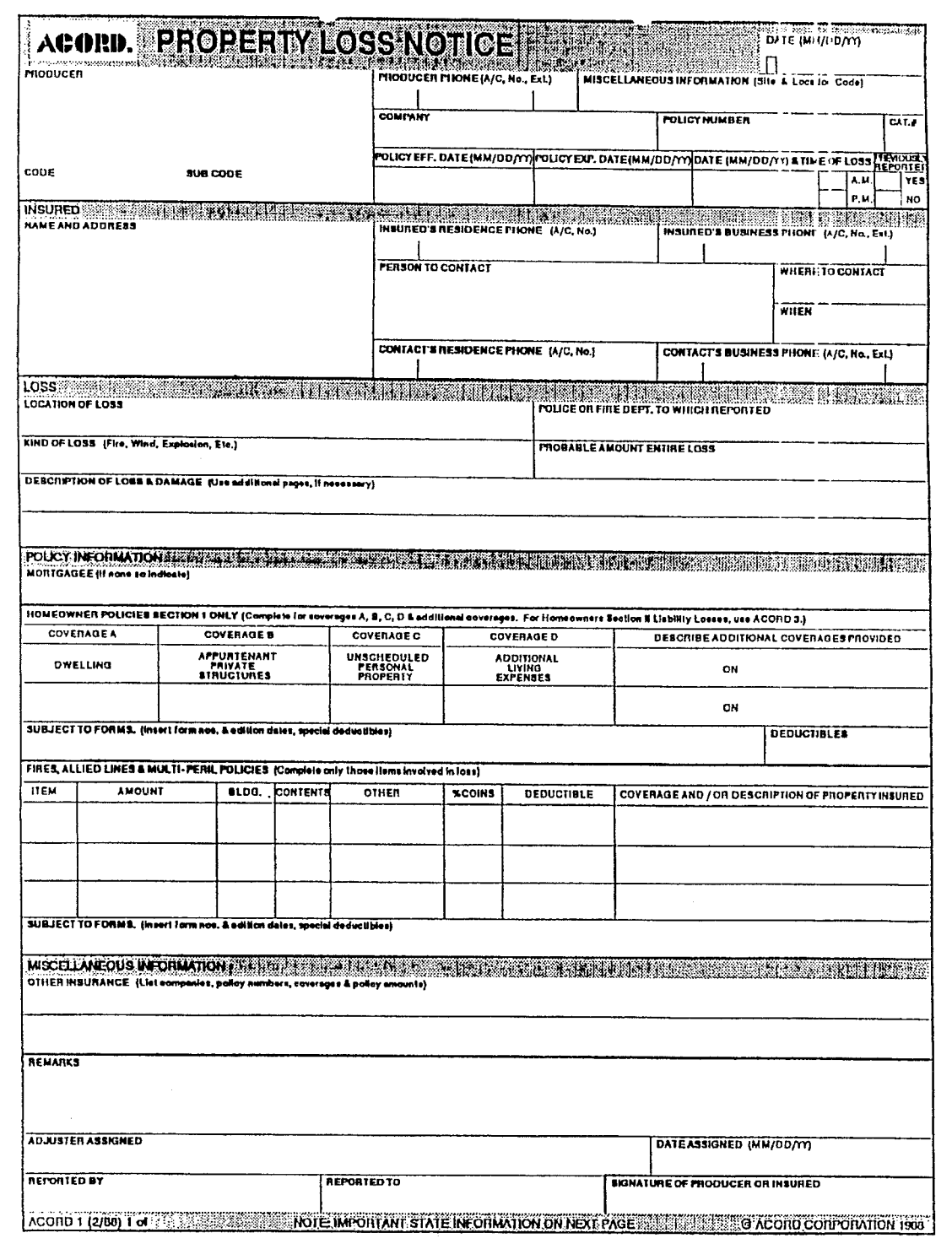

FIG. 37 is the actual form created by the Forms Generator as a result of the information entered and depicted in FIG. 36.

FIG. 38 is an example of the form of FIG. 37 combined with actual data and printed.

FIG. 39 is a screen image produced by the program BANKS$3.MAIN.

BRIEF DESCRIPTION OF THE APPENDICES

APPENDIX A. STD.HISTORY.SUB$8 (Version 8): Source Code Listing. Used to maintain and display audit history.

APPENDIX B. 1) BANKS$3.MAIN (Version 3): Generated Source Code Listing. Typical program that maintains and displays history.

2) BANKS$3.BGFG (Version 3): Generated Source Code Listing. Display routines used by BANKS$3.MAIN to display Background (static data), Foreground (DB record data), and Historical information (both visual presentation data and history data).

APPENDIX C. STD.MESSAGE$17 (Version 17): Source Code Listing. This program is used by all applications programs to prompt the operator with a message, and then capture the operator's response.

APPENDIX D. STD.INPUT$18 (Version 18): Source Code Listing. This program is used by all applications programs to accept data from the operator. This program differs from STD.MESSAGE in that there is no prompt involved and the resulting data is validated and placed into a data record.

APPENDIX E. STD.EXECUTE$4 (Version 4): Source Code Listing. Used by all applications programs to freeze the current level and initiate the next higher level.

APPENDIX F. PROGRAM.MAIN$4 (Version 4): Source Code Listing. Used by all applications programs to perform various house-keeping tasks and to communicate between levels.

APPENDIX G. STD.FORMS.BUILDER$2 (Version 2): Source Code Listing. Used to compile the printer understandable (Object Code) necessary to create a laser printed document.

APPENDIX H. 1) ACORD.FORMS$2.MAIN (Version 2): Source Code Listing. Used to enter document image parameters. Creates and maintains the Image Source information.

2) ACORD.FORMS$2.BGFG (Version 2): Source Code Listing. The display routines for the above entry program.

DETAILED DESCRIPTION OF A PREFERRED EMBODIMENT

Figure 1:
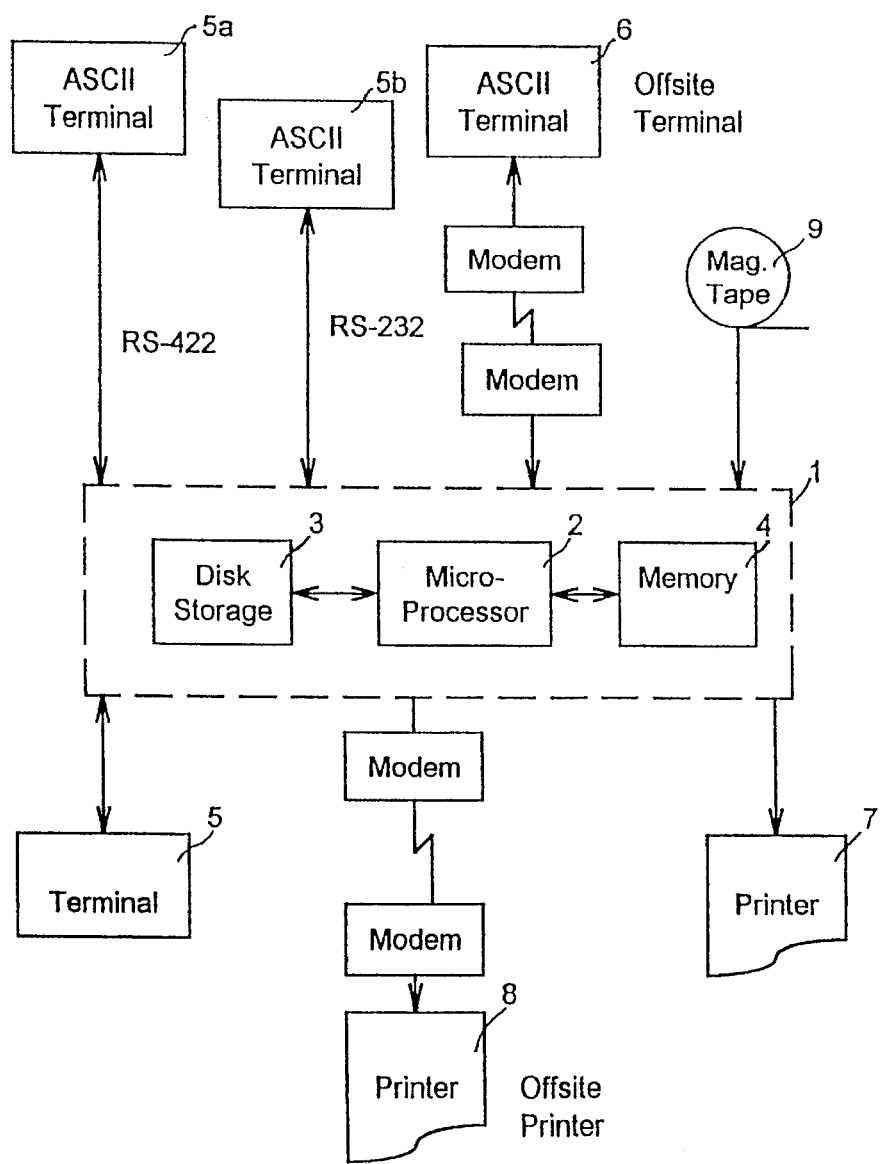
FIG. 1 shows a typical computer hardware configuration that could utilize this invention.

FIG. 1 shows diagrammatically a typical computer hardware configuration that would be appropriate for the system of the present invention. The host computer 1 generally comprises a microprocessor 2 in communication with disk storage 3 and high-speed memory 4. A plurality of terminals, here schematically represented by 5, 5a, and 5b, are in communication with the host computer 1 through any one or more of various forms of cabling.

Any of the various conventional techniques of connecting terminals to a host computer may be used in the system of the present invention. As an illustrative example and not by way of limitation, terminal 5 represents one or more terminals coupled to the host computer through coaxial cable; terminal 5a represents optionally one or more terminals communicating through an RS-422 link; and terminal 5b represents one or more terminals communicating through an RS-232 link. Terminals 5, a, and 5b are all within the distance of effective cable runs from the host computer 1.

Terminal 6, shown as being connected to the host computer 1 through telecommunications link by modem, represents optionally one or more terminals that may be beyond the effective distance of direct cabling to the host computer 1 and may operate anywhere that electromagnetic signals may be communicated, including via the public switched telephone network and cellular phone communication. As mentioned previously, the terminals should be capable of displaying conventional ASCII characters but do not require graphics capabilities, even though the printers used in connection with the present system are capable of generating the graphics of a variety of forms.

Printer 7, shown as connected by cabling to the host computer 1, represents one or more printers within the distance of effective cable runs of the host computer. Desirably a plurality of printers having graphics capability, which are preferably laser or similar high-speed, high quality printers but alternatively may be conventional dot-matrix printers, are provided at spaced-apart locations in the office that are generally in proximity to the various terminals 5, 5a, and 5b.

Printer 8, shown as connected via modem to the host computer 1, represents one or more printers that are off site, and desirably in general proximity to the off-site terminals 6.

Bulk memory is provided by one or more magnetic tape drives 9, which also communicate with the host computer 1.

Audit History Feature

The implementation of the audit history feature is facilitated by the generation of various parts of the software in a strictly uniform format. Each calling program would set up the initial conditions, accept and process the commands the same, and contain a display routine that would display the visual image record and the historical image record simultaneously on the screen to properly represent each image to the operator.

In producing the software for the office automation system of the present invention, it is quite helpful to employ a Computer-Aided Software Engineering (CASE) program generator to create all data input programs. Once the concepts of audit history have been programmed into the CASE tool, every program generated would then include all of the necessary code to properly process audit history. An example of one of the generated programs illustrates the necessary steps:

Program Name BANK.MAIN (Version 3). See APPENDIX B for listing.

FIG. 39. Screen Jan. 23, 1990 – 15:12:13: Screen dump of how the Bank File Maintenance program appears to the screen (including typical bank information; in this instance Chase Manhattan Bank).

APPENDIX B, pages 1–16. Program Listing BANK$$3.MAIN: This is the code generated by the CASE tool and contains the main logic portion of the program.

APPENDIX B, pages 17–19. Program Listing BANK$$3.BGFG: This is the code generated in concert with the ".MAIN" program above that contains all of the data display routines (including the audit history display). The pertinent sections of this program are as follows:

| Lines | Box | Description |
| --- | --- | --- |
| 37–57 | | Display the static background text |
| 58–83 | | Display the current Data Base record |
| 109–134 | 696 | Display the visual and historical image records |
| | 720 | |

Figure 2A:
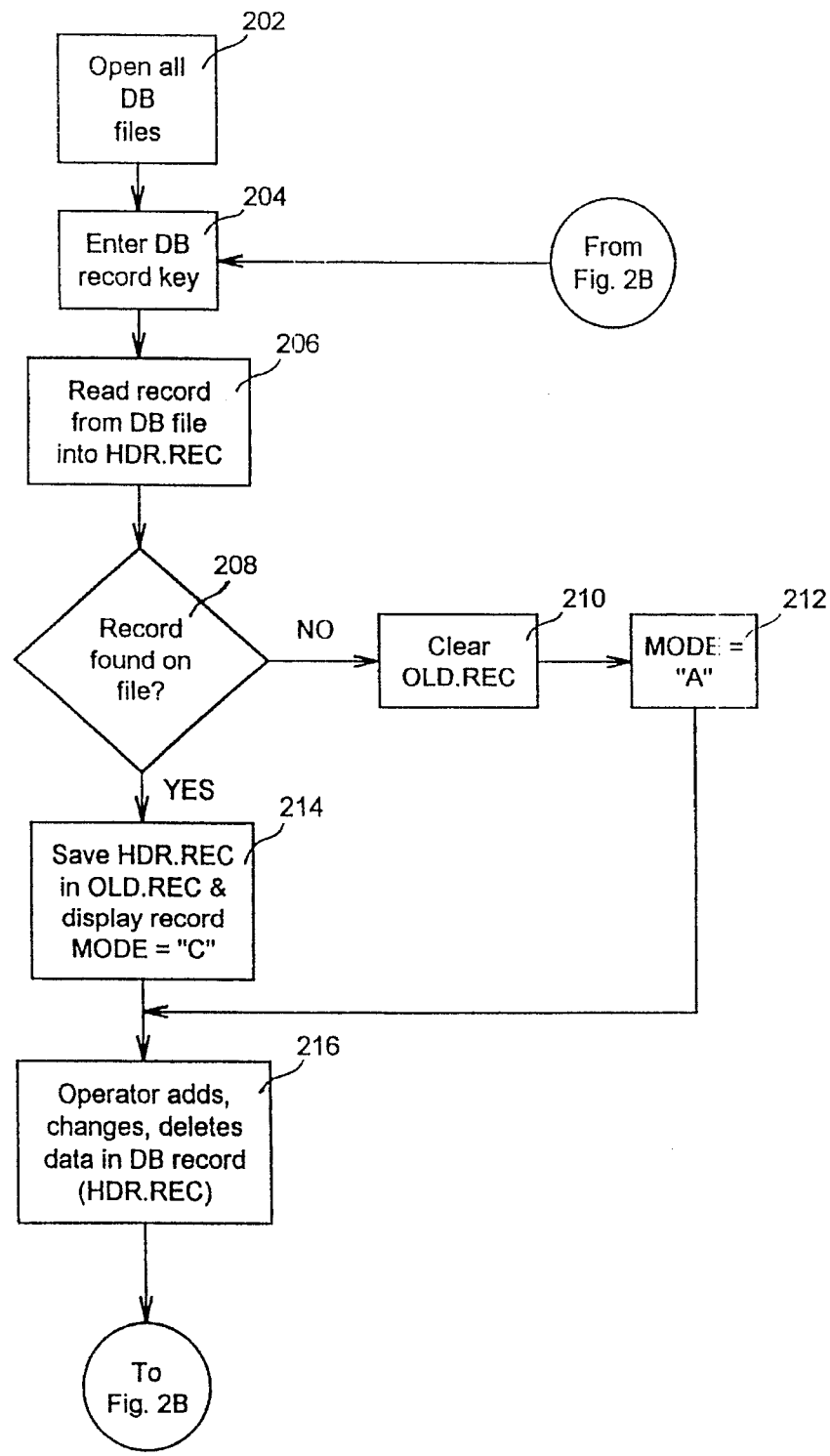
FIGS. 2A and 2B are a block diagram of a typical program that would maintain and display audit history.
Figure 2B:
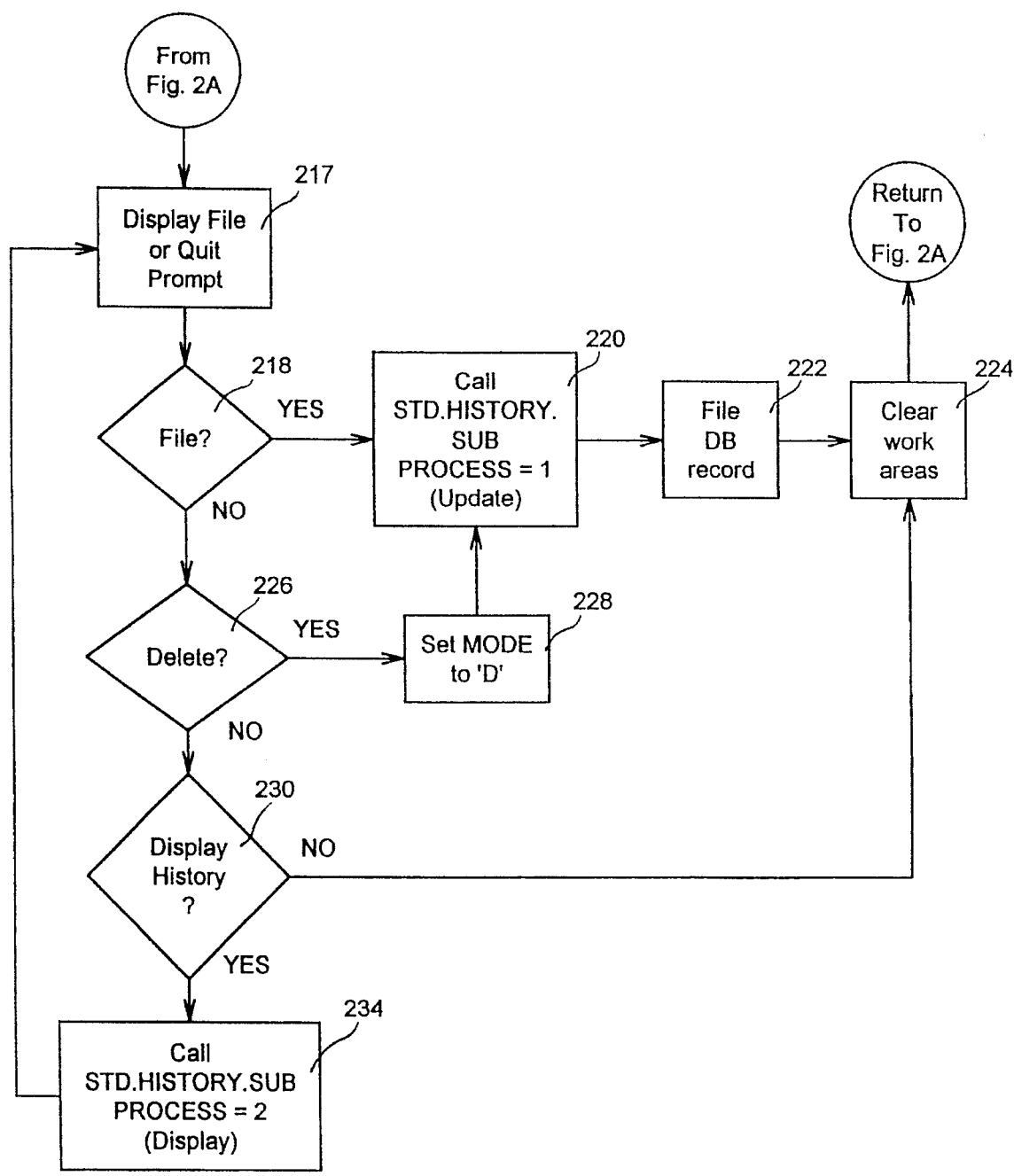
Figure 3:
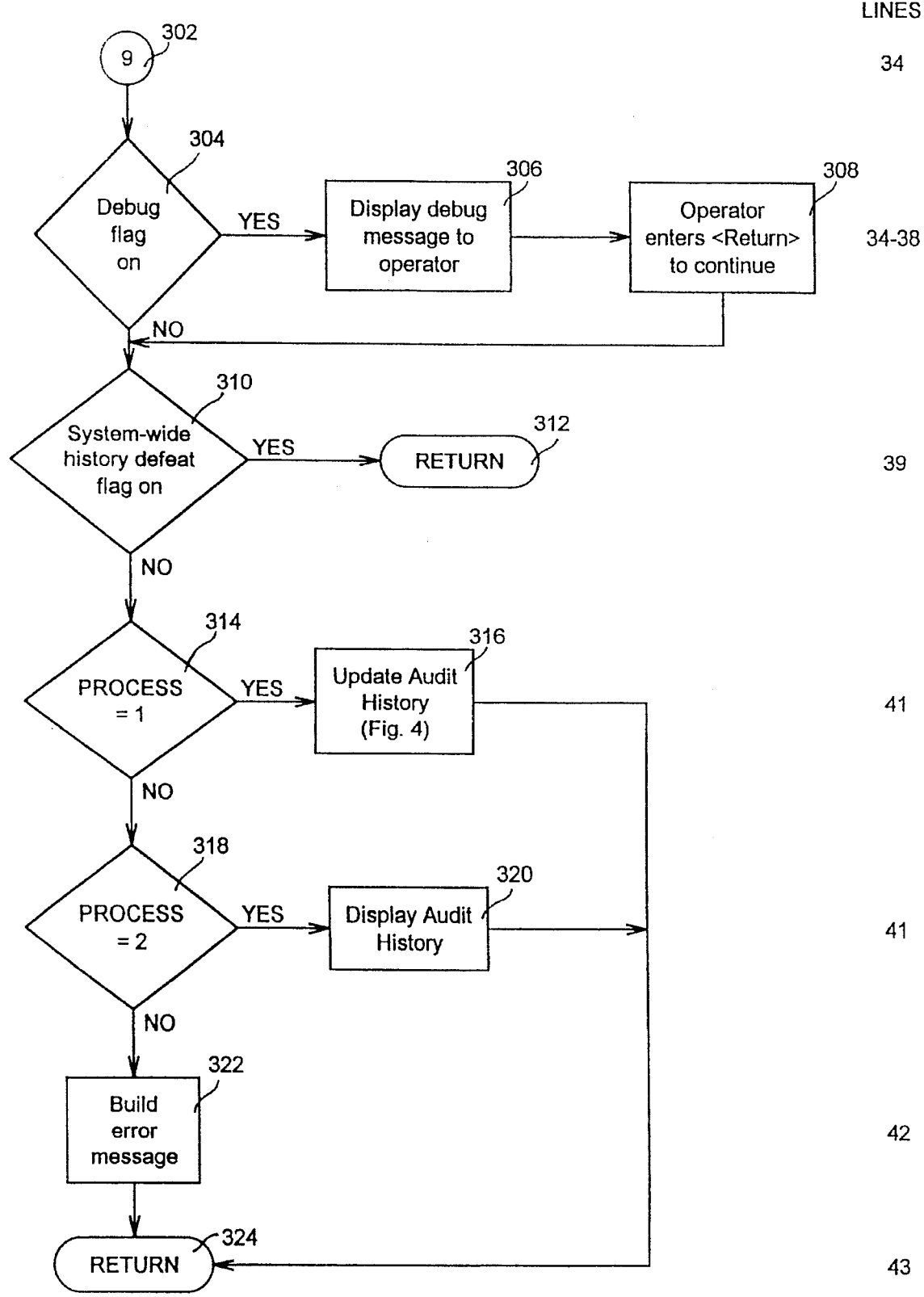
FIG. 3 shows the overall logic flow of the audit history program (STD.HISTORY.SUB) of a preferred embodiment of the present invention.

Please refer to FIGS. 2A and 2B and program listing BANK$$3.MAIN, APP. B.

| Lines | Box | Desscription |
| --- | --- | --- |
| 41–47 | 202 | Data Base files are opened (including BANKS.HISTORY FILE (line 43) |
| 84–95 | 204 | Operator enters Data Base record key |
| 107–115 | 206 | Program attempts to read DB record from disk |
| 112–115 | 212 | MODE set to "A" |
| 109–111 | 214 | DB record saved in OLD.REC, DB record displayed to the operator, and MODE set to "C" |
| 127–325 | 216 | Operator may enter/change data fields in the DB record. |
| 326–343 | 217 | Operator is prompted for (F)ile, (Q)uit, (R)eview, and various other commands |
| 345–382 | 218 | Operator selects (F)ile. |
| 512 | 220 | File routine calls STD.HISTORY.SUB to update the history file. |
| 513–514 | 222 | DB record is filed to disk |
| 518–546 | 224 | Work areas are cleared to prepare for a new DB key to be entered |
| 394–426 | 226 | Operator selects to delete the DB record |
| 401 | 228 | MODE is set to "D" |
| 402 | 220 | STD.HISTORY.SUB routine is called to update the history file. |

Note: Due to various program efficiency reasons, the recognition of the (R)eview command takes place in another program. This program is used to prompt the operator and return to the calling program the operator's response. The program name is STD.MESSAGE, and a complete program listing is APPENDIX C. The following line numbers refer to line numbers in STD.MESSAGE.

| | | |
| --- | --- | --- |
| 129 | 230 | The operator requests that audit history be displayed. |
| 426–432 | 234 | The STD.HISTORY.SUB program is called after setting PROCESS to 2 to signify that the display routine is to be executed. |
| 433 | | The original screen Background (static text) and Foreground (record data) are displayed. |

FILES REQUIRED

Each file that is to have history recorded must have a database file to store the current active record and a history file to store the audit history records. In the system of the preferred embodiment, the history file is named XXX.HIS- TORY where XXX is the name of the database file.

| Data File | History File |
|---|---|
| CLIENTS | CLIENTS.HISTORY |
| POLICIES | POLICIES.HISTORY |
| DRIVERS | DRIVERS.HISTORY |

RECORD LAYOUTS

Database Record

The layout of the database record has no bearing on the creation of audit history with the following restriction: A field must be designated to hold the Audit Information in the database record. This field will hold the following information:

1. The Initials of the operator who made the change.
2. The System Date that the change was made.
3. The System Time that the change was made.
4. The Audit History Change Number.
5. The Mode of the program: A — Adding a new record C — Changing an existing record D — Deleting a record
6. The name of the program making the change.
7. Any other optional piece of information that the system designer wishes to use as an alternate display sequence.

The database file record will hold the above-described information for the last change entered. Each time a new history record is created, the Audit History information is replaced with new information recording the conditions of the latest change.

Audit History Record

The key to each Audit History record is composed of the key to the database file record and the Audit History Change Number.

Attribute (Field) #1 — This field contains the same audit history information as contained in the database file record.

The next two attributes will record the fact that an individual field in the database record was changed as follows:

First Attribute: The specific data field location that has been changed. The operating system that a preferred embodiment of this Audit History is implemented on (the Pick Operating System) has Fields (Attributes), Sub-Fields (Values), and Sub-Sub-Fields (Sub-Values). Each of these is identified by the Attribute Mark Count (AMC), Value Mark Count (VMC), or Sub-Value Mark Count (SVMC). This first attribute will contain the AMC, VMC, and SVMC of the field changed.

Second Attribute: The second attribute of each pair will contain the old contents of the field changed. The new contents are in the database record. If the old contents of the field were Null (empty), then a Delete Mark (ASCII 127) is stored.

Each field changed in the database record will require a pair of attributes in the history record. Additional pairs of fields are added to the history record as necessary to record multiple changes.

When records are added to the database file, the only information recorded is the information in the attribute #1.

When records are deleted from the database file, the audit history record will contain all of the information in the database record just prior to deletion.

The following examples will demonstrate the file layout of a typical Audit History transaction:

AMC DB RECORD FIELD CONTENTS (BEFORE)
  Key MURDO23MA
    1 DMM/8900/14123/C/4/CP.100
    2 Megan M. Murdock
    3 123 Main St.
    4 Anywhere
    5 New Jersey Three changes will be made to this record.
1. Expand the middle initial to the complete middle name
2. Change "Anywhere" to "Bloomfield"
3. Remove the telephone number AMC DB RECORD FIELD CONTENTS (AFTER)
  Key MURDO23MA
    1 DMM/8935/16274/C/5/CP.100
    2 Megan Maria Murdock
    3 123 Main St.
    4 Bloomfield
    5 New Jersey
    6 07003
    7 (empty)

The Audit History record created to record this transaction will be as follows:

AMC AUDIT HISTORY FIELD CONTENTS
  Key MURD023MA*5
    1 DMM/8935/16274/C/5/CP.100
    2
    3 Megan M. Murdock
    4 4
    5 Anywhere
    6 7
    7
    8 201-429-2733

Notes: Attribute 1 of the Audit History record is identical to the Audit History Attribute in the database record (Attribute 1 in this case). Each attribute changed in the database record requires two attributes in the Audit History record. One records the Attribute Mark Count (field number) and one records the old contents of the field. The key to this history record is composed of the key to the database record and the Audit History Change Number.

INITIAL CONDITIONS IN CALLING PROGRAM

Any program that is to call the history routine (STD.HISTORY.SUB) must initialize the following variables:

HDR.REC This is an array that contains the record as it has been changed by the program.

OLD. REC This is an array that contains the record as it existed just after this program read the data record.

MODE This is the Program Mode as specified above (A)dd, (C)hange, or (D)elete.

HIST.FILE This is the internal file name (opened).

INT.HDR.KEY This is the key of the database record.

MAX.AUDIT This is the highest Attribute number (Field number) to be processed by the audit history routine. All fields above this limit are cleared and ignored.

ADDL.HIST.DATA This is the optional additional information that the developer may designate as additional auditing information to be included.

PROCESS This flag is set by the program depending on which function the program is to perform. If set to one (1), the program will perform the audit history update function. If set to two (2), the program will display any audit history that exists for the record as specified by INT.HDR.KEY.

CHANGE.HIST This indicator is set to the Attribute Number of the DB record that will hold the audit history information.

CALLING PROGRAM NARRATIVE

The process starts with the calling program (FIGS. 2A and 2B). This program will open all necessary database and history files 202. The operator will be prompted for and enter the key to a DB record 204. The program will store the response in INT.HDR.KEY and attempt to read the record from the DB file. If the record is not found in the file 208, the program will clear OLD.REC 210 and set the program MODE to "A" 212. If the record is found, the program will save the initial image of the DB record in OLD.REC 214.

At this point the operator has the ability to enter new information (Add Mode) or change existing information (Change Mode) 216. Once all additions or changes have been made, the program will prompt the operator to (F)ile the record, (D)elete the record, (Q)uit without saving any changes made, or (R)eview the audit history 217. If the operator responds (F)ile 218, the program will set the PROCESS flag to 1 (Update) and call STD.HISTORY.SUB 220, write the DB record back to disk 222, clear the work areas 224 and return to prompt the operator for another DB record key 204. If the operator responds (D)elete 226, the program will change the program mode from (A) dd to (D)elete 228 and then call STD.HISTORY.SUB to update 220. If the operator responds (R)eview 230, the program will set the PROCESS flag to 2 and call STD.HISTORY.SUB234 to display the audit history for the record and then return to the (F)ile, (D)elete, (R)eview prompt 217.

STD.HISTORY.SUB MAIN LOGIC NARRATIVE (FIG. 3)

If the programmer is debugging the calling program and has set the DEBUG.FLAG on, the program will halt and allow the operator (programmer) to set debug points in the program 304–308. If the system-wide history defeat flag has been set 310, then this installation of the Office Automation System is not maintaining history on any files, and the program will return to the calling program with no further processing 312. If the calling program has set the PROCESS flag to one (1) 314, then the program will execute the audit history update routine 316 and return to the calling program 324. If the calling program has set the PROCESS flag to two (2) 318, then the program will execute the audit history display routine 320 and return to the calling program 324. If the PROCESS flag is not set to either one or two, the program will return to the calling program 324 after setting an error condition 322.

Figure 4A:
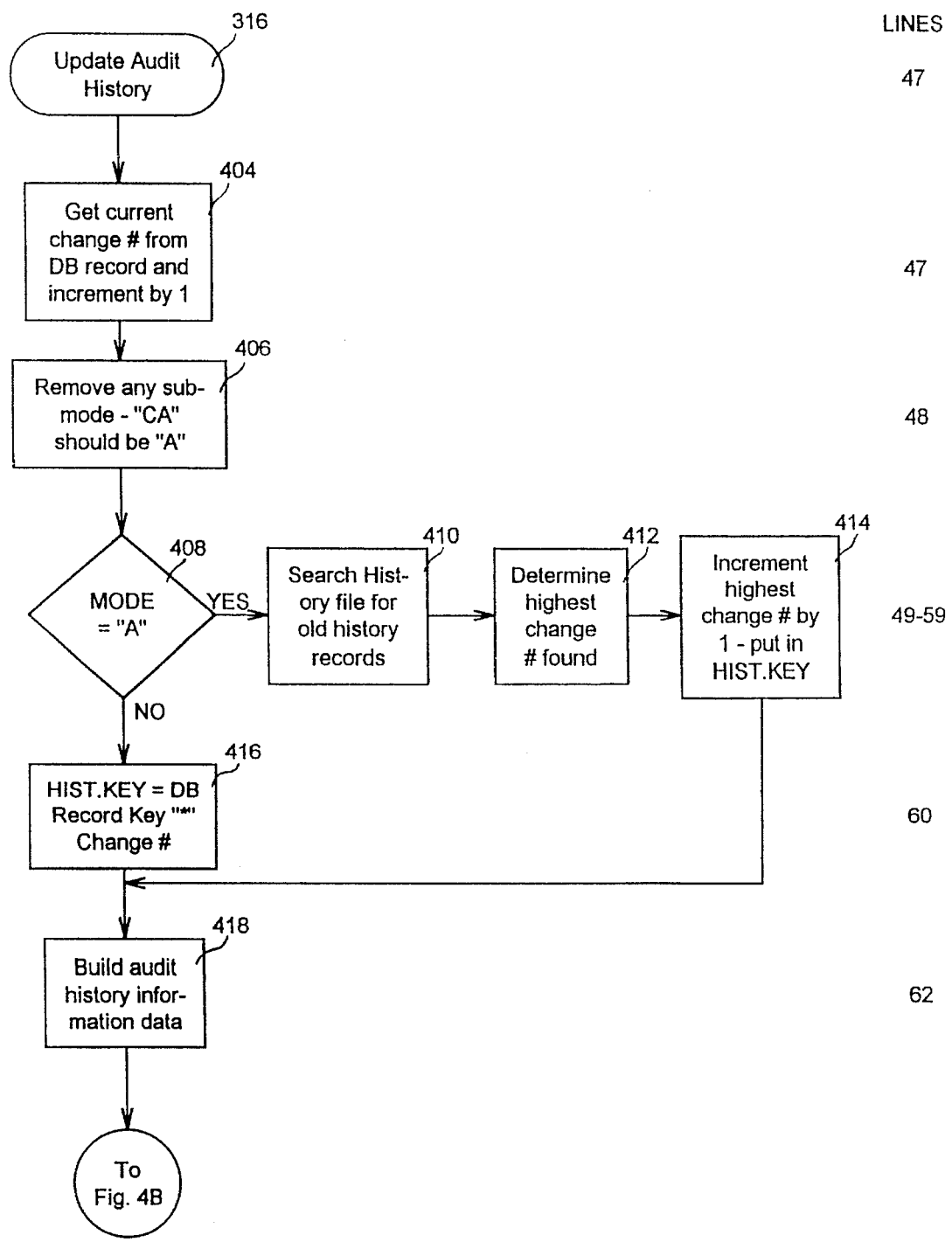
FIGS. 4A to 4I are a logic diagram of the updating portion of the audit history program.
Figure 4B:
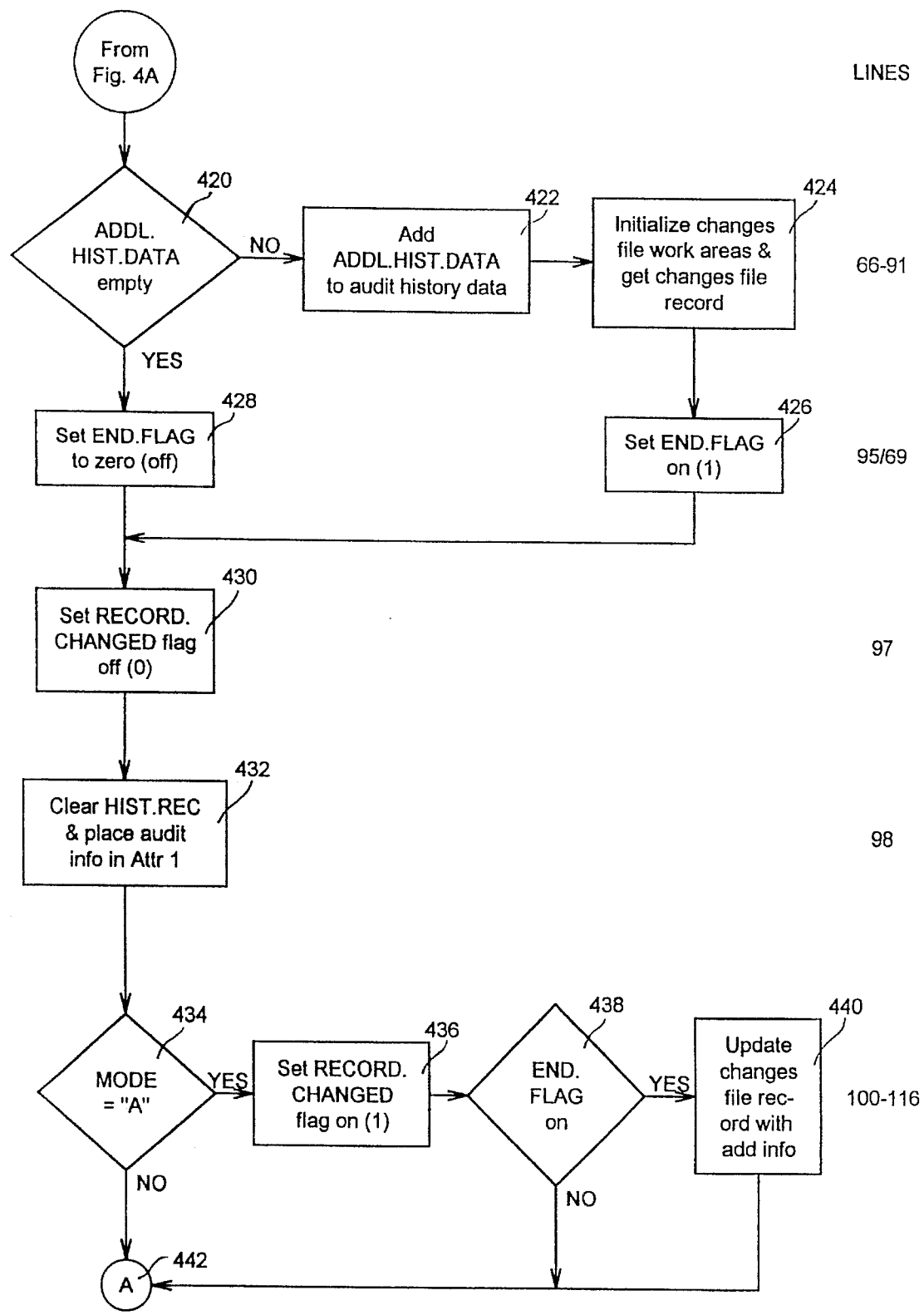

STD. HISTORY. SUB UPDATE LOGIC NARRATIVE (FIGS. 4A and 4B)

The program will determine the CHANGE.NO of the new audit history record (if any is ultimately created) by retrieving the last change number from the DB record's audit information and incrementing it by one 404. The program then will resolve any sub-Mode changes that might have taken place in the calling program 406. If the program mode is (A)dd 408, then the program will search the history file to see if this record had been deleted from the file at an earlier point 410, determine the highest change number found on the old record 412, and increment it and save the result in CHANGE.NO 414. The program will then specify the key of this audit history record 416 by constructing the history key as INT.HDR.KEY*CHANGE.NO as determined by step 404 or steps 410–414.

Next, the program will build the new audit history information string that will ultimately be stored in the DB record and in Attribute 1 of the audit history record 418. If the developer of the calling program has specified any additional information to be included 420, the program will add the contents of ADDL.HIST.DATA to the audit history data string 422, and initialize the Changes file to prepare to accept history information 424 and 426. At this point the program initializes various flags and work areas 430, and loads the audit information into the new audit history record 432.

If the program MODE was (A)dd 434, then there is no need to examine each data field. It is given that all fields are new. The program will set the RECORD.CHANGED flag on 436, and if the END.FlAG (set in step 424) is on 438, updates the changes file with information about the record being added 440. The program will then continue with step 540 (See FIG. 4I).

Figure 4C:
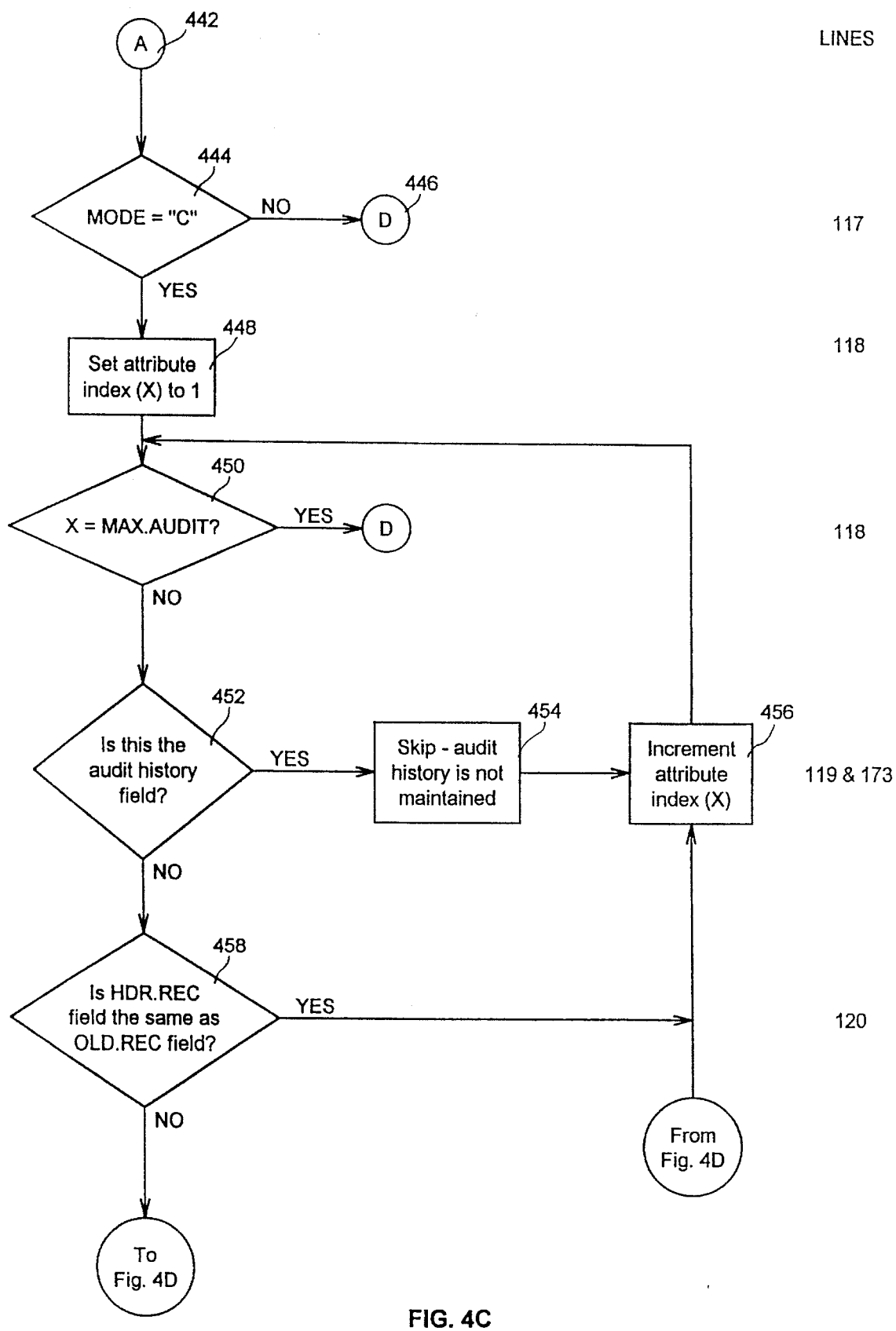
Figure 4D:
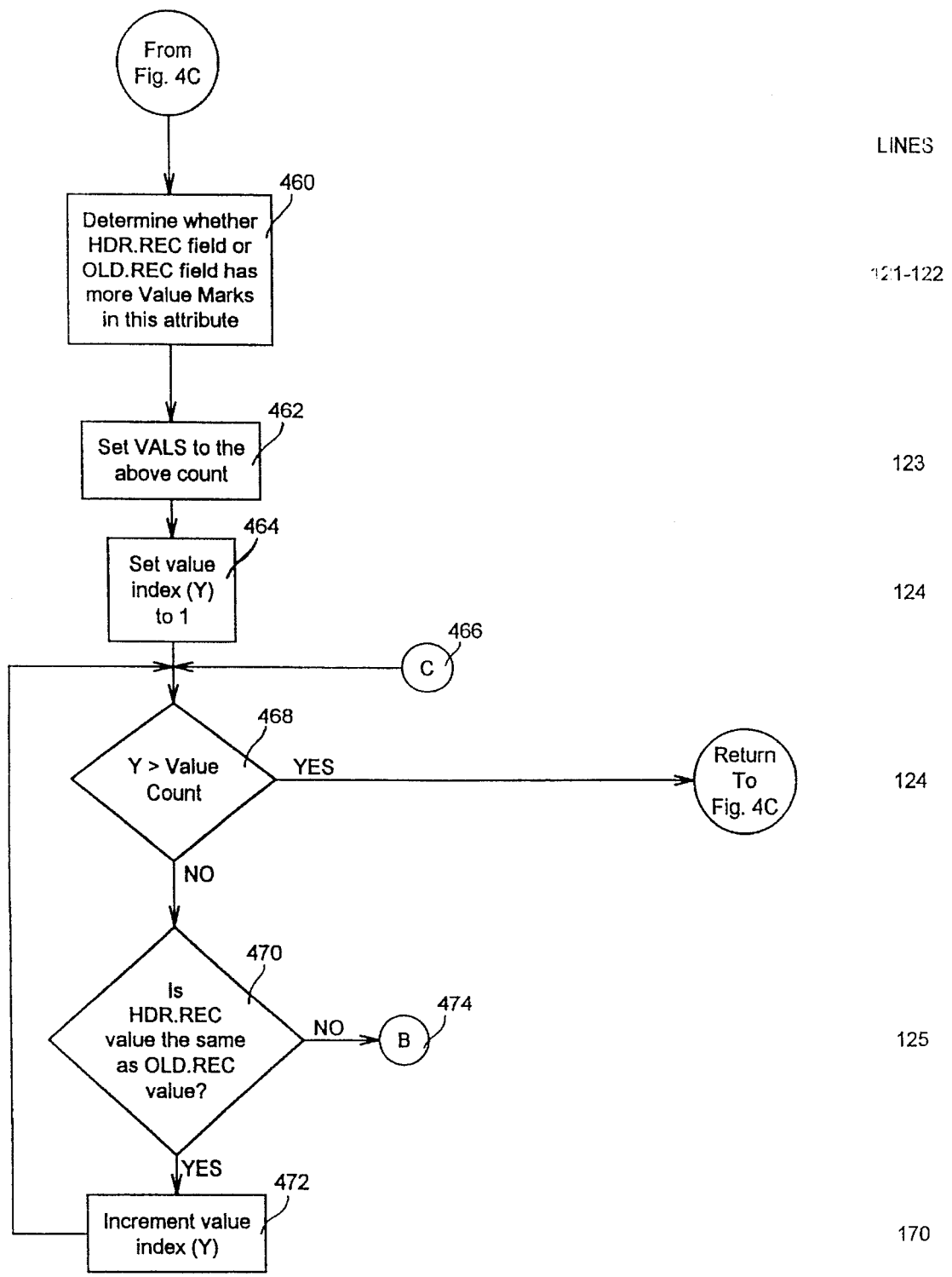

Refer to FIGS. 4C and 4D. If the program MODE is (C)hange 444, then each Attribute (Field), Value (Sub-Field), and Sub-Value (field within a Sub-Field) must be examined individually to determine if any changes have been made by the operator to this record. This is accomplished as follows:

The Attribute Index (X) is initialized to one (1) 448, and utilizing a programming "FOR-NEXT" loop, each Attribute is examined individually. If the loop logic has reached the last field to be processed 450, then the program will continue with step 540 (See FIG. 4I). The program is also designed to skip over the field that holds the audit history information in the DB record 452–456. Each Attribute is examined as a whole 458 to see if there are any differences between OLD.REC (the record as it existed when first read by the calling program 214) and HDR.REC (the record as it exists after the operator made any changes). If the are no differences 458 then no further checking is needed for this Attribute and the next Attribute may be examined 456. If there are differences, then additional checking is required at a Value level. The program will determine whether this Attribute is broken down into Values by counting the number of Value Marks (ASCII 253) that separate the Values 460. If none are found, the program will treat this Attribute as having one Value. This value count is then used by another "FOR-NEXT" loop to examine each Value within the Attribute 462–468. Each Value is examined individually. The Value in OLD.REC is compared to the Value in HDR.REC and if they are the same 470, then no additional checking must be performed on this Value and the next Value may checked 472.

Figure 4E:
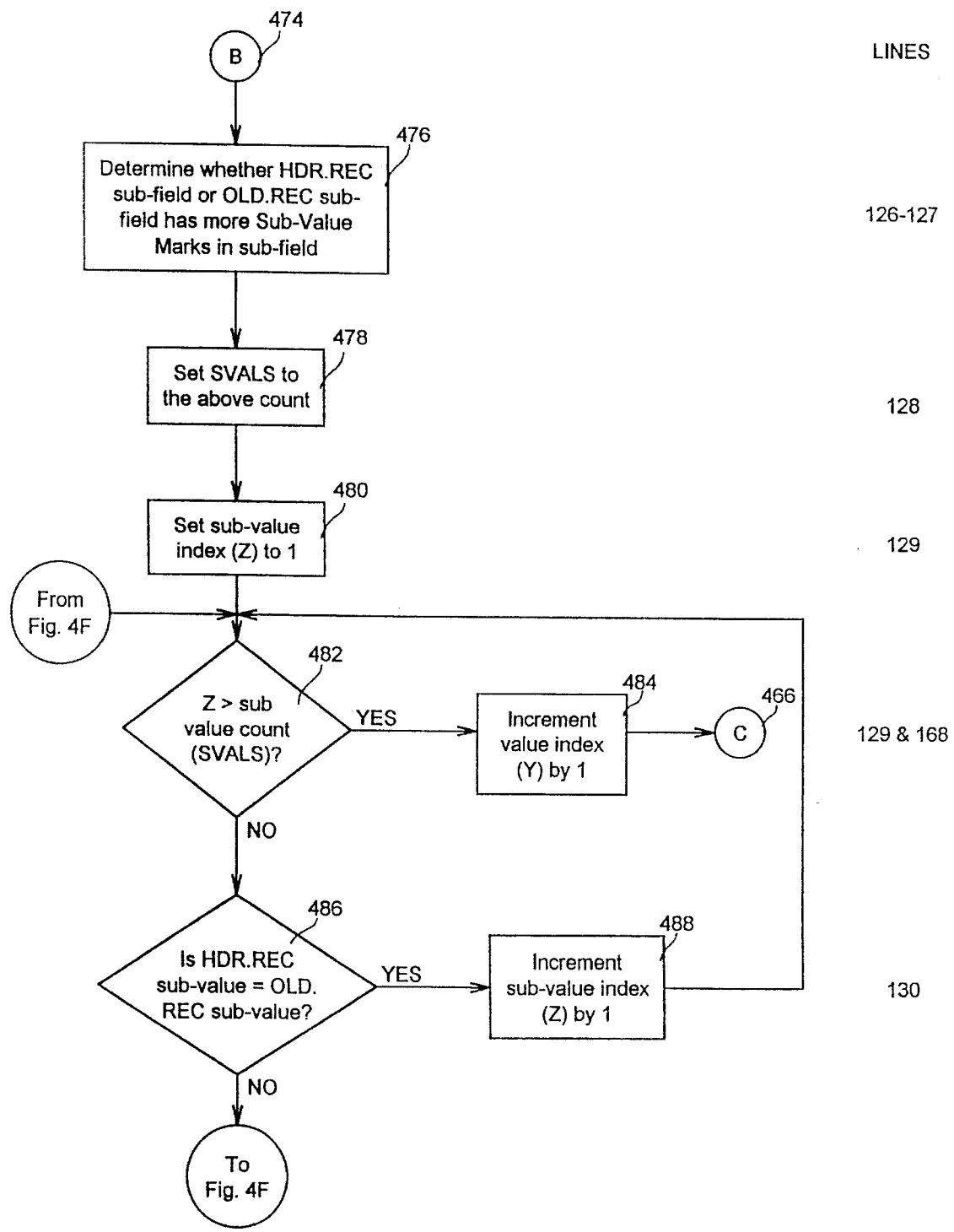
Figure 4F:
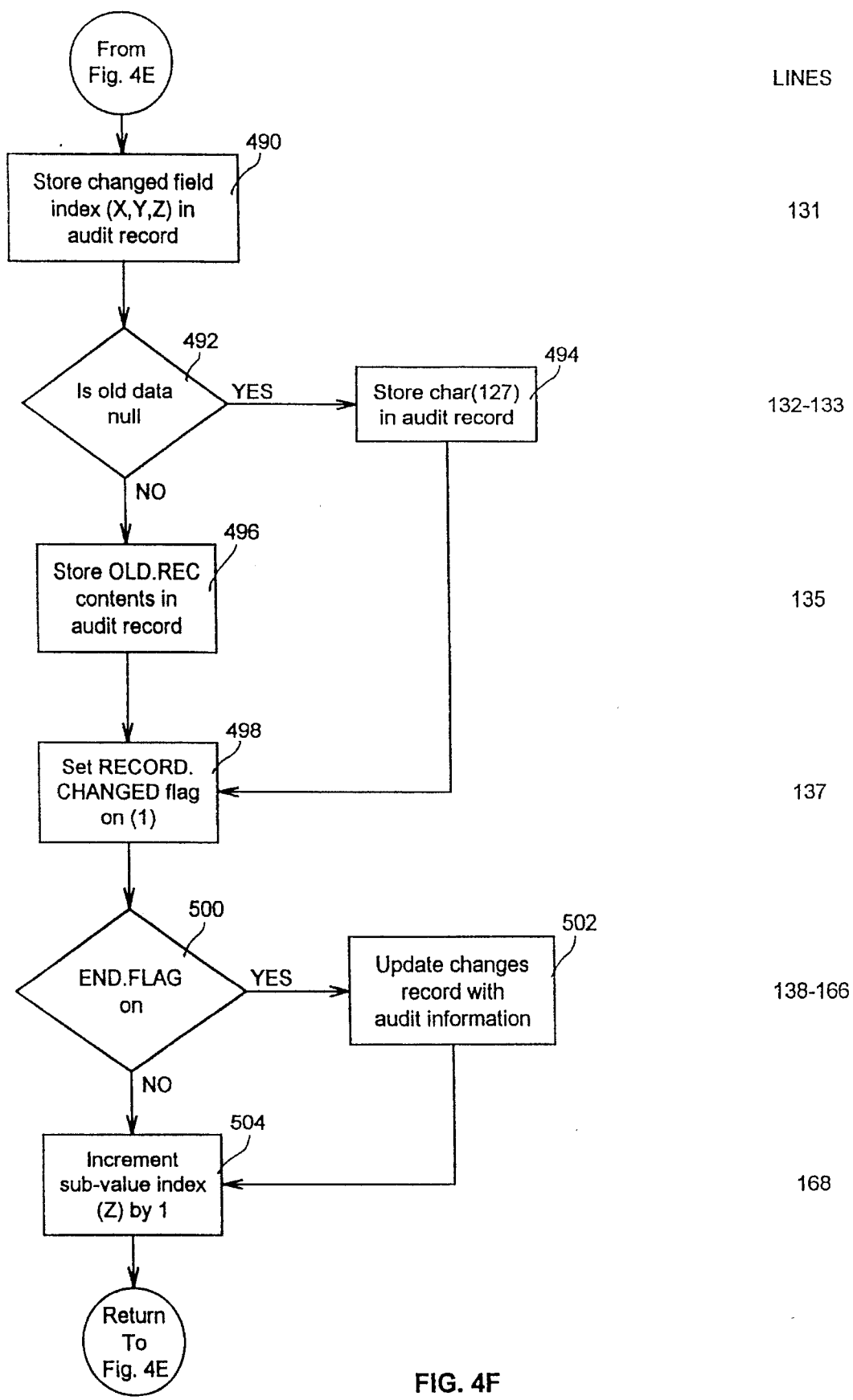

Refer to FIGS. 4E and 4F. If there are differences, then additional checking is required at a Sub-Value level. The program will determine whether this Value is broken down into Sub-Values by counting the number of Sub-Value Marks (ASCII 252) that separate the Sub-Values 476. If none are found, the program will treat this Value as having one Sub-Value. This value count-is then used by the third and last "FOR-NEXT" loop to examine each Sub-Value within the Value 478–482. Each Sub-Value is examined individually. The Sub-Value in OLD.REC is compared to the Sub-Value in HDR.REC and if they are the same 486, then the next Sub-Value is examined. If they are different, then the location of the changed data (Attribute Mark Count (AMC), Value Mark Count (VMC), and Sub-Value Mark Count (SVMC) is stored in the next available Attribute in the Audit History record 490. If the data field in OLD.REC is. Null (empty), then an ASCII 127 is stored in the Audit History record. Otherwise the actual contents of the field in OLD.REC is stored in the Audit History record 496. In either event, the RECORD.CHANGED flag is set on 498 and the program continues on to check the remaining Attributes, Values, and Sub-Values for additional changes. Once again, if the END.FLAG is "no" 500, the Changes file is updated with a history information. Once all of the Attributes have been examined, the program will continue with step 540 (See FIG. 4I).

Figure 4G:
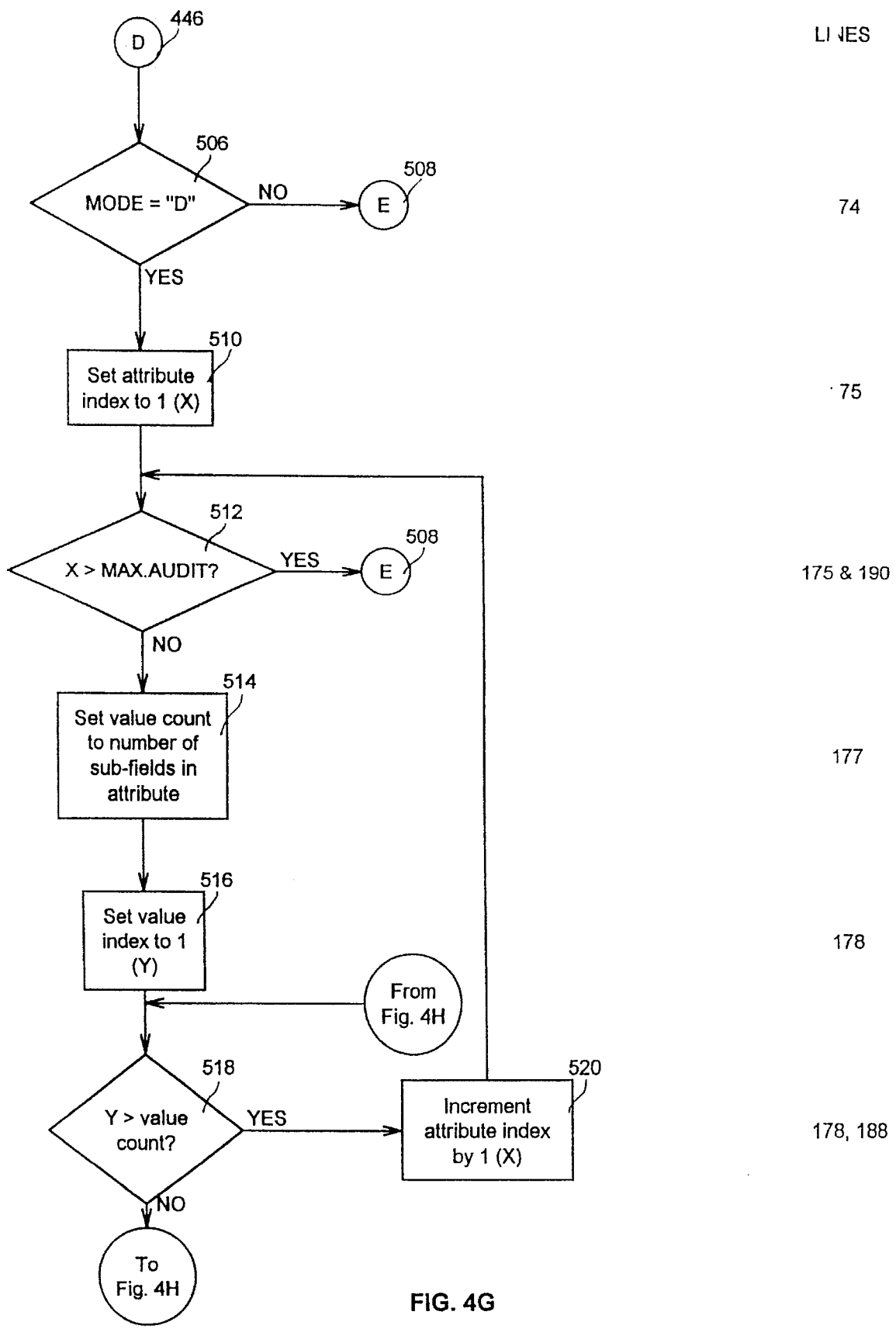
Figure 4H:
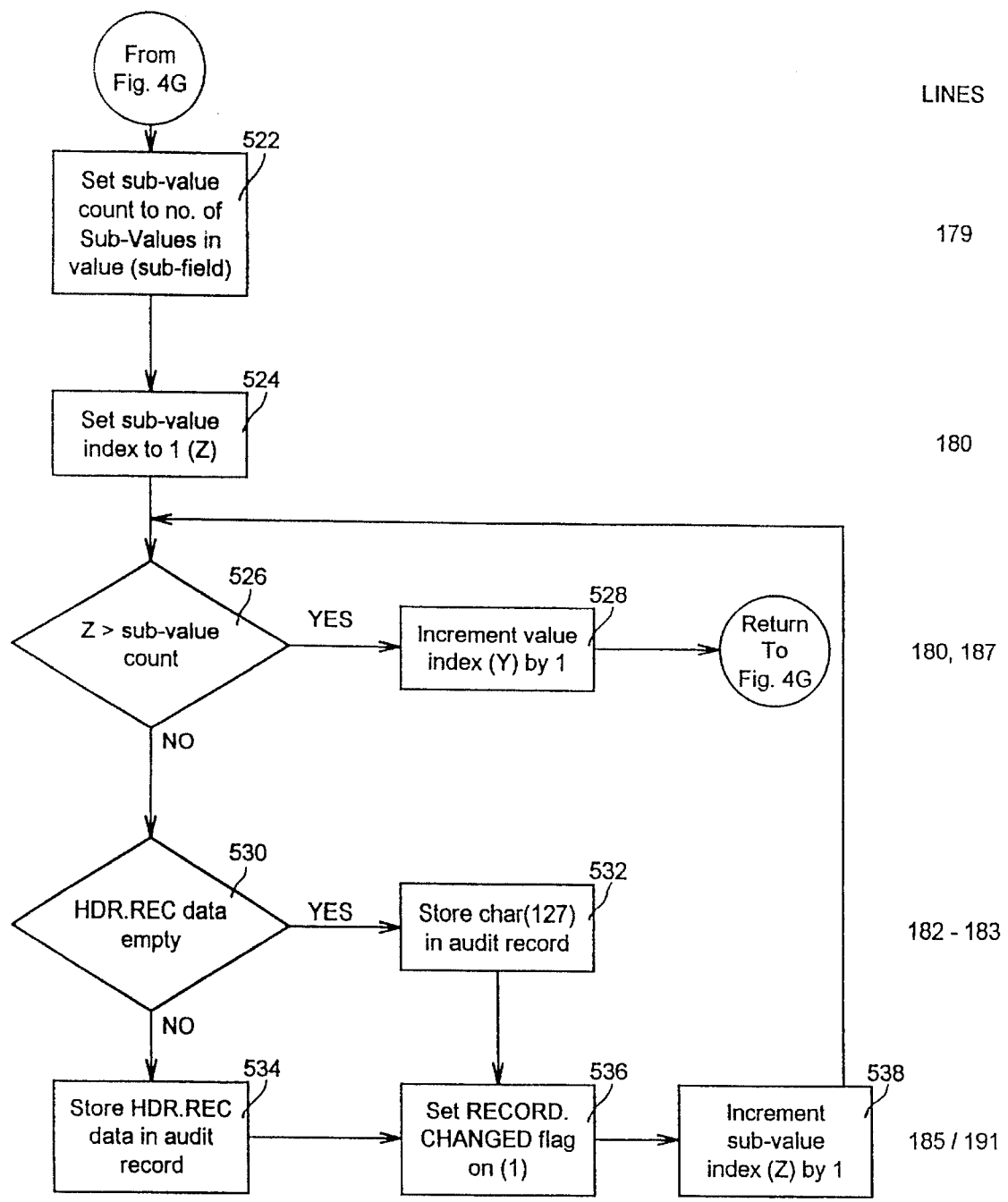
Figure 4I:
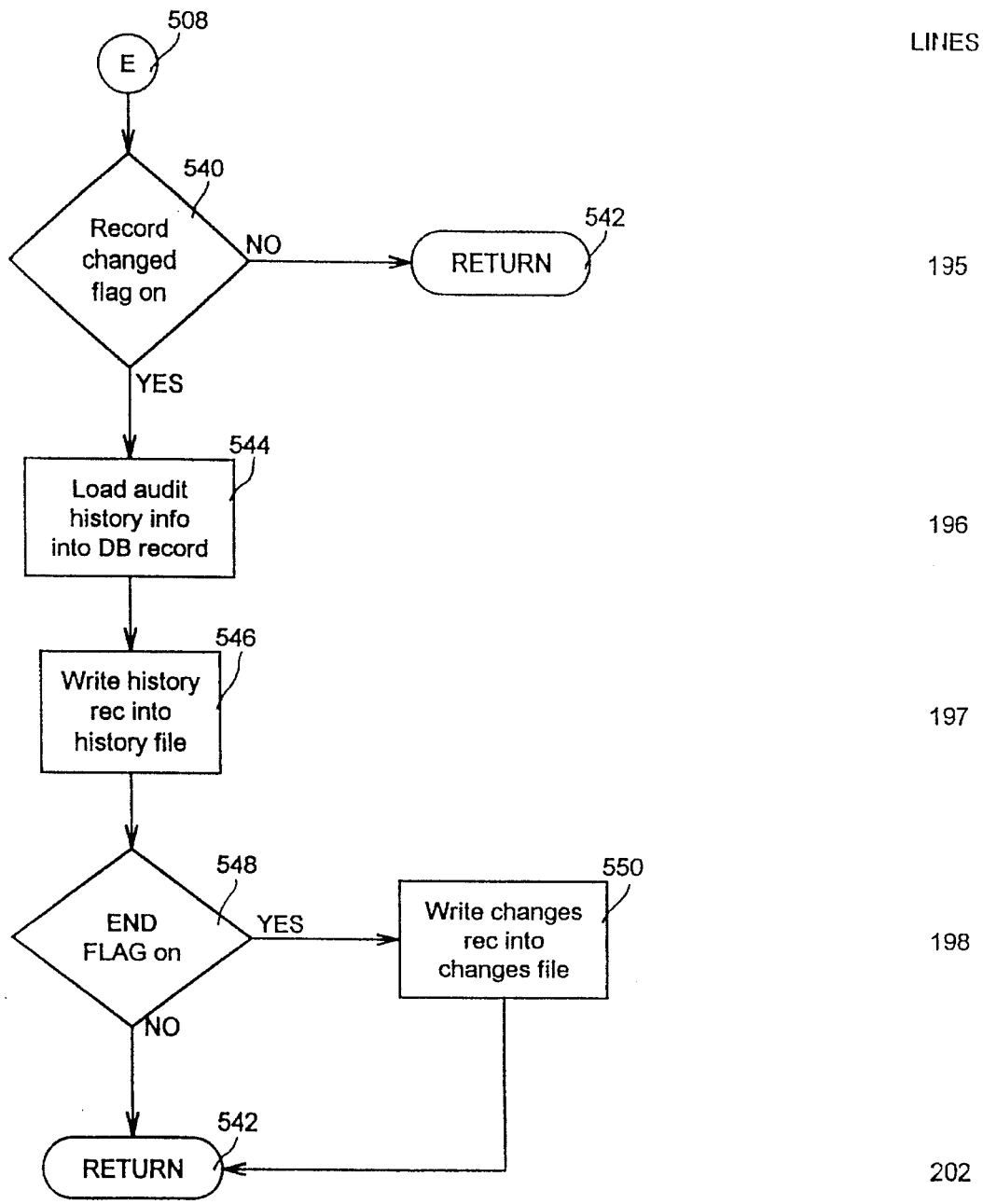

Refer to FIGS. 4G and 4H. If the Calling program MODE is (D)elete 506, then each Attribute, Value, and Sub-Value is examined and a complete Audit History record is built of all of the contents found 506–538. The examination method is very similar to the examination as described above and so need not be described in detail.

Refer to FIG. 4.5. If, after all of the aforesaid checking, no changes have been uncovered 540, the program will return to the calling program with no further processing 542. If changes have been found, then the Audit History Data String (created in step 418–422) is stored in the audit history attribute in the DB record 544 and the Audit History record is written to the History file 546. If the END.FLAG is on 548, then the Changes file record is also written out to the Changes file 550.

Update processing is now complete, and the program returns to the calling program 542.

Figure 5A:
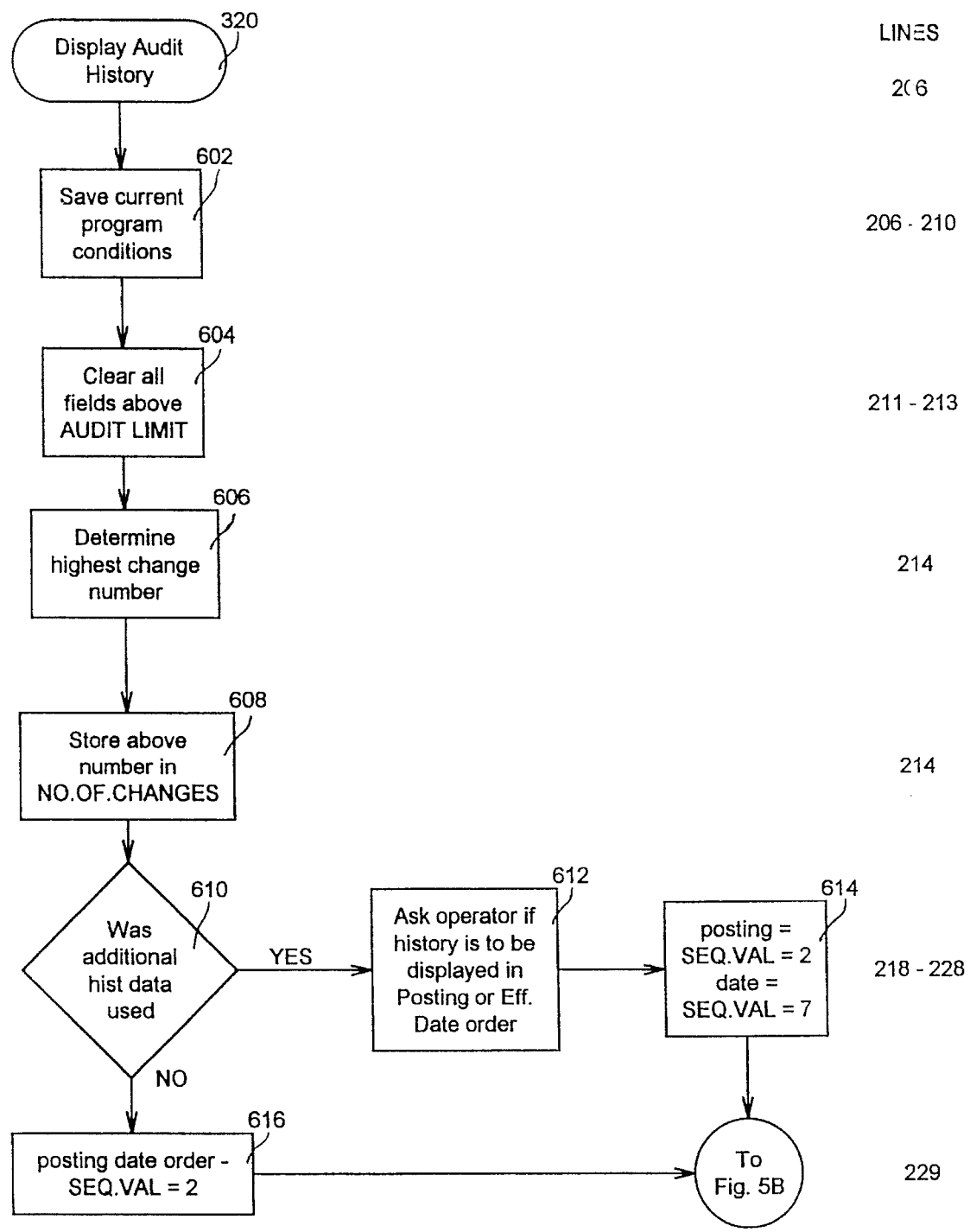
FIGS. 5A to 5K are a logic diagram of the display portion of the audit history program.
Figure 5B:
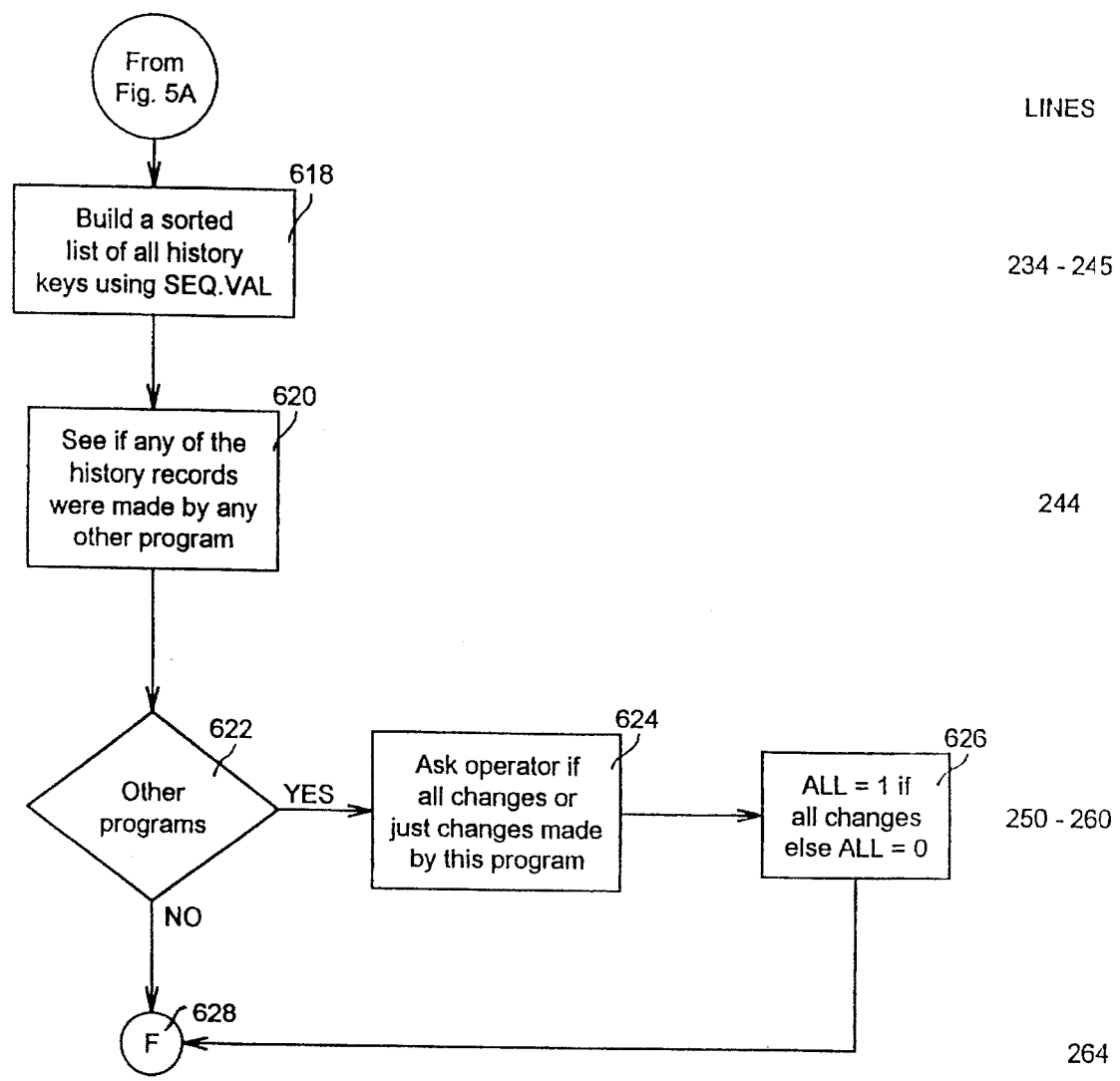

STD.HISTORY.SUB DISPLAY LOGIC NARRATIVE (FIGS. 5A and 5B)

The first step is to save the current program conditions 602, clear all DB record Attributes above the audit limit 604, and determine the last (also the highest) Change Number for this DB record 606. This number is saved in NO.OF.CHANGES 608. If there is Additional History Information stored in the audit history data string 610, the program will request the operator as to the order that the history is to be displayed: in Posting order, or sorted by the Additional History Data supplied 612. If the operator selects posting order, then the sorted key table (built in step 618) will be sorted by Posting Date & Change Number. If the operator selects the alternate order, then the sorted key table will be sorted by the Additional History Data (e.g. the Effective Date of the change). The sorted key table is built 618, and while it is being built, a flag will be set if any other programs other than the calling program have history records 620. If there are history records built by other programs 622, then the operator is asked to indicate if all changes (regardless of which program created then) are to be displayed, or only the changes made by this program 624–626.

Figure 5C:
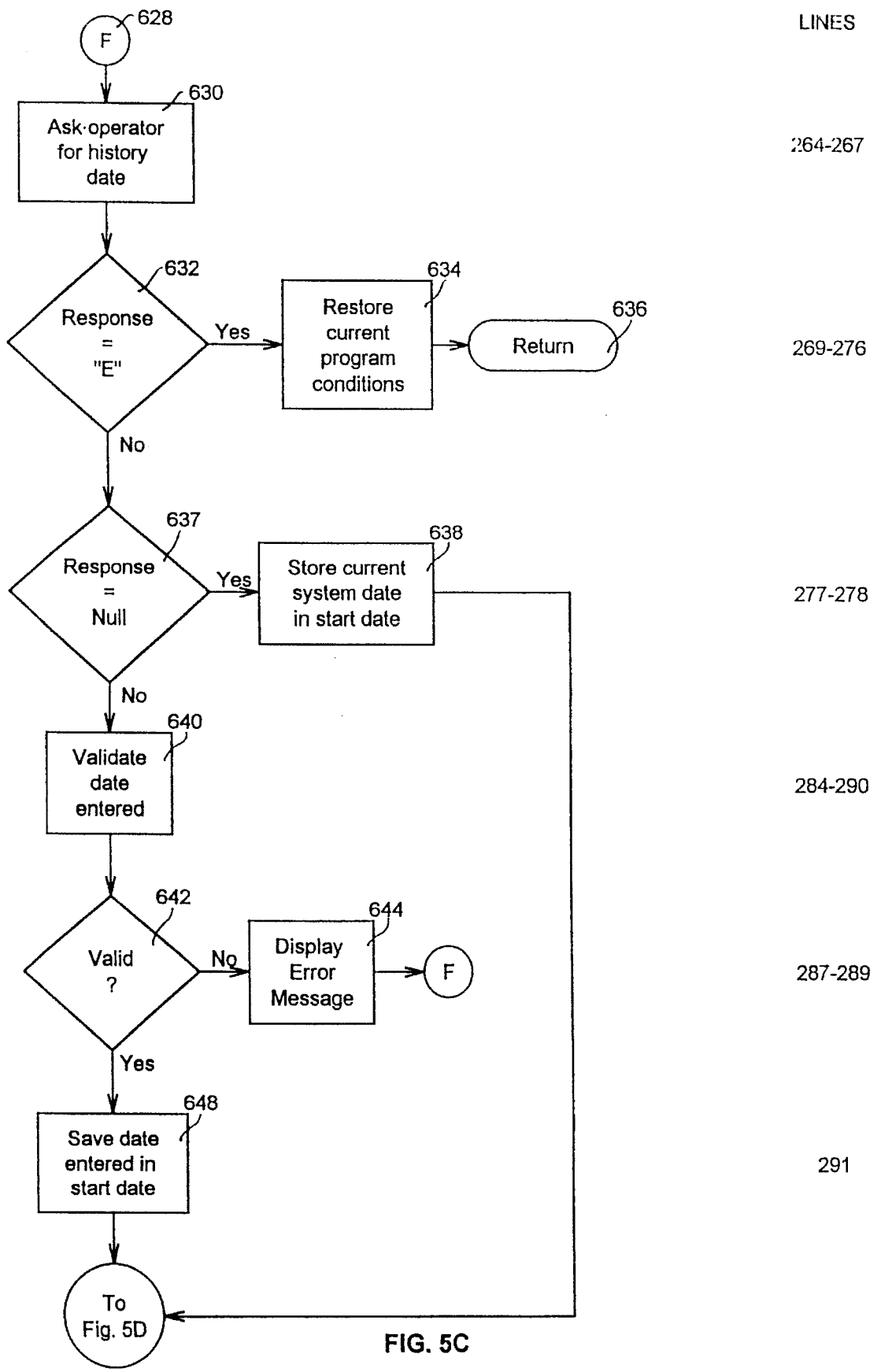
Figure 5D:
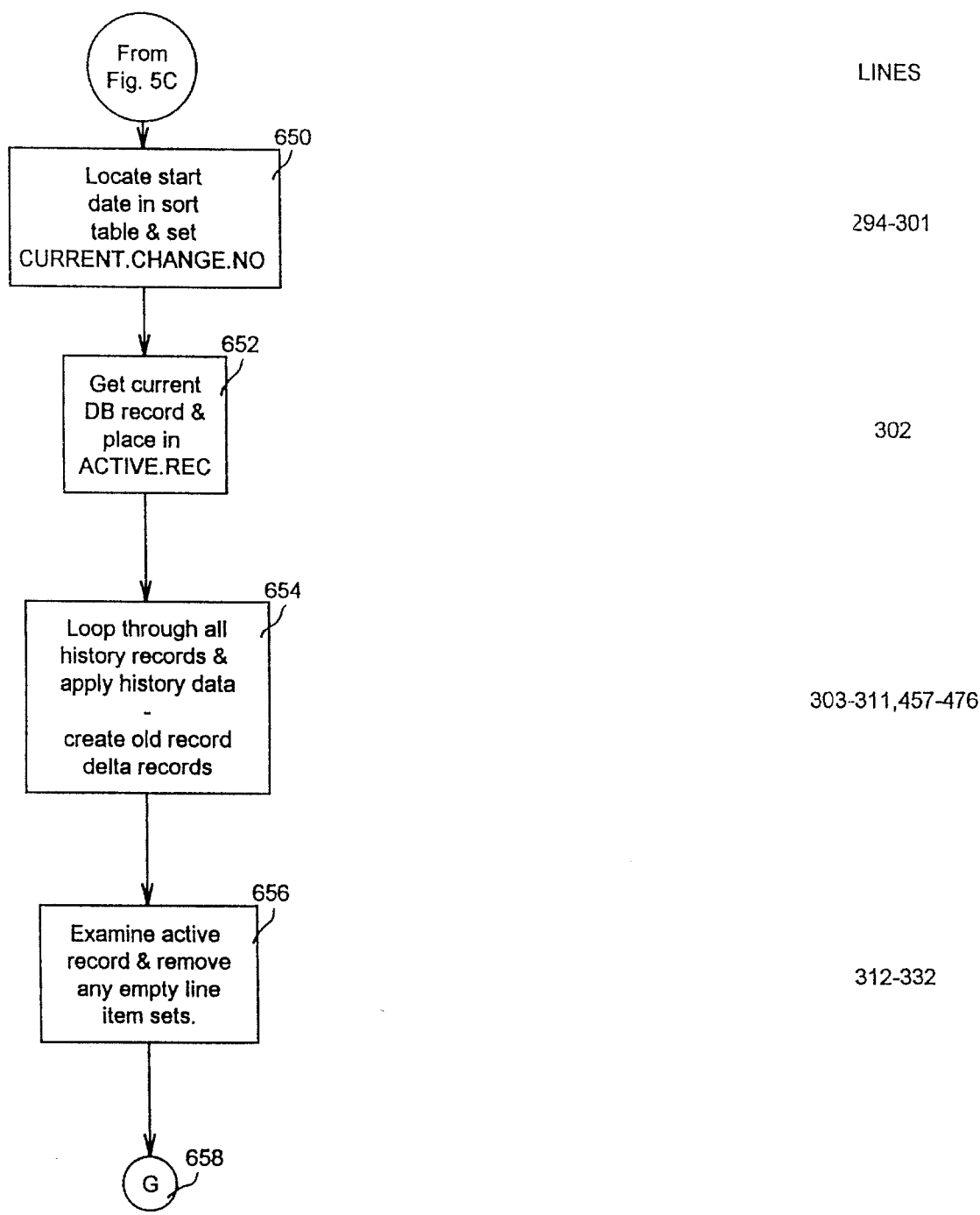

Refer to FIGS. 5C and 5D. Next, the operator is requested to enter the date for which the first history image is to be displayed 630. If the response is (E)xit 632, then the program restores the current program conditions 634 and returns to the calling program 636. If the response is Null (Return key only is pressed) 637, then the program will store today's date (the system date as maintained by the computer) 638 as the starting date. If a date is entered, it is validated for accuracy 640 and saved as the start date 648. The correct entry in the sorted key table is located using the start date as determined above 650.

At this point, the current active DB record is read from disk and saved in ACTIVE.REC 650. Since the Audit History records store the old contents of any changed field, new temporary history records need to be created which contain the new changed data 654. These delta records are identical in format to the Audit History records except that the data saved is the NEW contents instead of the OLD contents. As these delta records are being built, the program is regressing the ACTIVE.REC to its original state by re-applying all of the old data contents saved in the history records to the ACTIVE.REC. Once all history records have been applied, ACTIVE.REC now looks exactly as it did the day it was added to the DB file. The original ACTIVE.REC is examined and all empty Line Item Set values are removed. These can cause a false display when changes are contained in a Line Item Set 656.

Figure 5E:
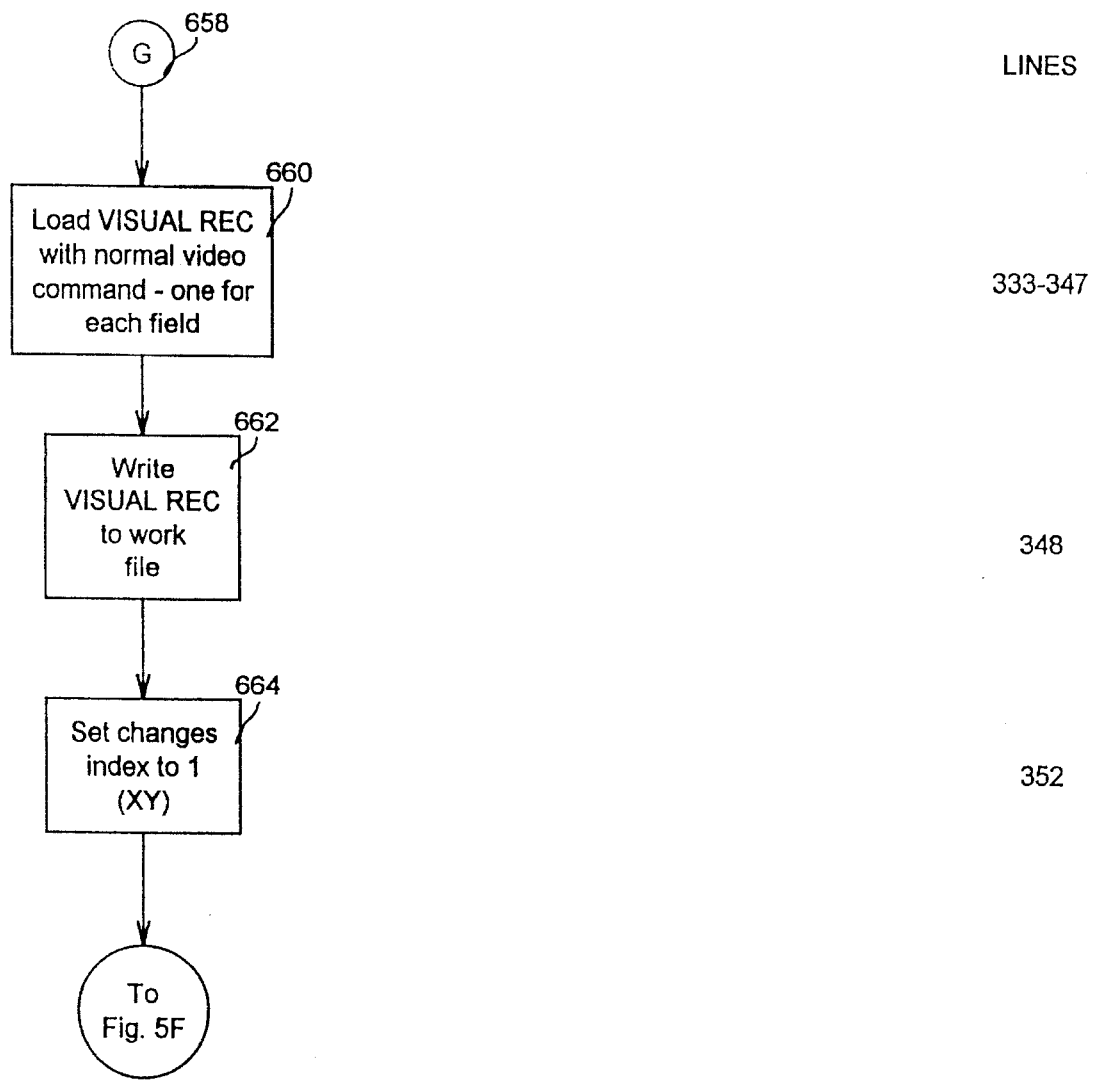
Figure 5F:
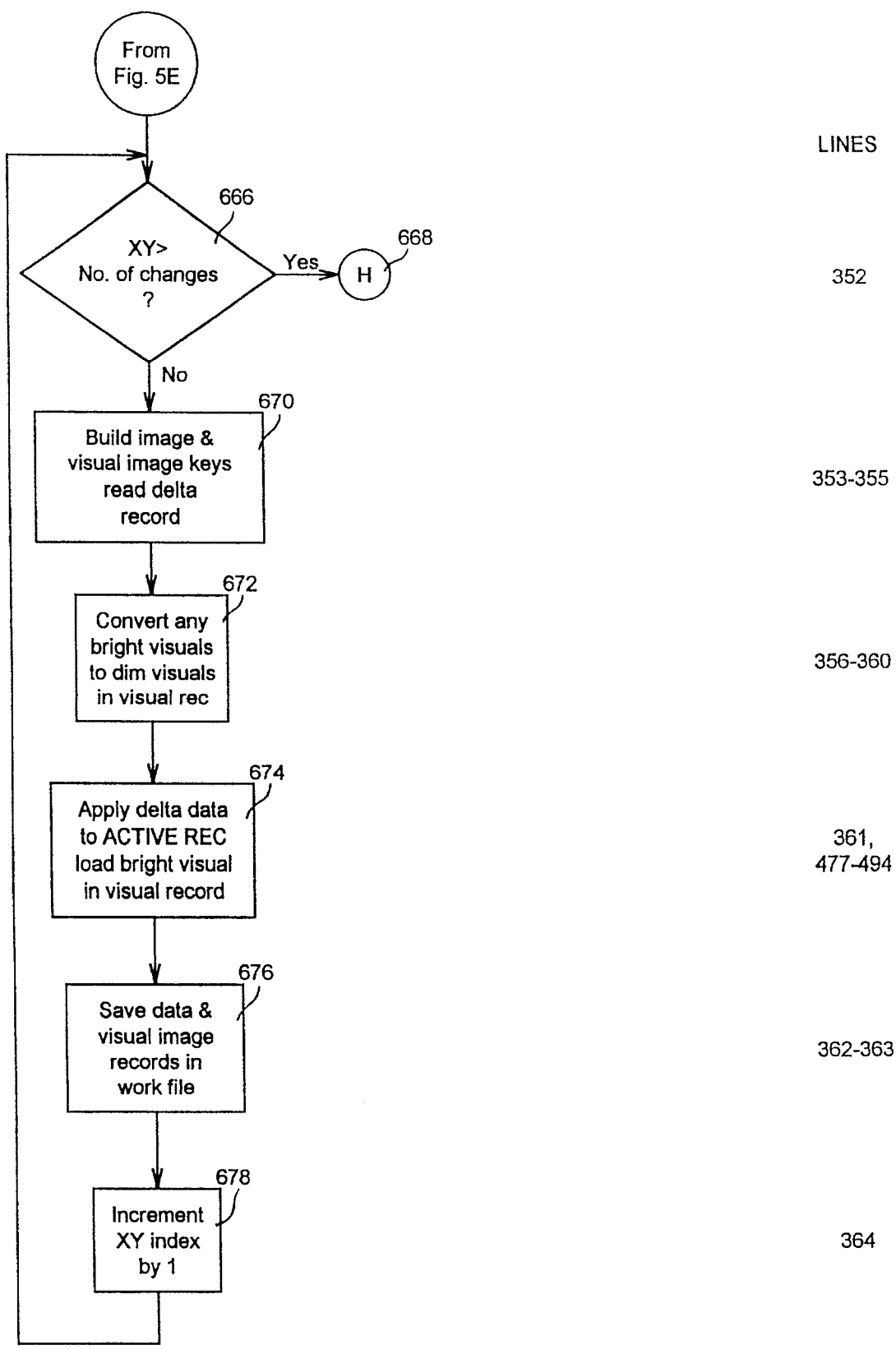

Refer to FIGS. 5E and 5F. The audit history display uses two visual attributes to display the historical images. All changes made to the record are shown in reverse video with the specific change shown in bright reverse video. For example, if the only field changed during one session was the name of a client, then when that specific change is displayed, all of the fields that have changed since the record was created will be shown in reverse video and the client's name will be shown in bright reverse video. See FIG. 6 to FIG. 12, wherein reverse video is represented by one form of shading (darker shade) and bright reverse is represented by another form of shading (lighter shade).

In order to display these two different visual attributes, whenever a historical image record is made using the audit history records, a corresponding visual record is also built to display it properly. The system starts the process by building a visual record using normal video display attributes 660. That visual record is written to a work file 662 as the basic model from which all future visual records will be built. This is the original visual record that will be displayed along with the original ACTIVE.REC built in step 654. To build each historical image, the delta records are processed one at a time and the NEW data is applied to the older record 670–672 and the Visual record is updated in the same corresponding fields 674. This pair (ACTIVE.REC containing the data and VISUAL.REC containing the visual display attributes) is saved in the work file 676. Once completed, there will be two records in the work file for each image of the record. If there had been thirty-two changes to a particular record, there would be thirty-two data image records and thirty-two visual image records at this point.

Figure 5G:
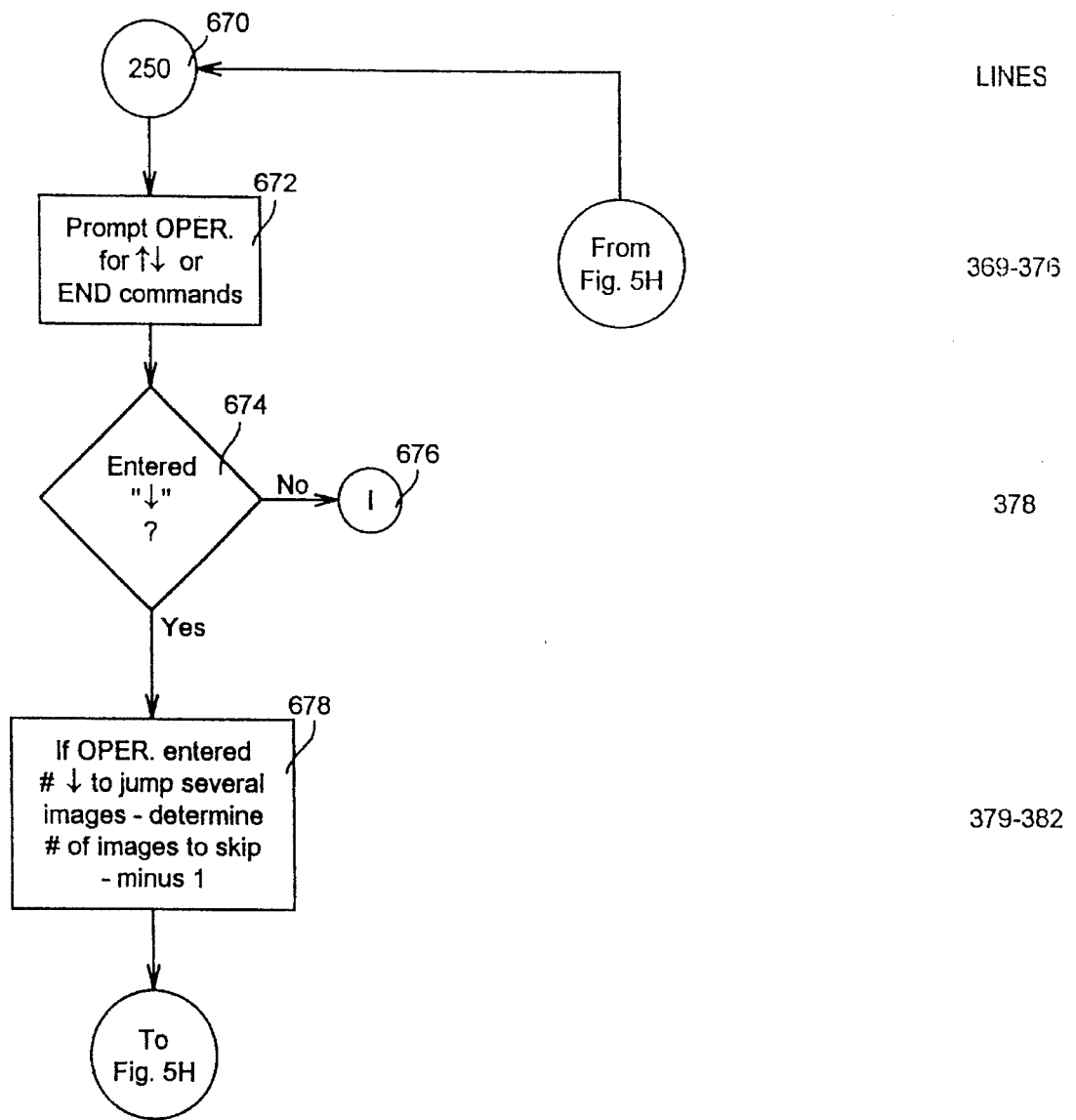
Figure 5H:
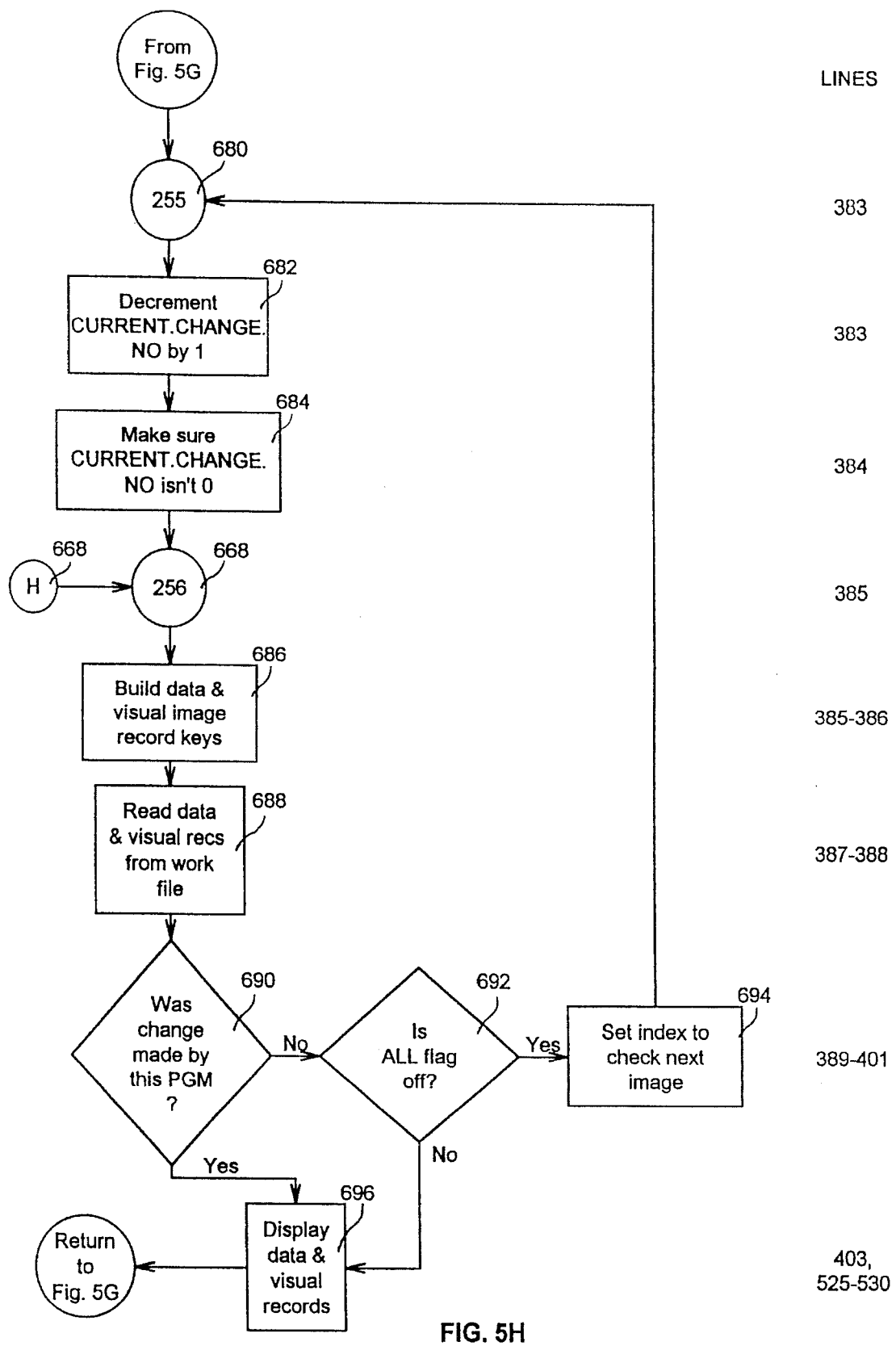

Refer to FIGS. 5G and 5H. Using the starting date entered by the operator in step 630, the correct image is selected from the sorted key table and the calling program's audit history display routine is called to display the data image and its associated visual image 696. If the operator has requested that only changes created by this calling program be displayed, and the image about to be displayed was created by another program 690, then the next sequential image created by this program will be found and displayed 694.

Each calling program that is going to display audit history requires a specific display routine that will display the historical data image and its associated visual image. Preferably when the principles of such a display routine are built into a CASE (Computer Aided Software Engineering) program generator, so that the correct display routines for each calling program are generated automatically.

Once the historical slice has been displayed, the operator is prompted for the next display command 672. If the operator enters a (down arrow) 674 either as a single character or in the format of # (down arrow), the program will regress the images back in time 678–696. In the aforesaid entry, if the operator enters 5(down arrow), then the program will regress back five (5) images. If no number is entered, then the regression will take place one image at a time.

Figure 5I:
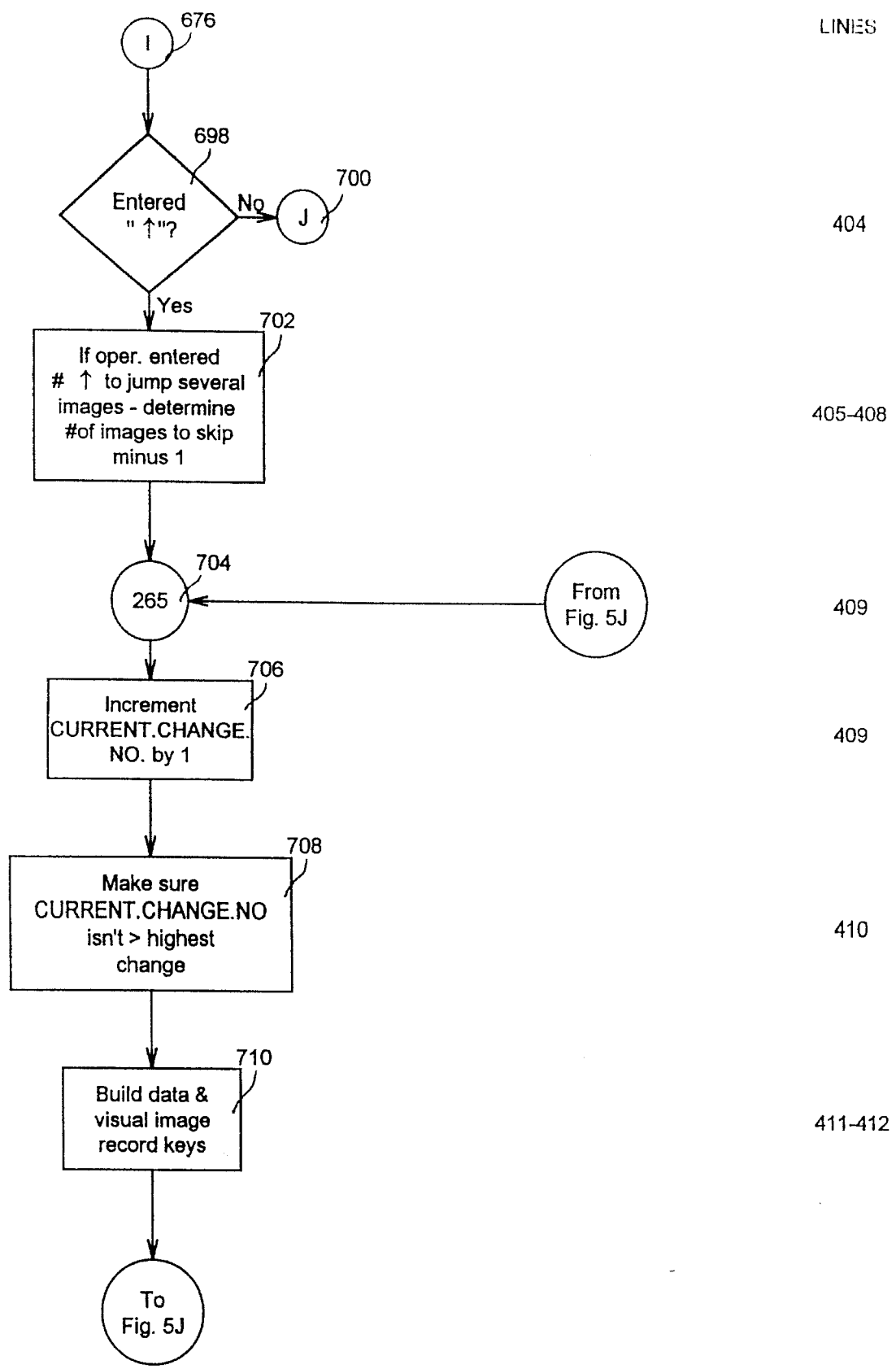
Figure 5J:
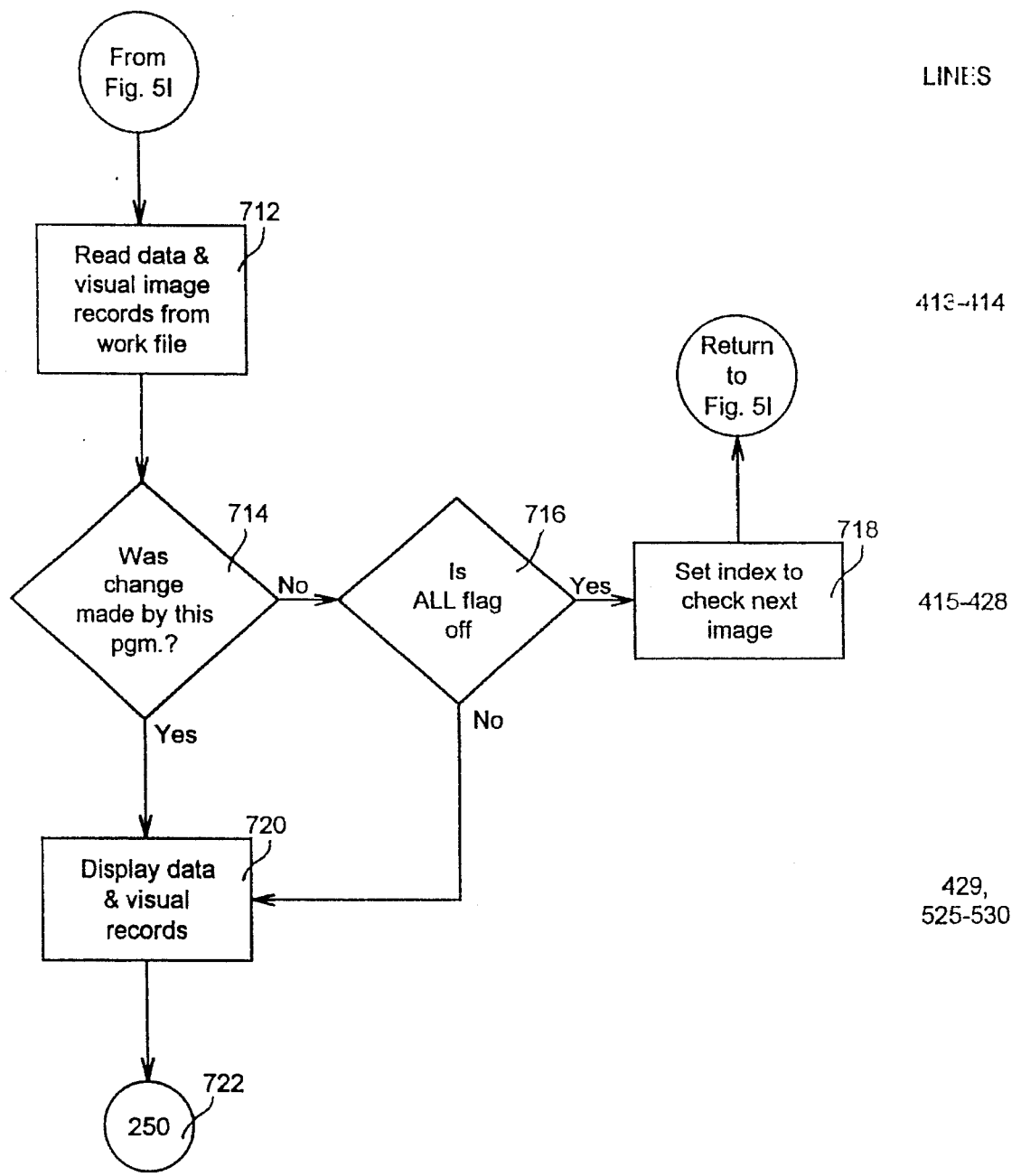

Refer to FIGS. 5I and 5J. If the operator enters an (up arrow) 698 either as a single character or in the format of # (up arrow), the program will progress the images forward in time 702–722.

Figure 5K:
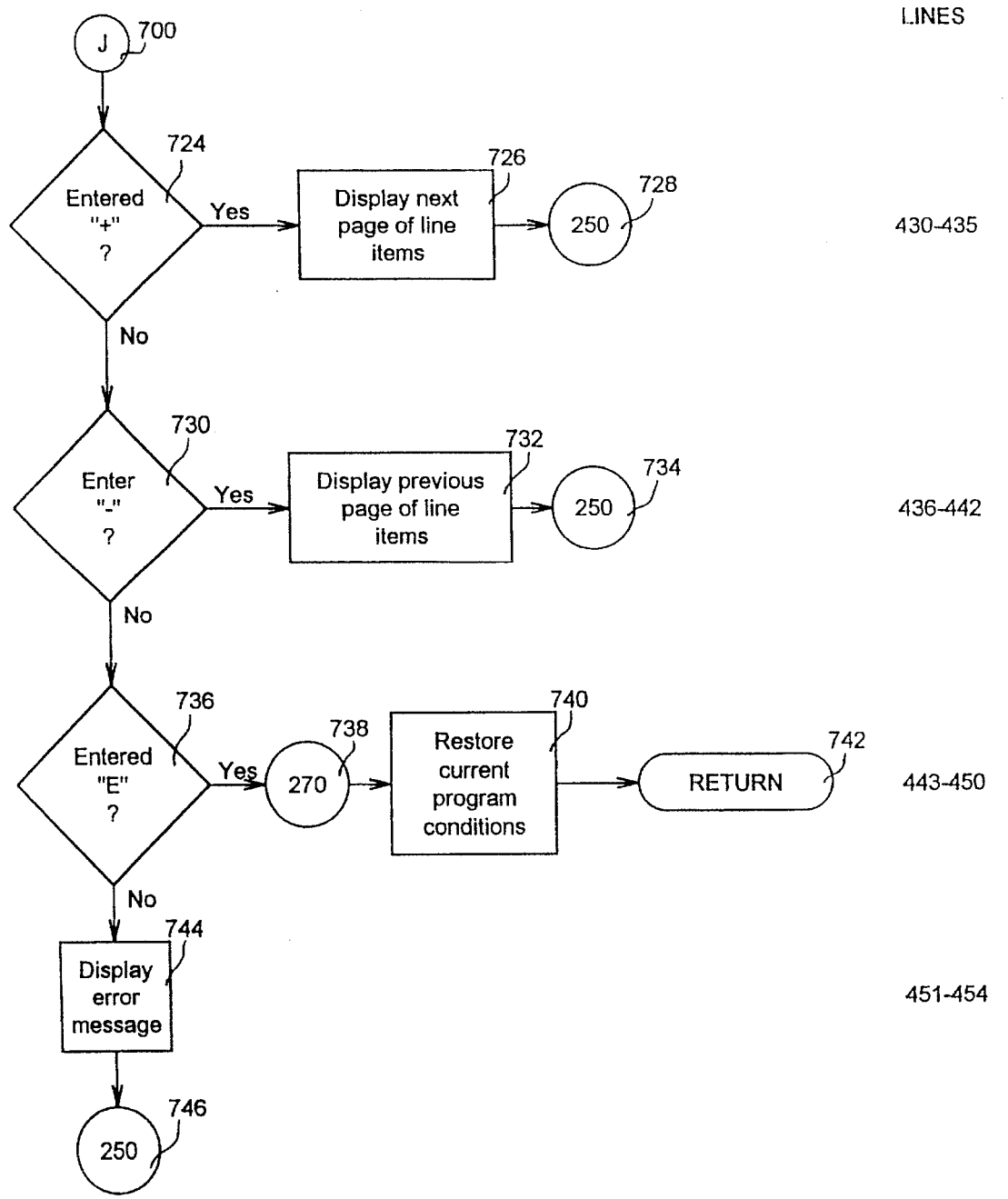

Refer to FIG. 5K. If the DB record contains Line Item Sets, then the operator may display other pages of items by entering either a (+) command 724–728 to see the next page or a (−) command 730–734 to see the previous page. In any case, if the operator enters (E)xit, the program will restore the current calling program's conditions and return 742.

AN EXAMPLE OF AUDIT HISTORY DISPLAY

The example screens that follow will demonstrate the various display images as outlined above.

FIG. 6. Screen Jan. 22, 1990 – 17:09:14: This is the initial screen as it would appear after the operator has entered the key to the DB record 204 and the calling program (CP.100 Version 7.1) has displayed the record 214. The last change made is displayed in the upper right hand corner of the screen (Last Changed by DMM on Jan. 20, 1990 at 10:50:33). The operator selects the review function by entering "R" at the screen acceptance prompt 217 & 230. The calling program calls STD.HISTORY.SUB which has prompted the operator for the starting information (612, 624, and 630) and the operator has selected to see the historical image of the record on Jan. 1, 1989 and to see only those changes made by this program.

FIG. 7. Screen Jan. 22, 1990 – 17:20:19: This is the historical image of how the record looked on Jan. 1, 1989. The last change was made by CFH on Dec. 7, 1988 at 16:10:16 and the field changed was Address #2. This is change 32 of 49. Note that the following fields have been changed since the record was created:

| | |
|---|---|
| BillTo | WHEATLEY |
| Client Name | David M. Murdock ZZ9Z |
| Address #1 | 625 Duke Road |
| Statuses | NBB |
| Categories | CAL |
| Contact Line Item Set #2 | (Empty fields) |
| Contact Line Item Set #3 | (Empty fields) |

The above fields are displayed in reverse video.
The following fields are displayed in bright reverse video:

| | |
|---|---|
| Last Changed By | CFH |
| Last Changed Date | 12/07/88 |
| Last Changed Time | 16:10:16 |
| Address #2 | 1nd. Floor |

The operator enters (down arrow) to see the next older record image (change 32 of 49) 672.

FIG. 8. Screen Jan. 22, 1990 – 17:22:48: This screen shows the old Address #2 field contents (2nd. Floor). Address #2 field is also displayed in bright reverse video which indicates that change 31 was applied to this field as well.

The operator enters 99(down arrow) to see the original record image 672.

FIG. 9. Screen Jan. 22, 1990 – 17:23:06: This screen shows the record as it was added (Change 1 of 49) to the database file by DMM on Sep. 24, 1987 at 15:13:48. None of the fields are shown in reverse video since no fields have been changed yet. The operator enters 99(up arrow) to see the current record image 672.

FIG. 10. Screen Jan. 22, 1990 – 17:23:26: This screen shows the current image (Change 49 of 49) but all of the fields that have been changed since it was added are shown in reverse video:

| Field Name | Changed Data |
|---|---|
| Last Changed By | DMM |
| Client Code | MURDOCK |
| BillTo | MURDOCK |
| Client Name | David M. Murdock |
| Address #1 | 625 Duke Road |
| Address #2 | Suite 202 |
| Categories | CAL |
| Statuses | NBB |
| Producer | DMM |
| Servicer | DMM |
| Contact Type (Line 1) | |
| Contact/Alternate Name (Line 2) | Mrs. Eileen A. Murdock |
| Contact Salutation (Line 2) | Eileen |
| Contact Type (Line 2) | SP1 |
| Contact/Alternate Name (Line 3) | Mr. Sean E. Murdock |
| Contact Salutation (Line 3) | Sean |
| Contact Type (Line 3) | 2 |

The fields displayed in bright reverse video to indicate that they were the last fields changed are:

| | |
|---|---|
| Last Changed Time | 10:50:33 |
| Contact/Alternate Name (Line 1) | Mr. David M. Murdock |

The operator enters (down arrow) to see change number forty-eight (48) 672.

FIG. 11. Screen Jan. 22. 1990 – 17:23:45: This screen (change 48 of 49) indicates that one field was changed.

Contact/Alternate Name (Line 1) END David M. Murdock

The operator enters (down arrow) to see change number forty-seven (47) 672.

FIG. 12. Screen Jan. 22, 1990 – 17:24:05: This screen (change 47 of 49) indicates that three fields were changed.

| | |
|---|---|
| Client Name | David M. Murdock |
| Address #1 | 625 Duke Road |
| Address #2 | Suite 202 |

The operator enters "E" to exit history review 672. The original active record is re-displayed and the operator is prompted for (F)ile or (Q)uit 217.

OPERATING ENVIRONMENT

The operating environment necessary to support this feature of the invention is any operating system (OS) that will support variable length database records containing variable length data fields. The preferred embodiment of the invention, as described herein, has been implemented under the Pick Operating System, which supports such a file structure. For further reference to this operating system, refer to publications of the Spectrum Manufacturers Association, San Diego, CA, as well as to Pick Systems, Inc. and other implementers of the PICK operating system.

DESCRIPTION OF TERMINALS

The terminals appropriate for use in the system of the present invention would need to support at least three visual attributes, for example:

Protected Background Display static background text

Reverse Video Display net record changes

Bright Reverse Video Display last change

Currently, the following computer terminals have been used successfully to display audit history in systems embodying the present invention:

Wyse 30; Wyse 50; Wyse 50+; Wyse 60; and IBM 3151 (with Wyse 60 personality card)

If bright reverse video is unavailable on a proposed terminal, but the machine is able to implement flashing reverse video instead, such a terminal could be used alternatively.

Interrupt Feature

FILES REQUIRED

The only file required for this feature of the invention is the TERMINAL file. There is a record in that file for each port (terminal) in the system. There are two fields that are used in each Terminal File record:

Attribute 14: This field is used to hold all communications between levels. The field is broken down into Values as follows:

| Value | Description |
| --- | --- |
| 1 | Program Name - The Calling Program. |
| 2 | DEBUG.FLAG - (0 = Off; 1 = On) Used by developers to halt the programs at certain milestones. |
| 3 | THIS.RETURNING.KEY - If the level is interrupted while there is an active record in a program, this variable will contain the key of that active record. If no record is active, then this variable will contain the last DB record key filed. |
| 4 | CURRENT.CLIENT - If a program was running in the level being interrupted that relates to a client, then this variable will contain the key to the CLIENTS file record for that client. |
| 5 | CURRENT.POLICY - If a program was running in the level being interrupted that relates to a policy, then this variable will contain the key to the POLICIES file record for that policy. |
| 6 | CURRENT.LOSS - If a program was running in the level being interrupted that relates to a loss, then this variable will contain the key to the LOSSES file record for that loss. |
| 7 | CURRENT.EFF.DATE - If a program was running in the level being interrupted that relates to a policy, then this variable will contain the Effective Date of the specific transaction being processed against that policy. |
| 8 | CURRENT.END.NO - If a program was running in the level being interrupted that relates to a policy, then this variable will contain the key to the CHANGES file record that refers to that transaction. |
| 9 | CURRENT.TRAN - If a program was running in the level being interrupted that relates to a policy, then this variable will contain the Transaction Code selected by the operator when the policy was accessed. |
| 10 | NEXT.COM.AREA - Into this variable, the programmer may specify any additional information that may be required by the next higher level. |

Attribute 15: This attribute contains the current level being utilized.

INITIAL CONDITIONS IN CALLING PROGRAM

There are no pre-conditions that are necessary to effect a level interruption. All conditions that existed in the interrupted program will be restored.

CALLING PROGRAM NARRATIVE

Figure 13:
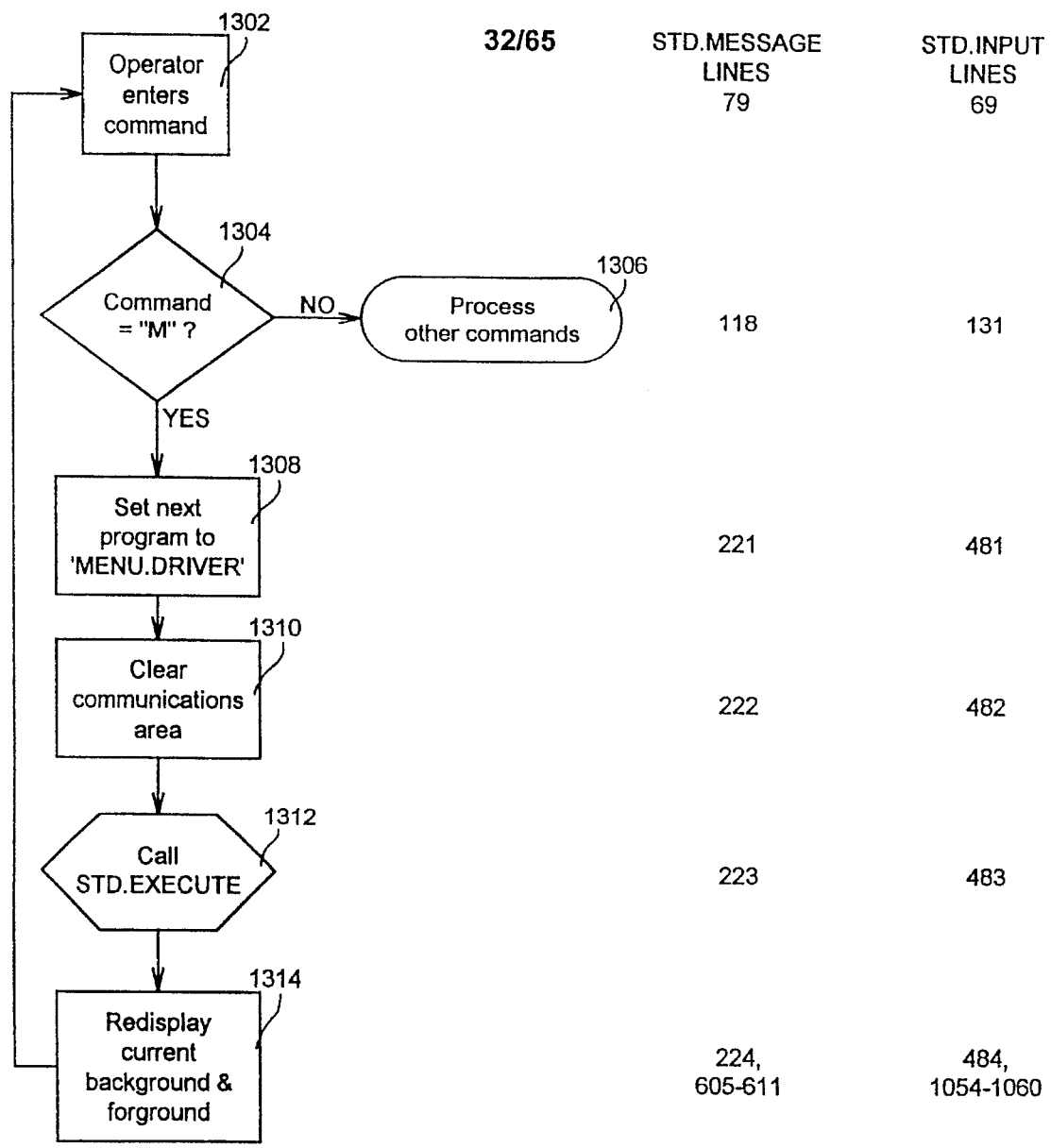
FIG. 13 is a logic flow diagram describing how the calling program initiates a request for a new session.

Refer to FIG. 13: The calling program. Each calling program utilizes two programs to get all operator input.

STD. INPUT This program is used to get data from the operator that will ultimately become database record information. The data is validated based on parameters set forth in the calling program. For example: If the data being entered is to be stored in the DB record as a date, then this program will insure that a valid date has been entered. If the data being entered is to be stored in the record as a dollar amount, then this program will insure that no letters (A–Z) or any special characters (! @# etc.) have been entered and will format the data with two decimal places.

STD.MESSAGE This program is used to prompt the operator with a question and get a response. The responses are not validated in any way (but all responses are converted to upper case). It is the duty of the calling program to perform any validation necessary.

Both of these programs are programmed with a command recognition logic. This way the operator may select a function from any field regardless of whether it is a data field input (STD.INPUT) or a question response (STD.MESSAGE). The logic flow diagram, FIG. 13, refers to lines in both programs since the flow is identical.

The operator enters a command 1302. One of the commands being tested for in the input string is the (M)enu command. If found 1304, the program will select the program to be executed at the next level to be "MENU.DRIVER". This is the program that processes all of the menu records and will permit the operator to select any other task to be executed during this interruption. The program clears the NEXT.COM.AREA 1310 since the system does not pass any input to the next level and calls the STD.EXECUTE program 1312 to initiate the next level.

STD.EXECUTE PROGRAM NARRATIVE

Figure 14A:
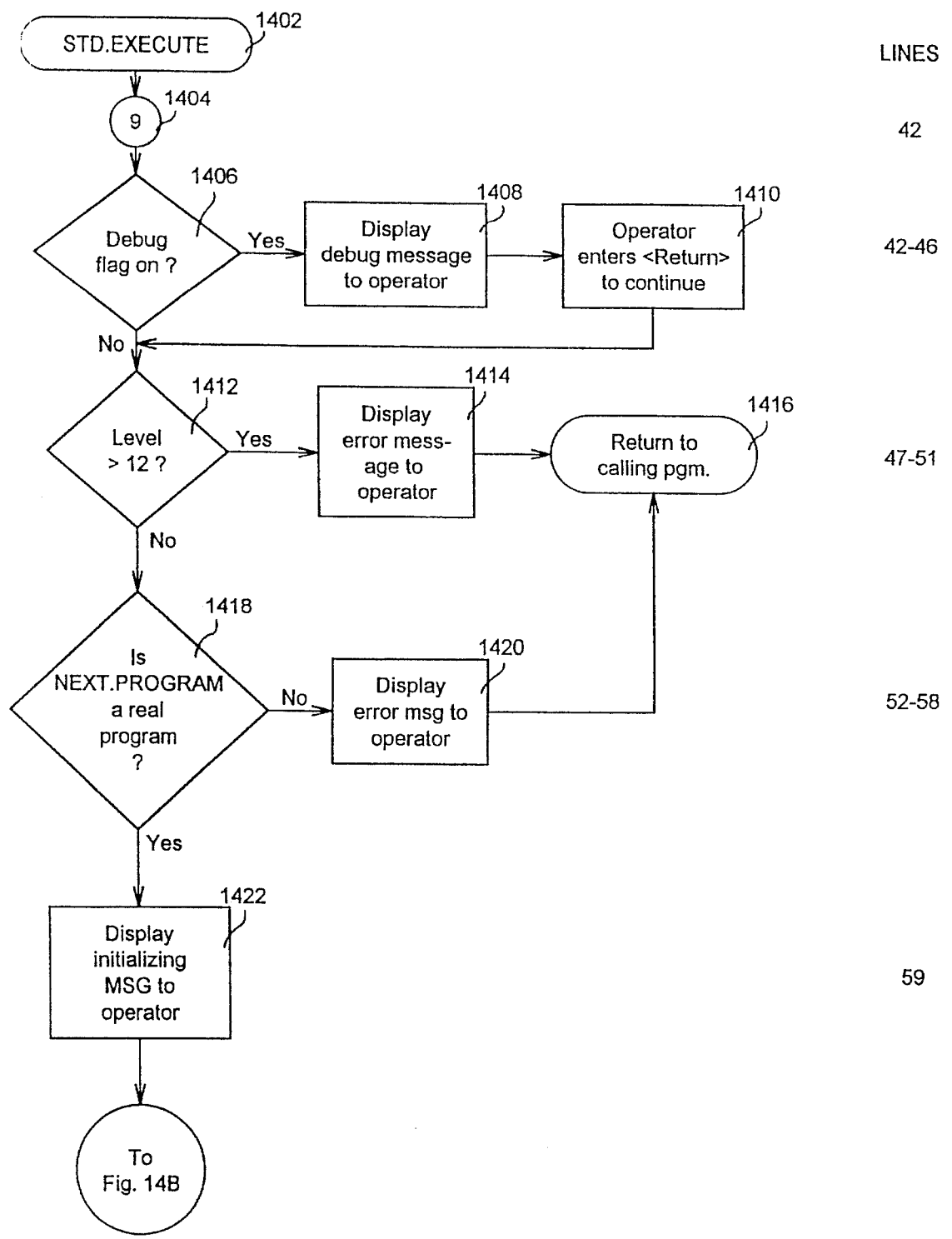
FIGS. 14A to 14C are a logic flow diagram describing how STD.EXECUTE suspends the current task, stores any communications for the next higher level, and initiates the new task.
Figure 14B:
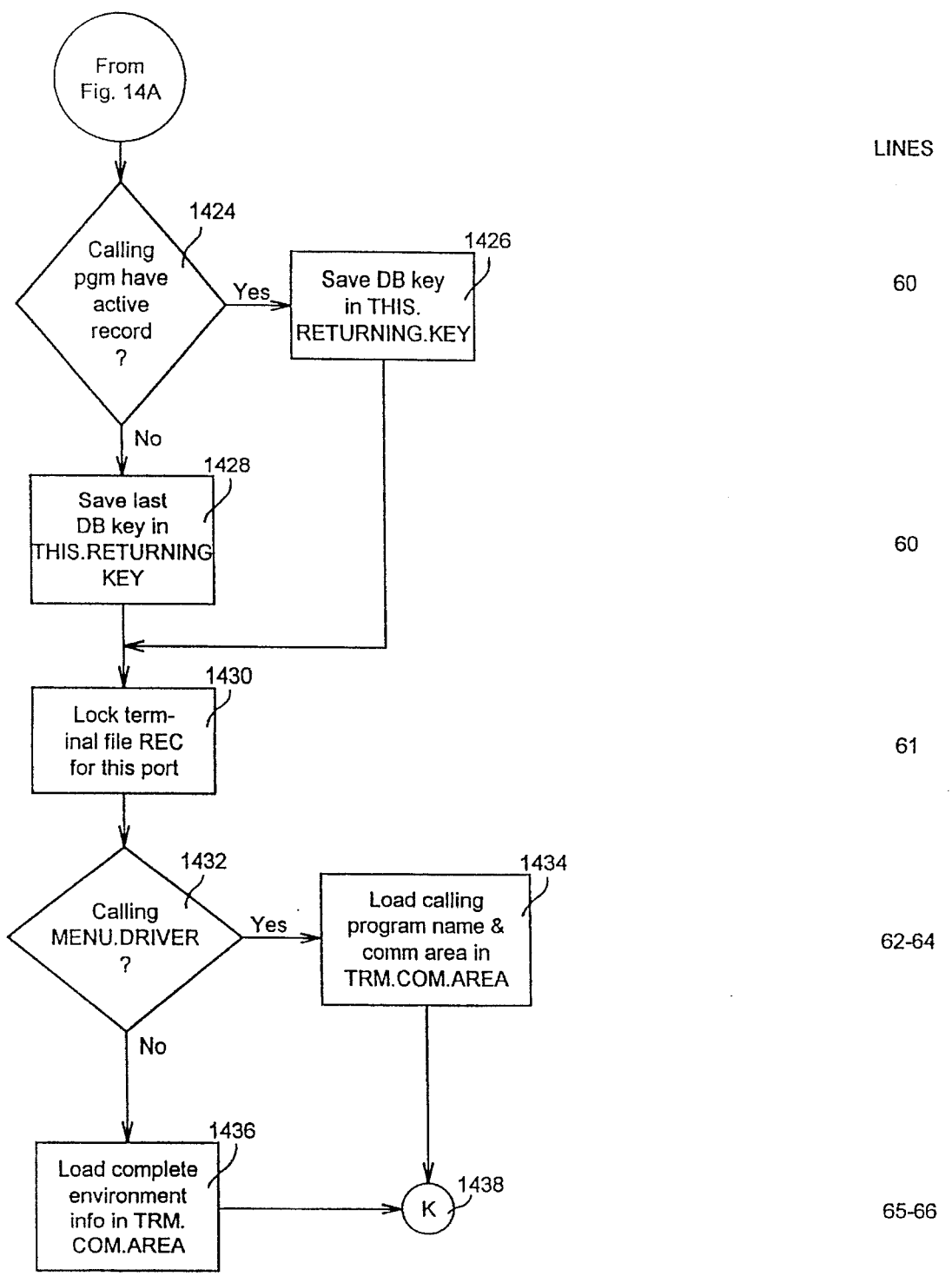

Refer to FIGS. 14LA and 14B. STD.EXECUTE (before the EXECUTE)

If the program is under development, the programmer has the opportunity to stop at various places by setting the DEBUG.FLAG on. If it is on 1406, then the program will display a message to the programmer and wait for a response. The first thing to be checked is the current level. If it is greater than twelve (12) 1412, then the program will display an error message 1414 and return to the calling program 1416. The program will check to insure that the program being called is a validly cataloged program 1418. If not, then the program will display an error message 1420 and return to the calling program 1416. Once past these checks, the program displays a message to the operator that the next level is being initiated 1422. The program then checks the MODE variable. If it contains data ("A", "C", etc.) 1424, then there was a DB record active when the operator requested the interrupt and the key to that record is saved in THIS.RETURNING.KEY 1426. If MODE is null (empty) then the calling program is between active records and the last DB record key filed is saved in THIS.RETURN-ING.KEY 1428. Because the system is about to write to the TERMINAL file, the record being updated is locked to prevent simultaneous updates from other users 1430.

There are two basic kinds of interruptions. A planned interruption where the program is designed to call another program in a job stream and pass information to it; and an unplanned interruption (initiated by the operator) where the next level program being executed is the MENU.DRIVER program and no information is to be passed. If the operator requests an interruption to run the menu program 1432, then none of the standard system common fields (listed above) need to be loaded 1434. If the system is not going to run the menu program, then the complete complement of standard system common information is loaded into the TRM.CO-M.AREA field in the Terminal file record for this port 1436.

Figure 14C:
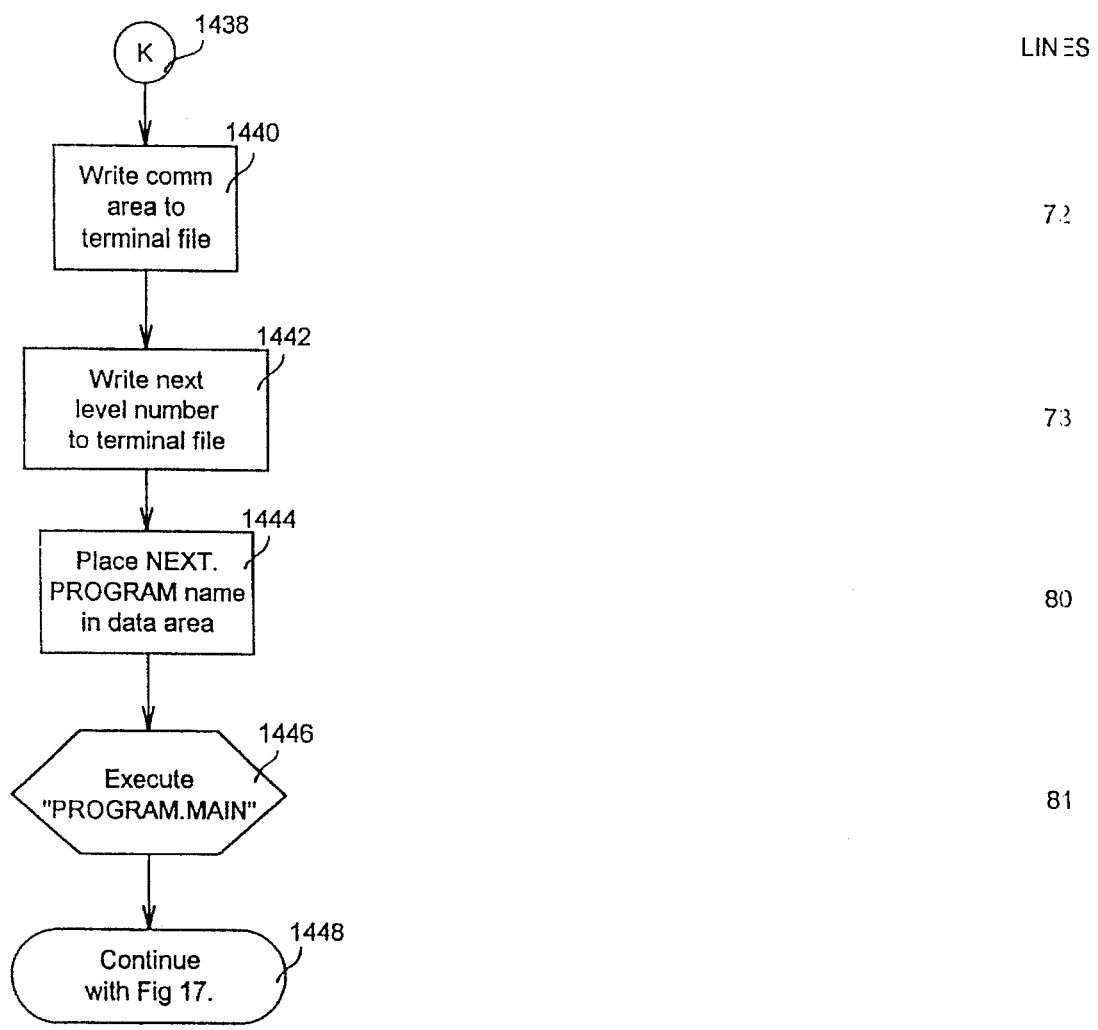

Refer to FIG. 14C. STD.EXECUTE (continued)

The updated TRM.COM.AREA field is written to the Terminal file into Attribute 14 of the record for this port 1440, and the level that is about to be initiated is written to Attribute 15 of the record for this port 1442. The name of the program to be run at the next level (in this case MENU.DRIVER) is placed into the system input area via the "DATA" statement 1444 and PROGRAM.MAIN is executed via the "EXECUTE" statement.

PROGRAM.MAIN PROGRAM NARRATIVE

Figure 15A:
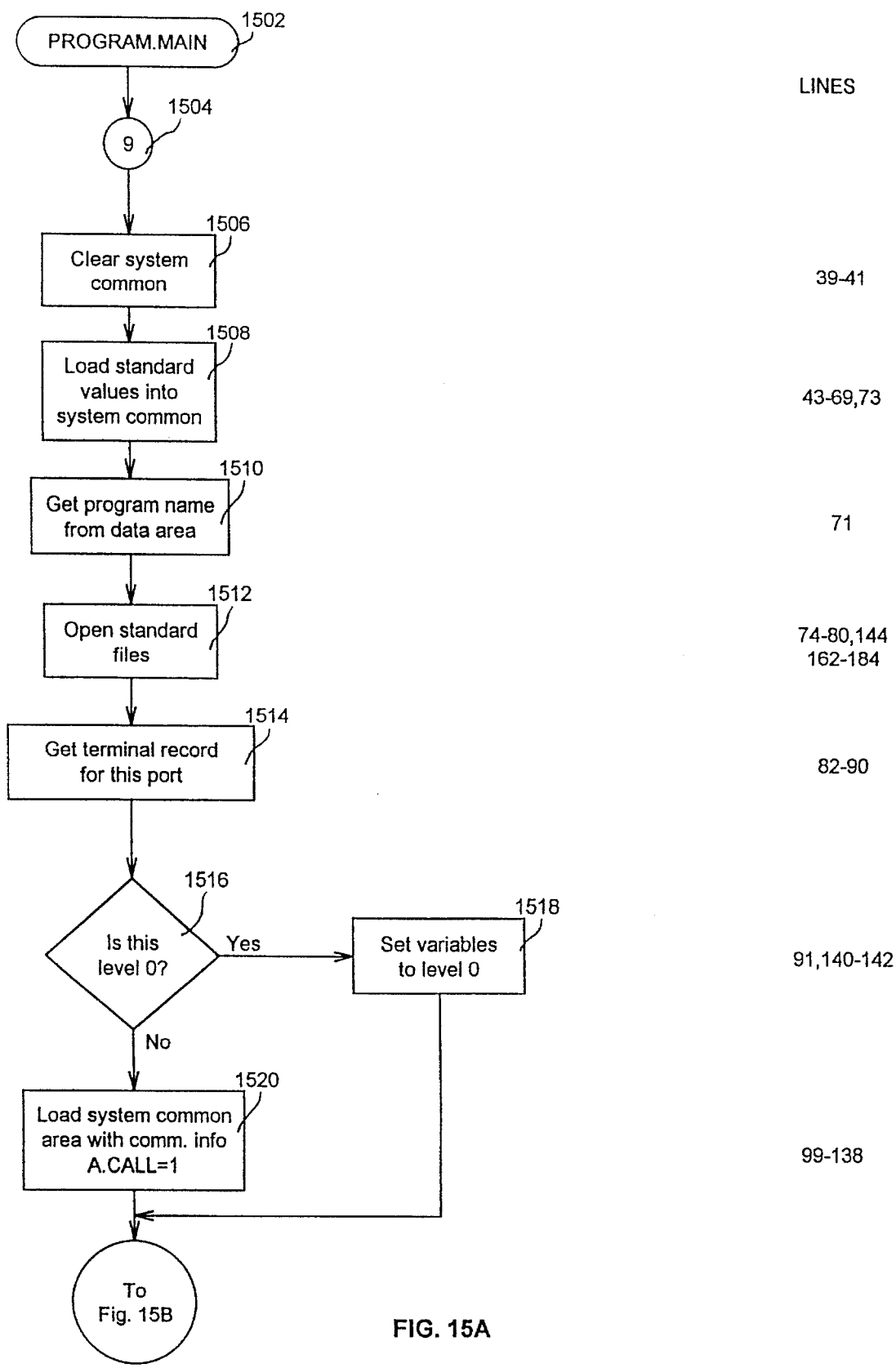
FIGS. 15A and 15B are a logic flow diagram describing how PROGRAM.MAIN processes the new task request and sets up any communications from the lower level.
Figure 15B:
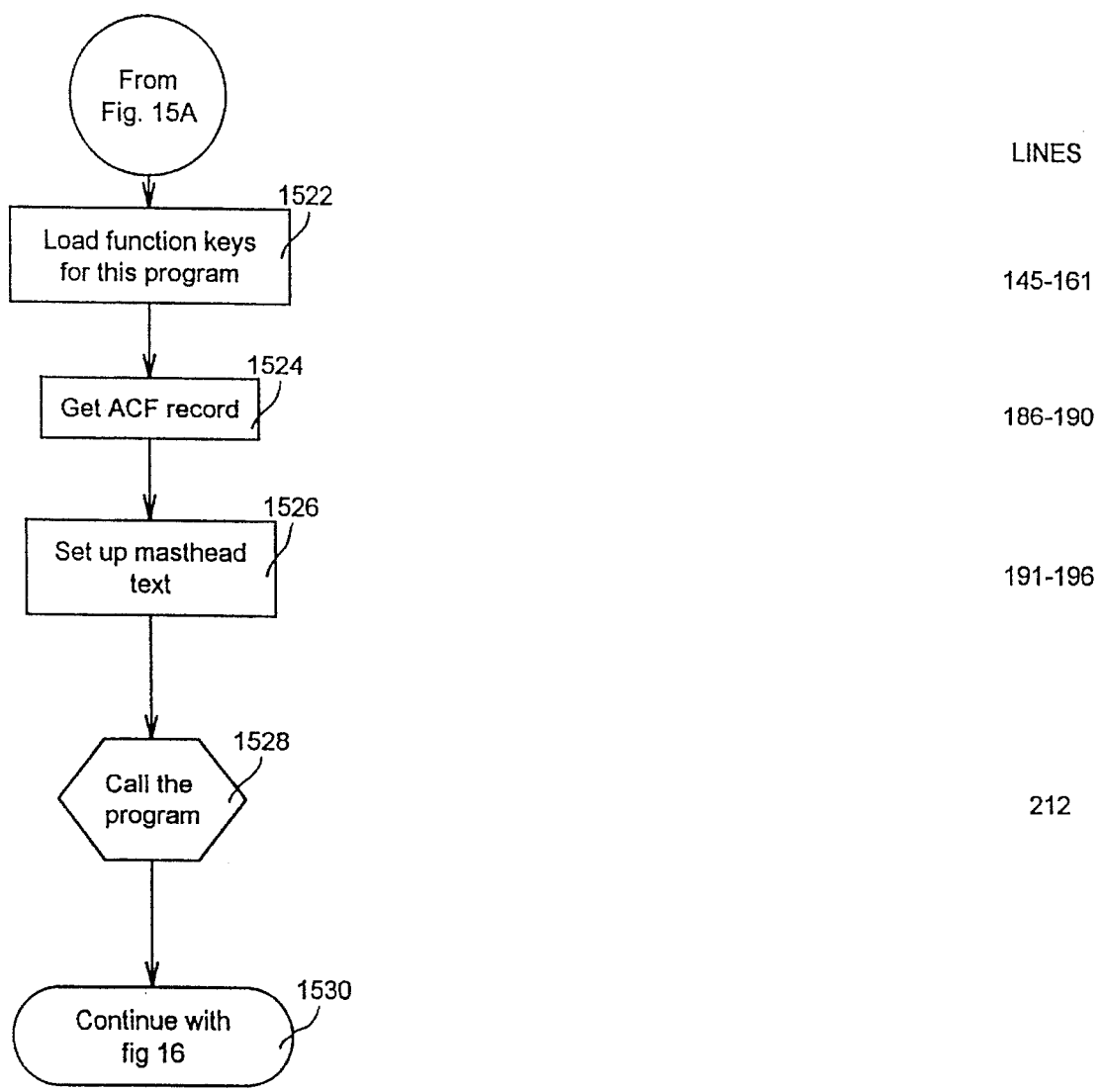

Refer to FIGS. 15A and 15B. PROGRAM.MAIN (before the program call)

This program is used to run all applications programs. It will perform those tasks that every program needs to do and open the files that every program needs to open. Once its housekeeping tasks are finished, the applications program is run via the "CALL" statement.

The first thing that is done is that all System Common areas are cleared 1506. System common is a common communications area where data can be passed back and forth between programs that are "CALLED" from one another. There is no common communications area between levels that are "EXECUTED". Next, there are several standard variables that are initialized 1508, and the name of the program to be called (in this case MENU.DRIVER) is retrieved from the system input area via an "INPUT" statement. Next the standard files are opened 1512 and the Terminal file record is read for this port 1514. This record will contain (in Attribute 14) all of the inter-level communications passed by STD.EXECUTE. If the program is running in Level 0 (the primary level that is running when the operator "logs on" in the morning) 1516, then there is no communications to process, and the communications is not processed and the variables are set to Level 0 values 1518. If this is not level 0, then there are communications variables that need to be stored in the various System Common fields 1520. Each variable is extracted from the communications area and placed into its respective variable, and the appropriate communications variable is removed. In addition, a flag (A.CALL) is set to signify that this level was initiated from another lower level 1520. The function keys are loaded for the program being run 1522, the Account Control File Record (ACF) is read 1524, and the masthead that will be displayed at the top of any screen is built 1526. Finally, the program (MENU.DRIVER) is run via the "CALL" statement 1528.

At this point the operator will see the MENU.DRIVER screen and may make any selection desired. Once the reason for the interruption has been satisfied, the operator will exit from the applications program and find the system displaying the menu once again. If the operator enters (E)xit or (OFF), the program recognizes that the level is not at 0 and automatically returns control to PROGRAM.MAIN to prepare to shut down this level and return to the previous lower level.

Figure 16:
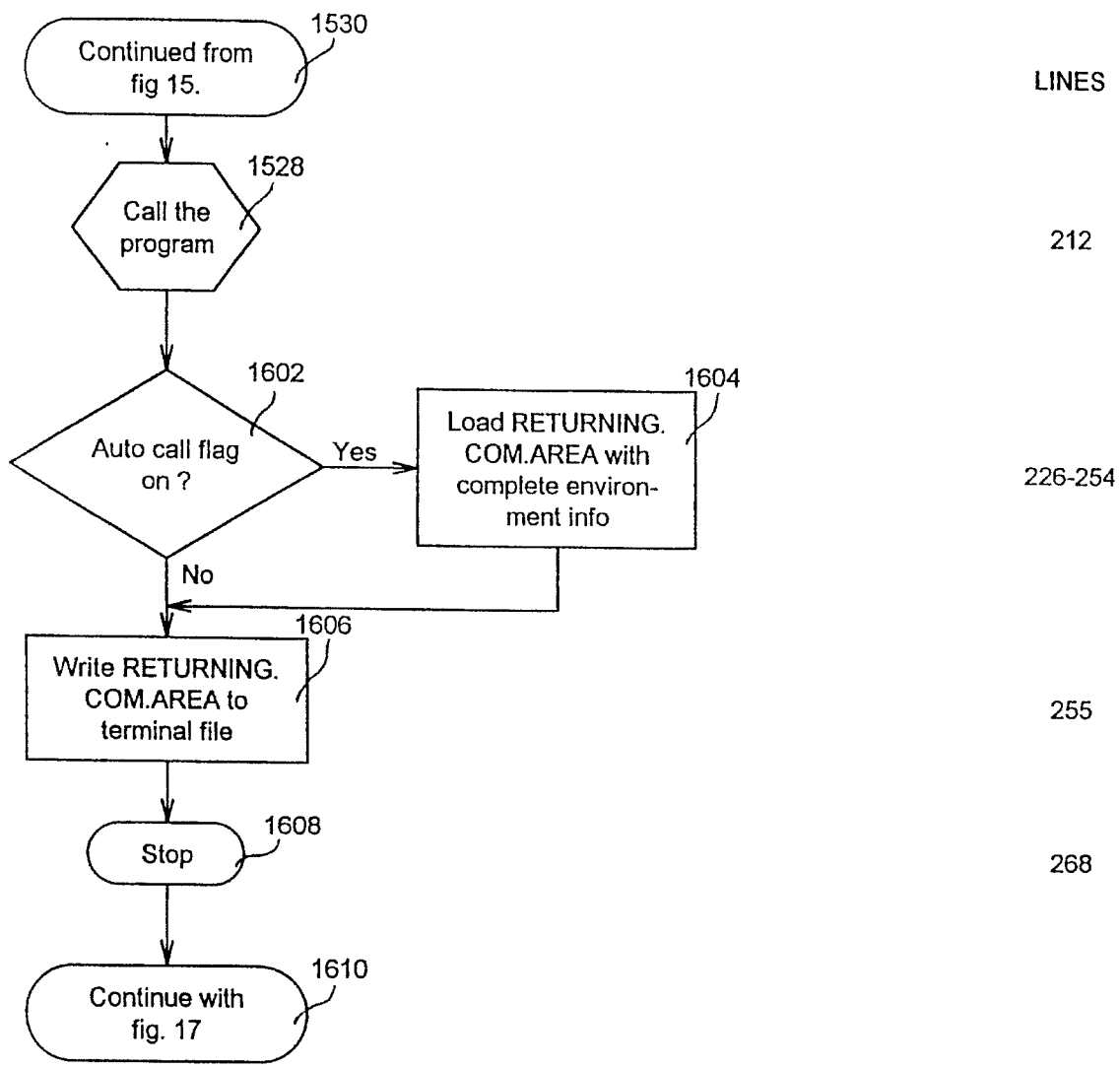
FIG. 16 is a logic flow diagram of how PROGRAM.MAIN closes down the higher level, prepares any communications to be passed back down to the lower level and shuts down the task.

Refer to FIG. 16. PROGRAM.MAIN (after the program call)

If the A.CALL flag is on 1602 then the very same system common variables which define the current environment will be loaded into the RETURNING.COM.AREA 1604 in order to pass them back to the lower level. The communications field is written back to the Terminal File 1606 and the program stops 1608. The operating system recognizes that this task is completed, closes down the task, and returns control to STD.EXECUTE at the lower level.

Figure 17:
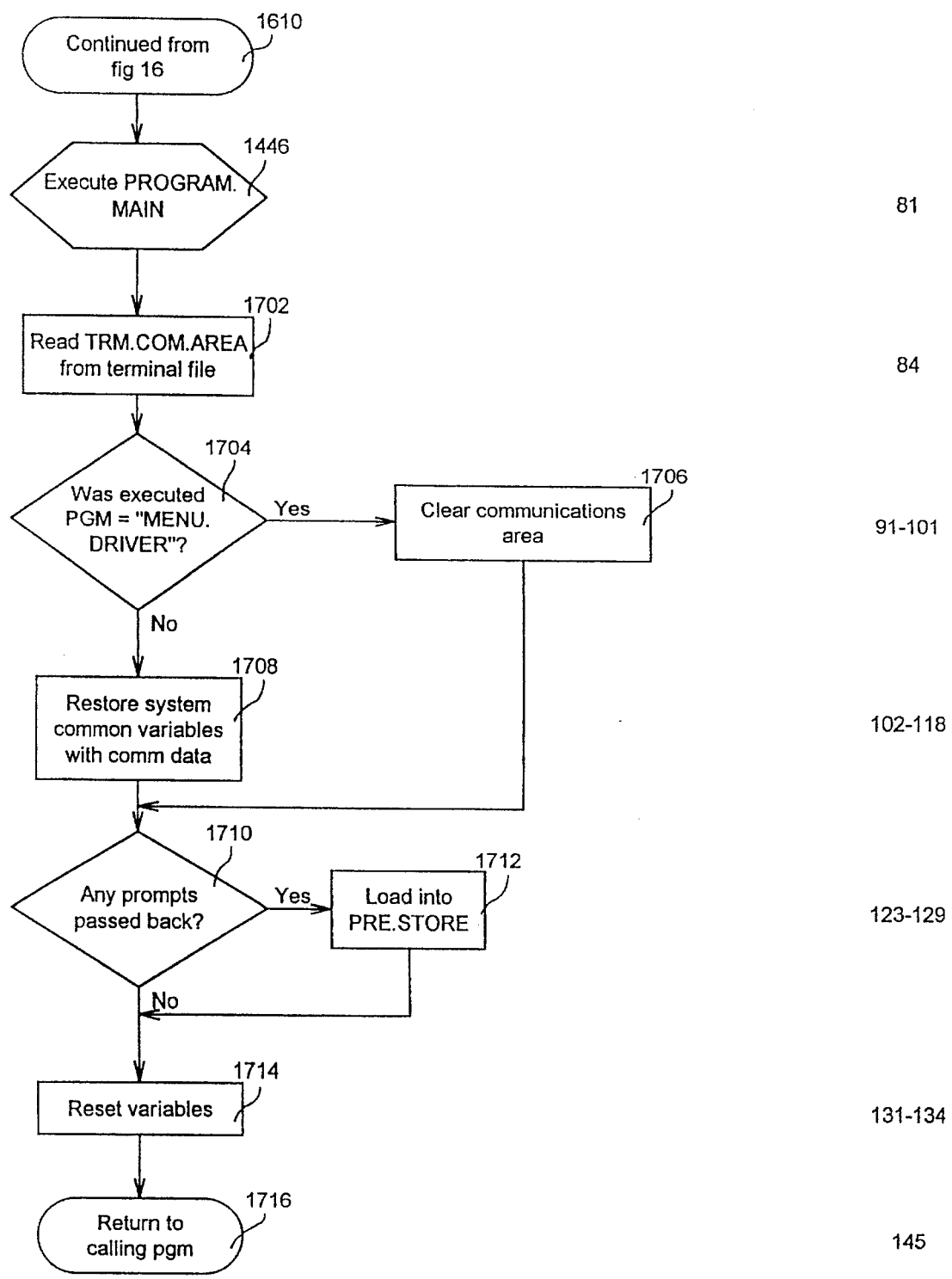
FIG. 17 is a logic flow diagram of how STD.EXECUTE handles the communications passed back from the higher level, reestablishes the calling program's display screens, and concludes the interrupt command.

Refer to FIG. 17. STD.EXECUTE (after the EXECUTE)

Once the operating system closes down an executed task, control is automatically passed to the next lower level. The program that was being executed at the time of the initiation of the higher level task is STD.EXECUTE. Once control is returned to this program, the program has access, once again, to System Common. System Common is a portion of the memory work area designed to hold the totality of information that describes the current executing applications environment of each task in effect on the system. Among the information maintained in System Common is:

1. The name of the program currently being executed (PGM.NAME).
2. The currently active Data Base record (HDR.REC).
3. The current coordinates of the cursor (HRZ & VRT).
4. The Attribute (Field) location being processed (AMC).
5. The current help record key (HELP.KEY).

There are approximately 770 individual variables that are include in System Common. STD.EXECUTE will utilize some of these variables to re-establish the screen so that the operator is returned to the exact program, data record, and field that were active at the time of the interruption.

The updated communications data as saved in step 1606 is read from the Terminal file. If the program being run at the higher level is "MENU.DRIVER" 1704, then there is no communications to process and the area is cleared 1706. If any other program was being run at the higher level, then the System Common Variables that describe the current environment are updated into their respective places in System Common 1708. If any data was passed back by the higher level program 1710, it is loaded into PRE.STORE for later processing 1712. Finally, the communications variables are cleared 1714 and STD.EXECUTE returns control to the calling program 1716.

Refer to FIG. 13. Calling program

The calling program will re-display the background and foreground of the program that was running before the interruption 1314, and the operator is placed back into the same field where the original command was issued 1302. The operator may then continue with the original task.

EXAMPLE OF PROGRAM INTERRUPTION

The scenario being illustrated is as follows:

"While making a change to a policy that belongs to Client David M. Murdock, another customer, Joe Jones, arrives at the office and wishes to leave a $100.00 deposit against a new policy."

Earlier

FIG. 18. Screen Jan. 22, 1990 – 17:54:05. This screen depicts the main menu screen that a typical operator would see after first "Logging On" in the morning. The operator selects program number 1 (Client Marketing and Servicing). This is the gateway program to all client/policy transactions.

FIG. 19. Screen Jan. 22, 1990 – 17:54:36. This screen is the Basic Client Information screen. The curser is resting just to the left of the Client Code: text. The operator enters "MURDOCK" to recall the DB record for David M. Murdock. The program accesses the database, retrieves the appropriate database record and displays . . .

FIG. 20. Screen Jan. 22, 1990 – 17:55:06. This screen contains the client information about client David M. Murdock. The operator verifies that this is the client desired and depresses the "POL" Function Key to call up the list of policies for this client. The program performs a planned interruption to call the Policy Selection List program, passes the Client Code so that the operator doesn't have to re-enter it and displays . . .

FIG. 21. Screen Jan. 22, 1990 – 17:57:09. This screen will allow the operator to select which of the policies for the client is to be processed. The operator selects a policy "1" enters a Transaction Code "COR" and depresses the "POL" function key again to indicate that an individual policy has been selected for processing. The program performs another planned interruption to call the Basic Policy Information program, passes the Policy Sequence Number so that the operator doesn't have to enter it and displays . . .

FIG. 22. Screen Jan. 22, 1990 – 18:01:37. This screen shows the operator the basic information about a policy. Just as the operator is about to enter the new information about this policy . . .

JOE JONES ARRIVES

The operator now has to satisfy the request of Joe Jones to process the $100.00 deposit immediately (after all he is sitting right there). The operator enters "M" to call the menu program. The program performs an unplanned interruption and displays . . .

FIG. 23. Screen Jan. 22, 1990 – 17:58:09. The main menu screen. The operator selects number 2 (Accounts Receivable Menu), and the program displays . . .

FIG. 24. Screen Jan. 22, 1990 – 17:58:24. The A/R menu where the operator selects number 4 (Case Receipts Entry Screen). The menu program calls the Cash Receipts program which displays . . .

Screen Jan. 22, 1990 – 18:00:45. The operator enters the necessary information to record the fact that Joe Jones is leaving $100.00 (Check number 12345) and files the screen. The program terminates and returns control to the menu program which displays the last menu processed . . . FIG. 26.

JOE JONES LEAVES

After a cheerful goodby, the operator must now finish up the interrupted task of correcting David M. Murdock's policy. So the operator enters (E)xit which causes the menu program to re-display . . .

FIG. 27. Screen Jan. 22, 1990 – 18:01:17. The main menu screen. The operator enters (E)xit again, and the program terminates this task and returns to the lower level. The original screen is redisplayed.

FIG. 28. Screen Jan. 22, 1990 – 18:01:37. The operator is now back where he started in the same field where he entered the (M)enu command just moments ago. The correction is now completed. The Policy record is filed, and the rest is history.

OPERATING ENVIRONMENT

The operating environment required for this feature of the present invention is any operating system that allows for the execution of system level commands from within a program. The environment must also be capable of assigning to each port (terminal/user/operator) a task automatically as the port "Logs On" to the system. In addition, the environment must be able to assign multiple tasks to any active port. The Pick Operating System and most (if not all) of its derivatives have this capability. UNIX and most (if not all) of its variations also have this capability. While these two are listed specifically, there are other operating systems/environments that support the execution of system level commands from within programs and automatically manage one or more tasks for each port/user.

Forms Builder

FILES REQUIRED

There are two files required to support the Forms Generator.

Source Parameter File This file will contain the image information as entered by the developer. All modifications to the form are affected by changing the contents of this file. This file becomes the "Source" code for the Forms Generation program.

Object Command File This file will contain the image information once it has been translated into printer-understandable commands. Each form will have s separate record in this file.

RECORD FORMATS

Source File — The following fields are required.

Key This is the key to each forms record and must be unique for each form. The key may take any form (Alpha only; Numeric only; or Alpha/Numeric).

2 Orientation. This field will contain either a "P" or "L" and signifies the orientation of the document. If (P)ortrait is selected, the document will print in a vertical format similar to a letter. If (L)andscape is selected, the document will print in a horizontal format similar to a check.

3 Description of the form.

The following fields all relate to any lines, boxes, shaded areas, and pattern fills that the form is to contain. The following fields are all entered and maintained in hundredths of a character (horizontally) and in hundredths of a line (vertically) in the format NNN.NN.

4 Horizontal Starting Point.

5 Vertical Starting Point.

6 Height. Used in conjunction with Width as follows: If the Height is 1 and the Width is greater than 1, then a horizontal line is drawn. If the Height is greater than 1 and the Width is 1, a vertical line is drawn. If both Height and Width are greater than 1, a box is drawn.

7 Width. Used in conjunction with height (see above).

8 Weight. How wide is the line. Specified in dots, with 300 dots to the inch.

9 Type of graphics as follows: 0 = Solid line 1 = Dashed line 2 = Shaded area 3 = Pattern fill 10 Pattern. Valid only if Type is 2 (Shaded area) or 3 (Pattern fill). This field will specify any one of 8 shades (Type = 2) or 6 patterns (Type = 3)

23 Comments. These comments are for the convenience of the developer and are used to hold notes about any line, box, shade, or pattern.

The next set of fields refer to check-off boxes. These small 1 character by 1 character boxes are often sprinkled around the form.

11 Horizontal character position.

12 Vertical character position.

The next set of fields specify where on the form all text is to be located.

13 Horizontal Starting Position.

14 Vertical Starting Position.

16 Text orientation (Vertically or Horizontally).

17 The Point Size of the text to be printed. Based on how many font sizes are contained in the printer. In the present Office Automation System, the following sizes are supported: 18, 16, 14, 12, 10, 9, 8, 7, 6, and 4.

18 Weight. This refers to whether the text will be printed in medium strike weight or bold strike weight.

15 The text to be printed.

The following fields are printer offset fields which allow the entire background or foreground to be shifted around without having to adjust hundreds of horizontal and vertical entries.

19 Horizontal background offset.

20 Vertical background offset.

21 Horizontal foreground offset.

22 Vertical foreground offset.

Object File — The following fields are generated.

Key The same key is used to identify this record as was entered by the developer in the Source file.

1 The date that this form was last generated.

3 The description of the form as entered by the developer.

4 The horizontal background offset.

5 The vertical background offset.

6 The horizontal foreground offset.

7 The vertical foreground offset.

8-n The rest of the fields contain the printer compatible commands that will generate the document. n will vary depending on the complexity of the form.

IMAGE ENTRY PROGRAM NARRATIVE

Figure 29A:
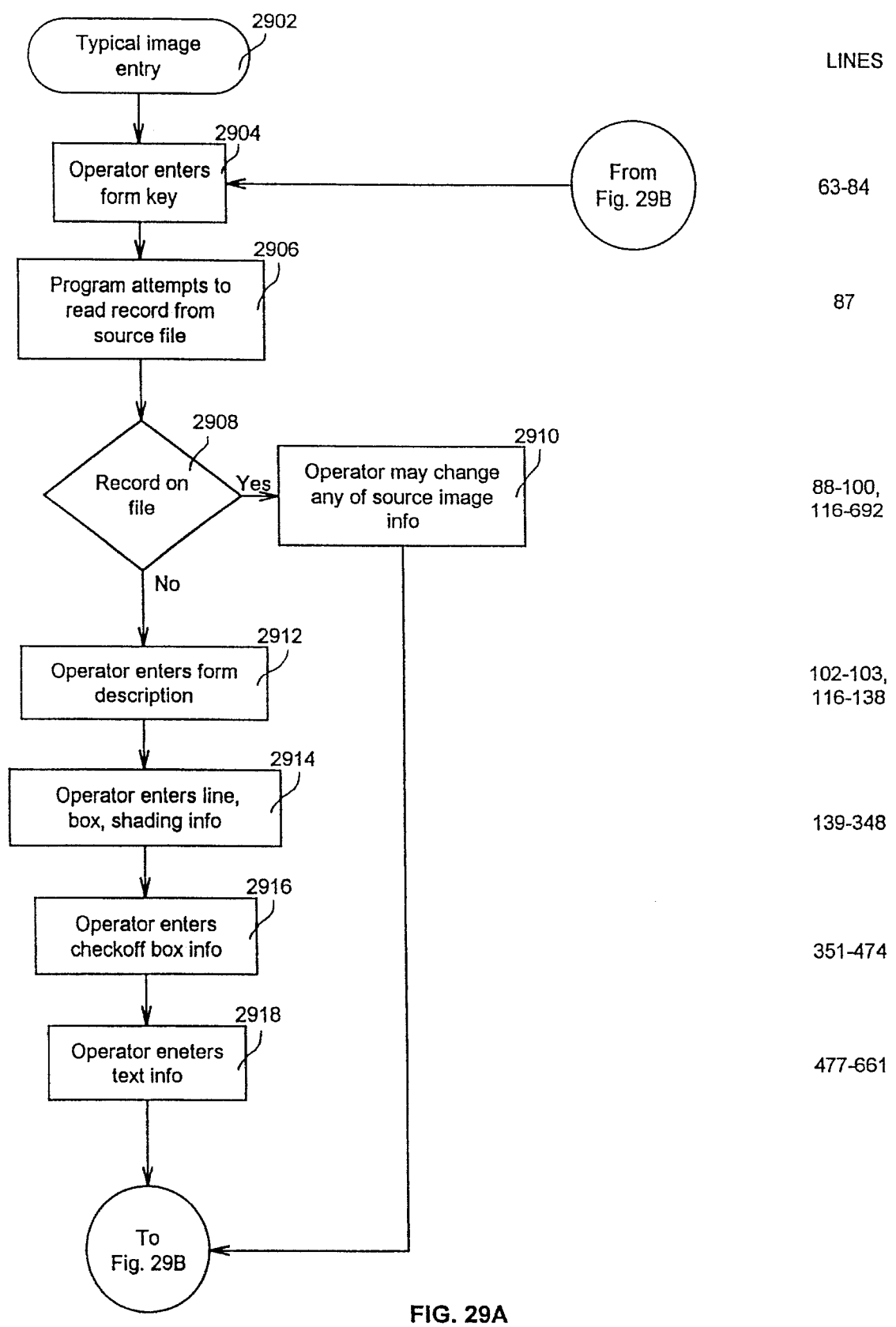
FIGS. 29A and 29B are a block logic diagram of a typical Forms Generation Parameter entry program.
Figure 29B:
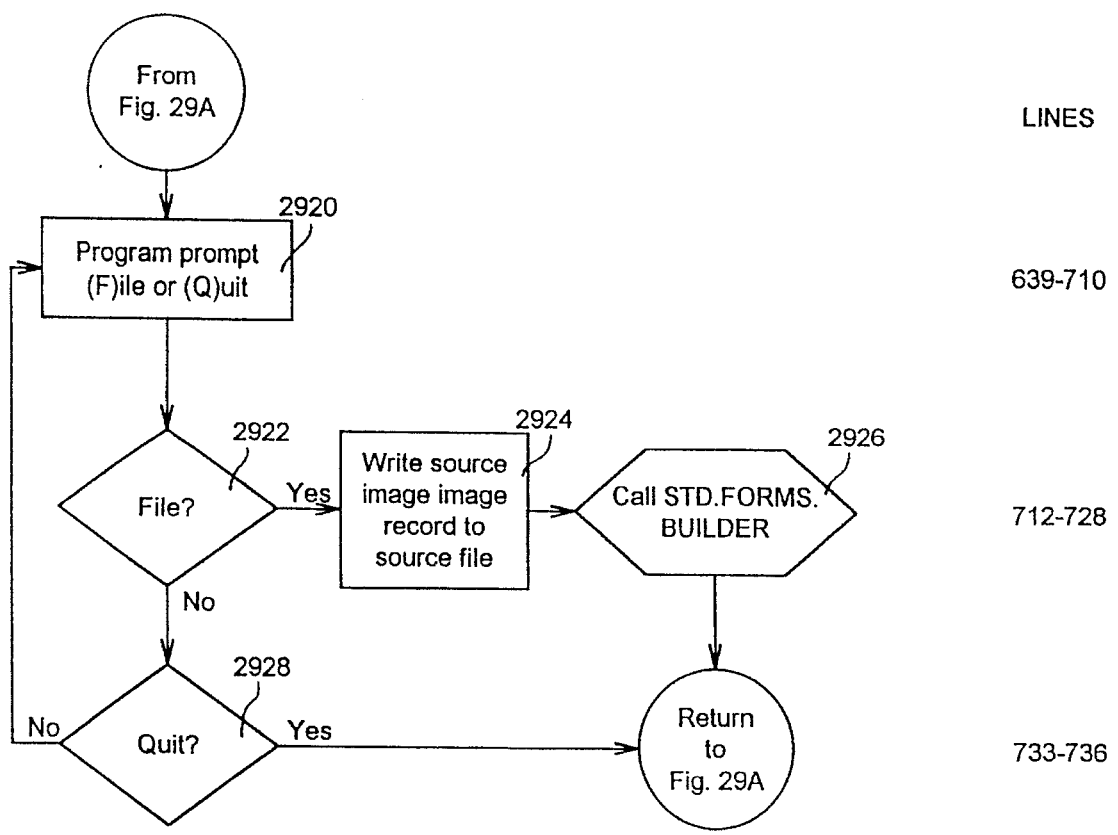
Figure 30A:
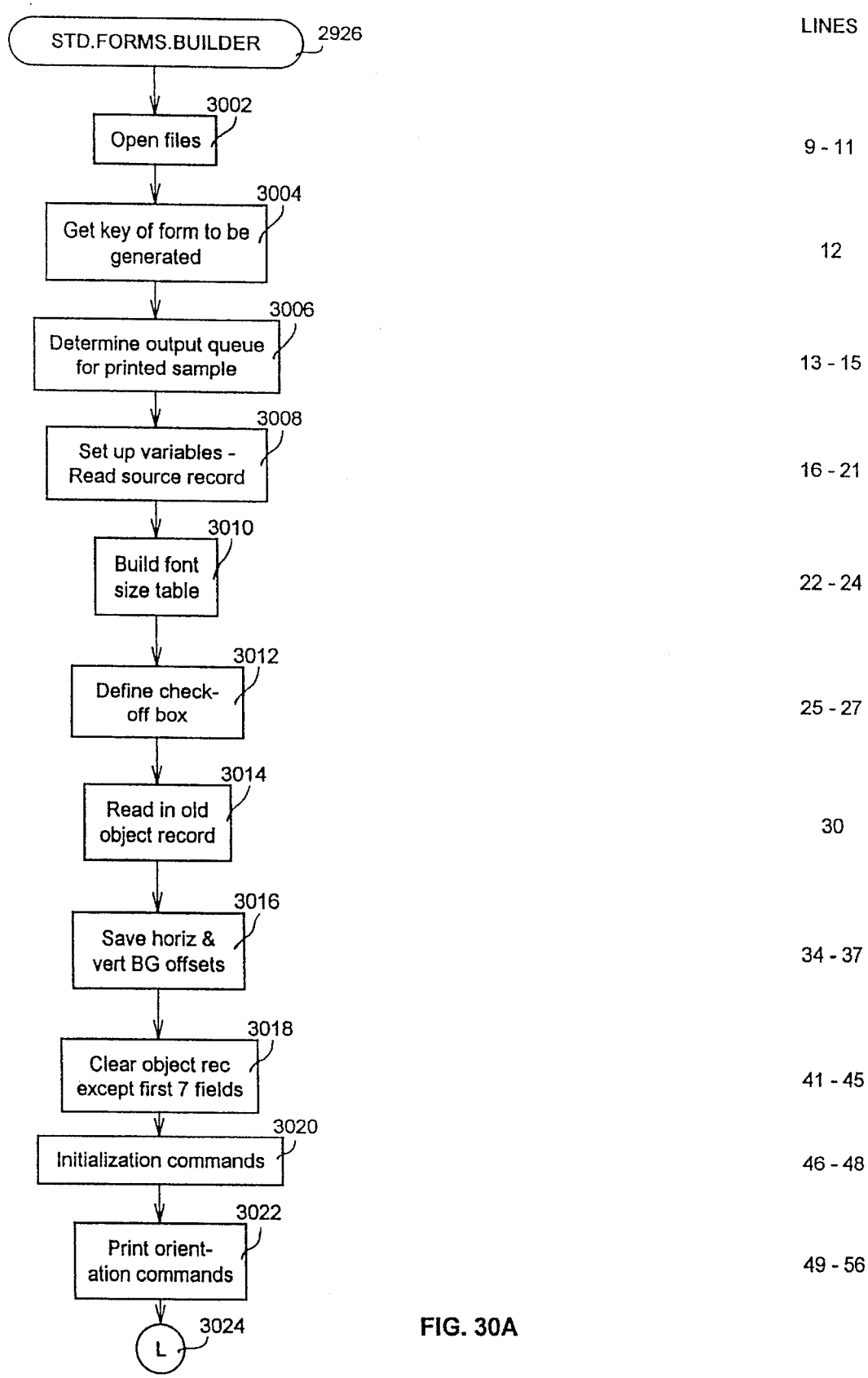
FIGS. 30A and 30B are the main program logic flow diagram of the STD.FORMS.BUILDERFIG.
Figure 30B:
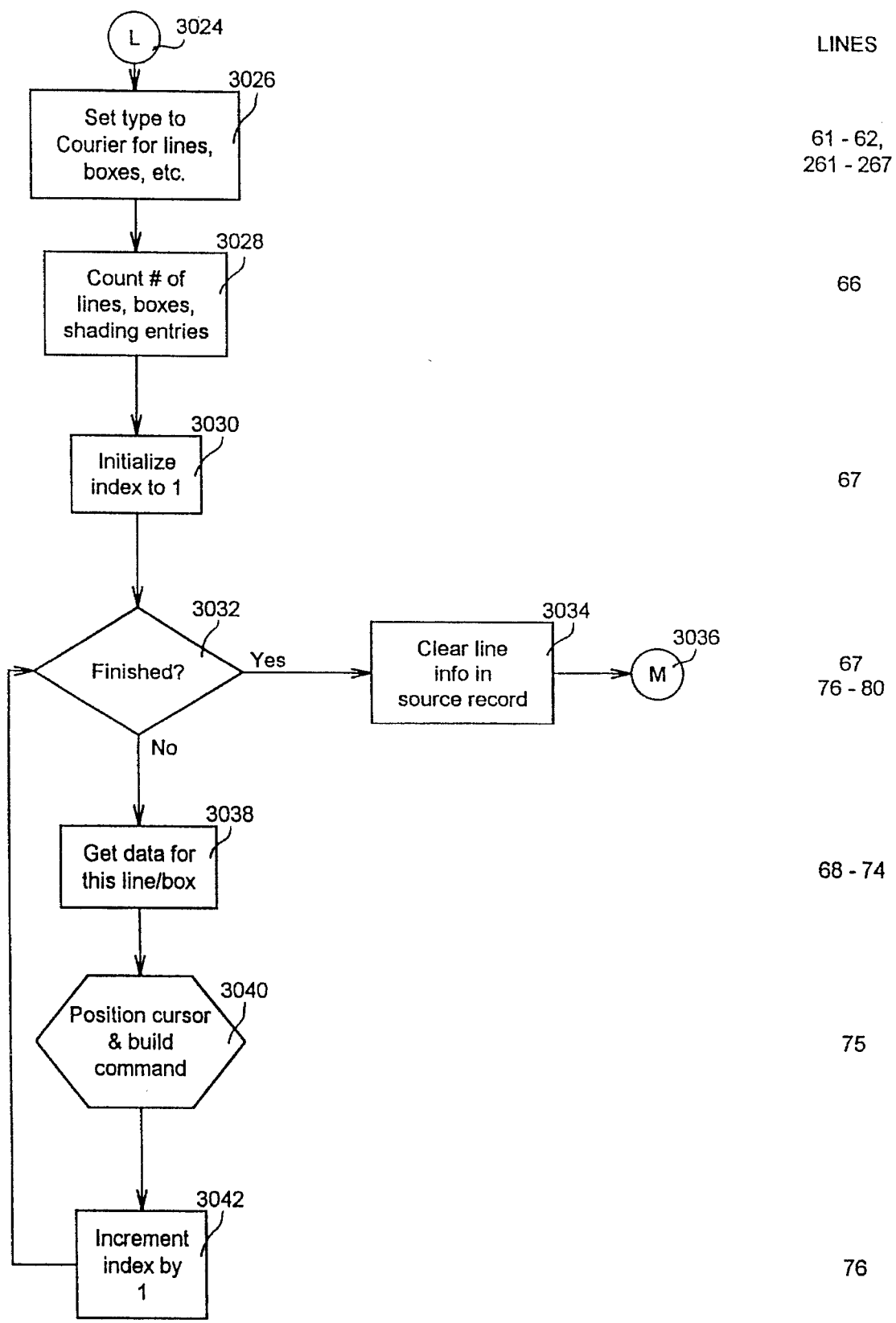

Refer to FIGS. 29A and 29B. Typical Image Entry Program

The program used to enter the document image information is any standard data capture program. This program will display a prompt to the operator for the document key 2904, attempt to read the record from the Source file 2906, and if found 2908, allow the operator to modify the contents of the image information 2910. If the record is not found, then the operator may enter the information necessary to compose a document. This information would include the description of the document being created 2912; the line, box, shading, and pattern data 2914; the check-off box data 2916, and the text to be printed on the document 2918. As a guide, the developer would have taken an original of the form and laid out guide markings using a forms ruler.

For ease of entry, all data entered is in the format NNN.NN or hundredth of a character. Since there are 10 characters to each inch, this equates to being able to specify the position of any line, box, shading, pattern, check-off box, or text to the thousandths of an inch horizontally. Vertically, all positioning is in hundredths of a line and with 6 lines per inch, so the developer may position anything to 1/600th of an inch.

Some examples:

To generate a horizontal line with the following statistics:

| Horiz. character | 6 |
|---|---|
| Vertical line | 3 |
| Length | 2.5 inches |
| Weight | 5 dots |

The following information would be entered:

```
Horiz  Vert  Height  Width   Wt   T   Patt ------ Comments ------
6.00   3.00  1.00    25.00   5    0
                                      |   Optional Comments
                                  +  --- No Pattern for lines
                              +  --------- Type 0 (line)
                         +  -------------- Weight 5 (dots)
                    +  ------------------- Width 25 characters (2.5")
              +  ------------------------- Height 1 (horizontal line)
        +  ------------------------------- Vertical Position Line 3
  +  ----------------------------------- Horizontal Pos'n Char. 6
```

The developer would continue to enter in the image, periodically printing out the document to check on the exact placement of the graphics. Once all of the information has been entered, the system displays a prompt asking whether to (F)ile or (Q)uit 2920. If the operator enters (F)ile 2922, then the system will write the Source image data to the Source file 2924, and call the STD.FORMS.BUILDER program 2926 to generate the object (printer-understandable) commands.

STD.FORMS.BUILDER PROGRAM NARRATIVE

This program will create the object commands based on the image information entered by the operator, and write the resulting series of commands to the Object file.

The first step in this process is the housekeeping chore necessary to perform the generation. Open the files 3002, get the key of the Source file record to be compiled 3004, set up the Spooler output queue to print the sample form 3006, set up some standard variables and then read in the Source Image record 3008, build a temporary font size table 3010, define the checkoff box as a series of printer commands 3012, read in the old object record 3014, save the horizontal and vertical offsets from that old table 3016, clear the old object record to prepare it for the new commands 3018, and, last but not least, save the new printer initialization commands in the Object record.

All line drawing is performed while the printer is set up to print Courier Type Font, so the necessary commands are issued 3026. The program causes the system to count the number of line, box, shading, and pattern entries there are 3028, and then starts to loop through each entry 3032–3042, looking at each entry in turn 3038, and calling the Curser Positioning and Command Generation routine (Tag 9000 in the program code). Once finished generating all of the lines, boxes, etc. the program continues with the Check-Off boxes (See FIG. 32.)

Figure 31:
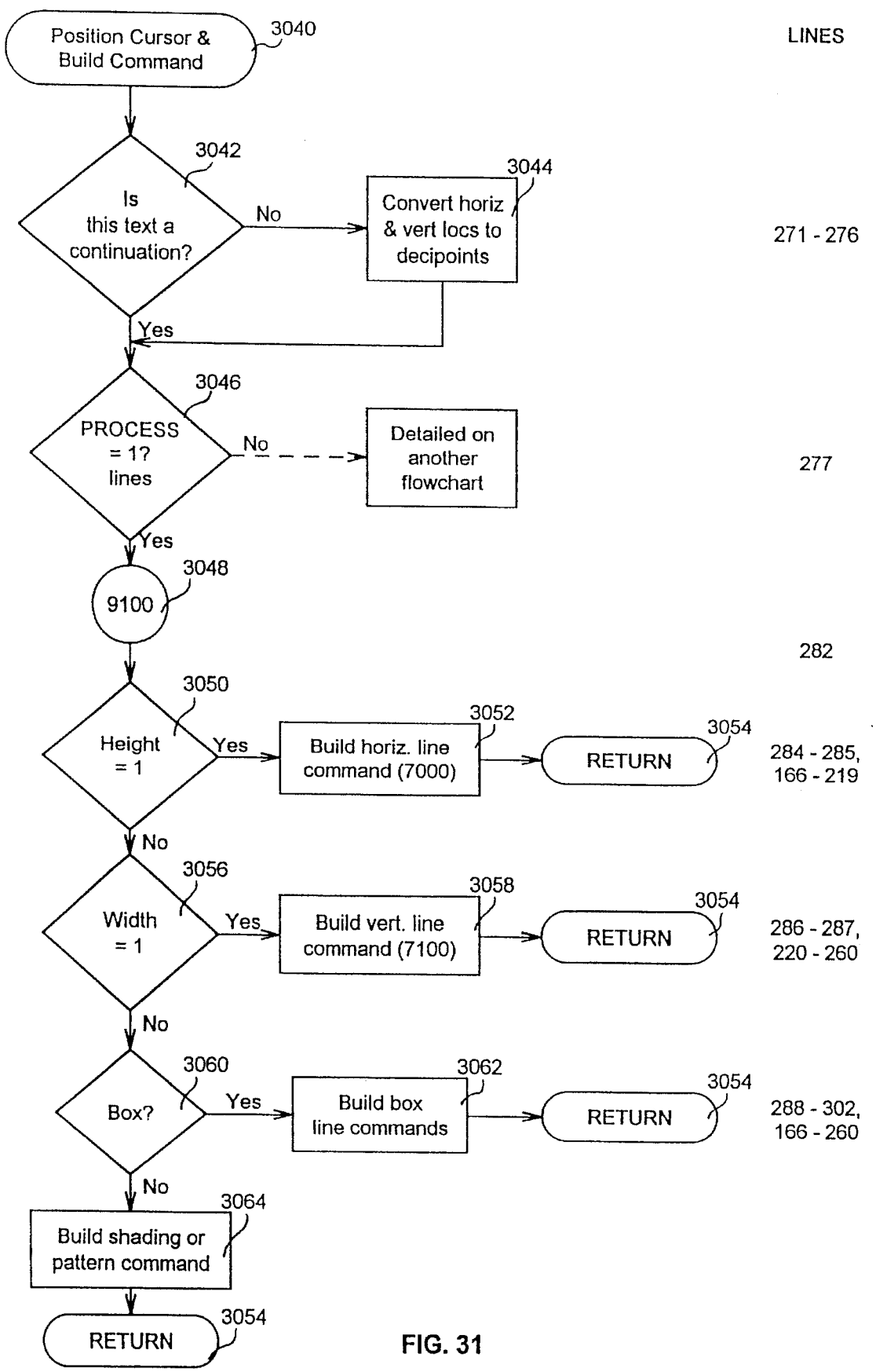
FIG. 31 is a program logic diagram of the Line, Box, Shading, and Pattern Fill commands routine.

Refer to FIG. 31. Lines, Boxes, Shading, and Patterns

If there is no horizontal position, that means that the system is concatenating two or more strings of text and there would not be any new curser placement command 3042. If there is a horizontal position, then the Horizontal and Vertical positions are converted into decipoints (720 decipoints to the inch) 3044. Because decipoints are not a unit of measure that people readily work with, the Forms Builder is designed so that all positional data entered is in characters and lines. To convert characters to decipoints, the program multiplies by 72 (i.e. 720 divided by 10 characters to the inch). To convert the lines to decipoints, the program multiplies by 120 (6 lines to the inch). Now the system is ready to generate the actual graphic command that will perform the action defined in the entry.

If the Height entered for this entry is one (1) 3050, then the program will build a horizontal line command 3052 and then return to process the next entry 3054. The same routine that builds solid horizontal will also build a dashed line as a series of short lines separated by a space that is two-thirds of the length of the short line.

If the Width entered is one (1) 3056, then the program will build a vertical line command 3058, and then return 3054.

If both the Height and Width have data 3060, then the program will build a box that has the height and width specified 3062 and then return 3054.

If the type indicates that this is a pattern fill or shading, then the program will build the shading/pattern fill command 3064 and return 3054.

Figure 32:
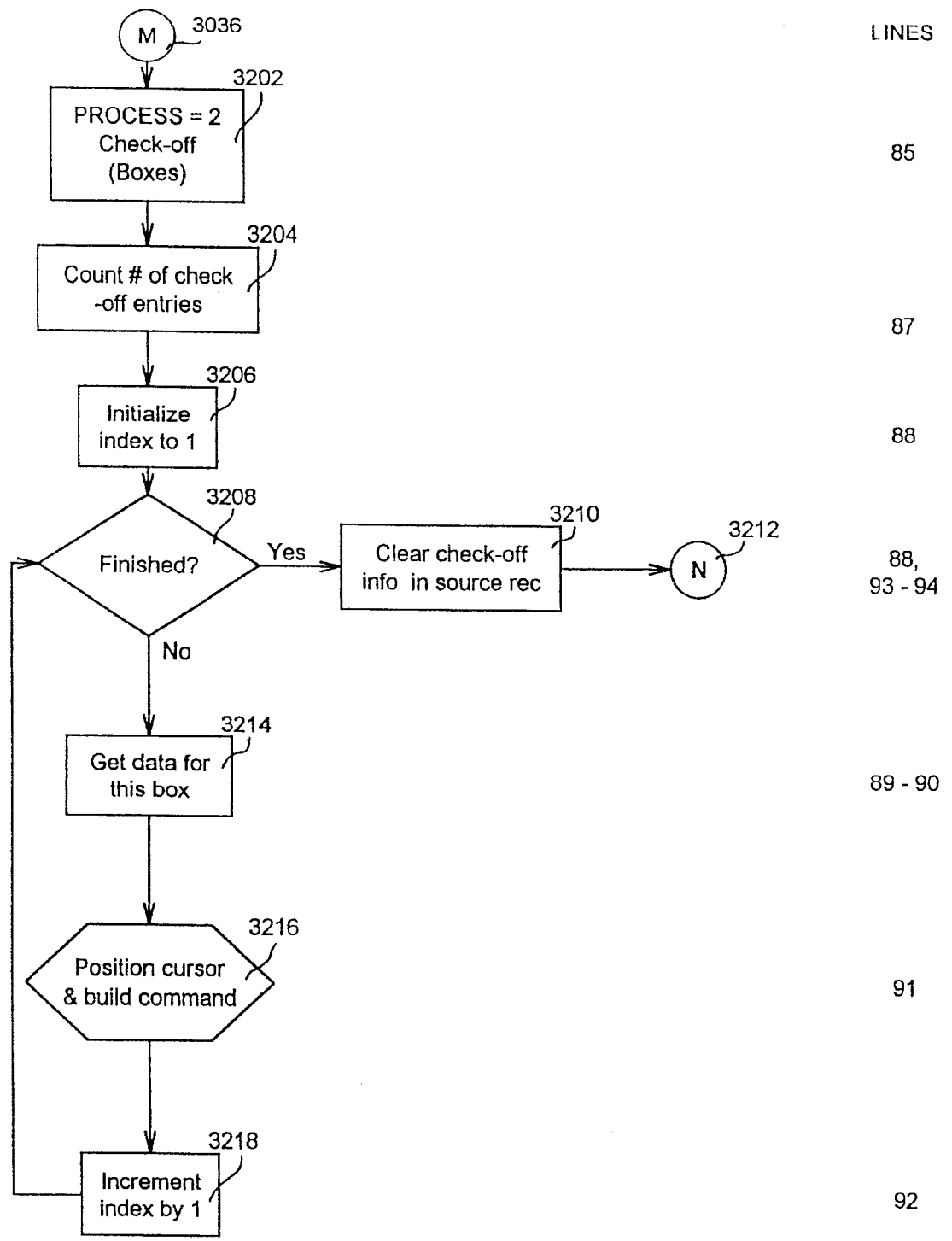
FIG. 32 is a continuation of FIGS. 30A and 30B (main logic flow).
Figure 33:
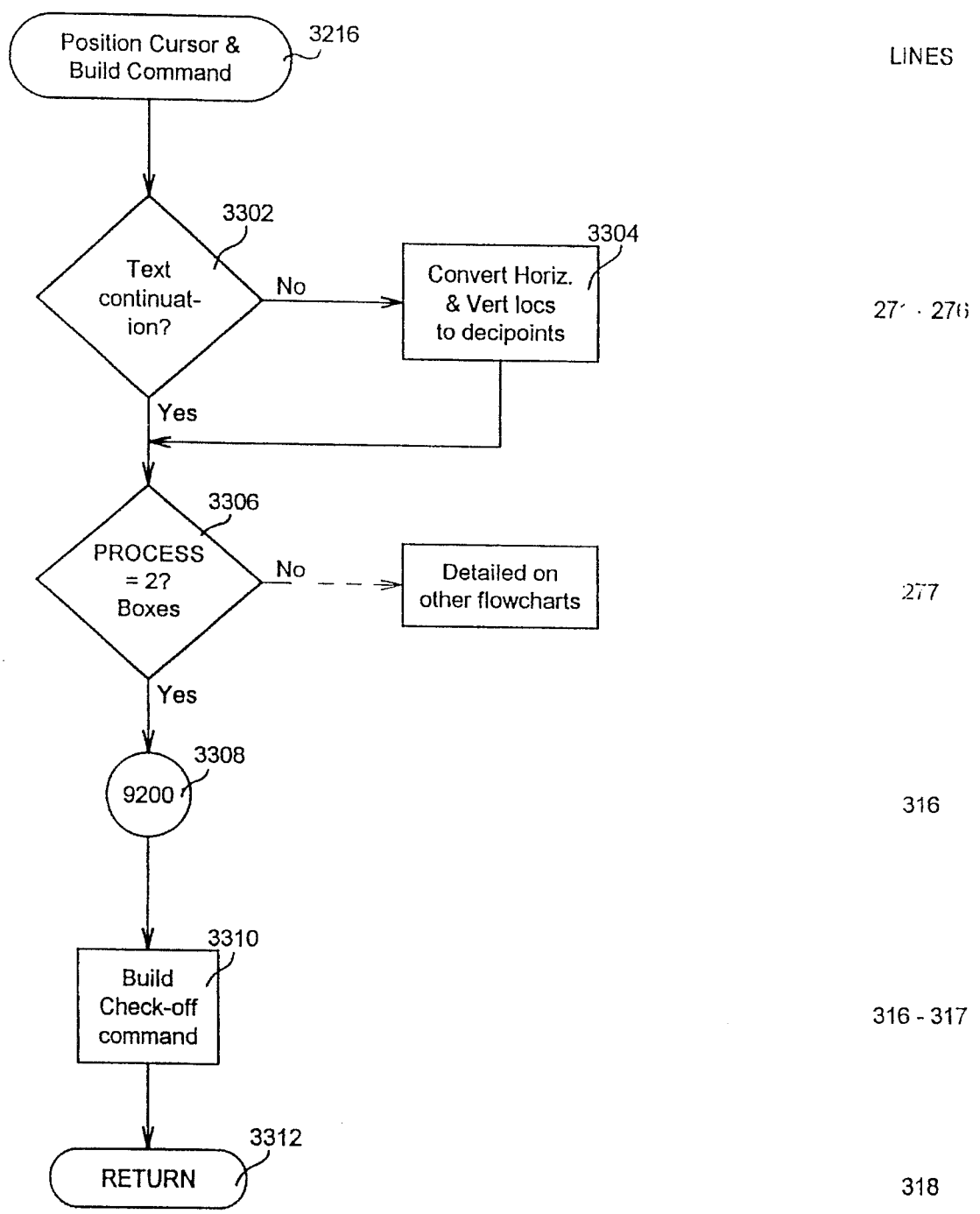
FIG. 33 is a logic diagram showing the Check-Off Box command routine.

Refer to FIG. 32. STD.FORMS.BUILDER Main Logic Flow (Cont.)

Once all lines, boxes, shading, and pattern fills are completed, the program will then set the PROCESS flag to two (2) 3202 to signify that the check-off boxes are being processed. The program counts the number of check-off box entries 3204, and then examines each entry in turn 3206–3218. Once finished 3208, the program clears the check-off data in the source record 3210, and continues 3212 (refer to FIG. 34). As each entry is processed, the data is identified 3214, and the Curser Position and Command Building routine is called 3218. After each entry is processed, the index is incremented 3218 to examine the next check-off box entry.

Once again in the Curser Position and Command Building routine (Tag 9000) 3256, the program checks the horizontal position field to see if it is null 3202, and if so, converts the positions (both horizontal and vertical) to decipoints 3304. The routine continues to Tag 9200 (based on the PROCESS flag) 3308, builds the command 3310 which is composed of the positioning command and the box command built at the beginning of the program 3022, and then returns 3322 to examine the next check-off box entry.

Figure 34A:
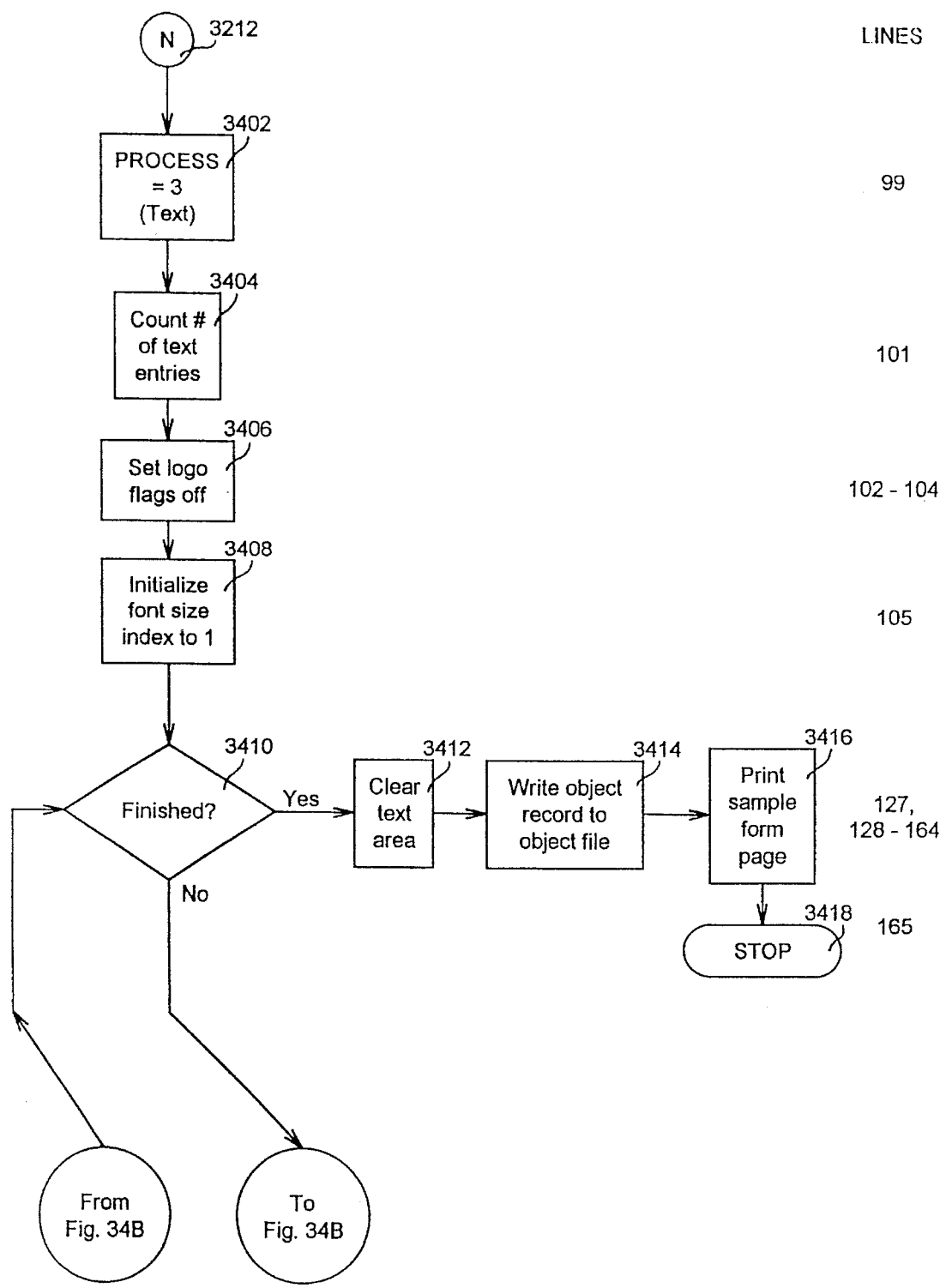
FIGS. 34A and 34B is a continuation of FIGS. 30A and 30B and FIG. 32 completing the main logic diagram and a portion of the Text command routine.
Figure 34B:
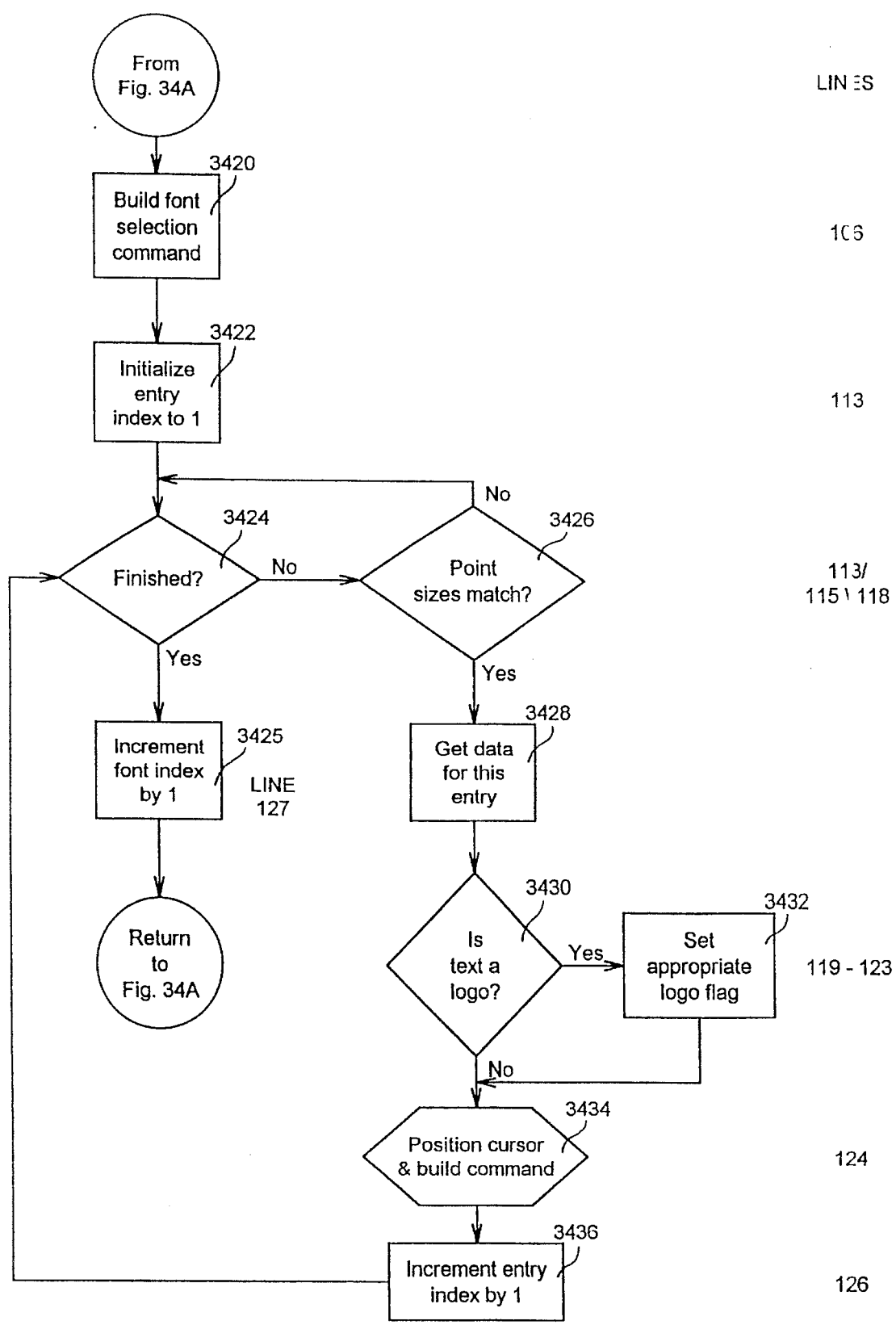

Refer to FIGS. 34A and 34B. STD.FORMS.BUILDER Main Logic Flow (Cont.)

Once all check-off boxes are processed, the program sets the PROCESS flag to three (3) 3402 to indicate the third and final step in the document generation process, Text. After counting the number of text entries 3404, and setting the three logo flags off 3406, the program examines each font size in turn 3408–3425, searching all of the text entries to group all text for each of the allowable size together. This prevents the program from jumping back and forth between differing font commands since the text is not entered in any font size order. As each font size is processed 3408–3425, each text entry is searched for a match 3422–3436. If the font size matches as to both font point size and strike weight, the data for this entry is identified 3428. If the text for this entry is one of the following words: "CISCO", "ACORD", or "AETNA" 3430, the program sets a specific logo flag 3432 to permit building a special command to print the digitized logos later on. (See below for further description of digitized logos.) The Curser Position and Command Building routine is called 3434 (again), and then the entry index is incremented to check the next text entry 3436.

Figure 35A:
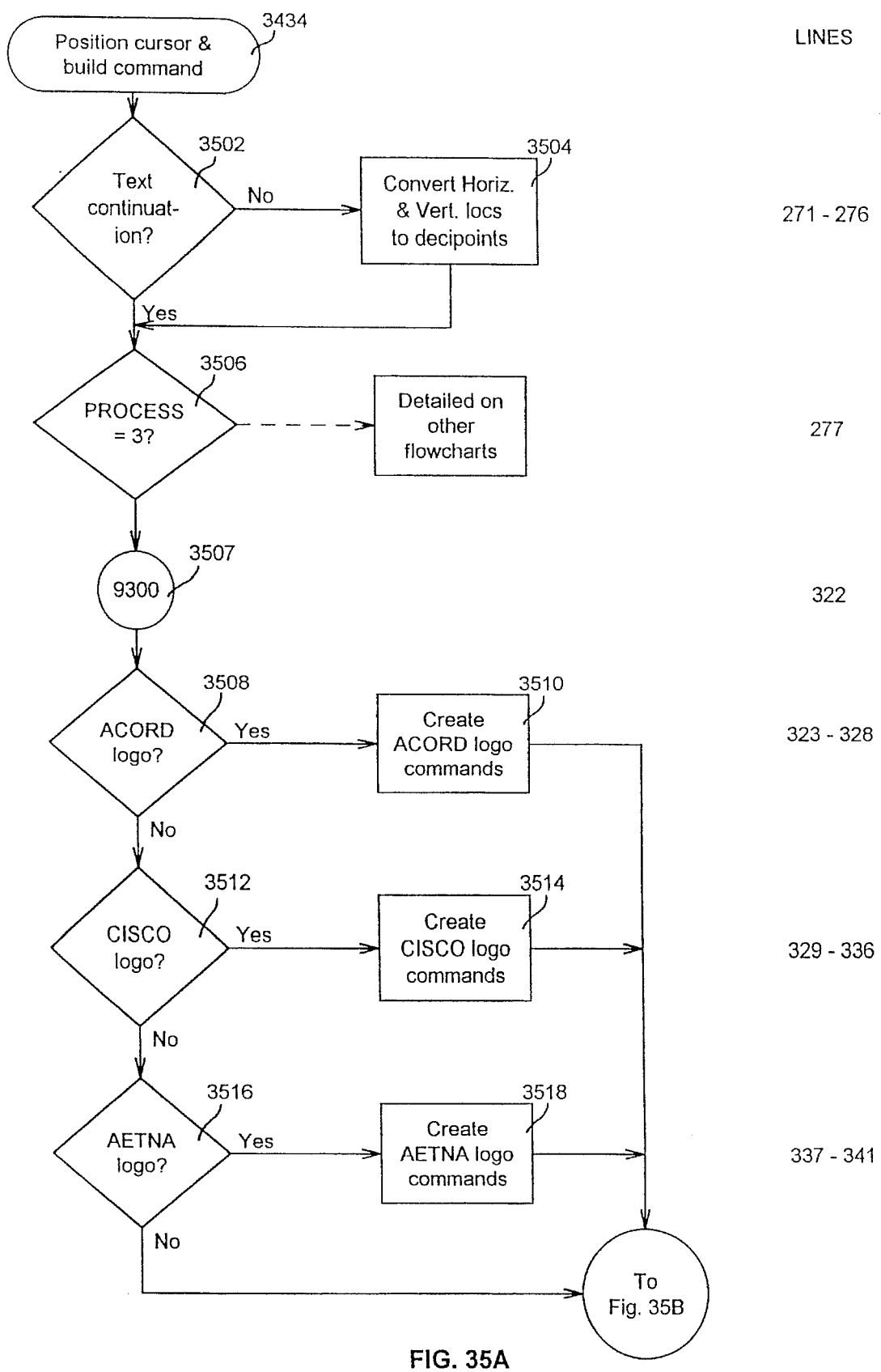
FIGS. 35A and 35B are logic diagrams of the Text command routine.
Figure 35B:
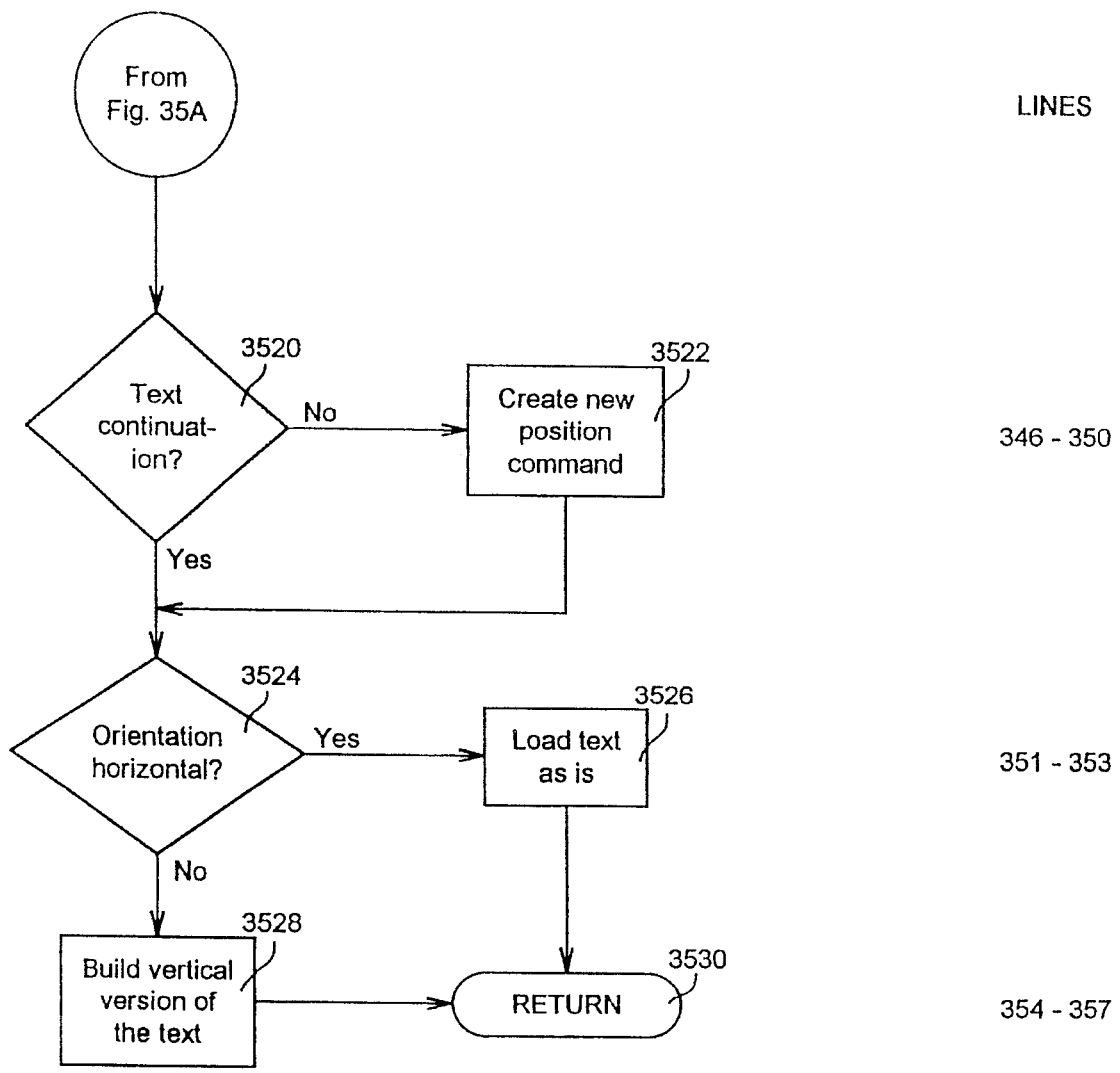

Refer to FIGS. 35A and 35B. STD.FORMS.BUILDER Text Command

Text continuation 3042, 3302, and 3502. This test has been encountered three times-the Curser Position and Command Building routine is used by all sections of the program: Lines, Check-Off Boxes, and Text. Here is why this test is here. The entry program used to enter all of the image data permits the developer (operator) to enter 53 characters of text. Usually, this is sufficient since in most cases the text is used to label sections of the form. There are places on some forms, however, where large amounts of text (more than 53 characters worth) are required. So, if the operator is entering a second (or third, or fourth, etc) block of fifty-three (53) characters that is a continuation of another block of text, she simply leaves the Horizontal position blank. This will indicate to this program that no new curser position is to be generated, and this additional text will be concatenated to the previous text. So, once again the program tests to see if this is a text continuation 3502, and if not, it converts the positions to decipoints 3504. If is it, then no position conversion is necessary since no positioning command will be issued. The program continues to Tag 9300 3507 to process the text.

The use of digitized logos was mentioned above in connection with the logo flags. The laser printers that are in general use today have the capability to print a digitized graphic image. In the preferred embodiment of the invention, three digitized logos have been created by conventional technique for inclusion on any of the forms generated. These logos are invoked by entering a specific word in the text entry. The program will generate the custom command required to print the logo.

The program tests for the custom logo text 3508, 3512, and 3516. If the flag is set, the appropriate logo command is generated 3210, 3514, or 3518. Once again the text continuation test is executed 3520, and if not, the actual curser positioning command is built. If the text orientation is (H)orizontal 3524, the text (or logo command) is combined with the curser command and placed into the object record. If the orientation is (V)ertical 3524, then the system will build a series of commands that will print the text

```
l
i
k
e
t
h
i
s 3528,
``` and load it into the Object record. In either case, the program returns 3530 to process the next text entry.

Refer to FIG. 34. STD.FORMS BUILDER Text Command

Once all of the text has been processed 3410, the program will clear the text area 3412, write the Object record to the Object file (ACORD.FORMS) 3414, print the generated form 3416 so that the developer can verify that all is well, and stop 3418.

Once the Object file image records are created, they are stored on disk until needed. When an operator requests that a specific document is to be printed, a program will be executed that reads up the Object image record for the desired form, and starting with Attribute 8, loops through all of the commands and outputs them to the printer. Once all of the commands have been processed, a complete background image of the document now resides in the printer. See FIG. 37 for an example of an ACORD Property Loss Notice printed in accordance herewith.

The program will then send the variable information to complete the process. The result is a completed document ready for submission, as shown in FIG. 38.

Both the Audit History and Forms Generation features of the present invention involve printed output. In the case of Audit History, the operator may wish to print images of the historical images for reference. All of the results of the Form Generator are printed by the laser printer. To support the modern office environment, the system of the present invention supports distributed printing as opposed to centralized printing. Because of the myriad of documents generated, centralized printing with one fast line printer is not feasible or practicable. The problem that arises with distributed printing is how to direct the spooler output to the correct printer based on the following guidelines:

1. Most printed output needs to be printed on the printer closest to the operator that generated the print request.
2. Print requests that require that the output be printed on a specific printer (checks, for example) need to be routed to the appropriate printer.

In the preferred embodiment of the Office Automation System, the management of the printers is controlled by a hierarchical decision table utilizing the following information:

FORMS file This file contains one record for each document printed. Among the information in the record is the specific spooler Queue that is assigned to this output. If the Queue number is null, then the printed output will be sent to the spooler Queue as specified by . . .

TERMINAL file This file contains one record for each port that has an ASCII terminal attached to it. The port number identifies the physical location of the terminal since all terminals are hard-wired to the host. One field in this record is the Default Spooler Queue for this port. This Queue number will direct the printer scheduler to . . .

QUEUE file This file Contain one record for each spooler Queue required by the system. Many queues are permitted (in some systems 256), and each queue can be thought of as a logical printing device. This logical printing device record has a field that points to a physical printing device in the . . .

DEVICE file This file contains one record for each physical printing device attached to the computer. Each device record contains the name of the printer assigned to this device number. The printer field in the device then points to . . .

PRINTER file This file contains one record for each printer supported by the Office Automation System. Information in this record is used to send the correct commands (they differ from printer to printer) to the correct device as specified by the queue assigned to this form or operator.

Whenever printed output is generated, a program is called that examines the current status of the above files and directs the printed output to the correct spooler queue, and insures that the correct printer commands are issued to the correct printer.

While but one embodiment of the present invention has been extensively described and illustrated, it will be apparent to those skilled in the art that changes and modifications may be made therein, which changes and modifications nevertheless will not depart from the spirit and scope of the invention as claimed in the various claims appended hereto.

Audit History Update and Display Program
STD.HISTORY.SUB (Version 8)
Copyright © 1990 by Creative Information Systems Co. Ltd.

```
    STD.HISTORY.SUB$8
001 SUBROUTINE STD.HISTORY.SUB$8
002 GO TO 9
003 * Program....: STD.HISTORY.SUB
004 * Description: Standard Audit History Update and Display
005 * Revision...: 8.0 - Transaction Code is no longer multi-valued.
006 * Project....: 4.0 - SMRFs fixed since Release 3.2.
007 * Programmer.: David M. Murdock
008 * Copyright..: 1990 Creative Information Systems CO. Ltd.
009 *----------
010 * STD.HISTORY.SUB
011 * David M. Murdock  - 201-429-7733
012 * Creative Information Systems CO. Ltd.
013 * STANDARD HISTORY UPDATE & DISPLAY
014 *----------
015 *
016 * SUBROUTINE SETUP
017 *
018 * PROCESS = 1 TO UPDATE; 2 TO DISPLAY
019 *
020 * ATTR 1 IN HEADER RECORD WILL BE UPDATED WITH OP INIT SVM DATE SVM TIME
021 * SVM MODE SVM CHANGE NUMBER SVM PROGRAM SVM ADDL HIST INFO
022 *
023 *
024 *
025 $INCLUDE EQUATES SYSTEM.COMMON
026 *
027 $INCLUDE EQUATES TERMINAL
028 *
029 $INCLUDE EQUATES CHANGES
030 *
031 EQU DEL TO CHAR(127)
032 *
033 ****************************************************************
034 9    IF DEBUG.FLAG THEN
035       CRT @(0,22):CL:'STD.HISTORY.SUB DEBUG; PROCESS(':PROCESS:')':
036       INPUT DUMMY,1:
037       CRT @(0,22):CL:
038     END
039     IF ACF.SYS.REC(10) THEN RETURN
040     SCREEN.SUB = PGM.NAME:'.BGFG'
041     ON PROCESS GO TO 100,200
042     PRMT.KEY = 'Invalid Process Code (':PROCESS:') passed'
043     RETURN
044 *
045 * UPDATE AN ITEM
046 *
047 100  CHANGE.NO = HDR.REC(CHANGE.HIST)<1,1,5> + 1
048     IF MODE = 'CA' THEN MODE = 'A'
049     IF MODE = 'A' THEN
050       ! CHECK TO SEE IF THIS RECORD WAS PREVIOUSLY DELETED AND REVISE THE
051       ! CHANGE.NO TO ADD AT THE END
052       HIST.EOF = 0
053       LOOP
```

Audit History Update and Display Program
STD.HISTORY.SUB (Version 8)

```
107             CHANGES.REC<CHG.NO,CHG.INDX>        = HIST.INFO<CHANGE.HIST,1,5>
108             CHANGES.REC<CHG.PGM,CHG.INDX>       = HIST.INFO<CHANGE.HIST,1,6>
109             CHANGES.REC<CHG.FILE,CHG.INDX>      = EXT.HDR.FILE
110             CHANGES.REC<CHG.KEY,CHG.INDX>       = INT.HDR.KEY
111             CHANGES.REC<CHG.ATTR,CHG.INDX>      = ''
112             CHANGES.REC<CHG.VAL,CHG.INDX>       = ''
113             CHANGES.REC<CHG.SVAL,CHG.INDX>      = ''
114             CHANGES.REC<CHG.OLD,CHG.INDX>       = ''
115             CHANGES.REC<CHG.NEW,CHG.INDX>       = HDR.REC(3)<1,1>
116           END
117        CASE MODE = 'C'
118           FOR X = 1 TO MAX.AUDIT
119              IF X # CHANGE.HIST THEN ;* CHANGE.HIST CONTAINS ATTR # WHERE INFO IS STORED
120                 IF HDR.REC(X) # OLD.REC(X) THEN
121                    VALS = COUNT(HDR.REC(X),VM)
122                    O.VALS = COUNT(OLD.REC(X),VM)
123                    IF O.VALS > VALS THEN VALS = O.VALS
124                    FOR Y = 1 TO VALS + 1
125                       IF HDR.REC(X)<1,Y> # OLD.REC(X)<1,Y> THEN
126                          SVALS = COUNT(HDR.REC(X)<1,Y>,SVM)
127                          O.SVALS = COUNT(OLD.REC(X)<1,Y>,SVM)
128                          IF O.SVALS > SVALS THEN SVALS = O.SVALS
129                          FOR Z = 1 TO SVALS + 1
130                             IF HDR.REC(X)<1,Y,Z> # OLD.REC(X)<1,Y,Z> THEN
131                                HIST.REC<-1> = X:VM:Y:VM:Z
132                                IF OLD.REC(X)<1,Y,Z> = '' THEN
133                                   HIST.REC<-1> = DEL
134                                END ELSE
135                                   HIST.REC<-1> = OLD.REC(X)<1,Y,Z>
136                                END
137                                RECORD.CHANGED = 1
138                                IF END.FLAG THEN
139                                   IF EXCL.REC<1> # 'ALL' THEN
140                                      LOCATE(X,EXCL.REC,1;DUMMY) ELSE
141                                         *
142                                         * THIS ATTR IS NOT ON THE EXCLUSIONARY LIST - UPDATE THE CHANGES RECORD
143                                         *
144                                         CHANGES.REC<CHG.OPER,CHG.INDX>     = HIST.INFO<CHANGE.HIST,1,1>
145                                         CHANGES.REC<CHG.DATE,CHG.INDX>     = HIST.INFO<CHANGE.HIST,1,2>
146                                         CHANGES.REC<CHG.TIME,CHG.INDX>     = HIST.INFO<CHANGE.HIST,1,3>
147                                         CHANGES.REC<CHG.MODE,CHG.INDX>     = HIST.INFO<CHANGE.HIST,1,4>
148                                         CHANGES.REC<CHG.NO,CHG.INDX>       = HIST.INFO<CHANGE.HIST,1,5>
149                                         CHANGES.REC<CHG.PGM,CHG.INDX>      = HIST.INFO<CHANGE.HIST,1,6>
150                                         CHANGES.REC<CHG.FILE,CHG.INDX>     = EXT.HDR.FILE
151                                         CHANGES.REC<CHG.KEY,CHG.INDX>      = INT.HDR.K
```

Audit History Update and Display Program
STD.HISTORY.SUB (Version 8)

```
            EY
152                                 CHANGES.REC<CHG.ATTR,CHG.INDX>      = X
153                                 CHANGES.REC<CHG.VAL,CHG.INDX>       = Y
154                                 CHANGES.REC<CHG.SVAL,CHG.INDX>      = Z
155                                 READV CNV FROM DCHG.FILE,X,7 ELSE CNV = ''
156                                 IF CNV # '' AND CNV # 'MR0' THEN
157                                    CHANGES.REC<CHG.OLD,CHG.INDX>    = OCONV(O
    LD.REC(X)<1,Y,Z>,CNV):SVM:OLD.REC(X)<1,Y,Z>
158                                    CHANGES.REC<CHG.NEW,CHG.INDX>    = OCONV(H
    DR.REC(X)<1,Y,Z>,CNV):SVM:HDR.REC(X)<1,Y,Z>
159                                 END ELSE
160                                    CHANGES.REC<CHG.OLD,CHG.INDX>    = OLD.REC
    (X)<1,Y,Z>
161                                    CHANGES.REC<CHG.NEW,CHG.INDX>    = HDR.REC
    (X)<1,Y,Z>
162                                 END
163                                 CHG.INDX = CHG.INDX + 1
164                              END
165                           END
166                        END
167                     END
168                  NEXT Z
169               END
170            NEXT Y
171         END
172      END
173      NEXT X
174   CASE MODE = 'D'
175      FOR X = 1 TO MAX.AUDIT
176         IF X # CHANGE.HIST THEN ;* CHANGE.HIST CONTAINS ATTR # WHERE INF
    O IS STORED
177            VALS = COUNT(HDR.REC(X),VM)
178            FOR Y = 1 TO VALS + 1
179               SVALS = COUNT(HDR.REC(X)<1,Y>,SVM)
180               FOR Z = 1 TO SVALS + 1
181                  HIST.REC<-1> = X:VM:Y:VM:Z
182                  IF HDR.REC(X)<1,Y,Z> = '' THEN
183                     HIST.REC<-1> = DEL
184                  END ELSE
185                     HIST.REC<-1> = HDR.REC(X)<1,Y,Z>
186                  END
187               NEXT Z
188            NEXT Y
189         END
190      NEXT X
191      RECORD.CHANGED = 1
192   CASE MODE = 'P'
193      RECORD.CHANGED = 1
194   END CASE
195   IF RECORD.CHANGED THEN
196      HDR.REC(CHANGE.HIST) = HIST.INFO
197      WRITE HIST.REC ON HIST.FILE,HIST.KEY
198      IF END.FLAG THEN WRITE CHANGES.REC ON CHANGES.FILE,CURRENT.END.NO
199   END ELSE
```

Audit History Update and Display Program
STD.HISTORY.SUB (Version 8)

```
200        IF END.FLAG THEN RELEASE CHANGES.FILE,CURRENT.END.NO
201        END
202        RETURN
203 *
204 * DISPLAY HISTORY
205 *
206 200    MAT SAVE.DY.COM = MAT DY.COM            ;* SAVE DYNAMIC VARIABLES
207        LAST.CHANGE.NO = ''
208        GENERIC.PGM = FIELD(PGM.NAME,'$',1)
209        SAVE.LIS.INFO = LIS.INFO                ;* SAVE LIS INFORMATION - IT G
    ETS CHANGED
210        MATWRITE HDR.REC ON WORK.FILE,'SAVED'    ;* SAVE THE CURRENT RECORD
211        FOR X=MAX.AUDIT + 1 TO 100               ;* CLEAR THE WORK AREA
212          HDR.REC(X)=''
213        NEXT X
214        NO.OF.CHANGES = HDR.REC(CHANGE.HIST)<1,1,5>
215        *
216        * GET SEQUENCE DATE FROM OPERATOR
217        *
218        IF ADDL.HIST.DATA GE 1 AND ADDL.HIST.DATA LE 100 THEN
219          PRMT.KEY = 145
220          HELP.KEY = 'STD.HISTORY.200'
221          GOSUB 9210
222          BEGIN CASE
223            CASE ANS = 'P'
224              SEQ.SVAL = 2
225            CASE 1
226              SEQ.SVAL = 7
227          END CASE
228        END ELSE
229          SEQ.SVAL = 2
230        END
231        *
232        * SORT AUDIT.RECORDS INTO DATE/TIME ORDER
233        *
234        OTHER.PGMS = 0
235        SEQ.TBL = ''
236        FOR X = 1 TO NO.OF.CHANGES
237          WORK.KEY = INT.HDR.KEY:"*":X
238          READV AUDIT.INFO FROM HIST.FILE,WORK.KEY,1 ELSE AUDIT.INFO = ''
239          SORT.SEQ = AUDIT.INFO<1,1,SEQ.SVAL>'R%5':AUDIT.INFO<1,1,5>'R%4'  ;* S
    ORT SEQ IS DATE, CHANGE#
240          LOCATE(SORT.SEQ,SEQ.TBL,1;INDX;'AR') ELSE
241            SEQ.TBL = INSERT(SEQ.TBL,1,INDX,0,SORT.SEQ)
242            SEQ.TBL = INSERT(SEQ.TBL,2,INDX,0,WORK.KEY)
243          END
244          IF GENERIC.PGM # AUDIT.INFO<1,1,6> THEN OTHER.PGMS = 1
245        NEXT X
246        NO.OF.CHANGES = DCOUNT(SEQ.TBL<1>,VM)
247        *
248        * ASK IF ALL CHANGES OR JUST THIS PROGRAM
249        *
250        ALL = 1
251        IF OTHER.PGMS THEN
```

Appendix A - Page 5

Audit History Update and Display Program
STD.HISTORY.SUB (Version 8)

```
252           PRMT.KEY = 405
253           GOSUB 9210
254           BEGIN CASE
255              CASE ANS = 'E'
256                 GO TO 211
257              CASE ANS = 'Y'
258                 ALL = 0
259           END CASE
260        END
261        *
262        * GET DATE
263        *
264 210    PRMT.KEY = 144
265        HELP.KEY = 'STD.HISTORY.210'
266        LENG = 8
267        GOSUB 9220
268        BEGIN CASE
269           CASE ANS[1,1] = 'E'                  ;* RETURN
270 211         MAT DY.COM = MAT SAVE.DY.COM       ;* RESTORE DYNAMIC VARIABLES
271             MATREAD HDR.REC FROM WORK.FILE,'SAVED' ELSE ABORT ;* RESTORE HDR RECORD
272             LIS.INFO = SAVE.LIS.INFO           ;* RESTORE LIS INFORMATION
273             CLEARFILE WORK.FILE                ;* CLEAR HISTORY WORK
274             ACTIVE.REC = ''
275             VISUAL.REC = ''
276             RETURN
277           CASE ANS = ''                        ;* START TODAY
278             START = DATE()'R%5':9999'R%4'
279           CASE 1                               ;* OPERATOR ENTERED A START DATE
280             ANS = OCONV(ANS,'MCN')
281             IF ANS = '' THEN
282                START = DATE()'R%5':9999'R%4'
283             END ELSE
284                EXT.DTE = ANS[1,2]:'/':ANS[3,2]:'/':ANS[5,2]
285                INT.DTE = ICONV(EXT.DTE,'D')
286                IF INT.DTE = '' THEN
287                   PRMT.KEY = 8
288                   GOSUB 9200
289                   GO TO 210
290                END
291                START = INT.DTE'R%5':9999'R%4'
292             END
293        END CASE
294        LOCATE(START,SEQ.TBL,1;CURRENT.CHANGE.NO;'AR') ELSE NULL
295        IF CURRENT.CHANGE.NO > NO.OF.CHANGES THEN
296           CURRENT.CHANGE.NO = NO.OF.CHANGES
297        END ELSE
298           IF CURRENT.CHANGE.NO > 2 THEN
299              CURRENT.CHANGE.NO = CURRENT.CHANGE.NO - 1
300           END
301        END
302        READ ACTIVE.REC FROM HDR.FILE,INT.HDR.KEY ELSE ACTIVE.REC = ''
303        *
304        * REMOVE ALL CHANGES MADE TO THE RECORD
```

Appendix A - Page    6

Audit History Update and Display Program
STD.HISTORY.SUB (Version 8)

```
305     *
306     FOR XY = NO.OF.CHANGES TO 1 STEP -1
307        WORK.KEY = INT.HDR.KEY:"*":XY
308        READ HIST.REC FROM HIST.FILE,WORK.KEY ELSE DEBUG
309        GOSUB 1000 ;* REMOVE CHANGES FROM ACTIVE.RECORD
310        WRITE DELTA.REC ON WORK.FILE,WORK.KEY
311     NEXT XY
312     *
313     * REMOVE EXTRA EMPTY LINE ITEMS
314     *
315     FOR X = 1 TO X + 1 UNTIL LIS.ATTR.LIST<X> = ''
316        * LOOKING AT EACH LIS
317        NO.OF.ATTRS = DCOUNT(LIS.ATTR.LIST<X>,VM)
318        MANDITORY.ATTR = LIS.ATTR.LIST<X,1>
319        NO.OF.VALS = DCOUNT(ACTIVE.REC<MANDITORY.ATTR>,VM) ;* COUNT THE MANDITORY FIELD
320        FOR Y = 1 TO NO.OF.VALS
321           THIS.ATTR = LIS.ATTR.LIST<X,1>
322           IF ACTIVE.REC<THIS.ATTR,Y> = '' THEN
323              * EMPTY LIS - DELETE SET
324              FOR Z = 1 TO NO.OF.ATTRS
325                 THIS.ATTR = LIS.ATTR.LIST<X,Z>
326                 ACTIVE.REC = DELETE(ACTIVE.REC,THIS.ATTR,Y,0)
327              NEXT Z
328              Y = Y - 1
329              NO.OF.VALS = NO.OF.VALS - 1
330           END
331        NEXT Y
332     NEXT X
333     *
334     * CREATE ORIGINAL VISUAL RECORD
335     *
336     VISUAL.REC = STR(TRM.RESET.NV:AM,MAX.AUDIT)
337     FOR X = 1 TO MAX.AUDIT
338        VALS = DCOUNT(ACTIVE.REC<X>,VM)
339        IF VALS < 1 THEN VALS = 1
340        FOR Y = 1 TO VALS
341           SVALS = DCOUNT(ACTIVE.REC<X,Y>,SVM)
342           IF SVALS < 1 THEN SVALS = 1
343           FOR Z = 1 TO SVALS
344              VISUAL.REC<X,Y,Z> = TRM.RESET.NV
345           NEXT Z
346        NEXT Y
347     NEXT X
348     WRITE VISUAL.REC ON WORK.FILE,INT.HDR.KEY:"*0*VISUAL"
349     *
350     * NOW APPLY THE DELTAS TO THE ORIGINAL RECORD IN HISTORY DATE ORDER
351     *
352     FOR XY = 1 TO NO.OF.CHANGES
353        WORK.KEY = SEQ.TBL<2,XY>
354        VISUAL.KEY = WORK.KEY:"*VISUAL"
355        READ DELTA.REC FROM WORK.FILE,WORK.KEY ELSE DEBUG
356        * VISUAL.REC = EXCHANGE(VISUAL.REC,'34','74')
357        AA1A.EXCH = VISUAL.REC
```

Appendix A - Page 7

Audit History Update and Display Program
STD.HISTORY.SUB (Version 8)

```
358            CONVERT "4" TO "t" IN AA1A.EXCH
359            VISUAL.REC = AA1A.EXCH
360  *$INCLUDE BP.NATIVE STD.HISTORY.SUB.221 ;* VISUAL.REC = EXCHANGE(VISUAL.REC
    ,'34','74')
361            GOSUB 2000 ;* APPLY CHANGES TO ACTIVE.RECORD
362            WRITE ACTIVE.REC ON WORK.FILE,WORK.KEY
363            WRITE VISUAL.REC ON WORK.FILE,VISUAL.KEY
364        NEXT XY
365        *
366        * NOW DISPLAY THE FIRST RECORD
367        *
368            GO TO 256
369  *
370  * FORWARD/BACKWARD PROMPT
371  *
372  250   PRMT.KEY = '58~':CURRENT.CHANGE.NO:' of ':NO.OF.CHANGES
373            REF.FILE = ''
374            HELP.KEY = 'STD.HISTORY.250'
375            LENG = 4
376            GOSUB 9220
377        BEGIN CASE
378            CASE ANS[1,1] = CHAR(10)              ;* GO BACK IN TIME
379              DUMMY = FIELD(ANS,CHAR(10),2)
380              DUMMY = OCONV(DUMMY,'MCN') + 0
381              IF DUMMY > 0 THEN DUMMY = DUMMY - 1
382              CURRENT.CHANGE.NO = CURRENT.CHANGE.NO - DUMMY
383  255       CURRENT.CHANGE.NO = CURRENT.CHANGE.NO - 1
384              IF CURRENT.CHANGE.NO < 1 THEN CURRENT.CHANGE.NO = 1
385  256       WORK.KEY = SEQ.TBL<2,CURRENT.CHANGE.NO>
386              VISUAL.KEY = WORK.KEY:"*VISUAL"
387              READ ACTIVE.REC FROM WORK.FILE,WORK.KEY ELSE ACTIVE.REC = ''
388              READ VISUAL.REC FROM WORK.FILE,VISUAL.KEY ELSE VISUAL.REC = ''
389              IF GENERIC.PGM # ACTIVE.REC<CHANGE.HIST,1,6> AND NOT(ALL) THEN
390                IF CURRENT.CHANGE.NO = 1 THEN
391                * WE HAVE REACHED THE END OF THE CHANGES AND THE LAST CHANGE
392                * WAS NOT MADE BY THIS PROGRAM
393                  IF LAST.CHANGE.NO = '' THEN
394                    PRMT.KEY = 399
395                    GOSUB 9200
396                    GO TO 270
397                  END
398                  CURRENT.CHANGE.NO = LAST.CHANGE.NO + 1
399                  GO TO 255
400                END
401                GO TO 255 ;* CHANGED BY ANOTHER PROGRAM - SKIP
402              END
403              GOSUB 9470                            ;* DISPLAY THE HISTORY RECORD
404            CASE ANS[1,1] = CHAR(11)              ;* GO FORWARD IN TIME
405              DUMMY = FIELD(ANS,CHAR(11),2)
406              DUMMY = OCONV(DUMMY,'MCN') + 0
407              IF DUMMY > 0 THEN DUMMY = DUMMY - 1
408              CURRENT.CHANGE.NO = CURRENT.CHANGE.NO + DUMMY
409  265       CURRENT.CHANGE.NO = CURRENT.CHANGE.NO + 1
410              IF CURRENT.CHANGE.NO > NO.OF.CHANGES THEN CURRENT.CHANGE.NO = NO.O
```

Appendix A - Page 8

Audit History Update and Display Program
STD.HISTORY.SUB (Version 8)

```
      F.CHANGES
411        WORK.KEY = SEQ.TBL<2,CURRENT.CHANGE.NO>
412        VISUAL.KEY = WORK.KEY:"*VISUAL"
413        READ ACTIVE.REC FROM WORK.FILE,WORK.KEY ELSE ACTIVE.REC = ''
414        READ VISUAL.REC FROM WORK.FILE,VISUAL.KEY ELSE VISUAL.REC = ''
415        IF GENERIC.PGM # ACTIVE.REC<CHANGE.HIST,1,6> AND NOT(ALL) THEN
416          IF NO.OF.CHANGES = CURRENT.CHANGE.NO THEN
417            * WE HAVE REACHED THE END OF THE CHANGES AND THE LAST CHANGE
418            * WAS NOT MADE BY THIS PROGRAM
419            IF LAST.CHANGE.NO = '' THEN
420              PRMT.KEY = 399
421              GOSUB 9200
422              GO TO 270
423            END
424            CURRENT.CHANGE.NO = LAST.CHANGE.NO - 1
425            GO TO 265
426          END
427          GO TO 265 ;* CHANGED BY ANOTHER PROGRAM - SKIP
428        END
429        GOSUB 9470                      ;* DISPLAY THE HISTORY RECORD
430      CASE INDEX(ANS,'+',1)
431        ANS = FIELD(ANS,'+',1)
432        NO.OF.LIS = DCOUNT(LIS.INFO,AM)
433        IF ANS GE 1 AND ANS LE NO.OF.LIS THEN LIS = ANS ELSE LIS = 1
434        LIS.INFO<LIS,1>=LIS.INFO<LIS,1> + 1
435        GOSUB 9440
436      CASE INDEX(ANS,'-',1)
437        ANS = FIELD(ANS,'-',1)
438        NO.OF.LIS = DCOUNT(LIS.INFO,AM)
439        IF ANS GE 1 AND ANS LE NO.OF.LIS THEN LIS = ANS ELSE LIS = 1
440        LIS.INFO<LIS,1>=LIS.INFO<LIS,1> - 1
441        IF LIS.INFO<LIS,1> < 1 THEN LIS.INFO<LIS,1> = 1
442        GOSUB 9440
443      CASE ANS[1,1] = 'E'               ;* RETURN
444 270    MAT DY.COM = MAT SAVE.DY.COM    ;* RESTORE DYNAMIC VARIABLES
445        MATREAD HDR.REC FROM WORK.FILE,'SAVED' ELSE ABORT ;* RESTORE HDR RECORD
446        LIS.INFO = SAVE.LIS.INFO        ;* RESTORE LIS INFORMATION
447        CLEARFILE WORK.FILE             ;* CLEAR HISTORY WORK
448        ACTIVE.REC = ''
449        VISUAL.REC = ''
450        RETURN
451      CASE 1
452        PRMT.KEY = 59
453        GOSUB 9200
454        GO TO 250
455      END CASE
456      GO TO 250
457 *
458 * REMOVE HISTORY RECORD CHANGES FROM ACTIVE RECORD
459 *
460 1000 DELTA.REC = ''
461      DELTA.REC<1> = HIST.REC<1>
462      ACTIVE.REC<CHANGE.HIST> = HIST.REC<1>
```

Appendix A - Page    9

Audit History Update and Display Program
STD.HISTORY.SUB (Version 8)

```
463       FOR X = 2 TO X + 2 STEP 2 UNTIL HIST.REC<X> = ''
464         DELTA.REC<X> = HIST.REC<X>
465         HIST.LOC.A = HIST.REC<X,1>
466         HIST.LOC.V = HIST.REC<X,2>
467         HIST.LOC.S = HIST.REC<X,3>
468         HIST.DATA = HIST.REC<X+1>
469         DELTA.REC<X+1> = ACTIVE.REC<HIST.LOC.A,HIST.LOC.V,HIST.LOC.S>
470         IF HIST.DATA = DEL THEN
471           ACTIVE.REC<HIST.LOC.A,HIST.LOC.V,HIST.LOC.S> = ''
472         END ELSE
473           ACTIVE.REC<HIST.LOC.A,HIST.LOC.V,HIST.LOC.S> = HIST.DATA
474         END
475       NEXT X
476       RETURN
477 *
478 * APPLY DELTA RECORD CHANGES TO ACTIVE RECORD
479 *
480 2000 FOR X = 1 TO 7
481         IF DELTA.REC<1,1,X> # ACTIVE.REC<CHANGE.HIST,1,X> THEN
482           ACTIVE.REC<CHANGE.HIST,1,X> = DELTA.REC<1,1,X>
483           VISUAL.REC<CHANGE.HIST,1,X> = TRM.BRV
484         END
485       NEXT X
486       FOR X = 2 TO X + 2 STEP 2 UNTIL DELTA.REC<X> = ''
487         DELTA.LOC.A = DELTA.REC<X,1>
488         DELTA.LOC.V = DELTA.REC<X,2>
489         DELTA.LOC.S = DELTA.REC<X,3>
490         DELTA.DATA = DELTA.REC<X+1>
491         ACTIVE.REC<DELTA.LOC.A,DELTA.LOC.V,DELTA.LOC.S> = DELTA.DATA
492         VISUAL.REC<DELTA.LOC.A,DELTA.LOC.V,DELTA.LOC.S> = TRM.BRV
493       NEXT X
494       RETURN
495 *
496 * STANDARD CALL ROUTINE
497 *
498 $INCLUDE BP STD.CALL.INCLUDE$1
499 9200 PRINT BELL:
500       SKIP.FLAG = 0
501       LENG = 0
502       GO TO 9220
503 9210 LENG = 2
504 9220 PGMS.KEY = 'STD.MESSAGE' ; GOSUB 8900
505       IF DEBUG.FLAG THEN
506         CRT @(0,22):CL:'STD.HISTORY.SUB DEBUG AFTER STD.MESSAGE':
507         INPUT DUMMY,1:
508         CRT @(0,22):CL:
509       END
510       RETURN
511 9300 PROCESS = 1 ;* DISPLAY BG
512       PGMS.KEY = SCREEN.SUB  ; GOSUB 8900
513       RETURN
514 9400 PROCESS = 2 ;* DISPLAY FG
515 9410 PGMS.KEY = SCREEN.SUB  ; GOSUB 8900
516       RETURN
```

Appendix A - Page 10

Audit History Update and Display Program
STD.HISTORY.SUB (Version 8)

```
517 9440 PROCESS = 4:AM:LIS
518      PRINT PROTECT.MODE.OFF:
519      PGMS.KEY = SCREEN.SUB  ; GOSUB 8900
520      PRINT PROTECT.MODE.ON:
521      RETURN
522 9450 PROCESS = 3 ;* CLEAR FG
523      PGMS.KEY = SCREEN.SUB  ; GOSUB 8900
524      RETURN
525 9470 PRINT PROTECT.MODE.OFF:
526      PROCESS = 4                               ;* DISPLAY HISTORY FG
527      LAST.CHANGE.NO = CURRENT.CHANGE.NO ;* SAVE LAST CHANGE DISPLAYED
528      PGMS.KEY = SCREEN.SUB  ; GOSUB 8900
529      PRINT PROTECT.MODE.ON:
530      RETURN
531 9500 * DISPLAY BOTH BG AND FG AFTER SCREEN ESCAPE
532      GOSUB 9300
533      GOSUB 9400
534      RETURN
535 *
536 * STD FILE OPEN ROUTINE
537 *
538 9900 PGMS.KEY = 'STD.OPEN' ; GOSUB 8900
539      IF PRMT.KEY # '' THEN
540        GOSUB 9200
541        ABORT
542      END
543 9999 RETURN
544 END

[405] 1 items listed out of 1 items.

Appendix A - Page    11
```

Bank File Maintenance (Main Logic) Program
BANKS.MAIN (Version 3)
C  Copyright © 1990 by Creative Information Systems Co., Ltd.

```
BANKS$3.MAIN
001 SUBROUTINE BANKS$3.MAIN
002 GO TO 9
003 * Add/Change Bank Codes
004 * BANKS
005 * Program....: BANKS
006 * Revision...: 3.0 - (a) expand routing code field; (b) 'do you want spaces
      in the MICR line?'; (c) field to declare ck#/acct#/transit# order
007 * Project....: BANKS - Option to print MICR coding on checks.
008 * Programmer.: Kenneth Lee Cibelli
009 * Copyright..: 1990 Creative Information Systems CO. Ltd.
010 ******************************************
011 * Creative Information Systems CO. Ltd.  *
012 *      650 Bloomfield Ave. Suite 202     *
013 *      Bloomfield, New Jersey   07003    *
014 *              (201) 429-7733            *
015 ******************************************
016 *
017 *
018 *
019 *
020 *
021 *
022 *
023 *
024 *
025 $INCLUDE EQUATES SYSTEM.COMMON
026 *
027 $INCLUDE EQUATES TERMINAL
028 *
029 $INCLUDE USER.BP BANKS$3.MAIN.EQUATES.INCLUDE
030 $INCLUDE USER.BP MAIN.DEBUG.INCLUDE
031 9 MODE=''
032 LIS.INFO = ''
033 ALST.KEY=''
034 LAST.INT.KEY=''
035 INT.HDR.KEY=''
036 FIELD.REDISPLAY=0
037 ADDL.HIST.DATA=''
038 HDR.FILE.NAME = "BANKS"
039 PGM.NAME = "BANKS$3"
040 SCREEN.SUB = PGM.NAME:".BGFG"
041 FL.KEY = "BANKS";GOSUB 9900;HDR.FILE = FL.KEY
042 EXT.HDR.FILE = "BANKS"
043 FL.KEY = "BANKS.HISTORY";GOSUB 9900;HIST.FILE = FL.KEY
044 CHANGE.HIST = 1
045 FL.KEY = "COAM";GOSUB 9900;COAM.FILE = FL.KEY
046 FL.KEY = "ZIPS";GOSUB 9900;ZIPS.FILE = FL.KEY
047 FL.KEY = "STATES";GOSUB 9900;STATES.FILE = FL.KEY
048 MAIN.SCREEN = 1
049 LAST.FIELD.NO = 14
050 LAST.TAB.FIELD.NO = 1
051 EXT.INT.KEY = 0
052 MAX.ATTRS = 18
```

Appendix B - Page   1

Bank File Maintenance (Main Logic) Program
BANKS.MAIN (Version 3)

```
053 MAX.AUDIT = 18
054 ADD.RECORDS = 1
055 CHANGE.RECORDS = 1
056 DELETE.RECORDS = 0
057 SCREEN.PROMPT = "55"
058 SCREEN.PROMPT.LEN = "7"
059 CALLED.SCREENS = ""
060 IF CURRENT.TRAN = 'DIS' THEN
061   * CAN'T ADD OR DELETE RECORDS IN DISPLAY MODE
062   ADD.RECORDS = 0
063   DELETE.RECORDS = 0
064 END
065 * END OF INITIALIZATION SECTION
066 READ FL.REC FROM FL.FILE,EXT.HDR.FILE ELSE NULL
067 IF FL.REC<8> THEN FIELD.XREF = 1 ELSE FIELD.XREF = 0
068 IF ACF.SYS.REC(7) # '' THEN
069   * WRITE AUDIT RECORD INTO SCRIPT FILE
070   AUDIT.STOP = TIME()
071   STD.ARG(1) = PGM.NAME
072   STD.ARG(2) = 'INITIALIZE'
073   PGMS.KEY = 'STD.AUDIT.FLOW' ;GOSUB 8900
074   AUDIT.START = TIME()
075 END
076 GOSUB 8200
077  GOSUB 9300
078 IF DEBUG.FLAG THEN
079   PROCESS = 3
080   GOSUB 8
081 END
082     * MARKER $$25
083 10  * MAIN PROGRAM LOOP FOR DATA ENTRY
084 100 REF.FILE="BANKS";HELP.KEY="BANKS.100";LENG=4;ILEN=0
085     HRZ=11;VRT=3;CON="MCAN";VM:"";PATT='0X';MASK="L#4";MAN="KEY";FIELD.NO=
1;DY.TAB=""
086     IF MODE='' THEN OLDVALUE='' ELSE OLDVALUE=HDR.KEY
087     AMC=0;VMC=0;SVMC=0
088     IF MODE[1,1]="C" THEN
089       SAVE.LENGTH = LENG
090       PRMT.KEY=38
091       GOSUB 9200
092       SKIP.FLAG=1
093       LENG = SAVE.LENGTH
094     END
095     GOSUB 9000 ;***** STD.INPUT
096     IF ENTRY="" THEN PRMT.KEY=5;GOSUB 9200;GO TO 100
097     IF OCONV(ENTRY,"MCU")[1,2]=ESC2:"E" OR OCONV(ENTRY,"MCU")[1,2]=ESC2:"Q
" THEN
098         IF MODE # '' THEN         ;* CAN'T EXIT WHILE IN CHANGE MODE
099           PRMT.KEY=54
100           GOSUB 9200
101           GO TO 100
102         END
103         GO TO 9999
104     END
```

Appendix B - Page    2

Bank File Maintenance (Main Logic) Program
BANKS.MAIN (Version 3)

```
105         HDR.KEY=ENTRY ;IF MODE = '' THEN INT.HDR.KEY=ENTRY
106         IF MODE='' THEN
107            INT.HDR.KEY=HDR.KEY
108            MATREAD HDR.REC FROM HDR.FILE,INT.HDR.KEY THEN
109               IF CHANGE.HIST THEN MAT OLD.REC=MAT HDR.REC
110               GOSUB 9400 ;***** DISPLAY FOREGROUND
111               MODE="C"
112            END ELSE
113               IF NOT(ADD.RECORDS) THEN PRMT.KEY='109~':ENTRY;GOSUB 9200;GO TO 100
114               MODE="A"
115            END
116            LI.KEY=EXT.HDR.FILE:"*":INT.HDR.KEY
117            PROCESS=1
118            GOSUB 9700
119            IF PRMT.KEY # '' THEN
120               GOSUB 9200
121               MODE='';GOSUB 9450
122               GO TO 100
123            END
124            IF MODE[1,1]="C" THEN GO TO 8000
125         END
126
127 110    REF.FILE="";HELP.KEY="";LENG=3;ILEN=0
128         HRZ=76;VRT=0;CON="MCAN";VM:"";PATT='0X';MASK="L#3";MAN="";FIELD.NO=1;DY.TAB=""
129         OLDVALUE=HDR.REC(1)<1,1,1>
130         AMC=1;VMC=1;SVMC=1
131         CRT @(HRZ,VRT):OLDVALUE MASK:
132         ENTRY=OLDVALUE
133
134 120    REF.FILE="";HELP.KEY="";LENG=8;ILEN=0
135         HRZ=62;VRT=1;CON="D";VM:"D2/";PATT='0N';MASK="R#8";MAN="";FIELD.NO=1;DY.TAB=""
136         OLDVALUE=HDR.REC(1)<1,1,2>
137         AMC=1;VMC=1;SVMC=2
138         CRT @(HRZ,VRT):OCONV(OLDVALUE,CON<1,2>) MASK:
139         ENTRY=OLDVALUE
140
141 130    REF.FILE="";HELP.KEY="";LENG=8;ILEN=0;VM:"MTS";PATT='2N':"2N":"2N';MASK="R#8";MAN="";
142         HRZ=71;VRT=1;CON="MTS";FIELD.NO=1;DY.TAB=""
143         OLDVALUE=HDR.REC(1)<1,1,3>
144         AMC=1;VMC=1;SVMC=3
145         CRT @(HRZ,VRT):OCONV(OLDVALUE,CON<1,2>) MASK:
146         ENTRY=OLDVALUE
147
148 140    REF.FILE="";HELP.KEY="BANKS.140";LENG=25;ILEN=0
149         HRZ=11;VRT=4;CON="";PATT='0X';MASK="L#25";MAN="Y";FIELD.NO=2;DY.TAB=1:AM:1
150         OLDVALUE=HDR.REC(3)
151         AMC=3;VMC=0;SVMC=0
152         GOSUB 9000 ;***** STD.INPUT
153         HDR.REC(3)=ENTRY
```

Appendix B - Page 3

Bank File Maintenance (Main Logic) Program
BANKS.MAIN (Version 3)

```
154
155 150   REF.FILE="COAM";HELP.KEY="BANKS.150";LENG=20;ILEN=0
156       HRZ=11;VRT=5;CON="";PATT='0X';MASK="L#20";MAN="Y";FIELD.NO=3;DY.TAB=1
157       OLDVALUE=HDR.REC(4)
158       AMC=4;VMC=0;SVMC=0
159       GOSUB 9000 ;***** STD.INPUT
160       IF ENTRY # "" THEN
161          INT.KEY=ENTRY
162          READ COAM.REC FROM COAM.FILE,INT.KEY THEN
163             CRT @(38,5):COAM.REC<1,1,1>"L#25":
164          END ELSE
165             PRMT.KEY=ENTRY:" is not on the COAM file!"
166             GOSUB 9200 ;***** STD.MESSAGE
167             GO TO 150
168          END
169       END ELSE INT.KEY=''
170       HDR.REC(4)=ENTRY
171
172 160   REF.FILE="";HELP.KEY="BANKS.160";LENG=6;ILEN=0
173       HRZ=11;VRT=6;CON="MCN":VM:"MR0";PATT='ON';MASK="R#6";MAN="";FIELD.NO=4
   ;DY.TAB=1
174       OLDVALUE=HDR.REC(8)
175       AMC=8;VMC=0;SVMC=0
176       IF HDR.REC(7)='Y' THEN MAN='Y'
177       GOSUB 9000 ;***** STD.INPUT
178       HDR.REC(8)=ENTRY
179
180 170   REF.FILE="";HELP.KEY="";LENG=6;ILEN=0
181       HRZ=11;VRT=7;CON="MCN":VM:"MR0";PATT='ON';MASK="R#6";MAN="";FIELD.NO=4
   ;DY.TAB=1
182       OLDVALUE=HDR.REC(9)
183       AMC=9;VMC=0;SVMC=0
184       CRT @(HRZ,VRT):OCONV(OLDVALUE,CON<1,2>) MASK:
185       ENTRY=OLDVALUE
186
187 180   REF.FILE="";HELP.KEY="BANKS.180";LENG=39;ILEN=0
188       HRZ=11;VRT=8;CON="";PATT='0X';MASK="L#39";MAN="";FIELD.NO=5;DY.TAB=1
189       OLDVALUE=HDR.REC(10)
190       AMC=10;VMC=0;SVMC=0
191       GOSUB 9000 ;***** STD.INPUT
192       HDR.REC(10)=ENTRY
193
194 190   REF.FILE="ZIPS";HELP.KEY="BANKS.190";LENG=10;ILEN=0
195       HRZ=11;VRT=9;CON="MCAN":VM:"";PATT='0X';MASK="L#10";MAN="";FIELD.NO=6;
   DY.TAB=1
196       OLDVALUE=HDR.REC(13)
197       AMC=13;VMC=0;SVMC=0
198       GOSUB 9000 ;***** STD.INPUT
199       IF ENTRY # "" THEN
200          INT.KEY=ENTRY
201          READ ZIPS.REC FROM ZIPS.FILE,INT.KEY THEN
202             CRT @(29,9):ZIPS.REC<3,1,1>"L#24":
203             CRT @(62,9):ZIPS.REC<4,1,1>"L#2":
204             IF ENTRY # OLDVALUE THEN
```

Appendix B - Page    4

Bank File Maintenance (Main Logic) Program
BANKS.MAIN (Version 3)

```
205          HDR.REC(11) = ZIPS.REC<3>
206          HDR.REC(12) = ZIPS.REC<4>
207        END
208      END ELSE
209        PRMT.KEY=ENTRY:" is not on the ZIPS file!"
210        GOSUB 9200 ;***** STD.MESSAGE
211        GO TO 190
212      END
213    END ELSE INT.KEY=''
214    HDR.REC(13)=ENTRY
215
216 220 REF.FILE="";HELP.KEY="BANKS.220";LENG=15;ILEN=0
217     HRZ=31;VRT=10;CON="";PATT='0X';MASK="L#15";MAN="";FIELD.NO=7;DY.TAB=1
218     OLDVALUE=HDR.REC(15)
219     AMC=15;VMC=0;SVMC=0
220     IF HDR.REC(7)='Y' THEN MAN='Y'
221     GOSUB 9000 ;***** STD.INPUT
222     HDR.REC(15)=ENTRY
223
224 230 REF.FILE="";HELP.KEY="BANKS.230";LENG=1;ILEN=0
225     HRZ=31;VRT=11;CON="MCA":VM:"";PATT='0X';MASK="L#1";MAN="Y";FIELD.NO=8;
    DY.TAB=1
226     OLDVALUE=HDR.REC(7)
227     AMC=7;VMC=0;SVMC=0
228     GOSUB 9000 ;***** STD.INPUT
229     BEGIN CASE
230       CASE ENTRY="Y"
231       CASE ENTRY="N"
232       CASE ENTRY="y"
233       CASE ENTRY="n"
234       CASE 1
235          PRMT.KEY=67
236          GOSUB 9200 ;***** STD.MESSAGE
237          GO TO 230
238     END CASE
239     HDR.REC(7)=ENTRY
240
241 240 REF.FILE="";HELP.KEY="BANKS.240";LENG=1;ILEN=0
242     HRZ=31;VRT=12;CON="MCA":VM:"";PATT='0X';MASK="L#1";MAN="Y";FIELD.NO=9;
    DY.TAB=1
243     OLDVALUE=HDR.REC(14)
244     AMC=14;VMC=0;SVMC=0
245     GOSUB 9000 ;***** STD.INPUT
246     BEGIN CASE
247       CASE ENTRY="Y"
248       CASE ENTRY="N"
249       CASE ENTRY="y"
250       CASE ENTRY="n"
251       CASE 1
252          PRMT.KEY=67
253          GOSUB 9200 ;***** STD.MESSAGE
254          GO TO 240
255     END CASE
256     HDR.REC(14)=ENTRY
```

Appendix B - Page    5

Bank File Maintenance (Main Logic) Program
BANKS.MAIN (Version 3)

```
257
258 250   REF.FILE="COAM";HELP.KEY="BANKS.250";LENG=13;ILEN=0
259       HRZ=31;VRT=13;CON="";PATT='0X';MASK="L#13";MAN="";FIELD.NO=10;DY.TAB=1

260       OLDVALUE=HDR.REC(16)
261       AMC=16;VMC=0;SVMC=0
262       IF HDR.REC(7)='Y' THEN MAN='Y'
263       GOSUB 9000 ;***** STD.INPUT
264       IF ENTRY # "" THEN
265          INT.KEY=ENTRY
266          READ COAM.REC FROM COAM.FILE,INT.KEY THEN
267             END ELSE
268                PRMT.KEY=ENTRY:" is not on the COAM file!"
269                GOSUB 9200 ;***** STD.MESSAGE
270                GO TO 250
271             END
272       END ELSE INT.KEY=''
273       HDR.REC(16)=ENTRY
274
275 260   REF.FILE="";HELP.KEY="BANKS.260";LENG=15;ILEN=0
276       HRZ=31;VRT=14;CON="MCN":VM:"MR0";PATT='ON';MASK="R#15";MAN="";FIELD.NO
    =11;DY.TAB=1
277       OLDVALUE=HDR.REC(5)
278       AMC=5;VMC=0;SVMC=0
279       IF HDR.REC(7)='Y' THEN MAN='Y'
280       GOSUB 9000 ;***** STD.INPUT
281       HDR.REC(5)=ENTRY
282
283 270   REF.FILE="";HELP.KEY="BANKS.270";LENG=15;ILEN=0
284       HRZ=31;VRT=15;CON="";PATT='0X';MASK="L#15";MAN="";FIELD.NO=12;DY.TAB=1

285       OLDVALUE=HDR.REC(6)
286       AMC=6;VMC=0;SVMC=0
287       IF HDR.REC(7)='Y' THEN MAN='Y'
288       GOSUB 9000 ;***** STD.INPUT
289       HDR.REC(6)=ENTRY
290
291 280   REF.FILE="";HELP.KEY="BANKS.280";LENG=1;ILEN=0
292       HRZ=31;VRT=16;CON="MCA":VM:"";PATT='0X';MASK="L#1";MAN="Y";FIELD.NO=13
    ;DY.TAB=1
293       OLDVALUE=HDR.REC(17)
294       AMC=17;VMC=0;SVMC=0
295       GOSUB 9000 ;***** STD.INPUT
296       BEGIN CASE
297          CASE ENTRY='Y'
298          CASE ENTRY='N'
299          CASE 1
300             PRMT.KEY=67
301             GOSUB 9200 ;***** STD.MESSAGE
302             GO TO 280
303       END CASE
304       HDR.REC(17)=ENTRY
305
306 290   REF.FILE="";HELP.KEY="BANKS.290";LENG=3;ILEN=0
```

Appendix B - Page    6

Bank File Maintenance (Main Logic) Program
BANKS.MAIN (Version 3)

```
307       HRZ=65;VRT=18;CON="MCA":VM:"";PATT='0X';MASK="L#3";MAN="Y";FIELD.NO=14
   ;DY.TAB=1
308       OLDVALUE=HDR.REC(18)
309       AMC=18;VMC=0;SVMC=0
310       GOSUB 9000 ;***** STD.INPUT
311       BEGIN CASE
312          CASE ENTRY='ACT'
313          CASE ENTRY='ATC'
314          CASE ENTRY='CAT'
315          CASE ENTRY='CTA'
316          CASE ENTRY='TAC'
317          CASE ENTRY='TCA'
318          CASE 1
319             PRMT.KEY=67
320             GOSUB 9200 ;***** STD.MESSAGE
321             GO TO 290
322       END CASE
323       HDR.REC(18)=ENTRY
324
325       * END OF KERNELS
326 8000 BEGIN CASE
327          CASE MODE='A'  ; MODE='CA'
328          CASE MODE='AC' ; MODE='C'
329       END CASE
330       IF SKIP.FLAG=998 THEN
331          PRE.STORE=INSERT(PRE.STORE,1,1,0,'F')
332          SKIP.FLAG=0
333        END ELSE
334          SKIP.FLAG=0
335       END
336       FIELD.NO=LAST.FIELD.NO
337       MAN=''
338       REF.FILE=''
339       HELP.KEY=FIELD(PGM.NAME,'$',1):'.8000'
340       PRMT.KEY=SCREEN.PROMPT
341       LENG=SCREEN.PROMPT.LEN
342       GOSUB 9220
343       IF ANS[1,1]='.' THEN ANS=ANS[2,99]
344       BEGIN CASE
345 CASE ANS='F'
346    IF HDR.REC(7)='Y' THEN
347 IF HDR.REC(8)='' THEN
348    PRMT.KEY="If printing checks on printer, you must have a 1st check#!"
349    GOSUB 9210
350    GO TO 8000
351 END
352 IF HDR.REC(15)='' THEN
353    PRMT.KEY="If printing checks on printer, you must have a routing code!"
354    GOSUB 9210
355    GO TO 8000
356 END
357 IF HDR.REC(16)='' THEN
358    PRMT.KEY="If printing checks on printer, you must have an adj. GL#!"
359    GOSUB 9210
```

Appendix B - Page 7

Bank File Maintenance (Main Logic) Program
BANKS.MAIN (Version 3)

```
360     GO TO 8000
361 END
362 IF HDR.REC(5)='' THEN
363    PRMT.KEY="If printing checks on printer, you must have a bank transit#!"
364    GOSUB 9210
365    GO TO 8000
366 END
367 IF HDR.REC(6)='' THEN
368    PRMT.KEY="If printing checks on printer, you must have an account#!"
369    GOSUB 9210
370    GO TO 8000
371 END
372    END
373         IF (ADD.RECORDS OR CHANGE.RECORDS) THEN
374            GOSUB 8100
375            GOSUB 8200
376            GOSUB 9450
377            GO TO 10
378         END ELSE
379            PRMT.KEY=86
380            GOSUB 9200
381            GO TO 8000
382         END
383       CASE ANS='F'
384         IF (ADD.RECORDS OR CHANGE.RECORDS) THEN
385            GOSUB 8100
386            GOSUB 8200
387            GOSUB 9450
388            GO TO 10
389         END ELSE
390            PRMT.KEY=86
391            GOSUB 9200
392            GO TO 8000
393         END
394       CASE ANS='D'
395         IF (DELETE.RECORDS) THEN
396 8025     PRMT.KEY=42
397            GOSUB 9210
398            BEGIN CASE
399              CASE ANS='Y'
400                GOSUB 8500
401                MODE='D'
402                IF CHANGE.HIST THEN GOSUB 9600;* HISTORY
403                IF FIELD.XREF THEN;* FIELD XREF DELETE
404                  PROCESS='2'
405                  GOSUB 9725
406                END
407                DELETE HDR.FILE,INT.HDR.KEY
408                HDR.KEY=''
409                IF EXT.INT.KEY THEN
410                  PGMS.KEY = 'STD.EXT.INT' ;GOSUB 8900
411                END
412                GOSUB 8200
413                GOSUB 9450
```

Appendix B - Page    8

Bank File Maintenance (Main Logic) Program
BANKS.MAIN (Version 3)

```
414             GO TO 10
415           CASE ANS='N'
416           CASE ANS=''
417           CASE 1
418             PRMT.KEY=21
419             GOSUB 9200
420             GO TO 8025
421           END CASE
422         END ELSE
423           PRMT.KEY=87
424           GOSUB 9200
425           GO TO 8000
426         END
427       CASE ANS='Q';* QUIT
428         GOSUB 8200
429         GOSUB 9450
430         GO TO 10
431       CASE ANS = 'S'  ;* SCREEN CALL
432         HELP.KEY = ''
433         X = 0
434         LOOP
435           X = X + 1
436           SC.HRZ = CALLED.SCREENS<X,2>
437           SC.VRT = CALLED.SCREENS<X,3>
438         UNTIL CALLED.SCREENS<X,1> = '' DO
439           CRT PROTECT.MODE.OFF:@(SC.HRZ+1,SC.VRT):R.BOUNDRY:@(SC.HRZ-1,SC.VRT):L.BOUNDRY:
440           PRMT.KEY = 500
441           GOSUB 9210
442           CRT PROTECT.MODE.OFF:@(SC.HRZ-1,SC.VRT):TRM.RESET.NV:PROTECT.MODE.ON:
443           BEGIN CASE
444             CASE ANS = 'Y'
445               PGMS.KEY = CALLED.SCREENS<X,1>
446               GOSUB 8900
447               GOSUB 9500
448             CASE ANS = 'E'
449               X = 99
450           END CASE
451         REPEAT
452       CASE ANS[1,1] = CHAR(9) AND CURRENT.TRAN = 'DIS'
453         PRMT.KEY = '498~<Tab>'
454         GOSUB 9200
455       CASE ANS[1,1]=CHAR(9);* TAB
456         ENTRY = ANS
457         DY.TAB=1
458         GO TO 9020
459       CASE ANS[1,1] = CHAR(11) AND CURRENT.TRAN = 'DIS'
460         PRMT.KEY = '498~<Up Arrow>'
461         GOSUB 9200
462       CASE ANS[1,1]=CHAR(11);* UP ARROW
463         ENTRY = ANS
464         FIELD.NO=LAST.FIELD.NO - ANS[2,3] + 1
465         GO TO 9010
```

Bank File Maintenance (Main Logic) Program
BANKS.MAIN (Version 3)

```
466         CASE ANS[1,1] = CHAR(10) AND CURRENT.TRAN = 'DIS'
467          PRMT.KEY = '498~<Down Arrow>'
468          GOSUB 9200
469         CASE ANS[1,1]=CHAR(10);* DOWN ARROW
470          ENTRY = ANS
471          DY.TAB=1
472          GO TO 9020
473         CASE ANS[1,1] = CHAR(30) AND CURRENT.TRAN = 'DIS'
474          PRMT.KEY = '498~<Home>'
475          GOSUB 9200
476         CASE ANS[1,1]=CHAR(30);* HOME
477          ENTRY = ANS
478          DY.TAB=1
479          GO TO 9020
480         * MARKER $$35
481          CASE 1
482           PRMT.KEY='13'
483           GOSUB 9200
484         END CASE
485         GO TO 8000
486 8100 * UPDATING ROUTINE
487         IF ACF.SYS.REC(7) # '' AND CURRENT.TRAN # 'DIS' THEN
488           * WRITE AUDIT RECORD INTO SCRIPT FILE
489           AUDIT.STOP = TIME()
490           STD.ARG(1) = PGM.NAME
491           STD.ARG(2) = 'DATA ENTRY'
492           PGMS.KEY = 'STD.AUDIT.FLOW' ;GOSUB 8900
493           AUDIT.START = TIME()
494         END
495         * MARKER $$40
496         IF EXT.INT.KEY THEN
497           PGMS.KEY = 'STD.EXT.INT' ;GOSUB 8900
498           IF PRMT.KEY # '' THEN
499              GOSUB 9200
500              GOSUB 9400
501              RETURN TO 8000
502           END
503         END
504         IF FIELD.XREF THEN
505           * FIELD XREF UPDATE
506           PROCESS='1'
507           GOSUB 9725
508         END
509         FOR X=MAX.AUDIT + 1 TO MAX.ATTRS
510           HDR.REC(X)=''
511         NEXT X
512         IF CHANGE.HIST THEN GOSUB 9600;* HISTORY
513         READVU DUMMY FROM HDR.FILE,INT.HDR.KEY,1 ELSE NULL
514         MATWRITE HDR.REC ON HDR.FILE,INT.HDR.KEY
515         LAST.KEY=HDR.KEY
516         LAST.INT.KEY=INT.HDR.KEY
517         RETURN
518 8200 * RESET ROUTINE
519         MAT HDR.REC=''
```

Appendix B - Page 10

Bank File Maintenance (Main Logic) Program
BANKS.MAIN (Version 3)

```
520         MAT OLD.REC=''
521         SKIP.FLAG=0
522         MODE=''
523         HIST.REC=''
524         IF HDR.KEY # '' THEN
525           IF LAST.KEY # HDR.KEY THEN
526             LAST.OPERATION = 'QUIT'
527           END ELSE
528             LAST.OPERATION = 'FILE'
529           END
530         END ELSE
531           LAST.OPERATION = 'QUIT'
532         END
533         IF INT.HDR.KEY # '' THEN
534           LI.KEY=EXT.HDR.FILE:"*":INT.HDR.KEY
535           PROCESS=2
536           GOSUB 9700;* UNLOCK HDR RECORD
537           IF PRMT.KEY # '' THEN
538             GOSUB 9200
539           END
540         END
541         * MARKER $$45
542         * MARKER $$50
543         HDR.KEY=''
544         INT.HDR.KEY=''
545         LIS.RTN=0
546         RETURN
547 8300   * UPDATE RTN UPON PGM EXIT
548         * MARKER $$60
549         RETURN
550 8400   * RTN UPON PGM EXIT
551         * MARKER $$70
552         RETURN
553 8500   * RTN UPON RECORD DELETION
554         * MARKER $$80
555         RETURN
556 8600   * LIS ACTIVE PAGE DETERMINATION AND DISPLAY
557         * MARKER $$85
558         IF LIS.RTN = 3 THEN
559           LIS.RTN = 0
560           RETURN TO 8000
561         END
562         RETURN
563 *
564 * STANDARD CALL ROUTINE
565 *
566 8900 IF DEBUG.FLAG THEN
567         CRT @(0,22):CL:'STD.CALL DEBUG;CALLING(':PGMS.KEY:')':
568         INPUT DUMMY,1:
569         CRT @(0,22):CL:
570       END
571       *
572       * STRIP OFF THE .MAIN OR THE .SUB FOR GENERATED PROGRAMS
573       *
```

Appendix B - Page   11

Bank File Maintenance (Main Logic) Program
BANKS.MAIN (Version 3)

```
574       SC.MAIN = INDEX(PGMS.KEY,'.MAIN',1)
575       SC.SUB  = INDEX(PGMS.KEY,'.SUB',1)
576       *
577       SC.KEY = PGMS.KEY
578       BEGIN CASE
579         CASE PGMS.KEY[1,4] = 'STD.'
580         CASE PGMS.KEY = 'PROGRAM.MAIN'
581         CASE PGMS.KEY = 'GE.MAIN'
582         CASE SC.MAIN
583            IF PGMS.KEY[SC.MAIN+5,1] = '' THEN
584              SC.KEY = PGMS.KEY[1,SC.MAIN-1]
585            END
586         CASE SC.SUB
587            IF PGMS.KEY[SC.SUB+4,1] = '' THEN
588              SC.KEY = PGMS.KEY[1,SC.SUB-1]
589            END
590       END CASE
591       *
592       * GET PROGRAMS FILE RECORD
593       *
594       READ SC.PGMS.REC FROM PGMS.FILE,SC.KEY THEN
595          *
596          * CHECK TO SEE IF DEVELOPMENT KEY IS ON LIST FOR THIS OPERATOR
597          *
598          SC.PGM = SC.PGMS.REC<5>
599          IF SC.PGM # '' THEN
600             IF CURR.OP = SC.PGMS.REC<6> THEN
601               * USE DEVELOPMENT VERSION
602             END ELSE
603               * USE PRODUCTION VERSION
604               SC.PGM = SC.PGMS.REC<2>
605             END
606          END ELSE
607            SC.PGM = SC.PGMS.REC<2>
608          END
609          IF SC.PGM = '' THEN SC.PGM = SC.KEY
610       END ELSE
611         SC.PGM = SC.KEY
612       END
613       *
614       CALL @SC.PGM
615       *
616       RETURN
617 *
618 * STANDARD EXECUTE ROUTINE
619 *
620 8950 IF DEBUG.FLAG THEN
621         CRT @(0,22):CL:'STD.EXECUTE DEBUG;EXECUTING(':PGMS.KEY:')':
622         INPUT DUMMY,1:
623         CRT @(0,22):CL:
624      END
625      *
626      * STRIP OFF THE .MAIN OR THE .SUB FOR GENERATED PROGRAMS
627      *
```

Appendix B - Page   12

```
                    Bank File Maintenance (Main Logic) Program
                              BANKS.MAIN (Version 3)

628        SC.MAIN = INDEX(PGMS.KEY,'.MAIN',1)
629        SC.SUB  = INDEX(PGMS.KEY,'.SUB',1)
630        *
631        SC.KEY = PGMS.KEY
632        BEGIN CASE
633          CASE PGMS.KEY[1,4] = 'STD.'
634          CASE PGMS.KEY = 'PROGRAM.MAIN'
635          CASE PGMS.KEY = 'GE.MAIN'
636          CASE SC.MAIN
637            IF PGMS.KEY[SC.MAIN+5,1] = '' THEN
638              SC.KEY = PGMS.KEY[1,SC.MAIN-1]
639            END
640          CASE SC.SUB
641            IF PGMS.KEY[SC.SUB+4,1] = '' THEN
642              SC.KEY = PGMS.KEY[1,SC.SUB-1]
643            END
644        END CASE
645        *
646        * GET PROGRAMS FILE RECORD
647        *
648        READ SC.PGMS.REC FROM PGMS.FILE,SC.KEY THEN
649          *
650          * CHECK TO SEE IF DEVELOPMENT KEY IS ON LIST FOR THIS OPERATOR
651          *
652          SC.PGM = SC.PGMS.REC<5>
653          IF SC.PGM # '' THEN
654            IF CURR.OP = SC.PGMS.REC<6> THEN
655              * USE DEVELOPMENT VERSION
656            END ELSE
657              * USE PRODUCTION VERSION
658              SC.PGM = SC.PGMS.REC<2>
659            END
660          END ELSE
661            SC.PGM = SC.PGMS.REC<2>
662          END
663          IF SC.PGM = '' THEN SC.PGM = SC.KEY
664        END ELSE
665          SC.PGM = SC.KEY
666        END
667        *
668        EXECUTE SC.PGM
669        *
670        RETURN
671   *
672 9000 PGMS.KEY = 'STD.INPUT' ;GOSUB 8900
673        IF DEBUG.FLAG THEN
674          PROCESS = 1
675          GOSUB 8
676        END
677        BEGIN CASE
678          CASE ENTRY[1,1]=CHAR(11) ;* UP ARROW
679            IF DY.TAB<2>=2 THEN;* THIS IS A LIS FIELD
680              IF LIS.INFO<LIS,3> > 1 THEN;* MOVE UP A LINE
681                LIS.INFO<LIS,3>=LIS.INFO<LIS,3> - ENTRY[2,3]
```

Appendix B - Page   13

Bank File Maintenance (Main Logic) Program
BANKS.MAIN (Version 3)

```
682             RETURN TO 9010
683           END ELSE;* JUMP UP OUT OF LIS SET
684             NULL
685           END
686         END
687         FIELD.NO=FIELD.NO - ENTRY[2,3]
688         IF FIELD.NO < 1 THEN FIELD.NO=1
689         IF FIELD.NO=1 AND MAIN.SCREEN THEN
690           IF EXT.INT.KEY AND MODE='C' THEN
691             NULL
692           END ELSE
693             PRMT.KEY = "4"
694             GOSUB 9210
695             IF ANS = "Y" THEN
696               GOSUB 8200
697               GOSUB 9450
698             END ELSE
699               FIELD.NO=2
700             END
701           END
702         END
703         RETURN TO 9010
704       CASE ENTRY[1,1]=CHAR(10)  ;* DOWN ARROW
705         IF DY.TAB<2>=2 THEN;* THIS IS A LIS FIELD
706           LIS.INFO<LIS,3>=LIS.INFO<LIS,3> + ENTRY[2,3]
707           RETURN TO 9010
708         END
709         FIELD.NO=FIELD.NO + ENTRY[2,3]
710         RETURN TO 9010
711       CASE ENTRY[1,1]=CHAR(30);*HOME
712         DY.TAB=1
713         RETURN TO 9020
714       CASE ENTRY[1,1]=CHAR(9);*UP OR DOWN TAB
715         BEGIN CASE
716           CASE MODE[1,1]='C' AND ENTRY[2,5] > 0
717             DY.TAB=DY.TAB<1> + 1
718           CASE 1
719             IF DY.TAB<2> # '' THEN
720               DY.TAB=DY.TAB<1> - 1
721               IF DY.TAB < 1 THEN DY.TAB=1
722             END
723         END CASE
724         RETURN TO 9020
725       CASE ENTRY[1,2]=ESC2:"Q" ;* QUIT THIS TRANSACTION
726         PRE.STORE=INSERT(PRE.STORE,1,1,0,'Q')
727         RETURN TO 8000
728       CASE ENTRY[1,2]=ESC2:"F" AND MODE[1,1]='C';* FILE THIS TRANSACTION
729         PRE.STORE=INSERT(PRE.STORE,1,1,0,'F')
730         RETURN TO 8000
731       CASE ENTRY[1,2]=ESC2:"N" AND MODE[1,1]='C';* GO TO ACCEPTANCE PROMPT
732         RETURN TO 8000
733       CASE 1
734     END CASE
```

Appendix B - Page   14

Bank File Maintenance (Main Logic) Program
BANKS.MAIN (Version 3)

```
735        RETURN
736 9010     ON FIELD.NO GO TO 100,140,150,160,180,190,220,230,240,250,260,270,
    280,290
737        GO TO 8000
738 9020     ON DY.TAB GO TO 140
739        GO TO 8000
740 9200 CRT BELL:
741        SKIP.FLAG=0
742        LENG=0
743        GO TO 9220
744 9210 LENG=2
745 9220 PGMS.KEY = 'STD.MESSAGE' ;GOSUB 8900
746        IF DEBUG.FLAG THEN
747           PROCESS = 2
748           GOSUB 8
749        END
750        RETURN
751 9300 PROCESS=1;* DISPLAY BG
752        PGMS.KEY = SCREEN.SUB ;GOSUB 8900
753        RETURN
754 9400 PROCESS=2;* DISPLAY FG
755 9410 PGMS.KEY = SCREEN.SUB ;GOSUB 8900
756        RETURN
757 9450 PROCESS=3;* CLEAR FG
758        PGMS.KEY = SCREEN.SUB ;GOSUB 8900
759        RETURN
760 9500 * DISPLAY BG & FG
761        GOSUB 9300
762        GOSUB 9400
763        RETURN
764 9600 * GENERATE HISTORY RECORD
765        PROCESS = 1
766        PGMS.KEY = "STD.HISTORY.SUB" ; GOSUB 8900
767        RETURN
768 *
769 9700 PGMS.KEY = 'STD.LOCK' ;GOSUB 8900
770        RETURN
771 *
772 9725 *
773        * MARKER $$102
774        RETURN
775 *
776 9900 PGMS.KEY = 'STD.OPEN' ;GOSUB 8900
777        IF PRMT.KEY # '' THEN
778           GOSUB 9200
779           ABORT
780        END
781        RETURN
782 *
783 9999 IF DEBUG.FLAG THEN
784           PROCESS = 4
785           GOSUB 8
786        END
787        RETURN
```

Appendix B - Page   15

Bank File Maintenance (Main Logic) Program
BANKS.MAIN (Version 3)

```
788 *
789     * MARKER $$90
790 END
```

[405] 1 items listed out of 1 items.

Appendix B - Page 16

Bank File Maintenance (Display Routine) Program
BANKS.BGFG (Version 3)

```
     BANKS$3.BGFG
001  SUBROUTINE BANKS$3.BGFG
002  GO TO 9
003  *******************************************************
004  * Creative Information Systems CO. Inc.               *
005  * Copyright 1989 Creative Information Systems CO. Ltd *
006  *******************************************************
007  *
008  *
009  *
010  *
011  *
012  *
013  *
014  *
015  *
016  *
017  *
018  *
019  *
020  *
021  *
022  *
023  *
024  *
025  $INCLUDE EQUATES SYSTEM.COMMON
026  *
027  $INCLUDE EQUATES TERMINAL
028  *
029  $INCLUDE USER.BP BANKS$3.MAIN.EQUATES.INCLUDE
030  9    IF DEBUG.FLAG THEN
031         CRT @(0,22):CL:PGM.NAME:'.BGFG DEBUG':
032         INPUT DUMMY,1:
033         CRT @(0,22):CL:
034       END
035       ON PROCESS<1> GO TO 100,200,300,400
036       ABORT
037  100  * BACKGROUND TEXT STRING
038       PRINT CLR:PROTECT.MODE.ON:START.BG:@(0,0):\Ref: BANKS$3\:@(23,0):CRT.L
     OGO:@(62,0):\Last Changed:\:
039       PRINT @(29,1):\Add/Change Bank Codes\:
040       PRINT @(0,3):\Bank Code:\:
041       PRINT @(0,4):\Bank Name:\:
042       PRINT @(0,5):\Bank G/L#:\:
043       PRINT @(0,6):\1st Chk #:\:
044       PRINT @(0,7):\Last Chk#:\:
045       PRINT @(0,8):\Address   :\:
046       PRINT @(0,9):\Zip Code :\:@(23,9):\City:\:@(55,9):\State:\:
047       PRINT @(0,10):\Routing Code\:@(29,10):\:\:
048       PRINT @(0,11):\Print Checks on Printer (Y/N):\:
049       PRINT @(0,12):\Print Check Stubs (Y/N)\:@(29,12):\:\:
050       PRINT @(0,13):\Adjustment G/L Number\:@(29,13):\:\:
051       PRINT @(0,14):\Bank Transit Number\:@(29,14):\:\:
052       PRINT @(0,15):\Account Number\:@(29,15):\:\:
```

Appendix B - Page 17

Bank File Maintenance (Display Routines) Program
BANKS.BGFG (Version 3)

```
053        PRINT @(0,16):\Spaces in MICR Line (Y/N)\:@(29,16):\:\:
054        PRINT @(0,18):\Order of (C)heck#-(T)ransit#-(A)ccount# MICR Output (e.
      g., TCA):\:
055        PRINT END.BG:
056        * END OF BG LINES
057        RETURN
058 200    * DISPLAY THE RECORD
059        CRT @(76,0):HDR.REC(1)<1,1,1>'L#3':
060        CRT @(62,1):OCONV(HDR.REC(1)<1,1,2>,'D2/')'R#8':
061        CRT @(71,1):OCONV(HDR.REC(1)<1,1,3>,'MTS')'R#8':
062        CRT @(11,3):FIELD(HDR.KEY,"*",1)'L#4':
063        CRT @(11,4):HDR.REC(3)'L#25':
064        CRT @(11,5):HDR.REC(4)'L#20':
065        READ COAM.REC FROM COAM.FILE,HDR.REC(4) ELSE COAM.REC = ""
066        CRT @(38,5):COAM.REC<1,1,1>'L#25':
067        CRT @(11,6):OCONV(HDR.REC(8),'MR0')'R#6':
068        CRT @(11,7):OCONV(HDR.REC(9),'MR0')'R#6':
069        CRT @(11,8):HDR.REC(10)'L#39':
070        CRT @(11,9):HDR.REC(13)'L#10':
071        READ ZIPS.REC FROM ZIPS.FILE,HDR.REC(13) ELSE ZIPS.REC = ""
072        CRT @(29,9):ZIPS.REC<3,1,1>'L#24':
073        CRT @(62,9):ZIPS.REC<4,1,1>'L#2':
074        CRT @(31,10):HDR.REC(15)'L#15':
075        CRT @(31,11):HDR.REC(7)'L#1':
076        CRT @(31,12):HDR.REC(14)'L#1':
077        CRT @(31,13):HDR.REC(16)'L#13':
078        CRT @(31,14):OCONV(HDR.REC(5),'MR0')'R#15':
079        CRT @(31,15):HDR.REC(6)'L#15':
080        CRT @(31,16):HDR.REC(17)'L#1':
081        CRT @(65,18):HDR.REC(18)'L#3':
082        * END OF FG LINES
083        RETURN
084 300    * CLEAR THE FOREGROUND
085        IF TRM.LEVEL THEN PRINT CLR.FG:; RETURN
086        CRT @(76,0):SPACE(4):
087        CRT @(62,1):SPACE(9):
088        CRT @(71,1):SPACE(9):
089        CRT @(11,3):SPACE(5):
090        CRT @(11,4):SPACE(26):
091        CRT @(11,5):SPACE(21):
092        CRT @(38,5):SPACE(26):
093        CRT @(11,6):SPACE(7):
094        CRT @(11,7):SPACE(7):
095        CRT @(11,8):SPACE(40):
096        CRT @(11,9):SPACE(11):
097        CRT @(29,9):SPACE(25):
098        CRT @(62,9):SPACE(3):
099        CRT @(31,10):SPACE(16):
100        CRT @(31,11):SPACE(2):
101        CRT @(31,12):SPACE(2):
102        CRT @(31,13):SPACE(14):
103        CRT @(31,14):SPACE(16):
104        CRT @(31,15):SPACE(16):
105        CRT @(31,16):SPACE(2):
```

Appendix B - Page 18

Bank File Maintenance (Display Routines) Program
BANKS.BGFG (Version 3)

```
106         CRT @(65,18):SPACE(4):
107       * END OF FG CLEAR LINES
108         RETURN
109 400   * DISPLAY THE ACTIVE HISTORY RECORD
110         CRT @(79,0):TRM.NV:@(75,0):VISUAL.REC<1,1,1>:@(76,0):ACTIVE.REC<1,1,1>
            'L#3':
111         CRT @(70,1):TRM.NV:@(61,1):VISUAL.REC<1,1,2>:@(62,1):OCONV(ACTIVE.REC<
            1,1,2>,'D2/')'R#8':
112         CRT @(79,1):TRM.NV:@(70,1):VISUAL.REC<1,1,3>:@(71,1):OCONV(ACTIVE.REC<
            1,1,3>,'MTS')'R#8':
113         CRT @(15,3):TRM.NV:@(10,3):" ":@(11,3):FIELD(HDR.KEY,"*",1)'L#4':
114         CRT @(36,4):TRM.NV:@(10,4):VISUAL.REC<3>:@(11,4):ACTIVE.REC<3>'L#25':
115         CRT @(31,5):TRM.NV:@(10,5):VISUAL.REC<4>:@(11,5):ACTIVE.REC<4>'L#20':
116         READ COAM.REC FROM COAM.FILE,ACTIVE.REC<4> ELSE COAM.REC = ""
117         CRT @(37,5):VISUAL.REC<4>:COAM.REC<1,1,1>'L#25':
118         CRT @(17,6):TRM.NV:@(10,6):VISUAL.REC<8>:@(11,6):OCONV(ACTIVE.REC<8>,'
            MR0')'R#6':
119         CRT @(17,7):TRM.NV:@(10,7):VISUAL.REC<9>:@(11,7):OCONV(ACTIVE.REC<9>,'
            MR0')'R#6':
120         CRT @(50,8):TRM.NV:@(10,8):VISUAL.REC<10>:@(11,8):ACTIVE.REC<10>'L#39'
            :
121         CRT @(21,9):TRM.NV:@(10,9):VISUAL.REC<13>:@(11,9):ACTIVE.REC<13>'L#10'
            :
122         READ ZIPS.REC FROM ZIPS.FILE,ACTIVE.REC<13> ELSE ZIPS.REC = ""
123         CRT @(28,9):VISUAL.REC<13>:ZIPS.REC<3,1,1>'L#24':
124         CRT @(61,9):VISUAL.REC<13>:ZIPS.REC<4,1,1>'L#2':
125         CRT @(46,10):TRM.NV:@(30,10):VISUAL.REC<15>:@(31,10):ACTIVE.REC<15>'L#
            15':
126         CRT @(32,11):TRM.NV:@(30,11):VISUAL.REC<7>:@(31,11):ACTIVE.REC<7>'L#1'
            :
127         CRT @(32,12):TRM.NV:@(30,12):VISUAL.REC<14>:@(31,12):ACTIVE.REC<14>'L#
            1':
128         CRT @(44,13):TRM.NV:@(30,13):VISUAL.REC<16>:@(31,13):ACTIVE.REC<16>'L#
            13':
129         CRT @(46,14):TRM.NV:@(30,14):VISUAL.REC<5>:@(31,14):OCONV(ACTIVE.REC<5
            >,'MR0')'R#15':
130         CRT @(46,15):TRM.NV:@(30,15):VISUAL.REC<6>:@(31,15):ACTIVE.REC<6>'L#15
            ':
131         CRT @(32,16):TRM.NV:@(30,16):VISUAL.REC<17>:@(31,16):ACTIVE.REC<17>'L#
            1':
132         CRT @(68,18):TRM.NV:@(64,18):VISUAL.REC<18>:@(65,18):ACTIVE.REC<18>'L#
            3':
133       * END OF HISTORY FG LINES
134         RETURN
135 END
```

[405] 1 items listed out of 1 items.

Appendix B - Page 19

Operator Prompt and Response Program
STD.MESSAGE (Version 17)
C  Copyright © 1990 by Creative Information Systems Co. Ltd.

```
STD.MESSAGE$17
001 SUBROUTINE STD.MESSAGE$17
002 GO TO 9
003 * Program....: STD.MESSAGE
004 * Description: Routine to display message and get a response from Oper
005 * Revision...: 17.0 - Add the ability to pass more than one insert to a mes
    sage.
006 * Project....: 4.0 - Next Release After 3.0B
007 * Programmer.: David M. Murdock
008 * Copyright..: 1990 Creative Information Systems CO. Ltd.
009 ****************************************************************
010 * This program will operate as follows:
011 * 1. If PRMT.KEY is in the form "##[~Data][~Data]" where ## is the key of
012 *    a PROMPT file record.  If desired, user supplied data may be inserted
013 *    into the message by including the "~Data" and putting a tilda (~) in
014 *    the message.  There must be the same number if tildas in the message
015 *    as there are in PRMT.KEY.
016 * 2. If PRMT.KEY is not in the above form, then it is taken to be the
017 *    message to be displayed.
018 * 3. If the LENGth of the response is zero, then the message is processed
019 *    as an error.  The message is displayed for 2 seconds and the bell
020 *    is sounded twice.
021 ****************************************************************
022 *
023 *
024 *
025 $INCLUDE EQUATES SYSTEM.COMMON
026 *
027 $INCLUDE EQUATES TERMINAL
028 *
029 $INCLUDE EQUATES ACF.SYS
030 *
031 ****************** STANDARD MESSAGE ROUTINE ******************
032 *
033 9 PROMPT.ID = 0
034     IF PROCESS = 'MCU' THEN CAPS = 0 ELSE CAPS = 1
035     READV DUMMY FROM TRM.FILE,THIS.PORT,17 ELSE DUMMY = ''
036     X = ''
037     IF DUMMY<1,1> = 1 THEN X = 'T'
038     IF DUMMY<1,1> = 2 THEN X = 'P'
039     IF TRM.LEVEL THEN
040         DUMMY = 'Operator: ':CURR.OP:'; Port: ':THIS.PORT:'; Queue: ':DEFAUL
    T.QUEUE:'; Level: ':WINDOW.NO:' ':X
041         CRT START.HOST.MSG:DUMMY'L#46':END.HOST.MSG:
042         IF TRM.MSG.DISP.FLAG = 2 THEN
043             DUMMY = 'Client: ':CURRENT.CLIENT<1,1,2>
044             DUMMY = DUMMY:'; Pol Seq: ':CURRENT.POLICY<1,1,2>:'; Eff Date: ':C
    URRENT.EFF.DATE
045             DUMMY = DUMMY:'; Loss Seq: ':CURRENT.LOSS<1,1,2>:'; End No: ':CURR
    ENT.END.NO
046             DUMMY = DUMMY:'; Trans: ':CURRENT.TRAN
047             CRT @(0,22):DUMMY'L#80':CS:
048         END
049     END
```

Appendix C - Page 1

Operator Prompt and Response Program
STD.MESSAGE (Version 17)

```
050        IF INDEX(PRMT.KEY,"~",1) THEN PROMPT.ID = FIELD(PRMT.KEY,'~',1)
051        IF NUM(PRMT.KEY) THEN PROMPT.ID = PRMT.KEY
052        ***** GET MESSAGE FROM THE PROGRAM.ERROR FILE
053        IF PROMPT.ID THEN
054          READV ERROR.MSG FROM PRMT.FILE, PROMPT.ID, 1 ELSE
055            ERROR.MSG = "Program Error Message ":PROMPT.ID:" not on file"
056          END
057          TILDAS = COUNT(ERROR.MSG,'~')
058          FOR X = 1 TO TILDAS
059            TILDA = INDEX(ERROR.MSG,"~",1)
060            IF TILDA THEN
061              ERROR.MSG = ERROR.MSG[1,TILDA-1]:FIELD(PRMT.KEY,"~",X+1):ERROR.M
     SG[TILDA+1,99]
062            END
063          NEXT X
064          PRMT.KEY = "(":PROMPT.ID:") ":ERROR.MSG
065        END
066        PRMT.KEY = PRMT.KEY[1,78]
067        PRMT.KEY.LEN = LEN(PRMT.KEY)
068        VRT = 23
069        GOSUB 8000     ;* DISPLAY THE MESSAGE
070 20     CRT PROTECT.MODE.OFF:@(HRZ+LENG,VRT):R.BOUNDRY:@(HRZ-1,VRT):L.BOUNDRY:
071        ANS = ''
072        IF LENG > 0 THEN
073          * GET ANY PRE-STORED INPUT OR GET INPUT FROM KEYBOARD
074          IF PRE.STORE = '' THEN PRE.STORE = 'ZZ9Z'
075          IF PRE.STORE<1,1> # 'ZZ9Z' THEN
076            ANS = PRE.STORE<1,1>
077            PRE.STORE = DELETE(PRE.STORE,1,1,0)
078          END ELSE
079            PGMS.KEY = 'STD.WP' ; GOSUB 8900
080          END
081        END ELSE
082          LOOP
083            Y = SYSTEM(14)
084          UNTIL Y = 0 DO
085            INPUT DUMMY,Y:
086          REPEAT
087          IF TRM.ERROR.TIME = '' THEN TRM.ERROR.TIME = 2
088          SLEEP TRM.ERROR.TIME
089          ANS = CHAR(13)
090        END
091        IF DEBUG.FLAG THEN
092          IF ANS[1,2] # '.$' THEN
093            CRT @(0,22):CL:'STD.MESSAGE AFTER WP DEBUG ;ANS=(':ANS:").":
094            INPUT DUMMY,1:
095            CRT @(0,22):CL:
096          END
097        END
098 30     CRT @(HRZ-1,VRT):TRM.RESET.NV:
099        ECHO ON
100 40     CRT @(0,22):CS:PROTECT.MODE.ON:
101        IF CAPS THEN ANS = OCONV(ANS,'MCU')
```

Appendix C - Page 2

Operator Prompt and Response Program
STD.MESSAGE (Version 17)

```
102        T.ANS = OCONV(ANS,'MCU')                         ;* SET UP T.ANS FOR COMMAN
    D TESTING
103        BEGIN CASE
104           CASE ANS[1,1] = CHAR(11)                      ;* OPERATOR ENTERED "<UP A
    RROW>" - BACK UP
105              RETURN
106           CASE ANS[1,1] = CHAR(10)                      ;* OPERATOR ENTERED "<DOWN
    ARROW>" - GO DOWN
107              RETURN
108           CASE ANS[1,1] = CHAR(9)                       ;* OPERATOR ENTERED "<TAB>
    " - GO UP OR DOWN
109              RETURN
110           CASE ANS[1,1] = CHAR(30)                      ;* OPERATOR ENTERED "<HOME
    >" - GO UP TO FIRST FIELD
111              RETURN
112 50        CASE ANS[1,1] = ESC2                          ;* OPERATOR ENTER AN ESCAP
    E SEQUENCE
113              BEGIN CASE
114                 CASE T.ANS[2,1] = 'H'  ; GOSUB 1000     ;* FIELD HELP
115                 CASE T.ANS[2,1] = '?'  ; GOSUB 1100     ;* COMMAND HELP
116                 CASE T.ANS[2,1] = 'I'  ; GOSUB 1150     ;* HELP ABOUT PROCEDURES
117                 CASE T.ANS[2,1] = 'A'  ; GOSUB 1300     ;* ADD A PROMPT RECORD - F
    ILE MAINTENANCE PGM
118                 CASE T.ANS[2,1] = 'M'  ; GOSUB 1400     ;* MENU
119                 CASE T.ANS[2,1] = 'Y'  ; GOSUB 1425     ;* ACCESS
120                 CASE T.ANS[2,1] = 'Z'  ; GOSUB 1450     ;* CLIENT INQUIRY
121                 CASE T.ANS[2,2] = 'PP'; GOSUB 1550      ;* PRINT REPORT
122                 CASE T.ANS[2,1] = 'P'  ; GOSUB 1500     ;* PRINT SCREEN
123                 CASE T.ANS[2,2] = '$$'; GOSUB 1650      ;* DEBUG MODE TO CHANGE TH
    E TERMINAL RECORD
124                 CASE T.ANS[2,1] = '$'  ; GOSUB 1600     ;* DEBUG MODE
125                 CASE T.ANS[2,1] = 'U'  ; GOSUB 1700     ;* USER HELP ENTRY
126                 CASE T.ANS[2,1] = 'V'  ; GOSUB 1701     ;* CISCO PROCEDURES ENTRY
127                 CASE T.ANS[2,2] = 'WW'; GOSUB 1703      ;* CISCO COMMAND HELP ENTR
    Y
128                 CASE T.ANS[2,1] = 'W'  ; GOSUB 1702     ;* CISCO HELP ENTRY
129                 CASE T.ANS[2,1] = 'R'  ; GOSUB 2100     ;* HISTORY DISPLAY
130                 CASE T.ANS[2,1] = 'C'  ; GOSUB 2200     ;* REFRESH THE SCREEN
131                 CASE T.ANS[2,1] = 'B'  ; GOSUB 2300     ;* SEND A PORT MESSAGE
132                 CASE T.ANS[2,1] = 'F'                   ;* STRIP "." AND RETURN
133                    ANS = T.ANS[2,1]
134                    RETURN
135                 CASE T.ANS[2,1] = 'Q'                   ;* STRIP "." AND RETURN
136                    ANS = T.ANS[2,1]
137                    RETURN
138                 CASE T.ANS[2,1] = 'E'                   ;* STRIP "." AND RETURN
139                    ANS = T.ANS[2,1]
140                    RETURN
141                 CASE 1                                  ;* USER ENTERED INVALID
142                    THE.PROMPT = '64'
143                    THE.HELP = ''
144                    GOSUB 9200
145              END CASE
146              GO TO 9
```

Appendix C - Page  3

Operator Prompt and Response Program
STD.MESSAGE (Version 17)

```
147        END CASE
148 99     RETURN
149 *
150 ***** HELP ROUTINE (.H)
151 *
152 1000 IF HELP.KEY # '' THEN
153        GOSUB 9000                                    ;* SAVE COMMON VARIABLES
154        PGMS.KEY = 'STD.HELP' ; GOSUB 8900
155        GOSUB 9050                                    ;* RESTORE COMMON VARIABLES
156        GOSUB 9500                                    ;* REFRESH THE SCREEN
157        IF TOTAL.WIDTH THEN
158          * HELP WAS DISPLAYED WHILE ANOTHER BOX WAS ON THE SCREEN
159          PRE.STORE = INSERT(PRE.STORE,1,1,0,'+-')
160        END
161      END ELSE
162        THE.PROMPT = '3'
163        THE.HELP = ''
164        GOSUB 9200
165      END
166      RETURN
167 *
168 ***** HELP WITH COMMANDS (.?)
169 *
170 1100 GOSUB 9000                                      ;* SAVE COMMON VARIABLES
171      HELP.KEY = 'STD.COMMANDS'
172      PGMS.KEY = 'STD.HELP' ; GOSUB 8900
173      GOSUB 9050                                      ;* RESTORE COMMON VARIABLES
174      GOSUB 9500                                      ;* REFRESH THE SCREEN
175      RETURN
176 *
177 * HELP WITH PROCEDURES (.I)
178 *
179 1150 GOSUB 9000                                      ;* SAVE COMMON VARIABLES
180      BEGIN CASE
181        CASE PGM.NAME # ''
182          HELP.KEY = FIELD(PGM.NAME,"$",1):'.PROCEDURES'
183          PGMS.KEY = 'STD.HELP' ; GOSUB 8900
184          GOSUB 9050                                  ;* RESTORE COMMON VARIABLES
185          GOSUB 9500                                  ;* REFRESH THE SCREEN
186        CASE 1
187          HELP.KEY = 'STD.FIELD'
188          THE.PROMPT = '382'
189          THE.HELP = ''
190          GOSUB 9200
191      END CASE
192      RETURN TO 9
193 *
194 * ADD A PROMPT RECORD - FILE MAINTENANCE (.A)
195 *
196 1300 REF.FILE = 'PROMPT'
197      READV NEXT.PROGRAM FROM FL.FILE,REF.FILE,10 ELSE NEXT.PROGRAM = ''
```

Appendix C - Page 4

Operator Prompt and Response Program
STD.MESSAGE (Version 17)

```
198     IF NEXT.PROGRAM = '' THEN NEXT.PROGRAM = REF.FILE:".MAIN"
199     MAIN.LOC = INDEX(NEXT.PROGRAM,'.MAIN',1)
200     PGMS.KEY = NEXT.PROGRAM[1,MAIN.LOC-1]
201     READV ID FROM PGMS.FILE,PGMS.KEY,2 ELSE ID = NEXT.PROGRAM
202     IF ID = '' THEN ID = NEXT.PROGRAM
203     IF OCONV(ID,'TMD;X;1;1') # '' THEN ;* THERE IS A CATALOGED PROGRAM
204        IF PROMPT.ID THEN
205           NEXT.COM.AREA = PROMPT.ID
206        END ELSE
207           NEXT.COM.AREA = 'ZZ8Z' ;* FIELD EMPTY - GET KEY IN FILE MAINTENANCE PGM
208        END
209        PGMS.KEY = 'STD.EXECUTE' ; GOSUB 8900           ;* REFRESH THE SCREEN
210        GOSUB 9600
211        IF PRE.STORE<1,1> # 'ZZ9Z' THEN PRE.STORE = DELETE(PRE.STORE,1,1,0)
212     END ELSE                                          ;* THERE IS NO FM PROGRAM
213        THE.PROMPT = '33'
214        THE.HELP = ''
215        GOSUB 9200
216     END
217     RETURN
218 *
219 ***** INQUIRY MENU (.M)
220 *
221 1400 NEXT.PROGRAM = 'MENU.DRIVER'
222     NEXT.COM.AREA = ''
223     PGMS.KEY = 'STD.EXECUTE' ; GOSUB 8900              ;* REFRESH THE SCREEN
224     GOSUB 9500
225     RETURN
226 *
227 ***** ACCESS (.Y)
228 *
229 1425 NEXT.PROGRAM = 'RB.100.MAIN'
230     PGMS.KEY = 'STD.EXECUTE' ; GOSUB 8900              ;* REFRESH THE SCREEN
231     GOSUB 9500
232     RETURN
233 *
234 ***** CLIENT INQUIRY (.Z)
235 *
236 1450 NEXT.PROGRAM = 'AR.200.MAIN'
237     IF CURRENT.CLIENT # '' THEN
238        NEXT.COM.AREA = CURRENT.CLIENT<1,1,1>
239     END ELSE
240        NEXT.COM.AREA = 'ZZ9Z'
241     END
242     PGMS.KEY = 'STD.EXECUTE' ; GOSUB 8900              ;* REFRESH THE SCREEN
243     GOSUB 9500
244     RETURN
245 *
246 ***** PRINT THE SCREEN (.P)
247 *
248 1500 IF PROCESS = 'STD.PRINTER.ASSIGN' THEN
249        * CAN'T DO THIS FROM STD.PRINTER.ASSIGN
250        NULL
```

Appendix C - Page 5

Operator Prompt and Response Program
STD.MESSAGE (Version 17)

```
251         END ELSE
252           SAVE.PRMT.KEY=PRMT.KEY
253           PROCESS = ''
254           STD.ARG(1) = 'STD.SCREEN.PRINT'
255           STD.ARG(2) = 1
256           PGMS.KEY = 'STD.PRINTER.ASSIGN' ; GOSUB 8900
257           PGMS.KEY = 'STD.SCREEN.PRINT'   ; GOSUB 8900
258           PGMS.KEY = 'STD.PRINTER.RESET'  ; GOSUB 8900
259           PRMT.KEY=SAVE.PRMT.KEY
260 *         GOSUB 9450                                   ;* CLEAR FG
261 *         GOSUB 9400                                   ;* DISPLAY FG DATA
262         END
263         RETURN
264 *
265 ***** PRINT THE REPORT (.PP)
266 *
267 1550 NEXT.PROGRAM = FIELD(PGM.NAME,'$',1):'.PROC'
268      PGMS.KEY = NEXT.PROGRAM
269      READV ID FROM PGMS.FILE,PGMS.KEY,2 ELSE ID = NEXT.PROGRAM
270      IF ID = '' THEN ID = NEXT.PROGRAM
271      IF OCONV(ID,'TMD;X;1;1') # '' THEN     ;* THERE IS A CATALOGED REPORT PR
    OGRAM
272         NEXT.COM.AREA = INT.HDR.KEY
273         PGMS.KEY = 'STD.EXECUTE' ; GOSUB 8900
274         GOSUB 9500                                    ;* REFRESH THE SCREEN
275      END ELSE                                         ;* THERE IS NO FM PROGRAM
276         THE.PROMPT = '148'
277         THE.HELP = ''
278         GOSUB 9200
279      END
280      RETURN
281 *
282 ***** TOGGLE IN AND OUT OF DEBUG MODE
283 *
284 1600 IF DEBUG.FLAG THEN
285         DEBUG.FLAG = 0
286         CRT @(0,23):CL:'DEBUG.FLAG OFF':
287      END ELSE
288         DEBUG.FLAG = 1
289         CRT @(0,23):CL:'DEBUG.FLAG ON':
290      END
291      RETURN
292 *
293 ***** MODIFY THE TERMINAL FILE RECORD (.$$)
294 *
295 1650 THE.PROMPT = '294'
296      THE.HELP = ''
297      GOSUB 9210
298      BEGIN CASE
299         CASE ANS = 'E'
300         CASE ANS = ''
301         CASE NUM(ANS)
302            OPEN 'DICT','TERMINAL' TO DT.FILE ELSE DEBUG
303            T.ATTR = ANS
```

Appendix C - Page    6

Operator Prompt and Response Program
STD.MESSAGE (Version 17)

```
304             READV DESC FROM DT.FILE,T.ATTR,3 ELSE DESC = 'UNKNOWN'
305             READVU T.DATA FROM TRM.FILE,THIS.PORT,T.ATTR THEN
306                THE.PROMPT = 'Old ':DESC:' (':T.DATA:')'
307                THE.HELP = ''
308                GOSUB 9200
309                THE.PROMPT = 'New ':DESC:': '
310                THE.HELP = ''
311                THE.LENG = 40
312                GOSUB 9220
313                IF ANS # 'E' THEN
314                   WRITEV ANS ON TRM.FILE,THIS.PORT,T.ATTR
315                   TRM.REC(T.ATTR) = ANS
316                END ELSE
317                   RELEASE TRM.FILE,THIS.PORT
318                END
319             END
320          END CASE
321          LENG = SAVE.LENG
322          RETURN
323 *
324 * OPERATOR WANTS TO ENTER SOME HELP TEXT (.U)/(.W)/(.V)/(.WW)
325 *
326 1700 H.KEY = HELP.KEY:"*USER"                      ;* USER HELP ENTRY POINT
327       GO TO 1704
328 1701 H.KEY = FIELD(PGM.NAME,"$",1):".PROCEDURES"   ;* USER PROCEDURES HELP EN
    TRY POINT
329       GO TO 1704
330 1702 H.KEY = HELP.KEY                              ;* CISCO HELP ENTRY POINT
331       GO TO 1704
332 1703 H.KEY = 'STD.COMMANDS'                        ;* CISCO COMMAND HELP ENTR
    Y POINT
333 1704 IF WINDOW.NO GE 12 THEN                       ;* OPERATOR IS TOO DEEP
334          THE.PROMPT = '65'
335          THE.HELP = ''
336          GOSUB 9200
337       END ELSE
338          IF HELP.KEY # '' THEN
339             OPEN '','DELETED.ITEMS' TO DELETED.ITEMS.FILE ELSE DEBUG
340             READV HELP.HEADING FROM HELP.FILE,'HELP.HEADING',1 ELSE HELP.HEADI
    NG = '\* HELP.HEADING record missing from the HELP file.'
341             IF HELP.HEADING[1,6] # '\RULER' THEN
342                READV HELP.HEADING FROM HELP.FILE,'HELP.HEADING',2 ELSE HELP.HEA
    DING = '\* HELP.HEADING record missing from the HELP file.'
343                IF HELP.HEADING[1,6] # '\RULER' THEN
344                   HELP.HEADING = 'HELP.HEADING record in HELP file is corrupted.
    No RULER in ATTR 1 or 2.'
345                END
346             END
347             READVU DUMMY FROM HELP.FILE,H.KEY,1 THEN
348                RELEASE HELP.FILE,H.KEY
349             END ELSE
350                * CREATE JET POINTER TO TEXT FILE
351                DUMMY     = '\* Update ':OCONV(DATE(),'D2/')
352                DUMMY<-1> = '\READ TEXT ':H.KEY
```

Operator Prompt and Response Program
STD.MESSAGE (Version 17)

```
353              WRITE DUMMY ON HELP.FILE,H.KEY
354              READVU DUMMY FROM FL.FILE,'HELP',28 ELSE DUMMY = ''
355              DUMMY<1,2> = DATE()
356              WRITEV DUMMY ON FL.FILE,'HELP',28
357           *
358           * DELETE DELETED.ITEMS RECORD IF THERE
359           *
360              DI.KEY = "HELP*":H.KEY
361              DELETE DELETED.ITEMS.FILE,DI.KEY
362           END
363           *
364           * PROCESS THE TEXT FILE RECORD
365           *
366           READ DUMMY FROM TXT.FILE,H.KEY THEN
367              IF DUMMY<1>[1,10] # '\* Update ' THEN
368                 HELP.HEADING = '\* Update ':OCONV(DATE(),'D2/'):AM:HELP.HEADIN
      G
369              END
370              DUMMY = INSERT(DUMMY,1,0,0,HELP.HEADING)
371              WRITE DUMMY ON WORK.FILE,H.KEY
372           END ELSE
373              DUMMY    = '\* Update ':OCONV(DATE(),'D2/')
374              DUMMY<-1> = HELP.HEADING
375              WRITE DUMMY ON WORK.FILE,H.KEY
376           END
377           CRT @(0,22):CL:'Loading Function Keys':
378           PROCESS = 1
379           FUN.KEY = 'JET-IN'
380           SAVE.LABELS = FUNCT.LABEL
381           SAVE.COMMANDS = FUNCT.COMMAND
382           PGMS.KEY = 'STD.FUNCTION.KEYS' ; GOSUB 8900
383           CRT PROTECT.MODE.OFF:
384           EXECUTE 'JET-IN WORK.':THIS.PORT:' ':H.KEY
385           CRT PROTECT.MODE.ON:
386           PROCESS = 3
387           FUNCT.LABEL = SAVE.LABELS
388           FUNCT.COMMAND = SAVE.COMMANDS
389           PGMS.KEY = 'STD.FUNCTION.KEYS' ; GOSUB 8900
390           READ DUMMY FROM WORK.FILE,H.KEY THEN
391              FOR AA = 1 TO 2
392                 IF DUMMY<AA>[1,6] = '\RULER' THEN
393                    DUMMY = DELETE(DUMMY,AA,0,0)
394                 END
395              NEXT AA
396              WRITE DUMMY ON TXT.FILE,H.KEY
397              DELETE WORK.FILE,H.KEY
398              READVU DUMMY FROM FL.FILE,'TEXT',28 ELSE DUMMY = ''
399              DUMMY<1,2> = DATE()
400              WRITEV DUMMY ON FL.FILE,'TEXT',28
401           *
402           * DELETE DELETED.ITEMS RECORD IF THERE
403           *
404              DI.KEY = "TEXT*":H.KEY
405              DELETE DELETED.ITEMS.FILE,DI.KEY
```

Appendix C - Page    8

Operator Prompt and Response Program
STD.MESSAGE (Version 17)

```
406            END ELSE
407            * TEXT FILE DELETED - DELETE HELP FILE POINTER
408            DELETE HELP.FILE,H.KEY
409            DELETE TXT.FILE,H.KEY
410            *
411            * PLACE RECORD INTO DELETED.ITEMS FILE FOR UPGRADE
412            *
413            DI.KEY = "HELP*":H.KEY
414            WRITE '' ON DELETED.ITEMS.FILE,DI.KEY
415            DI.KEY = "TEXT*":H.KEY
416            WRITE '' ON DELETED.ITEMS.FILE,DI.KEY
417          END
418          GOSUB 9500                                  ;* REFRESH THE SCREEN
419        END ELSE
420          THE.PROMPT = '3'
421          THE.HELP = ''
422          GOSUB 9200
423        END
424      END
425      RETURN
426 *
427 * HISTORY DISPLAY ROUTINE (.R)
428 *
429 2100 SCREEN.SUB = PGM.NAME:'.BGFG'
430      IF OCONV(SCREEN.SUB,'TMD;X;1;1') # '' THEN   ;* THERE IS A CATALOGED PROGRAM
431        PROCESS = 2
432        PGMS.KEY = 'STD.HISTORY.SUB' ; GOSUB 8900
433 2200   GOSUB 9500                                  ;* REFRESH BG & FG
434      END
435      RETURN
436 *
437 * SEND A MESSAGE TO A PORT (.B)
438 *
439 2300 THE.PROMPT = '305'
440      THE.HELP = ''
441      THE.LENG = 3
442      GOSUB 9220
443      BEGIN CASE
444        CASE ANS = 'E'
445          RETURN
446        CASE ANS = ''
447          RETURN
448        CASE NUM(ANS)
449          * OPERATOR ENTERED A PORT NUMBER
450          PORT.NO = ANS
451        CASE 1
452          * OPERATOR ENTERED INITIALS
453          PORT.NO = ''
454          EXECUTE 'LISTU' CAPTURING RESPONSE
455          BEGIN CASE
456            CASE OS.TYPE = 'RT'
457              FIRST = 5
458              SECTION = 2
```

Operator Prompt and Response Program
STD.MESSAGE (Version 17)

```
459              CASE OS.TYPE = 'GA'
460                 FIRST = 4
461                 SECTION = 3
462              END CASE
463              *
464              FOR X = FIRST TO X + 1 UNTIL RESPONSE<X> = ''
465                 * NO TRANSLATION REQUIRED
466                 LINE = TRIM(RESPONSE<X>)
467 *$INCLUDE BP.NATIVE STD.MESSAGE.397 ;* LINE = TRIM(RESPONSE<X>)
468                 IF ANS = "*" THEN
469                    PORT.NO<-1> = OCONV(FIELD(LINE,' ',1),'MCN')
470                 END ELSE
471                    IF FIELD(LINE,' ',SECTION) = ANS THEN
472                       PORT.NO<-1> = OCONV(FIELD(LINE,' ',1),'MCN')
473                    END
474                 END
475              NEXT X
476           END CASE
477           THE.PROMPT = '306'
478           THE.HELP = ''
479           THE.LENG = 46
480           GOSUB 9220
481           BEGIN CASE
482              CASE ANS = 'E'
483                 RETURN
484              CASE ANS = ''
485                 RETURN
486              CASE 1
487                 PORTS = DCOUNT(PORT.NO,AM)
488                 DUMMY = BELL:START.HOST.MSG:ANS'L#46':END.HOST.MSG
489                 ANS = ''
490                 FOR X = 1 TO PORTS
491                    PORT = PORT.NO<X>
492                    IF PORT # THIS.PORT THEN
493                       EXECUTE 'SEND-MSG ':PORT:',':DUMMY CAPTURING RESPONSE
494                       IF RESPONSE # '' THEN
495                          THE.PROMPT = RESPONSE
496                          THE.HELP = ''
497                          GOSUB 9200
498                       END
499                    END
500                 NEXT X
501           END CASE
502           RETURN
503 *
504 ***** DISPLAY THE MESSAGE
505 *
506 8000 IF INT(39 - PRMT.KEY.LEN / 2) + PRMT.KEY.LEN + LENG > 77 THEN
507         CRT @(0,VRT):CL:PRMT.KEY:" ":
508         HRZ = PRMT.KEY.LEN + 1
509      END ELSE
510         HORIZONTAL = INT(39 - PRMT.KEY.LEN / 2)
511         CRT @(0,VRT):CL: @(HORIZONTAL,VRT):PRMT.KEY:" ":
512         HRZ = HORIZONTAL + PRMT.KEY.LEN + 1
```

Appendix C - Page   10

Operator Prompt and Response Program
STD.MESSAGE (Version 17)

```
513        END
514        RETURN
515 *
516 * STANDARD CALL ROUTINE
517 *
518 $INCLUDE BP STD.CALL.INCLUDE$1
519 *
520 ***** SAVE DY.COM VARIABLES
521 *
522 9000 MAT SAVE.DY.COM = MAT DY.COM
523        RETURN
524 *
525 ***** RESTORE DY.COM VARIABLES
526 *
527 9050 MAT DY.COM = MAT SAVE.DY.COM
528        RETURN
529 *
530 * STANDARD MESSAGE ROUTINE
531 *
532 9200 PRINT BELL:
533        SAVE.LENG = LENG
534        SAVE.KEY  = HELP.KEY
535        GOSUB 9000                                      ;* SAVE COMMON VARIABLES
536        LENG      = 0
537        HELP.KEY  = THE.HELP
538        PRMT.KEY  = THE.PROMPT
539        GO TO 9230
540 9210 SAVE.LENG = LENG
541        SAVE.KEY  = HELP.KEY
542        GOSUB 9000                                      ;* SAVE COMMON VARIABLES
543        LENG      = 2
544        HELP.KEY  = THE.HELP
545        PRMT.KEY  = THE.PROMPT
546        GO TO 9230
547 9220 SAVE.LENG = LENG
548        SAVE.KEY  = HELP.KEY
549        GOSUB 9000                                      ;* SAVE COMMON VARIABLES
550        LENG      = THE.LENG
551        HELP.KEY  = THE.HELP
552        PRMT.KEY  = THE.PROMPT
553 9230 PGMS.KEY  = 'STD.MESSAGE' ; GOSUB 8900
554        GOSUB 9050                                      ;* RESTORE COMMON VARIABLES
555        IF DEBUG.FLAG THEN
556          CRT @(0,22):'STD.MESSAGE DEBUG POINT':
557          INPUT DUMMY:
558          CRT @(0,22):CL:
559        END
560        HELP.KEY = SAVE.KEY
561        SAVE.KEY = ''
562        LENG = SAVE.LENG
563        SAVE.LENG = ''
564        RETURN
565 *
```

Appendix C - Page  11

Operator Prompt and Response Program
STD.MESSAGE (Version 17)

```
566 * DISPLAY BG
567 *
568 9300 PROCESS=1                                          ;* DISPLAY BG
569      SCREEN.SUB = PGM.NAME:'.BGFG'
570      IF OCONV(SCREEN.SUB,'TMD;X;1;1') # '' THEN   ;* THERE IS A CATALOGED PR
    OGRAM
571         PGMS.KEY = SCREEN.SUB ; GOSUB 8900
572         IF ACTIVE.REC # '' THEN
573            PROCESS = 4
574            PGMS.KEY = SCREEN.SUB ; GOSUB 8900
575         END
576      END
577      RETURN
578 *
579 * DISPLAY FG
580 *
581 9400 IF ACTIVE.REC = '' THEN
582         PROCESS=2                                       ;* DISPLAY DATA FG
583      END ELSE
584         PROCESS=4                                       ;* DISPLAY HISTORY FG
585      END
586      SCREEN.SUB = PGM.NAME:'.BGFG'
587      IF OCONV(SCREEN.SUB,'TMD;X;1;1') # '' THEN   ;* THERE IS A CATALOGED PR
    OGRAM
588         CRT PROTECT.MODE.OFF:
589         PGMS.KEY = SCREEN.SUB ; GOSUB 8900
590         CRT PROTECT.MODE.ON:
591      END
592      IF ORIG.FIELD.LOC # '' THEN
593         CRT PROTECT.MODE.OFF:@(ORIG.FIELD.LOC<2>+ORIG.FIELD.LOC<3>,ORIG.FIEL
    D.LOC<1>):R.BOUNDRY:@(ORIG.FIELD.LOC<2>-1,ORIG.FIELD.LOC<1>):L.BOUNDRY:
594      END
595      RETURN
596 *
597 * CLEAR FG
598 *
599 9450 PROCESS=3                                          ;* CLEAR FG
600      SCREEN.SUB = PGM.NAME:'.BGFG'
601      IF OCONV(SCREEN.SUB,'TMD;X;1;1') # '' THEN   ;* THERE IS A CATALOGED PR
    OGRAM
602         PGMS.KEY = SCREEN.SUB ; GOSUB 8900
603      END
604      RETURN
605 *
606 * DISPLAY BG & FG WITHOUT RESTORING KEY DEFINITIONS
607 *
608 9500 SCREEN.SUB = PGM.NAME:'.BGFG'
609      GOSUB 9300
610      GOSUB 9400
611      RETURN
612 *
613 * DISPLAY BG & FG
614 *
615 9600 SCREEN.SUB = PGM.NAME:'.BGFG'
```

Appendix C - Page    12

Operator Prompt and Response Program
STD.MESSAGE (Version 17)

```
616       PGMS.KEY = 'STD.SCREEN' ; GOSUB 8900
617       PROCESS = 4
618       PGMS.KEY = 'STD.FUNCTION.KEYS' ; GOSUB 8900
619       GOSUB 9300
620       GOSUB 9400
621 9999 RETURN
622 END
```

[405] 1 items listed out of 1 items.

Appendix C - Page 13

```
                              Data Input Program
                            STD.INPUT (Version 18)
                       Copyright © 1990 by Creative Information System Co. Ltd.
    STD.INPUT$18
001 SUBROUTINE STD.INPUT$18
002 GO TO 9
003 * Program....: STD.INPUT
004 * Description: Standard Data Field Input Routine w/ editing
005 * Revision...: 18.0 - Change logic for display of data in local ter- minal
    area.
006 * Project....: 4.0 - SMRFs fixed since Release 3.2.
007 * Programmer.: David M. Murdock
008 * Copyright..: 1990 Creative Information Systems CO. Ltd.
009 *----------
010 * STD.INPUT
011 * DAVID MURDOCK   - 201-265-2812
012 * CREATIVE INFORMATION SYSTEMS
013 * STANDARD FIELD INPUT ROUTINE
014 *----------
015 *
016 *
017 *
018 *
019 *
020 *
021 *
022 *
023 *
024 *
025 $INCLUDE EQUATES SYSTEM.COMMON
026 *
027 $INCLUDE EQUATES TERMINAL
028 *
029 * SYSTEM ACF RECORD FIELDS
030 *
031     EQUATE OS.TYPE                TO ACF.SYS.REC(23)
032 ********************************************************************
033 9   IF DEBUG.FLAG THEN
034     CRT @(0,22):CL:'STD.INPUT DEBUG; FIELD.NO=(':FIELD.NO:');OLDVALUE=('
    :OLDVALUE:');PRE-LOADED INPUT=(':PRE.STORE:')':
035         INPUT DUMMY,1:
036         CRT @(0,22):CL:
037     END
038     READV DUMMY FROM TRM.FILE,THIS.PORT,17 ELSE DUMMY = ''
039     X = ''
040     IF DUMMY<1,1> = 1 THEN X = 'T'
041     IF DUMMY<1,1> = 2 THEN X = 'P'
042     IF TRM.LEVEL THEN
043         DUMMY = 'Operator: ':CURR.OP:'; Port: ':THIS.PORT:'; Queue: ':DEFAUL
    T.QUEUE:'; Level: ':WINDOW.NO:' ':X
044         CRT START.HOST.MSG:DUMMY'L#46':END.HOST.MSG:
045         IF TRM.MSG.DISP.FLAG = 2 THEN
046             DUMMY = 'Client: ':CURRENT.CLIENT<1,1,2>
047             DUMMY = DUMMY:'; Pol Seq: ':CURRENT.POLICY<1,1,2>:'; Eff Date: ':C
    URRENT.EFF.DATE
048             DUMMY = DUMMY:'; Loss Seq: ':CURRENT.LOSS<1,1,2>:'; End No: ':CURR
    ENT.END.NO
```

Appendix D - Page    1

Data Input Program
STD.INPUT (Version 18)

```
049          DUMMY = DUMMY:';  Trans: ':CURRENT.TRAN
050          CRT @(0,22):DUMMY'L#80':CS:
051        END
052      END
053      INT.DATA = OLDVALUE
054      GOSUB 7080                            ;* CONVERT DATA TO EXTERN
   AL FORM
055      GOSUB 7090                            ;* DISPLAY DATA
056      IF SKIP.FLAG THEN
057        * THIS FIELD WILL BE DEFAULTED AND SKIPPED IF IT IS NOT MANDITORY
058        GO TO 55
059      END
060      * GET ANY PRE-STORED INPUT OR GET INPUT FROM KEYBOARD
061 20   IF PRE.STORE = '' THEN PRE.STORE = 'ZZ9Z'
062      IF PRE.STORE<1,1> # 'ZZ9Z' THEN
063        ANS = PRE.STORE<1,1>
064        IF ANS = '' THEN ANS = OLDVALUE
065        PRE.STORE = DELETE(PRE.STORE,1,1,0)
066      END ELSE
067        CRT PROTECT.MODE.OFF:@(HRZ+LENG,VRT):R.BOUNDRY:SPACE(ILEN-1):@(HRZ-1
    ,VRT):L.BOUNDRY:
068        ANS = ENTRY
069        PGMS.KEY = 'STD.WP' ; GOSUB 8900
070        CRT @(HRZ-1,VRT):TRM.RESET.NV:PROTECT.MODE.ON:
071      END
072      ENTRY = ANS
073      IF DEBUG.FLAG THEN
074        IF ENTRY[1,2] # '.$' THEN
075          CRT @(0,22):CL:'STD.INPUT AFTER WP DEBUG ;ENTRY=(':ENTRY:')':
076          INPUT DUMMY,1:
077          CRT @(0,22):CL:
078        END
079      END
080      ECHO ON
081 40   IF ESC.REDISPLAY THEN
082        IF MODE = '' THEN
083          IF OCONV(ENTRY,'MCU') = '.E' THEN
084            NULL
085          END ELSE
086            GOSUB 9500                      ;* REFRESH THE SCREEN
087          END
088        END ELSE
089          GOSUB 9500                        ;* REFRESH THE SCREEN
090        END
091        ESC.REDISPLAY = 0
092      END
093      BEGIN CASE
094        CASE ENTRY[1,1] = CHAR(11)          ;* OPERATOR ENTERED "<UP ARROW>" -
    BACK UP
095          DISP.DATA = INT.DATA
096          GOSUB 200
097          GO TO 99
098        CASE ENTRY[1,1] = CHAR(30)          ;* OPERATOR ENTERED "<HOME>" - BAC
    K UP TO FIRST FIELD
```

Appendix D - Page    2

Data Input Program
STD.INPUT (Version 18)

```
099             DISP.DATA = INT.DATA
100             GOSUB 200
101             GO TO 99
102         CASE ENTRY[1,1] = CHAR(10)        ;* OPERATOR ENTERED "<DOWN ARROW>"
     - GO DOWN
103             IF MODE[1,1] = 'A' THEN
104                 SKIP.FLAG = ENTRY[2,3]
105                 DISP.DATA = OLDVALUE
106                 GOSUB 200
107                 GO TO 55
108             END ELSE
109                 DISP.DATA = INT.DATA
110                 GOSUB 200
111                 GO TO 99
112             END
113         CASE ENTRY[1,1] = CHAR(9)         ;* OPERATOR ENTERED "<TAB>" - GO U
     P OR DOWN
114             IF MODE[1,1] = 'A' AND ENTRY[2,5] > 0 THEN  ;* DOWN IN ADD MODE - C
     HECK THE FIELDS
115                 SKIP.FLAG = 999
116                 DY.TAB = DY.TAB<1>
117                 GO TO 55
118             END ELSE                      ;* CHANGE MODE - LOGIC IN CALLING
     PGM
119                 DISP.DATA = INT.DATA
120                 GOSUB 200
121                 GO TO 99
122             END
123 50      CASE ENTRY[1,1] = ESC2            ;* OPERATOR ENTER A COMMA
     ND
124             ENTRY = OCONV(ENTRY,'MCU')
125             BEGIN CASE
126                 CASE ENTRY[2,1] = 'H'  ; GOSUB 1000    ;* HELP ABOUT THE FIELD
127                 CASE ENTRY[2,1] = '?'  ; GOSUB 1100    ;* HELP ABOUT THE COMMAND
     S
128                 CASE ENTRY[2,1] = 'I'  ; GOSUB 1150    ;* HELP ABOUT PROCEDURES
129                 CASE ENTRY[2,1] = 'S'  ; GOSUB 1200    ;* SEARCH AND LIST
130                 CASE ENTRY[2,1] = 'A'  ; GOSUB 1300    ;* ADD A RECORD - FILE MA
     INTENANCE PGM
131                 CASE ENTRY[2,1] = 'M'  ; GOSUB 1400    ;* MENU
132                 CASE ENTRY[2,1] = 'Y'  ; GOSUB 1425    ;* PROMPT-R
133                 CASE ENTRY[2,1] = 'Z'  ; GOSUB 1450    ;* CLIENT INQUIRY
134                 CASE ENTRY[2,2] = 'PP' ; GOSUB 1550    ;* PRINT REPORT
135                 CASE ENTRY[2,1] = 'P'  ; GOSUB 1500    ;* PRINT SCREEN
136                 CASE ENTRY[2,2] = '$$' ; GOSUB 1650    ;* DEBUG MODE TO CHANGE T
     HE TERMINAL RECORD
137                 CASE ENTRY[2,1] = '$'  ; GOSUB 1600    ;* DEBUG MODE
138                 CASE ENTRY[2,1] = 'U'  ; GOSUB 1700    ;* USER HELP ENTRY
139                 CASE ENTRY[2,1] = 'V'  ; GOSUB 1701    ;* CISCO PROCEDURES ENTRY
140                 CASE ENTRY[2,2] = 'WW' ; GOSUB 1703    ;* CISCO COMMAND HELP ENT
     RY
141                 CASE ENTRY[2,1] = 'W'  ; GOSUB 1702    ;* CISCO HELP ENTRY
142                 CASE ENTRY[2,1] = ''   ; GOSUB 1800    ;* USER WANTS SAME FIELD
```

Appendix D - Page 3

```
                       Data Input Program
                       STD.INPUT (Version 18)

FROM LAST REC
143         CASE ENTRY[2,2] = '..'; GOSUB 1850      ;* USER WANTS SAME RECORD
      FROM LAST REC FILED
144         CASE ENTRY[2,1] = '#' ; GOSUB 1900      ;* GET NEXT SEQUENCE NUMB
      ER
145         CASE ENTRY[2,1] = 'X' ; GOSUB 2000      ;* FILE CROSS REFERENCE D
      ISPLAY
146         CASE ENTRY[2,1] = 'C' ; GOSUB 2200      ;* REFRESH THE SCREEN
147         CASE ENTRY[2,1] = 'B' ; GOSUB 2300      ;* SEND A PORT MESSAGE
148         CASE ENTRY[2,1] = 'T' ; GOSUB 2400      ;* TUTORIAL MODE
149         CASE ENTRY[2,1] = 'Q'                   ;* OPERATOR WANTS TO QUIT
      THIS TRANSACTION
150            PRMT.KEY = "4"
151            GOSUB 9210
152            IF ANS = "Y" THEN GO TO 99
153            GO TO 9
154         CASE ENTRY[2,1] = 'E'                   ;* OPERATOR WANTS TO EXIT
      LIS OR PROGRAM
155            BEGIN CASE
156              CASE MAN = 'KEY'
157              CASE MAN = 'LINE'
158              CASE 1
159                PRMT.KEY = 49
160                GOSUB 9200
161                GO TO 9
162            END CASE
163            GO TO 99
164         CASE ENTRY[2,1] = 'F'                   ;* OPERATOR WANTS TO FINIS
      H THE SCREEN AND FILE THE RECORD
165            GO TO 55
166         CASE ENTRY[2,1] = 'N'                   ;* OPERATOR WANTS TO FINIS
      H THE SCREEN BUT NOT FILE THE RECORD
167 55         BEGIN CASE
168              CASE MODE = ''                     ;* ENTERED .N OR .F IN KEY
          FIELD - NG
169                PRMT.KEY = 176
170                GOSUB 9200
171                GO TO 9
172              CASE MODE[1,1] = 'C'               ;* CHANGE MODE - RETURN
173                DISP.DATA = OLDVALUE             ;* RESISPLAY OLDVALUE
174                GOSUB 200
175                IF SKIP.FLAG < 998 THEN SKIP.FLAG = SKIP.FLAG - 1
176                GO TO 99
177              CASE 1                             ;* ADD MODE
178                IF SKIP.FLAG = 999 THEN          ;* THIS IS A TAB - SHOULD
      WE STOP?
179                  IF DY.TAB<2> # '' THEN         ;* YES - THIS IS THE TAB F
      IELD
180                    SKIP.FLAG = 0
181                    GO TO 9
182                  END
183                END
184            END CASE
185            IF MAN = "Y" AND OLDVALUE = "" THEN  ;* CAN'T SKIP A MANDITORY
```

Appendix D - Page    4

Data Input Program
STD.INPUT (Version 18)

```
            FIELD
186                 PRMT.KEY = 5
187                 GOSUB 9200
188                 GO TO 9
189             END
190             IF SKIP.FLAG THEN                        ;* WE ARE IN SKIP MODE
191                 IF SKIP.FLAG < 998 THEN SKIP.FLAG = SKIP.FLAG - 1
192             END ELSE
193                 IF ENTRY[2,1] = 'N' THEN             ;* THIS IS THE FIELD THAT
    THE OP ENTERED '.N' - SET THE SKIP.FLAG TO 997
194                     SKIP.FLAG = 997
195                 END ELSE                             ;* THIS IS THE FIELD THAT
    THE OP ENTERED '.F' - SET THE SKIP.FLAG TO 998
196                     SKIP.FLAG = 998
197                 END
198             END
199             IF MAN = "KEY" OR MAN = "LINE" THEN ;* FOR "KEY" OR "LINE" FIE
    LDS, THERE IS NO DEFAULTING TO DO
200                 IF SKIP.FLAG THEN
201                     IF SKIP.FLAG < 998 THEN SKIP.FLAG = SKIP.FLAG - 1
202                     ENTRY = ESC2:'N'
203                 END
204                 GO TO 99
205             END
206             ENTRY = OLDVALUE                         ;* PLACE ICONV OF DATA IN
    TO ENTRY
207             GO TO 60                                 ;* GO TO PRINT
208         CASE NUM(ENTRY[2,1])                         ;* OPERATOR ENTERED DECIM
    ALS ONLY
209             GO TO 58
210         CASE 1                                       ;* OPERATOR ENTERED AN IN
    VALID ESCAPE COMMAND
211             PRMT.KEY = '64'
212             GOSUB 9200
213             GO TO 9
214         END CASE                                     ;* END OF COMMAND LOGIC
215     CASE ENTRY[1,1] = ' ' AND ENTRY[2,1] # ' '   ;* OPERATOR WANTS TO CLEA
    R THE FIELD
216 57      IF MAN = "Y" THEN                            ;* THIS IS A MANDITORY FI
    ELD AND MAY NOT BE NULLED
217             PRMT.KEY = 5
218             GOSUB 9200
219             GO TO 9
220         END
221         CRT @(HRZ,VRT): SPACE(LENG+ILEN):
222         ENTRY = ""                                   ;* SET FIELD TO NULL AND
    GO TO PRINT
223         CASE 1
224 58      IF ENTRY = '' THEN                           ;* OPERATOR ENTERED A <RE
    TURN> ONLY AFTER DELETING FIELD
225             GO TO 57                                 ;* OR ENTRY AND OLDVALUE
    ARE NULL
226         END
227         IF PATT # '' THEN                            ;* ARE THERE PATTERNS TO
```

Appendix D - Page 5

Data Input Program
STD.INPUT (Version 18)

```
              CHECK
228              IF CON<1,1>[1,2] = 'MT' THEN        ;* OPERATOR ENTERED A TIME
229                  ENTRY = ICONV(ENTRY,'MCU')       ;* MAKE SURE THAT "AM" OR "PM" ARE IN CAPS
230              END
231              BEGIN CASE
232                  CASE PATT = 'OX'
233                  CASE PATT = 'ON'                 ;* IGNORE STANDARD PATTERNS GENERATED BY EDIT GEN
234                  CASE 1                           ;* YES - CHECK IT
235                      IF ENTRY # '' THEN
236                          IF NOT(ENTRY MATCHES PATT) THEN  ;* DATA NG
237                              PRMT.KEY = "7"
238                              GOSUB 9200
239                              GO TO 9
240                          END
241                      END
242              END CASE
243          END
244          BEGIN CASE
245              CASE CON<1,1>   = ""                 ;* NO CONVERSION - GO TO PRINT
246                  GO TO 60
247              CASE CON<1,1>[1,1] = 'D'             ;* OPERATOR ENTERED A DATE IN FORMAT MMDDYY
248                  IF ENTRY = '' THEN GO TO 60
249                  IF INDEX(ENTRY,'/',1) THEN NULL ELSE
250                      ENTRY = OCONV(ENTRY,'MCN')
251                      ENTRY = ENTRY[1,2]:"/":ENTRY[3,2]:"/":ENTRY[5,2]
252                  END
253                  ENTRY = ICONV(ENTRY,CON<1,1>)
254                  IF ENTRY = "" THEN               ;* DATE IS INVALID
255                      PRMT.KEY = 8
256                      GOSUB 9200
257                      GO TO 9
258                  END
259                  GO TO 60                         ;* GO TO PRINT
260              CASE CON<1,1> = 'MCN' AND DY.TAB<2>=2  ;* OPERATOR ENTERED A LIST COMMAND
261                  ENTRY = ICONV(ENTRY,'MCU')       ;* MAKE SURE COMMAND IS UPPER CASE
262                  GO TO 60
263              CASE CON<1,1> = 'MCN'                ;* OPERATOR ENTERED A NUMERIC FIELD - STRIP SPECIAL CHARS
264              CASE CON<1,1>[1,2] = 'MR'            ;* OPERATOR ENTERED A NUMERIC FIELD - STRIP SPECIAL CHARS
265              CASE CON<1,1>[1,2] = 'MT'            ;* OPERATOR ENTERED A TIME
266                  IF ENTRY = '' THEN GO TO 60      ;* NULL ENTERED - SKIP ICONV
267                  ENTRY = ICONV(ENTRY,CON<1,1>)
268                  IF ENTRY = "" THEN               ;* TIME IS INVALID
269                      PRMT.KEY = 8
```

Appendix D - Page 6

Data Input Program
STD.INPUT (Version 18)

```
270                 GOSUB 9200
271                 GO TO 9
272               END
273               GO TO 60
274             CASE 1                              ;* FIELD HAS SOME OTHER INPUT CONVERSION
275               ENTRY = ICONV(ENTRY,'MCU')
276               BEGIN CASE
277                 CASE OS.TYPE = 'RT' AND CON<1,1> = 'MCAN'
278                 * NO MCAN ON IBM RT - CALL PROGRAM
279                   PGMS.KEY = 'STD.MCAN' ; GOSUB 8900
280                 CASE OS.TYPE = 'RT' AND CON<1,1> = 'MCT'
281                 * NO MCT ON IBM RT - CALL PROGRAM
282                   PGMS.KEY = 'STD.MCT' ; GOSUB 8900
283                 CASE 1
284                   ENTRY = ICONV(ENTRY,CON<1,1>)
285               END CASE
286               IF MAN = 'KEY' THEN                ;* THIS IS A KEY FIELD
287                 IF MODE # '' THEN               ;* PROGRAM IS IN CHANGE MODE
288                   IF OLDVALUE # ENTRY THEN      ;* OPERATOR IS CHANGING THE KEY FIELD
289                     PRMT.KEY = 88
290                     GOSUB 9210
291                     BEGIN CASE
292                       CASE ANS = 'Y'            ;* OK - CONTINUE
293                       CASE 1        ;GO TO 9    ;* GO BACK TO ENTRY
294                     END CASE
295                   END
296                 END
297               END
298               IF ENTRY = "" THEN                ;* THE FINAL DEFAULTED ENTRY IS STILL NULL
299                 BEGIN CASE
300                   CASE MAN = 'LINE'             ;* LIS KEY FIELD - PROCEED WITH FIRST DATA FIELD
301                   CASE MAN = 'KEY'  ; GO TO 99  ;* KEY FIELD - ANY TESTING IS IN THE CALLING PGM
302                   CASE MAN = ''                 ;* NON-MANDITORY FIELD
303                   CASE 1                        ;* THIS MUST BE A MANDATORY FIELD
304                     PRMT.KEY = '168'
305                     GOSUB 9200
306                     GOTO 9
307                 END CASE
308               END
309               GO TO 60                          ;* GO TO PRINT
310             END CASE
311           *
312           * AT THIS POINT, WE ARE DEALING WITH A NUMBER
313           *
314           * ENTRY = EXCHANGE(ENTRY,'24','FF')   ;* STRIP ANY $
315           AA1A.EXCH = ENTRY
316           CONVERT "$" TO CHAR(255) IN AA1A.EXCH
```

Data Input Program
STD.INPUT (Version 18)

```
317           ENTRY = AA1A.EXCH
318 *$INCLUDE BP.NATIVE STD.INPUT.305 ;* ENTRY = EXCHANGE(ENTRY,'24','FF') ;* S
    TRIP ANY $
319         * ENTRY = EXCHANGE(ENTRY,'2B','FF')       ;* STRIP ANY +
320           AA1A.EXCH = ENTRY
321           CONVERT "+" TO CHAR(255) IN AA1A.EXCH
322           ENTRY = AA1A.EXCH
323 *$INCLUDE BP.NATIVE STD.INPUT.306 ;* ENTRY = EXCHANGE(ENTRY,'2B','FF') ;* S
    TRIP ANY +
324         * ENTRY = EXCHANGE(ENTRY,'2C','FF')       ;* STRIP ANY ,
325           AA1A.EXCH = ENTRY
326           CONVERT "," TO CHAR(255) IN AA1A.EXCH
327           ENTRY = AA1A.EXCH
328 *$INCLUDE BP.NATIVE STD.INPUT.307 ;* ENTRY = EXCHANGE(ENTRY,'2C','FF') ;* S
    TRIP ANY ,
329           IF NOT(NUM(ENTRY)) THEN               ;* STILL FAILED NUMERIC TES
    T
330             PRMT.KEY = "9"
331             GOSUB 9200
332             GO TO 9
333           END
334           IF INDEX(ENTRY,'.',1) # 0 THEN        ;* ENTRY CONTAINS DECIMAL
    PLACES - VERIFY NUMBER ENTERED
335             NO.OF.DEC = CON<1,1>[3,1]
336             IF NUM(NO.OF.DEC) THEN              ;* STD "MR#" CONVERSION -
    SKIP TEST
337               IF LEN(FIELD(ENTRY,'.',2)) > NO.OF.DEC THEN
338                 PRMT.KEY = '181~':NO.OF.DEC
339                 GOSUB 9200
340                 GO TO 9
341               END
342             END
343           END
344           ENTRY=ICONV(ENTRY,CON<1,1>)
345           OCONV.ENTRY = OCONV(ENTRY,CON<1,2>)
346           OCONV.LEN = LEN(OCONV.ENTRY)
347           IF CON<1,3> AND OCONV.LEN = LENG AND OCONV.ENTRY[1,1] # '-' THEN
348           * THIS IS A "MONY" TYPE FIELD
349           * DATA ENTERED IS EQUAL TO FIELD LENGTH
350           * MOST SIGNIFICANT CHARACTER IS NOT A "-"
351           PRMT.KEY = 10
352           GOSUB 9200
353           GO TO 9
354           END ELSE
355             IF OCONV.LEN > LENG THEN
356               PRMT.KEY = 10
357               GOSUB 9200
358               GO TO 9
359             END
360           END
361         END CASE
362 60    DISP.DATA = ENTRY                         ;* DISPLAY THE FIELD
363       GOSUB 200
364 99    EXT.INT.DEF = ''
```

Appendix D - Page   8

```
                         Data Input Program
                         STD.INPUT (Version 18)

365       RETURN
366 *
367 * DISPLAY THE DATA
368 *
369 200 IF CON<1,2> = '' THEN
370         CRT @(HRZ,VRT):DISP.DATA MASK:
371       END ELSE
372         CRT @(HRZ,VRT):OCONV(DISP.DATA,CON<1,2>) MASK:
373       END
374       RETURN
375 *
376 * HELP ROUTINE (.H)
377 *
378 1000 IF HELP.KEY # '' THEN
379         GOSUB 9000                                      ;* SAVE COMMON VARIABLES
380         PGMS.KEY = 'STD.HELP' ; GOSUB 8900
381         GOSUB 9050                                      ;* RESTORE COMMON VARIABL
    ES
382         ESC.REDISPLAY = 1
383         CRT PROTECT.MODE.OFF:@(HRZ,VRT):SPACE(LENG):PROTECT.MODE.ON:
384         RETURN TO 9                                     ;* VALIDATE THE ENTERED DA
    TA
385       END ELSE
386         PRMT.KEY = '3'
387         GOSUB 9200
388       END
389       RETURN TO 9
390 *
391 * HELP WITH COMMANDS (.?)
392 *
393 1100 GOSUB 9000                                         ;* SAVE COMMON VARIABLES
394       BEGIN CASE
395         CASE MAN = 'KEY'    ; HELP.KEY = 'STD.KEY'
396         CASE MAN = 'LINE'   ; HELP.KEY = 'STD.LIS'
397         CASE 1              ; HELP.KEY = 'STD.FIELD'
398       END CASE
399       PGMS.KEY = 'STD.HELP' ; GOSUB 8900
400       GOSUB 9050                                        ;* RESTORE COMMON VARIABL
    ES
401       GOSUB 9500                                        ;* REFRESH THE SCREEN
402       RETURN TO 9
403 *
404 * HELP WITH PROCEDURES (.I)
405 *
406 1150 GOSUB 9000                                         ;* SAVE COMMON VARIABLES
407       BEGIN CASE
408         CASE PGM.NAME # ''
409           HELP.KEY = FIELD(PGM.NAME,"$",1):'.PROCEDURES'
410           PGMS.KEY = 'STD.HELP' ; GOSUB 8900
411           GOSUB 9050                                    ;* RESTORE COMMON VAR
    IABLES
412           GOSUB 9500                                    ;* REFRESH THE SCREEN
413         CASE 1               ; HELP.KEY = 'STD.FIELD'
```

Appendix D - Page   9

Data Input Program
STD.INPUT (Version 18)

```
414            PRMT.KEY = 382
415            GOSUB 9200
416         END CASE
417         RETURN TO 9
418 *
419 * FILE LISTING (.S)
420 *
421 1200 BEGIN CASE
422         CASE MAN = 'LINE'
423            PRMT.KEY = 80
424            GOSUB 9200
425         CASE REF.FILE = ''
426            PRMT.KEY = '32'
427            GOSUB 9200
428         CASE 1
429            GOSUB 9000                                  ;* SAVE COMMON VARIABLE
S
430            ORIG.FIELD.LOC = VRT:AM:HRZ:AM:LENG         ;* SAVE ORIGINAL FIELD
   LOCATION
431            PGMS.KEY = 'STD.LIST' ; GOSUB 8900
432            GOSUB 9050                                  ;* RESTORE COMMON VARIA
BLES
433            ORIG.FIELD.LOC = ''
434            ESC.REDISPLAY = 1
435            CRT PROTECT.MODE.OFF:@(HRZ,VRT):SPACE(LENG):PROTECT.MODE.ON:
436         END CASE
437         RETURN TO 9
438 *
439 * ADD A RECORD - FILE MAINTENANCE (.A)
440 *
441 1300 BEGIN CASE
442         CASE REF.FILE = ''                             ;* THERE IS NO REFERENCE
   FILE
443            PRMT.KEY = '32'
444            GOSUB 9200
445         CASE MAN = 'LINE'
446            PRMT.KEY = 81
447            GOSUB 9200
448         CASE MAN = 'KEY'
449            PRMT.KEY = 82
450            GOSUB 9200
451         CASE 1
452            READV NEXT.PROGRAM FROM FL.FILE,REF.FILE,10 ELSE NEXT.PROGRAM = ''

453            IF NEXT.PROGRAM = '' THEN NEXT.PROGRAM = REF.FILE:".MAIN"
454            MAIN.LOC = INDEX(NEXT.PROGRAM,'.MAIN',1)
455            PGMS.KEY = NEXT.PROGRAM[1,MAIN.LOC-1]
456            READV ID FROM PGMS.FILE,PGMS.KEY,2 ELSE ID = NEXT.PROGRAM
457            IF ID = '' THEN ID = NEXT.PROGRAM
458            IF OCONV(ID,'TMD;X;1;1') # '' THEN ;* THERE IS A CATALOGED PROGRAM

459               IF OLDVALUE # '' THEN
460                  IF EXT.INT.DEF THEN
461                     * PASS INTERNAL KEY
```

Appendix D - Page 10

Data Input Program
STD.INPUT (Version 18)

```
462                 NEXT.COM.AREA = HDR.REC(AMC)<1,VMC,SVMC>
463               END ELSE
464                * PASS EXTERNAL KEY
465                 NEXT.COM.AREA = OLDVALUE
466               END
467             END ELSE
468               NEXT.COM.AREA = 'ZZ8Z' ;* FIELD EMPTY - GET KEY IN FILE MAINTE
    NANCE PGM
469           END
470           PGMS.KEY = 'STD.EXECUTE' ; GOSUB 8900
471           GOSUB 9500                                    ;* REFRESH THE SCREEN
472         END ELSE                                        ;* THERE IS NO FM PROGRAM

473           PRMT.KEY = '33'
474           GOSUB 9200
475         END
476       END CASE
477       RETURN TO 9
478 *
479 * MENU (.M)
480 *
481 1400 NEXT.PROGRAM = 'MENU.DRIVER'
482      NEXT.COM.AREA = ''
483      PGMS.KEY = 'STD.EXECUTE' ; GOSUB 8900
484      GOSUB 9500                                         ;* REFRESH THE SCREEN
485      RETURN TO 9
486 *
487 * ACCESS (.Y)
488 *
489 1425 NEXT.PROGRAM = 'RB.100.MAIN'
490      PGMS.KEY = 'STD.EXECUTE' ; GOSUB 8900
491      GOSUB 9500                                         ;* REFRESH THE SCREEN
492      RETURN TO 9
493 *
494 * CLIENT INQUIRY (.Z)
495 *
496 1450 NEXT.PROGRAM = 'AR.200.MAIN'
497      IF CURRENT.CLIENT # '' THEN
498         NEXT.COM.AREA = CURRENT.CLIENT<1,1,1>
499       END ELSE
500         NEXT.COM.AREA = 'ZZ9Z'
501       END
502      PGMS.KEY = 'STD.EXECUTE' ; GOSUB 8900
503      GOSUB 9500                                         ;* REFRESH THE SCREEN
504      RETURN TO 9
505 *
506 * PRINT THE SCREEN (.P)
507 *
508 1500 INT.DATA = OLDVALUE
509      GOSUB 7080                                         ;* CONVERT DATA TO EXTERN
    AL FORM
510      GOSUB 7090                                         ;* DISPLAY DATA
511      SAVE.PRMT.KEY=PRMT.KEY
512      PROCESS = ''
```

Appendix D - Page 11

```
                             Data Input Program
                             STD.INPUT (Version 18)

513        STD.ARG(1) = 'STD.SCREEN.PRINT'
514        STD.ARG(2) = 1
515        PGMS.KEY = 'STD.PRINTER.ASSIGN' ; GOSUB 8900
516        PGMS.KEY = 'STD.SCREEN.PRINT'   ; GOSUB 8900
517        PGMS.KEY = 'STD.PRINTER.RESET'  ; GOSUB 8900
518        PRMT.KEY=SAVE.PRMT.KEY
519        RETURN TO 9
520 *
521 * PRINT THE REPORT (.PP)
522 *
523 1550 NEXT.PROGRAM = PGM.NAME:'.PROC'
524      PGMS.KEY = NEXT.PROGRAM
525      READV ID FROM PGMS.FILE,PGMS.KEY,2 ELSE ID = NEXT.PROGRAM
526      IF ID = '' THEN ID = NEXT.PROGRAM
527      IF OCONV(ID,'TMD;X;1;1') # '' THEN      ;* THERE IS A CATALOGED REPORT PR
    OGRAM
528         NEXT.COM.AREA = INT.HDR.KEY
529         PGMS.KEY = 'STD.EXECUTE' ; GOSUB 8900
530         GOSUB 9500                              ;* REFRESH THE SCREEN
531      END ELSE                                   ;* THERE IS NO FM PROGRAM
532         PRMT.KEY = 148
533         GOSUB 9200
534      END
535      RETURN TO 9
536 *
537 * TOGGLE IN AND OUT OF DEBUG MODE (.$)
538 *
539 1600 IF DEBUG.FLAG THEN
540         DEBUG.FLAG = 0
541         CRT @(0,23):CL:'DEBUG.FLAG OFF':
542      END ELSE
543         DEBUG.FLAG = 1
544         CRT @(0,23):CL:'DEBUG.FLAG ON':
545      END
546      ENTRY = ''
547      INT.DATA = OLDVALUE
548      GOSUB 7080                                 ;* CONVERT DATA TO EXTERN
    AL FORM
549      GOSUB 7090                                 ;* DISPLAY DATA
550      RETURN TO 20
551 *
552 * MODIFY THE TERMINAL FILE RECORD (.$$)
553 *
554 1650 PRMT.KEY = 294
555      SAVE.LENG = LENG
556      GOSUB 9210
557      BEGIN CASE
558         CASE ANS = 'E'
559         CASE ANS = ''
560         CASE NUM(ANS)
561            OPEN 'DICT','TERMINAL' TO DT.FILE ELSE DEBUG
562            T.ATTR = ANS
563            READV DESC FROM DT.FILE,T.ATTR,3 ELSE DESC = 'UNKNOWN'
564            READVU T.DATA FROM TRM.FILE,THIS.PORT,T.ATTR THEN
```

Appendix D - Page    12

Data Input Program
STD.INPUT (Version 18)

```
565           PRMT.KEY = 'Old ':DESC:' (':T.DATA:')'
566           GOSUB 9200
567           PRMT.KEY = 'New ':DESC:': '
568           LENG = 40
569           GOSUB 9220
570           IF ANS # 'E' THEN
571             WRITEV ANS ON TRM.FILE,THIS.PORT,T.ATTR
572             TRM.REC(T.ATTR) = ANS
573           END ELSE
574             RELEASE TRM.FILE,THIS.PORT
575           END
576         END
577       END CASE
578       ENTRY = ''
579       LENG = SAVE.LENG
580       INT.DATA = OLDVALUE
581       GOSUB 7080                                      ;* CONVERT DATA TO EXTERNAL FORM
582       GOSUB 7090                                      ;* DISPLAY DATA
583       RETURN TO 9
584 *
585 * OPERATOR WANTS TO ENTER SOME HELP TEXT (.U)/(.W)/(.V)/(.WW)
586 *
587 1700 H.KEY = HELP.KEY:"*USER"                         ;* USER HELP ENTRY POINT
588       GO TO 1704
589 1701 H.KEY = FIELD(PGM.NAME,"$",1):".PROCEDURES"      ;* USER PROCEDURES HELP ENTRY POINT
590       GO TO 1704
591 1702 H.KEY = HELP.KEY                                 ;* CISCO HELP ENTRY POINT
592       GO TO 1704
593 1703 BEGIN CASE
594       CASE MAN = 'KEY'    ; H.KEY = 'STD.KEY'
595       CASE MAN = 'LINE'   ; H.KEY = 'STD.LIS'
596       CASE 1              ; H.KEY = 'STD.FIELD'
597       END CASE
598 1704 IF WINDOW.NO GE 12 THEN                          ;* OPERATOR IS TOO DEEP
599       PRMT.KEY = '65'
600       GOSUB 9200
601     END ELSE
602       IF HELP.KEY # '' THEN
603         OPEN '','DELETED.ITEMS' TO DELETED.ITEMS.FILE ELSE DEBUG
604         READV HELP.HEADING FROM HELP.FILE,'HELP.HEADING',1 ELSE HELP.HEADING = '\* HELP.HEADING record missing from the HELP file.'
605         IF HELP.HEADING[1,6] # '\RULER' THEN
606           READV HELP.HEADING FROM HELP.FILE,'HELP.HEADING',2 ELSE HELP.HEADING = '\* HELP.HEADING record missing from the HELP file.'
607           IF HELP.HEADING[1,6] # '\RULER' THEN
608             HELP.HEADING = 'HELP.HEADING record in HELP file is corrupted. No RULER in ATTR 1 or 2.'
609           END
610         END
611         READVU DUMMY FROM HELP.FILE,H.KEY,1 THEN
612           RELEASE HELP.FILE,H.KEY
613         END ELSE
```

Appendix D - Page 13

Data Input Program
STD.INPUT (Version 18)

```
614            * CREATE JET POINTER TO TEXT FILE
615            DUMMY       = '\* Update ':OCONV(DATE(),'D2/')
616            DUMMY<-1> = '\READ TEXT ':H.KEY
617            WRITE DUMMY ON HELP.FILE,H.KEY
618            READVU DUMMY FROM FL.FILE,'HELP',28 ELSE DUMMY = ''
619            DUMMY<1,2> = DATE()
620            WRITEV DUMMY ON FL.FILE,'HELP',28
621            *
622            * DELETE DELETED.ITEMS RECORD IF THERE
623            *
624            DI.KEY = "HELP*":H.KEY
625            DELETE DELETED.ITEMS.FILE,DI.KEY
626          END
627          *
628          * PROCESS THE TEXT FILE RECORD
629          *
630          READ DUMMY FROM TXT.FILE,H.KEY THEN
631            IF DUMMY<1>[1,10] # '\* Update ' THEN
632              HELP.HEADING = '\* Update ':OCONV(DATE(),'D2/'):AM:HELP.HEADING
633            END
634            DUMMY = INSERT(DUMMY,1,0,0,HELP.HEADING)
635            WRITE DUMMY ON WORK.FILE,H.KEY
636          END ELSE
637            DUMMY       = '\* Update ':OCONV(DATE(),'D2/')
638            DUMMY<-1> = HELP.HEADING
639            WRITE DUMMY ON WORK.FILE,H.KEY
640          END
641          CRT @(0,22):CL:'Loading Function Keys':
642          PROCESS = 1
643          FUN.KEY = 'JET-IN'
644          SAVE.LABELS = FUNCT.LABEL
645          SAVE.COMMANDS = FUNCT.COMMAND
646          PGMS.KEY = 'STD.FUNCTION.KEYS' ; GOSUB 8900
647          CRT PROTECT.MODE.OFF:
648          EXECUTE 'JET-IN WORK.':THIS.PORT:' ':H.KEY
649          CRT PROTECT.MODE.ON:
650          PROCESS = 3
651          FUNCT.LABEL = SAVE.LABELS
652          FUNCT.COMMAND = SAVE.COMMANDS
653          PGMS.KEY = 'STD.FUNCTION.KEYS' ; GOSUB 8900
654          READ DUMMY FROM WORK.FILE,H.KEY THEN
655            FOR AA = 1 TO 2
656              IF DUMMY<AA>[1,6] = '\RULER' THEN
657                DUMMY = DELETE(DUMMY,AA,0,0)
658              END
659            NEXT AA
660            WRITE DUMMY ON TXT.FILE,H.KEY
661            DELETE WORK.FILE,H.KEY
662            READVU DUMMY FROM FL.FILE,'TEXT',28 ELSE DUMMY = ''
663            DUMMY<1,2> = DATE()
664            WRITEV DUMMY ON FL.FILE,'TEXT',28
665            *
666            * DELETE DELETED.ITEMS RECORD IF THERE
```

Appendix D - Page 14

Data Input Program
STD.INPUT (Version 18)

```
667             *
668             DI.KEY = "TEXT*":H.KEY
669             DELETE DELETED.ITEMS.FILE,DI.KEY
670           END ELSE
671           * TEXT FILE DELETED - DELETE HELP FILE POINTER
672           DELETE TXT.FILE,H.KEY
673           DELETE HELP.FILE,H.KEY
674           *
675           * PLACE RECORD INTO DELETED.ITEMS FILE FOR UPGRADE
676           *
677           DI.KEY = "HELP*":H.KEY
678           WRITE '' ON DELETED.ITEMS.FILE,DI.KEY
679           DI.KEY = "TEXT*":H.KEY
680           WRITE '' ON DELETED.ITEMS.FILE,DI.KEY
681         END
682         GOSUB 9500
683       END ELSE
684         PRMT.KEY = '3'
685         GOSUB 9200
686     END
687   END
688   RETURN TO 9
689 *
690 * GET PREVIOUS ENTRY (.)
691 *
692 1800  BEGIN CASE
693         CASE MAN = 'LINE'
694           PRMT.KEY = 83
695           GOSUB 9200
696           RETURN TO 9
697         CASE LAST.KEY = ''                       ;* THERE WAS NO LAST ENTRY
698           PRMT.KEY = 133
699           GOSUB 9200
700           RETURN TO 9
701         CASE 1
702           IF AMC = 0 THEN                        ;* GET LAST KEY ENTERED
703             READV EXT.INT.KEY FROM FL.FILE,EXT.HDR.FILE,7 ELSE EXT.INT.KEY = 0
704             IF EXT.INT.KEY THEN                  ;* EXTERNAL/INTERNAL FILE - GET EXTERNAL KEY
705               INT.DATA = LAST.KEY
706             END ELSE                             ;* GET INTERNAL KEY
707               INT.DATA = LAST.INT.KEY
708             END
709           END ELSE                               ;* GET CONTENTS OF THE DESIRED ATTRIBUTE
710             READV INT.DATA FROM HDR.FILE,LAST.INT.KEY,AMC ELSE INT.DATA = ''
711           END
712           IF SVMC = 0 THEN SVMC = 1
713           IF VMC  = 0 THEN VMC  = 1
714           INT.DATA = INT.DATA<1,VMC,SVMC>        ;* GET THE DESIRED VALUE & SUB-VALUE
```

Appendix D - Page 15

Data Input Program
STD.INPUT (Version 18)

```
715          GOSUB 7080                              ;* CONVERT DATA TO EXTERN
   AL FORM IF NECESSARY
716       END CASE
717       RETURN TO 40
718 *
719 * GET PREVIOUS RECORD (...)
720 *
721 1850  BEGIN CASE
722          CASE MAN = 'KEY'
723             PRMT.KEY = 211
724             GOSUB 9200
725          CASE MAN = 'LINE'
726             PRMT.KEY = 83
727             GOSUB 9200
728          CASE LAST.KEY = ''                      ;* THERE WAS NO LAST ENTR
   Y
729             PRMT.KEY = 133
730             GOSUB 9200
731          CASE 1
732             IF AMC = 0 THEN                      ;* GET LAST EXTERNAL KEY
   ENTERED
733                INT.DATA = LAST.KEY
734             END ELSE                             ;* GET CONTENTS OF THE DE
   SIRED ATTRIBUTE
735                READ DUMMY FROM FL.FILE,HDR.FILE.NAME ELSE DUMMY = ''
736                IF (DUMMY<7> + 0) THEN EI.KEY = 1 ELSE EI.KEY = 0 ;* INTERNAL/
   EXTERNAL KEY
737                IF (DUMMY<19> + 0) THEN AH.LOC = DUMMY<19> ELSE AH.LOC = 0 ;*
   LOCATION OF AUDIT HISTORY
738                IF EI.KEY THEN SAVE1 = HDR.REC(2)
739                MATREAD HDR.REC FROM HDR.FILE,LAST.INT.KEY ELSE MAT HDR.REC =
   ''
740                IF AH.LOC THEN HDR.REC(AH.LOC) = '' ;* CLEAR AUDIT ATTRIBUTE
741                IF EI.KEY THEN HDR.REC(2) = SAVE1
742             END
743             GOSUB 9400                           ;* DISPLAY
744             OLDVALUE = HDR.REC(AMC)<1,VMC,SVMC>
745       END CASE
746       RETURN TO 9
747 *
748 * GET THE NEXT SEQUENCE NUMBER FOR THIS FIELD (.#)
749 *
750 1900 BEGIN CASE
751          CASE MAN # 'KEY'                        ;* OK SO FAR
752             PRMT.KEY = 52
753             GOSUB 9200
754          CASE REF.FILE = ''                      ;* THIS IS THE NAME OF TH
   E PRIMARY FILE
755             PRMT.KEY = 53
756             GOSUB 9200
757          CASE 1
758             *
759             * 17.0 - VERIFY THAT NEW NUMBER IS UNUSED
760             *
```

Appendix D - Page 16

Data Input Program
STD.INPUT (Version 18)

```
761            IF REF.FILE # '' THEN                          ;* 17.0
762              OPEN '',REF.FILE TO REFER.FILE THEN          ;* 17.0
763                FILE.THERE = 1                             ;* 17.0
764              END ELSE                                     ;* 17.0
765                FILE.THERE = 0                             ;* 17.0
766              END                                          ;* 17.0
767            END ELSE                                       ;* 17.0
768              FILE.THERE = 0                               ;* 17.0
769            END                                            ;* 17.0
770            XREF.KEY = REF.FILE:"*":AMC
771            OK = 0                                         ;* 17.0
772            *
773            LOOP                                           ;* 17.0
774              READVU ENTRY FROM ACF.FILE,XREF.KEY,1 ELSE ENTRY = 1
775              NEXT.NO = ENTRY + 1
776              WRITEV NEXT.NO ON ACF.FILE,XREF.KEY,1
777              IF FILE.THERE THEN                           ;* 17.0
778                READV DUMMY FROM REFER.FILE,ENTRY,1 ELSE OK = 1 ;* 17.0
779              END ELSE                                     ;* 17.0
780                OK = 1                                     ;* 17.0
781              END                                          ;* 17.0
782            UNTIL OK DO                                    ;* 17.0
783            REPEAT                                         ;* 17.0
784            RETURN TO 99
785        END CASE
786        RETURN TO 9
787 *
788 * FILE XREF ROUTINE (.X)
789 *
790 2000 BEGIN CASE
791        CASE REF.FILE = ''                                ;* THERE MUST BE A REF FI
    LE
792          PRMT.KEY = '32'
793          GOSUB 9200
794        CASE MAN = 'KEY' AND MODE # ''                    ;* OPERATIONAL ONLY WHEN
    THERE IS NO ACTIVE RECORD
795          PRMT.KEY = 107
796          GOSUB 9200
797          PRMT.KEY = 108
798          GOSUB 9200
799        CASE MAN = 'KEY' AND MODE = ''                    ;* OK - HANDLE HERE
800          ORIG.FIELD.LOC = VRT:AM:HRZ:AM:LENG             ;* SAVE ORIGINAL FIELD
    LOCATION
801          PROCESS = 3
802          PGMS.KEY = 'STD.XREF.SUB' ; GOSUB 8900
803          ORIG.FIELD.LOC = ''
804          GOSUB 9500                                       ;* REFRESH BG & FG
805        CASE 1                                             ;* MUST DO A ".A" THEN A
    ".X"
806          PRMT.KEY = 84
807          GOSUB 9200
808          PRMT.KEY = 85
809          GOSUB 9200
810        END CASE
```

Appendix D - Page 17

Data Input Program
STD.INPUT (Version 18)

```
811       RETURN TO 9
812  *
813  * REFRESH THE SCREEN (.C)
814  *
815  2200 GOSUB 9600
816       RETURN TO 9
817  *
818  * SEND A MESSAGE TO A PORT (.B)
819  *
820  2300 PRMT.KEY = 305
821       SAVE.LENG = LENG
822       LENG = 3
823       GOSUB 9220
824       LENG = SAVE.LENG
825       BEGIN CASE
826          CASE ANS = 'E'
827             RETURN TO 9
828          CASE ANS = ''
829             RETURN TO 9
830          CASE NUM(ANS)
831             * OPERATOR ENTERED A PORT NUMBER
832             PORT.NO = ANS
833          CASE 1
834             * OPERATOR ENTERED INITIALS
835             PORT.NO = ''
836             EXECUTE 'LISTU' CAPTURING RESPONSE
837             BEGIN CASE
838                CASE OS.TYPE = 'RT'
839                   FIRST = 5
840                   SECTION = 2
841                CASE OS.TYPE = 'GA'
842                   FIRST = 4
843                   SECTION = 3
844             END CASE
845             *
846             FOR X = FIRST TO X + 1 UNTIL RESPONSE<X> = ''
847                * NO TRANSLATION REQUIRED
848                LINE = TRIM(RESPONSE<X>)
849  *$INCLUDE BP.NATIVE STD.INPUT.697 ;* LINE = TRIM(RESPONSE<X>)
850                IF ANS = "*" THEN
851                   PORT.NO<-1> = OCONV(FIELD(LINE,' ',1),'MCN')
852                END ELSE
853                   IF FIELD(LINE,' ',SECTION) = ANS THEN
854                      PORT.NO<-1> = OCONV(FIELD(LINE,' ',1),'MCN')
855                   END
856                END
857             NEXT X
858          END CASE
859          PRMT.KEY = 306
860          SAVE.LENG = LENG
861          LENG = 46
862          GOSUB 9220
863          LENG = SAVE.LENG
864          BEGIN CASE
```

Appendix D - Page 18

Data Input Program
STD.INPUT (Version 18)

```
865         CASE ANS = 'E'
866            RETURN TO 9
867         CASE ANS = ''
868            RETURN TO 9
869         CASE 1
870            PORTS = DCOUNT(PORT.NO,AM)
871            DUMMY = BELL:START.HOST.MSG:ANS'L#46':END.HOST.MSG
872            ANS = ''
873            FOR X = 1 TO PORTS
874               PORT = PORT.NO<X>
875               IF PORT # THIS.PORT THEN
876                  EXECUTE 'SEND-MSG ':PORT:',':DUMMY CAPTURING RESPONSE
877                  IF RESPONSE # '' THEN
878                     PRMT.KEY = RESPONSE
879                     GOSUB 9200
880                  END
881               END
882            NEXT X
883         END CASE
884         RETURN TO 9
885 *
886 * TUTORIAL MODE (.T)
887 *
888 2400 IF PGM.NAME # 'MENU.DRIVER' THEN
889         PRMT.KEY = 319
890         GOSUB 9200
891         RETURN TO 9
892      END
893      PRMT.KEY = 320
894      GOSUB 9210
895      BEGIN CASE
896         CASE ANS = 'T'                ;* TRAP MODE
897            TUTORIAL = 1
898         CASE ANS = 'P'                ;* PLAYBACK MODE
899            TUTORIAL = 2
900         CASE ANS = 'E'
901            IF TUTORIAL.INFO # '' THEN
902               ELAPSED = TIME() - TUTORIAL.INFO<1,4>
903               CRT @(0,22):OCONV(ELAPSED,'MTS'):
904      OPEN "BENCHMARK.STATUS" TO B.STAT.FILE ELSE EXECUTE " MSG !0   CALL CFH:
     CAN NOT OPEN FILE BENCHAMRK.STATUS!"
905      B.TEXT =  'MSG !0 Script(':TUTORIAL.INFO<1,2>:') completed in ':ELAPSED
     :' seconds.'
906         WRITE B.TEXT ON B.STAT.FILE, THIS.PORT
907               EXECUTE 'MSG !0 Script(':TUTORIAL.INFO<1,2>:') completed in ':EL
     APSED:' seconds.'
908               WRITEV '' ON TRM.FILE,THIS.PORT,17
909            END ELSE
910               RELEASE TRM.FILE,THIS.PORT
911            END
912            RETURN TO 9
913         CASE 1
914            GO TO 2400
915      END CASE
```

Appendix D - Page  19

Data Input Program
STD.INPUT (Version 18)

```
416     *
417     * GET SCRIPT KEY
418     *
419 2410 PRMT.KEY = 321
420     SAVE.LENG = LENG
421     LENG = 20
422     GOSUB 9220
423     IF ANS = 'E' THEN
424        LENG = SAVE.LENG
425        RETURN TO 9
426     END
427     *
428     TUTORIAL<1,2> = ANS
429     TUTORIAL<1,3> = 1
430     TUTORIAL<1,4> = TIME()
431     *
432     * IF IN PLAYBACK MODE - CHECK FOR SCRIPT RECORD
433     *
434     BEGIN CASE
435        CASE TUTORIAL<1,1> = 1
436           DELETE SCR.FILE,TUTORIAL<1,2>
437        CASE TUTORIAL<1,1> = 2
438           READV DUMMY FROM SCR.FILE,TUTORIAL<1,2>,1 ELSE
439              PRMT.KEY = '322~':TUTORIAL<1,2>
440              GOSUB 9200
441              GO TO 2410
442           END
443     END CASE
444     *
445     * UPDATE TERMINAL FILE
446     *
447     READVU DUMMY FROM TRM.FILE,THIS.PORT,1 ELSE NULL
448     WRITEV TUTORIAL ON TRM.FILE,THIS.PORT,17
449     TUTORIAL.INFO = TUTORIAL
450     RETURN TO 9
451 *
452 * DISPLAY THE CURRENT FIELD AND SETUP FOR DATA ENTRY
453 *
454 7080 IF INT.DATA # '' THEN
455        IF CON<1,1> = '' THEN
456           ENTRY = INT.DATA
457        END ELSE
458           IF CON<1,2> # '' THEN
459              IF CON<1,1> = 'D' THEN
460                 ENTRY = OCONV(INT.DATA,CON<1,2>)
461              END ELSE
462                 ENTRY = OCONV(INT.DATA,CON<1,1>)
463              END
464              BEGIN CASE
465                 CASE CON<1,1>[1,2] = 'MT'
466                 CASE CON<1,1> MATCHES "'MR'1N"
467                 CASE 1
468                    ENTRY = OCONV(ENTRY,'MCN')
469              END CASE
```

Appendix D - Page 20

Data Input Program
STD.INPUT (Version 18)

```
970            END ELSE
971              ENTRY = INT.DATA
972            END
973          END
974        END ELSE
975          ENTRY = ''
976        END
977      RETURN
978 *
979 * DISPLAY DATA IN BOX
980 *
981 7090 TMSK = 'L#':LENG
982      CRT @(HRZ,VRT):ENTRY TMSK:
983      RETURN
984 *
985 * STANDARD CALL ROUTINE
986 *
987 $INCLUDE BP STD.CALL.INCLUDE$1
988 *
989 * SAVE DY.COM VARIABLES
990 *
991 9000 MAT SAVE.DY.COM = MAT DY.COM
992      RETURN
993 *
994 * RESTORE DY.COM VARIABLES
995 *
996 9050 MAT DY.COM = MAT SAVE.DY.COM
997      RETURN
998 *
999 * STANDARD MESSAGE ROUTINE
1000 *
1001 9200 PRINT BELL:
1002      SKIP.FLAG = 0                             ;* RESET SKIP.FLAG DUE TO ERROR
1003      GOSUB 9000                                ;* SAVE COMMON VARIABLES
1004      LENG = 0
1005      SAVE.KEY = HELP.KEY
1006      GO TO 9230
1007 9210 SKIP.FLAG = 0                             ;* RESET SKIP.FLAG DUE TO ERROR
1008      GOSUB 9000                                ;* SAVE COMMON VARIABLES
1009      LENG = 2
1010      SAVE.KEY = HELP.KEY
1011      GO TO 9230
1012 9220 GOSUB 9000                                ;* SAVE COMMON VARIABLES
1013      SAVE.KEY = HELP.KEY
1014 9230 PGMS.KEY = 'STD.MESSAGE' ; GOSUB 8900
1015      GOSUB 9050                                ;* RESTORE COMMON VARIABLES
1016      IF DEBUG.FLAG THEN
1017        CRT @(0,22):'STD.INPUT DEBUG POINT':
```

Data Input Program
STD.INPUT (Version 18)

```
1018        INPUT DUMMY:
1019        CRT @(0,22):CL:
1020     END
1021     HELP.KEY = SAVE.KEY
1022     SAVE.KEY = ''
1023     RETURN
1024 *
1025 * DISPLAY BG
1026 *
1027 9300 PROCESS=1                                      ;* DISPLAY BG
1028     SCREEN.SUB = PGM.NAME:'.BGFG'
1029     IF OCONV(SCREEN.SUB,'TMD;X;1;1') # '' THEN ;* THERE IS A CATALOGED PR
    OGRAM
1030        PGMS.KEY = SCREEN.SUB ; GOSUB 8900
1031     END
1032     RETURN
1033 *
1034 * DISPLAY FG
1035 *
1036 9400 PROCESS=2                                      ;* DISPLAY FG
1037     SCREEN.SUB = PGM.NAME:'.BGFG'
1038     IF OCONV(SCREEN.SUB,'TMD;X;1;1') # '' THEN ;* THERE IS A CATALOGED PR
    OGRAM
1039        *
1040        * ENTER HERE TO DISPLAY ONE PAGE OF LINE ITEMS
1041        *
1042 9410   PGMS.KEY = SCREEN.SUB ; GOSUB 8900
1043     END
1044     RETURN
1045 *
1046 * CLEAR FG
1047 *
1048 9450 PROCESS=3                                      ;* CLEAR FG
1049     SCREEN.SUB = PGM.NAME:'.BGFG'
1050     IF OCONV(SCREEN.SUB,'TMD;X;1;1') # '' THEN ;* THERE IS A CATALOGED PR
    OGRAM
1051        PGMS.KEY = SCREEN.SUB ; GOSUB 8900
1052     END
1053     RETURN
1054 *
1055 * DISPLAY BG & FG WITHOUT RESTORING KEY DEFINITIONS
1056 *
1057 9500 SCREEN.SUB = PGM.NAME:'.BGFG'
1058     GOSUB 9300
1059     GOSUB 9400
1060     RETURN
1061 *
1062 * DISPLAY BG & FG AND RESTORING KEY DEFINITIONS
1063 *
1064 9600 SCREEN.SUB = PGM.NAME:'.BGFG'
1065     PGMS.KEY = 'STD.SCREEN' ; GOSUB 8900
1066     PROCESS = 4
1067     PGMS.KEY = 'STD.FUNCTION.KEYS' ; GOSUB 8900
1068     GOSUB 9300
```

Appendix D - Page    22

Data Input Program
STD.INPUT (Version 18)

```
1069      GOSUB 9400
1070 9999 RETURN
1071 END
```

[405] 1 items listed out of 1 items.

Appendix D - Page 23

Execute Next Level Program
STD.EXECUTE (Version 4)
Copyright © 1990 by Creative Information Systems Co. Ltd.

```
C    STD.EXECUTE$4
001 SUBROUTINE STD.EXECUTE$4
002 GO TO 9
003 * Program....: STD.EXECUTE
004 * Description: Execute a CISCO compatable program
005 * Revision...: 4.0 - Fix bug where the wrong number of parameters was being
       passed when performing ".M" command.
006 * Project....: 1.0 - PROJECTS record not on file.
007 * Programmer.: David M. Murdock
008 * Copyright..: 1989 Creative Information Systems CO. Ltd.
009 *----------
010 * STD.EXECUTE
011 * David M. Murdock   - 201-429-7733
012 * Creative Information Systems CO. Ltd.
013 * STANDARD EXECUTE OF THE NEXT PROGRAM LEVEL
014 *----------
015 * ----------------- VARIABLES USED
016 * NEXT.COM.AREA = MULTI-VALUED INFO TO PASS TO NEXT LEVEL.  VALUE ONE IS
017 *                 ALWAYS MULTI-SUBVALUED PRE-STORED RESPONSES
018 * NEXT.PROGRAM = CATALOGED PROGRAM NAME TO CALL
019 * MODE - IF MODE IS NULL THEN RETURNING PROGRAM WILL LOAD LAST.KEY FROM
020 *        THIS LEVEL IN PRE-STORE ELSE LAST.KEY FROM THE OTHER LEVEL
021 * THIS PROGRAM WILL INSERT IN FRONT OF THE COMMUNICATIONS FIELDS SUPPLIED
022 * BY THE OPERATOR (NEXT.COM.AREA) AND PLACE IN TRM.COM.AREA THE FOLLOWING:
023 *
024 * VALUE 1 - FIELD(PGM.NAME,'$',1)
025 * VALUE 2 - DEBUG.FLAG
026 * VALUE 3 - THIS.RETURNING.KEY
027 * VALUE 4 - CURRENT.CLIENT (EXT:SVM:INT)
028 * VALUE 5 - CURRENT.POLICY (EXT:SVM:INT)
029 * VALUE 6 - CURRENT.LOSS   (EXT:SVM:INT)
030 * VALUE 7 - CURRENT.EFF.DATE
031 * VALUE 8 - CURRENT.END.NO
032 * VALUE 9 - CURRENT.TRAN
033 * VALUE 10 AND UP - NEXT.COM.AREA
034 *
035 $INCLUDE EQUATES SYSTEM.COMMON
036 *
037 $INCLUDE EQUATES TERMINAL
038 *
039 $INCLUDE EQUATES ACF.SYS
040 *
041 ****************************************************************
042 9    IF DEBUG.FLAG THEN
043         CRT @(0,22):CL:'STD.EXECUTE DEBUG;CALLING(':NEXT.PROGRAM:');NEXT.COM
     .AREA(':NEXT.COM.AREA:')':
044         INPUT DUMMY,1:
045         CRT @(0,22):CL:
046      END
047      IF WINDOW.NO GE 12 THEN        ;! MAKE SURE THAT WE AREN'T TOO DEEP
048         PRMT.KEY = 65
049         GOSUB 9200
050         RETURN
051      END
```

Appendix E - Page  1

Execute Next Level Program
STD.EXECUTE (Version 4)

```
052 *     IF OCONV(NEXT.PROGRAM,'TMD;X;1;1') # '' THEN ;* THERE IS A CATALOGED
    PROGRAM
053 *        NULL
054 *        END ELSE                                ;* THERE IS NO FM PROGRAM
055 *           PRMT.KEY = '33'
056 *           GOSUB 9200
057 *           RETURN
058 *        END
059          CRT @(0,22):CL:'Initializing Level No. ':WINDOW.NO + 1:
060          IF MODE # '' THEN THIS.RETURNING.KEY = '' ELSE THIS.RETURNING.KEY = LA
    ST.KEY
061          READVU DUMMY FROM TRM.FILE,THIS.PORT,1 ELSE NULL
062          IF NEXT.PROGRAM = 'MENU.DRIVER' THEN ;* DON'T PASS CLIENT/POLICY INFO
063             TRM.COM.AREA = FIELD(PGM.NAME,'$',1):VM:DEBUG.FLAG:VM:VM:VM:VM:VM
    :VM:VM:NEXT.COM.AREA          ;! PASS THIS PROGRAM NAME ALONG WITH COMMUNICAT
    IONS AREA
064          END ELSE
065             TRM.COM.AREA = FIELD(PGM.NAME,'$',1):VM:DEBUG.FLAG:VM:THIS.RETURNING
    .KEY:VM:CURRENT.CLIENT:VM:CURRENT.POLICY:VM:CURRENT.LOSS:VM:CURRENT.EFF.DAT
    E:VM:CURRENT.END.NO:VM:CURRENT.TRAN:VM:NEXT.COM.AREA          ;! PASS THIS PR
    OGRAM NAME ALONG WITH COMMUNICATIONS AREA
066          END
067          IF DEBUG.FLAG THEN
068             CRT @(0,22):CL:'STD.EXECUTE DEBUG;CALLING(':NEXT.PROGRAM:')';TRM.COM.
    AREA(':TRM.COM.AREA:')':
069             INPUT DUMMY,1:
070             CRT @(0,22):CL:
071          END
072          WRITEVU TRM.COM.AREA ON TRM.FILE,THIS.PORT,14
073          WRITEV WINDOW.NO + 1 ON TRM.FILE,THIS.PORT,15
074          IF AUDIT.FLOW THEN
075             AUDIT.STOP = TIME()
076             STD.ARG(1) = FIELD(PGM.NAME,'$',1)
077             STD.ARG(2) = 'NEXT LEVEL'
078             PGMS.KEY = 'STD.AUDIT.FLOW' ; GOSUB 8900
079          END
080          DATA NEXT.PROGRAM
081          EXECUTE 'PROGRAM.MAIN (E)'
082          AUDIT.START = TIME()
083          * CHECK FOR RETURNED DATA
084          READVU TRM.COM.AREA FROM TRM.FILE,THIS.PORT,14 ELSE NULL
085          DEBUG.FLAG = TRM.COM.AREA<1,2>
086          IF DEBUG.FLAG THEN
087             CRT @(0,22):CL:'STD.EXECUTE DEBUG;RETURNING FROM(':NEXT.PROGRAM:')';T
    RM.COM.AREA(':TRM.COM.AREA:')':
088             INPUT DUMMY,1:
089             CRT @(0,22):CL:
090          END
091          IF NEXT.PROGRAM = 'MENU.DRIVER' THEN ;* DON'T RESTORE AND CLIENT/POLIC
    Y INFO
092             TRM.COM.AREA   = DELETE(TRM.COM.AREA,1,1,0) ;* STRIP RETURNING NULL
093             TRM.COM.AREA   = DELETE(TRM.COM.AREA,1,1,0) ;* STRIP DEBUG.FLAG
094             TRM.COM.AREA   = DELETE(TRM.COM.AREA,1,1,0) ;* STRIP LAST.KEY
095             TRM.COM.AREA   = DELETE(TRM.COM.AREA,1,1,0) ;* STRIP CURRENT.CLIENT
```

Appendix E - Page    2

```
                        Execute Next Level Program
                          STD.EXECUTE (Version 4)

096        TRM.COM.AREA      = DELETE(TRM.COM.AREA,1,1,0)  ;* STRIP CURRENT.POLICY
097        TRM.COM.AREA      = DELETE(TRM.COM.AREA,1,1,0)  ;* STRIP CURRENT.LOSS
098        TRM.COM.AREA      = DELETE(TRM.COM.AREA,1,1,0)  ;* STRIP CURRENT.EFF.DATE
099        TRM.COM.AREA      = DELETE(TRM.COM.AREA,1,1,0)  ;* STRIP CURRENT.END.NO
100        TRM.COM.AREA      = DELETE(TRM.COM.AREA,1,1,0)  ;* STRIP CURRENT.TRAN
101        END ELSE
102        TRM.COM.AREA      = DELETE(TRM.COM.AREA,1,1,0)  ;* STRIP RETURNING NULL
103        TRM.COM.AREA      = DELETE(TRM.COM.AREA,1,1,0)  ;* STRIP DEBUG.FLAG
104        LAST.KEY          = TRM.COM.AREA<1,1>           ;* RESTORE LAST.KEY
105        TRM.COM.AREA      = DELETE(TRM.COM.AREA,1,1,0)  ;* STRIP LAST.KEY
106        CURRENT.CLIENT    = TRM.COM.AREA<1,1>           ;* RESTORE CURRENT.CLIENT
107        TRM.COM.AREA      = DELETE(TRM.COM.AREA,1,1,0)  ;* STRIP CURRENT.CLIENT
108        CURRENT.POLICY    = TRM.COM.AREA<1,1>           ;* RESTORE CURRENT.POLICY
109        TRM.COM.AREA      = DELETE(TRM.COM.AREA,1,1,0)  ;* STRIP CURRENT.POLICY
110        CURRENT.LOSS      = TRM.COM.AREA<1,1>           ;* RESTORE CURRENT.LOSS
111        TRM.COM.AREA      = DELETE(TRM.COM.AREA,1,1,0)  ;* STRIP CURRENT.LOSS
112        CURRENT.EFF.DATE  = TRM.COM.AREA<1,1>           ;* RESTORE CURRENT.EFF.DATE
113        TRM.COM.AREA      = DELETE(TRM.COM.AREA,1,1,0)  ;* STRIP CURRENT.EFF.DATE
114        CURRENT.END.NO    = TRM.COM.AREA<1,1>           ;* RESTORE CURRENT.END.NO
115        TRM.COM.AREA      = DELETE(TRM.COM.AREA,1,1,0)  ;* STRIP CURRENT.END.NO
116        CURRENT.TRAN      = TRM.COM.AREA<1,1>           ;* RESTORE CURRENT.TRAN
117        TRM.COM.AREA      = DELETE(TRM.COM.AREA,1,1,0)  ;* STRIP CURRENT.TRAN
118        END
119        NEXT.COM.AREA = TRM.COM.AREA
120        BEGIN CASE
121           CASE NEXT.COM.AREA = ''                      ;! NOTHING PASSED
122           CASE NEXT.COM.AREA = 'ZZ9Z'                  ;! NULL PASSED - GO TO KEY FIELD
123           CASE 1                                       ;! CODE PASSED - LOAD INTO PRE-STORE
124              * DUMMY = EXCHANGE(TRM.COM.AREA<1,1>,'FC','FD')
125              AA1A.EXCH = TRM.COM.AREA<1,1>
126              CONVERT CHAR(252) TO CHAR(253) IN AA1A.EXCH
127              DUMMY = AA1A.EXCH
128 *$INCLUDE BP.NATIVE STD.EXECUTE.112 ;* DUMMY = EXCHANGE(TRM.COM.AREA<1,1>,'FC','FD')
129              PRE.STORE = INSERT(PRE.STORE,1,1,0,DUMMY)
130        END CASE
131        LAST.OPERATION = 'QUIT'
132        NEXT.COM.AREA = ''
133        WRITEVU NEXT.COM.AREA ON TRM.FILE,THIS.PORT,14
134        WRITEV WINDOW.NO ON TRM.FILE,THIS.PORT,15
135        IF TRM.LEVEL THEN
136           PROCESS = 2
137           PGMS.KEY = 'STD.FUNCTION.KEYS' ; GOSUB 8900
```

Appendix E - Page 3

Execute Next Level Program
STD.EXECUTE (Version 4)

```
138      *
139      * REDEFINE THE BACK SPACE/DELETE KEYS
140      *
141      IF TRM.LEVEL GE 4 AND TRM.WINDOW.NO + 0 = 0 THEN ;* DEFINE BS/DEL KEYS
142         CRT TRM.BS.DEL.DEFINE:
143         END
144      END
145      RETURN
146 *
147 * STANDARD CALL ROUTINE
148 *
149 $INCLUDE BP STD.CALL.INCLUDE$1
150 *
151 * STD MESSAGE
152 *
153 9200 PRINT BELL:
154      SKIP.FLAG = 0
155      LENG = 0
156      GO TO 9220
157 9210 LENG = 2
158 9220 PGMS.KEY = 'STD.MESSAGE' ; GOSUB 8900
159      IF DEBUG.FLAG THEN
160         CRT @(0,22):CL:PGM.NAME:'.MAIN DEBUG':
161         INPUT DUMMY,1:
162         CRT @(0,22):CL:
163         END
164 9999 RETURN
165 END
```

[405] 1 items listed out of 1 items.

Appendix E - Page 4

```
          Applications Program Initialization Program
                    PROGRAM.MAIN (Version 4)
                Copyright (C) 1990 by Creative Information Systems Co. Ltd.
   PROGRAM.MAIN$4
001 GO TO 9
002 * Program....: PROGRAM.MAIN
003 * Description: Program Initialization/Housekeeping program
004 * Revision...: 4.0 - Added PRECISION 2 statement.
005 * Project....: 1.0 - PROJECTS record not on file.
006 * Programmer.: David M. Murdock
007 * Copyright..: 1990 Creative Information Systems CO. Ltd.
008 ***************************************
009 * PROGRAM.MAIN - MAIN CALLING PGM        *
010 * Creative Information Systems Inc.      *
011 * David M. Murdock  - 201-265-2812       *
012 ****************************************************************
013 * THIS PROGRAM USES THE "ENTRY.SHELL" AND IS USED TO CALL ALL ENTRY *
014 * PROGRAMS.  THIS MAIN CALLING ROUTINE WILL ESTABLISH THE STANDARD  *
015 * COMMONS AREA AND OPEN THE STANDARD FILES                          *
016 ****************************************************************
017 *
018 *
019 *
020 *
021 *
022 *
023 *
024 *
025 *
026 *
027 *
028 *
029 *
030 *
031 $INCLUDE EQUATES SYSTEM.COMMON
032 *
033 $INCLUDE EQUATES TERMINAL
034 *
035 $INCLUDE EQUATES ACF.SYS
036       *
037       * INITIALIZE
038       *
039 9     MAT ST.COM = ''
040       MAT DY.COM = ''
041       MAT STD.ARG = ''
042       *
043       DUMMY = OCONV(0,'U50BB')
044       THIS.PORT = FIELD(DUMMY,' ',1)
045       THIS.ACCT = FIELD(DUMMY,' ',2)
046       *
047       IF THIS.PORT = 0 THEN
048          CRT
049          CRT
050          CRT 'Port 0 - aborting to TCL'
051          ABORT
052       END
053       AUDIT.START = TIME()   ;* SAVE PROGRAM START TIME Appendix F - Page   1
```

Applications Program Initialization Program
PROGRAM.MAIN (Version 4)

```
054      PRE.STORE = 'ZZ9Z'
055      ESC.REDISPLAY = 0
056      SC.STAF.REC = ''
057      *
058      * SET UP CONSTANTS
059      *
060      BELL = CHAR(7)
061      ESC1 = CHAR(27)
062      ESC2 = '.'
063      AM   = CHAR(254)
064      VM   = CHAR(253)
065      SVM  = CHAR(252)
066      SKIP.FLAG = 0
067      PROMPT ''
068      XREF.ORDER = 0
069      WP.LIST = CHAR(24):AM:CHAR(9):AM:CHAR(10):AM:CHAR(11):AM:CHAR(30):AM:CHAR(27):AM:CHAR(8):AM:CHAR(12):AM:CHAR(29):AM:CHAR(127)
070      ***** GET NAME OF DATA FILE
071      INPUT PROGRAM.NAME
072      *****
073      CURR.OP = OCONV(THIS.PORT,'TTERMINAL;X;10;10')
074      OPEN '','PROGRAMS' TO PGMS.FILE ELSE DEBUG
075      OPEN '','STAFF' TO STAF.FILE ELSE DEBUG
076      ***** OPEN STANDARD FILES
077      FL.KEY = "FILES"       ;GOSUB 9900 ; FL.FILE   = FL.KEY
078      FL.KEY = "PROMPT"      ;GOSUB 9900 ; PRMT.FILE = FL.KEY
079      FL.KEY = "HELP"        ;GOSUB 9900 ; HELP.FILE = FL.KEY
080      FL.KEY = "TERMINAL"    ;GOSUB 9900 ; TRM.FILE  = FL.KEY
081      ***** GET TERMINAL RECORD
082      MATREADU TRM.REC FROM TRM.FILE,THIS.PORT ELSE
083        IF FIELD(PROGRAM.NAME,'$',1) = 'STD.TERMINAL' THEN
084          MAT TRM.REC = ''
085        END ELSE
086          PRMT.KEY = "11"
087          GOSUB 9200
088          STOP
089        END
090      END
091      IF (TRM.WINDOW.NO + 0) THEN
092        IF TRM.COM.AREA<1,2> THEN
093          CRT START.MSG.LINE:'PROGRAM.MAIN ENTRY DEBUG ;TRM.COM.AREA=(':TRM.COM.AREA:')':
094          INPUT DUMMY,1:
095          IF DUMMY = 'Q' THEN DEBUG.FLAG = 2
096          IF DUMMY = 'F' THEN DEBUG.FLAG = 3
097          CRT CLEAR.MSG.LINE:
098        END
099        LAST.PROGRAM       = TRM.COM.AREA<1,1>
100        TRM.COM.AREA       = DELETE(TRM.COM.AREA,1,1,0) ;* STRIP LAST.PROGRAM
101        DEBUG.FLAG         = TRM.COM.AREA<1,1>
102        TRM.COM.AREA       = DELETE(TRM.COM.AREA,1,1,0) ;* STRIP DEBUG.FLAG
103        LAST.RETURNING.KEY = TRM.COM.AREA<1,1>          ;* RESTORE LAST.KEY
```

Applications Program Initialization Program
PROGRAM.MAIN (Version 4)

```
104     TRM.COM.AREA        = DELETE(TRM.COM.AREA,1,1,0) ;* STRIP LAST.KEY
105     CURRENT.CLIENT      = TRM.COM.AREA<1,1>          ;* RESTORE CURRENT.CLIENT
106     TRM.COM.AREA        = DELETE(TRM.COM.AREA,1,1,0) ;* STRIP CURRENT.CLIENT
107     CURRENT.POLICY      = TRM.COM.AREA<1,1>          ;* RESTORE CURRENT.POLICY
108     TRM.COM.AREA        = DELETE(TRM.COM.AREA,1,1,0) ;* STRIP CURRENT.POLICY
109     CURRENT.LOSS        = TRM.COM.AREA<1,1>          ;* RESTORE CURRENT.LOSS
110     TRM.COM.AREA        = DELETE(TRM.COM.AREA,1,1,0) ;* STRIP CURRENT.LOSS
111     CURRENT.EFF.DATE    = TRM.COM.AREA<1,1>          ;* RESTORE CURRENT.EFF.DATE
112     TRM.COM.AREA        = DELETE(TRM.COM.AREA,1,1,0) ;* STRIP CURRENT.EFF.DATE
113     CURRENT.END.NO      = TRM.COM.AREA<1,1>          ;* RESTORE CURRENT.END.NO
114     TRM.COM.AREA        = DELETE(TRM.COM.AREA,1,1,0) ;* STRIP CURRENT.END.NO
115     CURRENT.TRAN        = TRM.COM.AREA<1,1>          ;* RESTORE CURRENT.TRAN
116     TRM.COM.AREA        = DELETE(TRM.COM.AREA,1,1,0) ;* STRIP CURRENT.TRAN
117     BEGIN CASE
118       CASE TRM.COM.AREA=''              ;* NOTHING PASSED - PROGRAM CALLED FROM A MENU
119         A.CALL=0
120       CASE TRM.COM.AREA='ZZ9Z'           ;* NULL PASSED - LOAD INTO PRE-STORE
121         A.CALL=1
122         PRE.STORE = INSERT(PRE.STORE,1,1,0,'')
123       CASE TRM.COM.AREA='ZZ8Z'           ;* NOTHING PASSED - PROGRAM CALLED FROM ANOTHER PROGRAM VIA STD.INPUT
124         A.CALL=1
125       CASE 1
126         A.CALL=1                         ;* CODE PASSED - LOAD INTO PRE-STORE
127         * DUMMY = EXCHANGE(TRM.COM.AREA<1,1>,'FC','FD') ;* CONVERT SVMs INTO VMs
128         AA1A.EXCH = TRM.COM.AREA<1,1>
129         CONVERT CHAR(252) TO CHAR(253) IN AA1A.EXCH
130         DUMMY = AA1A.EXCH
131 *$INCLUDE BP.NATIVE PROGRAM.MAIN.105 ;* DUMMY = EXCHANGE(TRM.COM.AREA<1,1>,'FC','FD') ;* CONVERT SVMs INTO VMs
132         PRE.STORE = INSERT(PRE.STORE,1,1,0,DUMMY)
133     END CASE
134     LAST.COM.AREA = TRM.COM.AREA
135     TRM.COM.AREA = ''
136     NEXT.COM.AREA = ''
137     WRITEV TRM.COM.AREA ON TRM.FILE,THIS.PORT,14
138     WINDOW.NO = TRM.WINDOW.NO
```

Appendix F - Page 3

Applications Program Initialization Program
PROGRAM.MAIN (Version 4)

```
139        END ELSE
140         RELEASE TRM.FILE,THIS.PORT
141         WINDOW.NO = 0
142         A.CALL = 0
143        END
144       FL.KEY = "FUNCTIONS" ;GOSUB 9900 ; FUN.FILE = FL.KEY
145       IF TRM.LEVEL THEN
146         *
147         * CALL FUNCTION KEY SUBROUTINE
148         *
149 *---
150 *DEBUG
151 *
152         PROCESS = 1
153         FUN.KEY = FIELD(PROGRAM.NAME,'$',1)
154         PGMS.KEY = 'STD.FUNCTION.KEYS' ; GOSUB 8900
155         *
156         * REDEFINE THE BACK SPACE/DELETE KEYS
157         *
158         IF TRM.LEVEL GE 4 AND TRM.WINDOW.NO + 0 = 0 THEN ;* DEFINE BS/DEL KE
    YS
159            CRT TRM.BS.DEL.DEFINE:
160         END
161       END
162       FL.KEY = "ACF"         ;GOSUB 9900 ; ACF.FILE = FL.KEY
163       *
164       IF TRM.CONVERSION # '' THEN
165         * GET CONVERSION RECORD FROM ACF FILE
166         READ TRM.CONVERSION FROM ACF.FILE,TRM.CONVERSION ELSE TRM.CONVERSION
    = ''
167       END
168       *
169       FL.KEY = "TEXT"        ;GOSUB 9900 ; TXT.FILE = FL.KEY
170       FL.KEY = "SCRIPT"      ;GOSUB 9900 ; SCR.FILE = FL.KEY
171       FL.KEY = "LOCKED.ITEM" ;GOSUB 9900 ; LI.FILE = FL.KEY
172       FL.KEY = "WORK.":THIS.PORT
173       OPEN '','MD' TO MD.FILE ELSE ABORT
174       READV DUMMY FROM MD.FILE,FL.KEY,1 ELSE
175         *** FILE DOESN'T EXIST - CREATE IT
176         EXECUTE "CREATE-FILE ":FL.KEY:" 1,1 11,1" CAPTURING DUMMY
177         WRITE AM:AM:'Work file for port ':THIS.PORT ON FL.FILE,FL.KEY
178         READVU DUMMY FROM MD.FILE,FL.KEY,1 THEN
179            WRITEV 'DX' ON MD.FILE,FL.KEY,1
180         END ELSE
181            ABORT
182         END
183       END
184       GOSUB 9900 ; WORK.FILE = FL.KEY
185       ***** GET SYSTEM ACF RECORD
186       MATREAD ACF.SYS.REC FROM ACF.FILE,'SYS' ELSE
187          PRMT.KEY = "12~SYSTEM"
188          GOSUB 9200
189          STOP
190       END
```

Appendix F - Page    4

Applications Program Initialization Program
PROGRAM.MAIN (Version 4)

```
191       ***** GET MASTHEAD FROM COMPANY MASTER RECORD
192       * NO TRANSLATION REQUIRED
193       DUMMY = TRIM(OCONV(CURR.CO,'TCOMPANY.MASTER;X;1;1'))
194   *$INCLUDE BP.NATIVE PROGRAM.MAIN.163 ;* DUMMY = TRIM(OCONV(CURR.CO,'TCOMPAN
      Y.MASTER;X;1;1'))
195       PAD = INT((40-LEN(DUMMY))/2)
196       IF DUMMY # '' THEN CRT.LOGO = (SPACE(PAD):DUMMY)'L#40'
197       ***** GET XREF THROW-AWAY WORDS RECORD
198       READ TOSS.WORDS FROM ACF.FILE,'TOSS' ELSE TOSS.WORDS = ''
199       ***** GET AND SAVE ANY STACKED INPUT
200   *   LOOP
201   *     CHARS = SYSTEM(14)
202   *     UNTIL CHARS = 0 DO
203   *       INPUT ANS:
204   *       PRE.STORE<1,-1> = ANS
205   *   REPEAT
206   *
207   * CALL SUBROUTINE
208   *
209       RELEASE
210       BEGIN CASE
211         CASE DEBUG.FLAG < 2
212            PGMS.KEY = PROGRAM.NAME ; GOSUB 8900
213         CASE DEBUG.FLAG = 2
214            LAST.OPERATION = 'QUIT'
215         CASE DEBUG.FLAG = 3
216            LAST.OPERATION = 'FILE'
217       END CASE
218   *
219   * SET UP RETURNING.COM.AREA
220   *
221       IF DEBUG.FLAG THEN
222          CRT START.MSG.LINE:'PROGRAM.MAIN DEBUG ;RETURNING.COM.AREA=(':RETURN
      ING.COM.AREA:')':
223          INPUT DUMMY,1:
224          CRT CLEAR.MSG.LINE:
225       END
226       IF A.CALL THEN
227          READVU DUMMY FROM TRM.FILE,THIS.PORT,1 ELSE NULL
228          BEGIN CASE
229             CASE RETURNING.COM.AREA # ''          ;* COMMUNICATIONS AREA SET BY
      USER
230             CASE PRE.STORE # 'ZZ9Z'               ;* ACTIVE PRESTORE - PLACE IN
      INTER-LEVEL COMMUNICATIONS AREA
231                RETURNING.COM.AREA = ''            ;* CONVERT VALUES INTO SUB-VA
      LUES AND STORE IN THE RETURNING.COM.AREA
232                FOR X = 1 TO X + 1 UNTIL PRE.STORE<1,X> = 'ZZ9Z'
233                   RETURNING.COM.AREA<1,1,X> = PRE.STORE<1,X>
234                NEXT X
235             CASE 1                                ;* STANDARD A.CALL COMMUNICAT
      ION AREA IS SET HERE
236                BEGIN CASE
237                   CASE LAST.OPERATION = 'FILE'    ;* LAST OPERATION WAS FILES -
      SOME SORT OF KEY WILL BE PASSED BACK
```

Appendix F - Page 5

Applications Program Initialization Program
PROGRAM.MAIN (Version 4)

```
238            IF LAST.RETURNING.KEY # '' THEN    ;* CALLED BY CUSTOM.COMM
    ANDS - PASS BACK KEY TO LAST LEVEL
239              RETURNING.COM.AREA = LAST.RETURNING.KEY
240            END ELSE                           ;* CALLED TO PROCESS CODE FIE
    LD - PASS BACK KEY TO THIS LEVEL
241              RETURNING.COM.AREA = LAST.KEY
242            END
243          CASE 1                               ;* LAST OPERATION WAS NOT FIL
    ED - NO KEY GETS PASSED BACK
244            RETURNING.COM.AREA = 'ZZ9Z'
245          END CASE
246        END CASE
247        PGM.NAME = ''
248        LAST.RETURNING.KEY = ''
249        TRM.COM.AREA = FIELD(PROGRAM.NAME,'$',1):VM:DEBUG.FLAG:VM:LAST.RETUR
    NING.KEY:VM:CURRENT.CLIENT:VM:CURRENT.POLICY:VM:CURRENT.LOSS:VM:CURRENT.EFF
    .DATE:VM:CURRENT.END.NO:VM:CURRENT.TRAN:VM:RETURNING.COM.AREA
250        IF DEBUG.FLAG THEN
251          CRT START.MSG.LINE:'PROGRAM.MAIN DEBUG ;TRM.COM.AREA=(':TRM.COM.AR
    EA:')':
252          INPUT DUMMY,1:
253          CRT CLEAR.MSG.LINE:
254        END
255        WRITEV TRM.COM.AREA ON TRM.FILE,THIS.PORT,14
256      END
257      CRT PROTECT.MODE.OFF:    ;* PROTECT MODE OFF
258      IF TRM.LEVEL GE 4 AND TRM.WINDOW.NO + 0 = 0 THEN ;* RESET TERMINAL
259        CRT TRM.BS.DEL.RESET:
260      END
261      IF AUDIT.FLOW # '' THEN
262        * WRITE AUDIT RECORD INTO SCRIPT FILE
263        AUDIT.STOP = TIME()
264        STD.ARG(1) = FIELD(PROGRAM.NAME,'$',1)
265        STD.ARG(2) = 'EXIT'
266        PGMS.KEY = 'STD.AUDIT.FLOW' ; GOSUB 8900
267      END
268      STOP
269 $INCLUDE BP STD.CALL.INCLUDE$1
270 *
271 * STANDARD MESSAGE ROUTINE
272 *
273 9200 CRT BELL:
274      LENG = 0
275      PGMS.KEY = 'STD.MESSAGE' ; GOSUB 8900
276      RETURN
277 *
278 * STD FILE OPEN ROUTINE
279 *
280 9900 PGMS.KEY = 'STD.OPEN' ; GOSUB 8900
281      IF PRMT.KEY # '' THEN
282        GOSUB 9200
283        ABORT
284      END
285      RETURN
```

Appendix F - Page    6

Applications Program Initialization Program
PROGRAM.MAIN (Version 4)

286 END

[405] 1 items listed out of 1 items.

Appendix F - Page 7

```
                          Build Printer Object Code Program
                              STD.FORMS.BUILDER (Version 2)
  C          Copyright © 1990 by Creative Information Systems Co. Ltd.
      STD.FORMS.BUILDER$2
001 * Program....: STD.FORMS.BUILDER
002 * Description: Compile ACORD Source code entered via ACORD.FORMS.MAIN
003 * Revision...: 2.0 - Change program to use the Data Products AEtna logo car
      d instead of the BSI card.
004 * Project....: AETNA.LOGO - Convert programs to utilize the new AEtna Logo
      card from Data
005 * Programmer.: David M. Murdock
006 * Copyright..: 1990 Creative Information Systems CO. Ltd.
007 *****************************
008       STARTING.TIME = TIME() ;* GCR
009       OPEN '','ACORD.FORMS.BG' TO HDR.FILE ELSE DEBUG
010       OPEN '','ACORD.FORMS' TO AF.FILE ELSE DEBUG
011       OPEN '','TERMINAL' TO TRM.FILE ELSE DEBUG
012       INPUT INT.HDR.KEY
013       EXECUTE 'WHO' CAPTURING MSG
014       THIS.PORT = FIELD(MSG,' ',1)
015       READV DEFAULT.QUEUE FROM TRM.FILE,THIS.PORT,11 ELSE DEFAULT.QUEUE = 0
016       READ HDR.REC FROM HDR.FILE,INT.HDR.KEY ELSE STOP
017       DIM AF.ARRAY(3000)
018       AM = CHAR(254)
019       ESC = CHAR(27)
020       LF  = CHAR(10)
021     *
022       FONT.POINT = 18 :AM:16 :AM:14 :AM:12 :AM:10 :AM:10 :AM: 9 :AM: 9 :AM:
       8 :AM: 8 :AM: 7 :AM: 7 :AM: 6 :AM: 6 :AM: 4 :AM: 4
023       FONT.STROKE= 'B':AM:'B':AM:'B':AM:'B':AM:'B':AM:'M':AM:'B':AM:'M':AM:'
       B':AM:'M':AM:'B':AM:'M':AM:'B':AM:'M':AM:'B':AM:'M'
024       FONTS = 16
025       A.BOX =        ESC:'&a+06h-100V':ESC:'*c60h001v0p1h100v0P'
026       A.BOX = A.BOX:ESC:'&a+00h+100V':ESC:'*c60h001v0P'
027       A.BOX = A.BOX:ESC:'&a+60h-100V':ESC:'*c01h100v0P'
028     *
029     * ACF RECORD CONTAINS THE OFFSETS FOR FINE TUNING PLACEMENT
030     *
031     * ATTR 1 = HORIZONTAL OFFSET - IN FRACTIONS OF A SPACE
032     * ATTR 2 = VERTICAL OFFSET - IN FRACTIONS OF A LINE
033       READ AF.REC FROM AF.FILE,INT.HDR.KEY ELSE AF.REC = ''
034       H.OFFSET = AF.REC<4> * 72
035       V.OFFSET = AF.REC<5> * 120
036       CRT H.OFFSET
037       CRT V.OFFSET
038     *
039     * BUILD THE PRINT IMAGE VERSION
040     *
041       SAVE.REC = ''
042       FOR X = 1 TO 7
043         SAVE.REC<X> = AF.REC<X>
044       NEXT X
045       AF.REC = SAVE.REC
046       PI = ''
047       PI<-1> = ESC:'&l0e'                    ;* SKIP NO LINES AT THE TOP OF PAGE
048       PI<-1> =      '66F'                    ;* 66 LINES PER PAGE Appendix G - Page   1
```

Build Printer Object Code Program
STD.FORMS.BUILDER (Version 2)

```
049     BEGIN CASE
050       CASE HDR.REC<2> = ''              ;* PORTRAIT
051         PI<-1> = ESC:'&l00'
052       CASE HDR.REC<2> = 'P'             ;* PORTRAIT
053         PI<-1> = ESC:'&l00'
054       CASE HDR.REC<2> = 'L'             ;* LANDSCAPE
055         PI<-1> = ESC:'&l1O'
056     END CASE
057     *
058     * LINES FIRST
059     *
060     CRT 'Building Lines and Blocks'
061     PROCESS = 1
062     GOSUB 8000
063     *
064     TL = 0
065     BR = 0
066     CNT = DCOUNT(HDR.REC<4>,CHAR(253))
067     FOR XX = 1 TO CNT
068       HRZ = OCONV(HDR.REC<4,XX>,'MR2')
069       VRT = OCONV(HDR.REC<5,XX>,'MR2')
070       HT  = OCONV(HDR.REC<6,XX>,'MR2')
071       WID = OCONV(HDR.REC<7,XX>,'MR2')
072       WEIGHT = HDR.REC<8,XX>
073       TYPE = HDR.REC<9,XX>
074       PATT = HDR.REC<10,XX>
075       GOSUB 9000
076     NEXT XX
077     HDR.REC<4> = ''
078     HDR.REC<5> = ''
079     HDR.REC<6> = ''
080     HDR.REC<7> = ''
081     *
082     * CHECK-OFF BOXES NEXT
083     *
084     CRT 'Building Boxes'
085     PROCESS = 2
086     *
087     CNT = DCOUNT(HDR.REC<11>,CHAR(253))
088     FOR XX = 1 TO CNT
089       HRZ = OCONV(HDR.REC<11,XX>,'MR2')
090       VRT = OCONV(HDR.REC<12,XX>,'MR2')
091       GOSUB 9000
092     NEXT XX
093     HDR.REC<11> = ''
094     HDR.REC<12> = ''
095     *
096     * TEXT LAST
097     *
098     CRT 'Entering Text'
099     PROCESS = 3
100     *
101     CNT = DCOUNT(HDR.REC<14>,CHAR(253))
102     ACORD = 0
```

Appendix G - Page 2

Build Printer Object Code ~~Program~~ Program
STD.FORMS.BUILDER (Version 2)

```
103       CISCO = 0
104       AETNA = 0
105       FOR YY = 1 TO FONTS
106       * LOOK FOR EACH OF THE FONTS AND GROUP THE PRINTING OF LIKE FONTS TO
     GETHER
107          THIS.POINT = FONT.POINT<YY>
108          THIS.STROKE = FONT.STROKE<YY>
109          IF THIS.STROKE = 'B' THEN STROKE = 1 ELSE STROKE = 0
110          CRT @(-4):'Point size: ':THIS.POINT:CHAR(13):
111          FONT.COMMAND = ESC:'(8U':ESC:'(s1p':THIS.POINT:'v':STROKE:'b0s4T'
112          PI<-1> = FONT.COMMAND
113          FOR XX = 1 TO CNT
114             IF THIS.POINT = HDR.REC<17,XX> AND THIS.STROKE = HDR.REC<18,XX> TH
     EN
115                HRZ = OCONV(HDR.REC<13,XX>,'MR2')
116                VRT = OCONV(HDR.REC<14,XX>,'MR2')
117                HV  = HDR.REC<16,XX>
118                TEXT= HDR.REC<15,XX>
119                BEGIN CASE
120                   CASE TEXT = 'ACORD'    ;ACORD = 1
121                   CASE TEXT = 'CISCO'    ;CISCO = 1
122                   CASE TEXT = 'AETNA'    ;AETNA = 1
123                END CASE
124                GOSUB 9000
125             END
126          NEXT XX
127       NEXT YY
128       HDR.REC<13> = ''
129       HDR.REC<14> = ''
130       HDR.REC<15> = ''
131       HDR.REC<16> = ''
132       *
133       * RESET THE PRINTER AND EXIT
134       *
135       PI<-1> = ESC:'&l3e'                ;* SKIP 3 LINES AT THE TOP OF PAGE
136       PI<-1> =       '60F'               ;* 60 LINES PER PAGE
137       GOSUB 8000
138       AF.REC<8> = PI
139       PI = ''
140       AF.REC<3> = HDR.REC<3>
141       WRITE AF.REC ON AF.FILE,INT.HDR.KEY
142       MATREAD AF.ARRAY FROM AF.FILE,INT.HDR.KEY ELSE STOP
143       EXECUTE 'SP-ASSIGN OIF':DEFAULT.QUEUE
144       EXECUTE 'LZR1230.PORTRAIT'
145       BEGIN CASE
146          CASE HDR.REC<2> = ''            ;* PORTRAIT
147             EXECUTE 'LZR1230.PORTRAIT'
148          CASE HDR.REC<2> = 'P'           ;* PORTRAIT
149             EXECUTE 'LZR1230.PORTRAIT'
150          CASE HDR.REC<2> = 'L'           ;* LANDSCAPE
151             EXECUTE 'LZR1230.LANDSCAPE'
152       END CASE
153       PRINTER ON
154       CRT 'Printing Form'
```

Appendix G - Page    3

```
                    Build Printer Object Code Program
                       STD.FORMS.BUILDER (Version 2)

155     LINES = DCOUNT(AF.REC,CHAR(254))
156     FOR X = 8 TO LINES
157        PRINT AF.ARRAY(X):
158     NEXT X
159     CRT 'Elapased Generation Time is ':OCONV((TIME()-STARTING.TIME),'MTS')
160     SLEEP 2
161     PRINTER OFF
162     PRINTER CLOSE
163     EXECUTE 'LZR1230.LANDSCAPE'
164     EXECUTE 'SP-ASSIGN F':DEFAULT.QUEUE
165     STOP
166 *
167 * PRINT HORIZONTAL LINE
168 *
169 7000 IF BOX THEN
170        * MOVE STARTING POSITION BACK 1/2 LINE WEIGHT TO FILL IN TOP LEFT CO
    RNER
171        H.LOC = HD + 36 - (WEIGHT/2)
172        V.LOC = VD - 60 - (WEIGHT/2)
173     END ELSE
174        H.LOC = HD + 36
175        V.LOC = VD - 60 - (WEIGHT/2)
176     END
177     POS= ESC:'&a':H.LOC:'h':V.LOC:'V'
178     IF BOX THEN
179        * MAKE HORIZ LINE ONE CHAR LONGER TO FILL IN TOP RIGHT CORNER
180        LEN = ((WID - 1) * 72) + WEIGHT
181     END ELSE
182        LEN = (WID - 1) * 72
183     END
184     IF TYPE = 1 THEN
185        * DASHED LINE - PATT = DECIPOINT LENGTH OF EACH DASH
186        IF PATT + 0 = 0 THEN PATT = 60
187        D.LEN = PATT                                  ;* LENGTH OF DASH
188        B.LEN = OCONV(ICONV(PATT*.66,'MR0'),'MR0')    ;* LENGTH OF SPACE
189        OK = 0
190        D.MIN = 0
191        D.MAX = INT(D.LEN)/2
192        LOOP
193           T.LEN = D.LEN + B.LEN
194           DUMMY = OCONV(ICONV((LEN/T.LEN),'MR2'),'MR2')
195           REM = '0.':(FIELD(DUMMY,'.',2) + 0)
196           REM = OCONV(ICONV((T.LEN*REM),'MR0'),'MR0')
197           BEGIN CASE
198              CASE REM < D.MIN    ;* ENDS WITH A TOO SMALL LINE - NG
199              CASE REM > D.MAX    ;* ENDS WITH A SPACE - NG
200              CASE 1
201                 OK = 1
202           END CASE
203        UNTIL OK DO
204           B.LEN = B.LEN - 3
205           IF B.LEN LE 0 THEN
206              B.LEN = OCONV(ICONV(PATT*1.33,'MR0'),'MR0') ;* START AGAIN WITH
```

Appendix G - Page    4

Build Printer Object Code Program
STD.FORMS.BUILDER (Version 2)

```
        LARGER SPACE
207         END
208         REPEAT
209         L = ESC:'*c':D.MAX:'h':WEIGHT:'v0P':ESC:'&a+':D.MAX+B.LEN:'H'
210         FOR X = D.MAX+B.LEN TO LEN STEP T.LEN
211            IF D.LEN > LEN - X THEN D.LEN = LEN - X
212            L = L:ESC:'*c':D.LEN:'h':WEIGHT:'v0P':ESC:'&a+':D.LEN+B.LEN:'H'
213         NEXT X
214      END ELSE
215         * SOLID LINE
216         L = ESC:'*c':LEN:'h':WEIGHT:'v0P'
217      END
218      PI<-1> = POS:L
219      RETURN
220 *
221 * VERTICAL LINE
222 *
223 7100 POS= ESC:'&a':HD+36-(WEIGHT/2):'h':VD-60:'V'
224      LEN = (HT - 1) * 120
225      IF TYPE = 1 THEN
226         * DASHED LINE - PATT = DECIPOINT LENGTH OF EACH DASH
227         IF PATT + 0 = 0 THEN PATT = 60            ;* LENGTH OF DASH
228         D.LEN = PATT
229         B.LEN = OCONV(ICONV(PATT*.66,'MR0'),'MR0') ;* LENGTH OF SPACE
230         OK = 0
231         D.MIN = 0
232         D.MAX = INT(D.LEN)/2
233         LOOP
234            T.LEN = D.LEN + B.LEN
235            DUMMY = OCONV(ICONV((LEN/T.LEN),'MR2'),'MR2')
236            REM = '0.':(FIELD(DUMMY,'.',2) + 0)
237            REM = OCONV(ICONV((T.LEN*REM),'MR0'),'MR0')
238            BEGIN CASE
239               CASE REM < D.MIN    ;* ENDS WITH A TOO SMALL LINE - NG
240               CASE REM > D.MAX    ;* ENDS WITH A SPACE - NG
241               CASE 1
242                  OK = 1
243            END CASE
244         UNTIL OK DO
245            B.LEN = B.LEN - 3
246            IF B.LEN LE 0 THEN
247               B.LEN = OCONV(ICONV(PATT*1.33,'MR0'),'MR0') ;* START AGAIN WITH
        LARGER SPACE
248         END
249         REPEAT
250         L = ESC:'*c':WEIGHT:'h':D.MAX:'v0P':ESC:'&a+':D.MAX+B.LEN:'V'
251         FOR X = D.MAX+B.LEN TO LEN STEP T.LEN
252            IF D.LEN > LEN - X THEN D.LEN = LEN - X
253            L = L:ESC:'*c':WEIGHT:'h':D.LEN:'v0P':ESC:'&a+':D.LEN+B.LEN:'V'
254         NEXT X
255      END ELSE
256         * SOLID LINE
257         L = ESC:'*c':WEIGHT:'h':LEN:'v0P'
258      END
```

Appendix G - Page 5

```
                        Build Printer Object Code Program
                           STD.FORMS.BUILDER (Version 2)

259        PI<-1> = POS:L
260        RETURN
261 *
262 * COURIER TYPE
263 *
264 8000 PI<-1> = ESC:'(8U':ESC:'(s0p10h12v0s0b3T'
265        HMI = 72
266        VMI = 120
267        RETURN
268 *
269 * POSITION CURSOR AND PRINT
270 *
271 9000 IF HRZ # '' THEN
272           IF FIELD(VRT,'.',2) = 0 THEN VRT = FIELD(VRT,'.',1)
273           IF FIELD(HRZ,'.',2) = 0 THEN HRZ = FIELD(HRZ,'.',1)
274           VD=((VRT-1)*120) + V.OFFSET
275           HD=((HRZ-1)*72) + H.OFFSET
276        END
277        ON PROCESS GO TO 9100,9200,9300
278        RETURN
279 *
280 * DRAW BOXES AND LINES
281 *
282 9100 BOX = 0
283        BEGIN CASE
284          CASE HT=1
285             GOSUB 7000
286          CASE WID=1
287             GOSUB 7100
288          CASE TYPE = 0 OR TYPE = 1   ;* SOLID BLACK LINE OF DASHED LINE
289             *
290             * THIS IS A BOX
291             *
292             BOX = 1
293             SHD = HD
294             SVD = VD
295             GOSUB 7000
296             HD = SHD + ((WID-1) * 72)
297             GOSUB 7100
298             HD = SHD
299             VD = SVD
300             GOSUB 7100
301             VD = SVD + ((HT-1) * 120)
302             GOSUB 7000
303          CASE 1           ;* SHADING
304             H.LOC = HD + 36
305             V.LOC = VD - 60
306             POS= ESC:'&a':H.LOC:'h':V.LOC:'V'
307             LEN = (WID - 1) * 72
308             HGT = (HT - 1) * 120
309             L = ESC:'*c':LEN:'h':HGT:'v':PATT:'g':TYPE:'P'
310             PI<-1> = POS:L
311        END CASE
312        RETURN
```

Appendix G - Page    6 build Printer Object Code ~~Program~~ Program
STD.FORMS.BUILDER (Version 2)

```
313 *
314 * DRAW CHECK-OFF BOXES
315 *
316 9200 POS= ESC:'&a':HD:'h':VD:'V'
317      PI<-1> = POS:A.BOX
318      RETURN
319 *
320 * PRINT TEXT
321 *
322 9300 BEGIN CASE
323      CASE ACORD
324         ACORD = 0
325         POS= ESC:'&a':HD:'h':VD:'V'
326         PI<-1> = POS
327         PI<-1> = ESC:'(8U':ESC:'(s0p6.25h12v0s0b0TABCDEF'
328         PI<-1> = FONT.COMMAND
329      CASE CISCO
330         CISCO = 0
331         POS= ESC:'&a':HD:'h':VD:'V'
332         PI<-1> = POS
333         PI<-1> = ESC:'(8U':ESC:'(s0p6.25h12v0s3b0TABCDEF'
334         PI<-1> = ESC:'&a-0690h+0120V':'GHIJKL'
335         PI<-1> = ESC:'&a-0690h+0120V':'MNOPQR'
336         PI<-1> = FONT.COMMAND
337      CASE AETNA
338         AETNA = 0
339         POS= ESC:'&a':HD:'h':VD:'V'
340         PI<-1> = POS
341         PI<-1> = ESC:'(8U':ESC:'(s0p6.25h12v0s3b0TABCDE'
342         PI<-1> = ESC:'&a-0576h+0120V':'FGHIJ'
343         PI<-1> = ESC:'&a-0576h+0120V':'KLMNO'
344         PI<-1> = FONT.COMMAND
345      CASE 1
346         IF HRZ # '' THEN
347            * THIS TEXT IS NOT A CONTINUATION
348            POS= ESC:'&a':HD:'h':VD:'V'
349            PI<-1> = POS
350         END
351         IF HV='H' THEN
352            PI<-1> = TEXT
353         END ELSE
354            T.VMI = VMI - 12
355            FOR X=1 TO X + 1 UNTIL TEXT[X,1]=''
356               PI<-1> = TEXT[X,1]:ESC:'&a-':HMI:'ha+':T.VMI:'V'
357            NEXT X
358         END
359      END CASE
360      RETURN
361 END
```

[405] 1 items listed out of 1 items.

Document Image File Maintenance (Main Logic) Program
ACORD.FORMS.MAIN (Version 2.1)
Copyright © 1990 by Creative Information Systems Co. Ltd.

```
ACORD.FORMS$2.1.MAIN
001 SUBROUTINE ACORD.FORMS$2.1.MAIN
002 GO TO 9
003 * ACORD FORM PARAMETER ENTRY
004 * ACORD.FORMS.BG
005 * Program....: ACORD.FORMS
006 * Revision...: 2.1 - Add code to set Update Flat in A24 for release process
007 * Project....: 2.0B - Software Release Bugs since 2.0 was released into Pil
    ot.
008 * Programmer.: Michael F. Linehan
009 * Copyright..: 1990 Creative Information Systems CO. Ltd.
010 ******************************************
011 * Creative Information Systems CO. Ltd.  *
012 *       650 Bloomfield Ave. Suite 202    *
013 *       Bloomfield, New Jersey  07003    *
014 *             (201) 429-7733             *
015 ******************************************
016 *
017 *
018 *
019 *
020 *
021 *
022 *
023 *
024 *
025 $INCLUDE EQUATES SYSTEM.COMMON
026 *
027 $INCLUDE EQUATES TERMINAL
028 *
029 $INCLUDE USER.BP ACORD.FORMS$2.1.MAIN.EQUATES.INCLUDE
030 $INCLUDE USER.BP MAIN.DEBUG.INCLUDE
031 9 MODE=''
032 LIS.INFO = ''
033 ALST.KEY=''
034 LAST.INT.KEY=''
035 INT.HDR.KEY=''
036 FIELD.REDISPLAY=0
037 ADDL.HIST.DATA=''
038 $INCLUDE USER.BP ACORD.FORMS$2.1.MAIN.OPEN.INCLUDE
039 IF CURRENT.TRAN = 'DIS' THEN
040   * CAN'T ADD OR DELETE RECORDS IN DISPLAY MODE
041   ADD.RECORDS = 0
042   DELETE.RECORDS = 0
043 END
044 * END OF INITIALIZATION SECTION
045 READ FL.REC FROM FL.FILE,EXT.HDR.FILE ELSE NULL
046 IF FL.REC<8> THEN FIELD.XREF = 1 ELSE FIELD.XREF = 0
047 IF ACF.SYS.REC(7) # '' THEN
048   * WRITE AUDIT RECORD INTO SCRIPT FILE
049   AUDIT.STOP = TIME()
050   STD.ARG(1) = PGM.NAME
051   STD.ARG(2) = 'INITIALIZE'
```

Appendix H - Page 1

Document Image File Maintenance (Main Logic) Program
ACORD.FORMS.MAIN (Version 2.1)

```
052     PGMS.KEY = 'STD.AUDIT.FLOW' ;GOSUB 8900
053     AUDIT.START = TIME()
054 END
055 GOSUB 8200
056  GOSUB 9300
057 IF DEBUG.FLAG THEN
058    PROCESS = 3
059    GOSUB 8
060 END
061        * MARKER $$25
062 10     * MAIN PROGRAM LOOP FOR DATA ENTRY
063 100   REF.FILE="ACORD.FORMS.BG";HELP.KEY="ACORD.FORMS.100";LENG=8;ILEN=0
064       HRZ=14;VRT=2;CON="";PATT='0X';MASK="L#8";MAN="KEY";FIELD.NO=1;DY.TAB="
    "
065       IF MODE='' THEN OLDVALUE='' ELSE OLDVALUE=HDR.KEY
066       AMC=0;VMC=0;SVMC=0
067       IF MODE[1,1]="C" THEN
068          SAVE.LENGTH = LENG
069          PRMT.KEY=38
070          GOSUB 9200
071          SKIP.FLAG=1
072          LENG = SAVE.LENGTH
073       END
074       GOSUB 9000 ;***** STD.INPUT
075       IF ENTRY="" THEN PRMT.KEY=5;GOSUB 9200;GO TO 100
076       IF OCONV(ENTRY,"MCU")[1,2]=ESC2:"E" OR OCONV(ENTRY,"MCU")[1,2]=ESC2:"Q
    " THEN
077          IF MODE # '' THEN           ;* CAN'T EXIT WHILE IN CHANGE MODE
078             PRMT.KEY=54
079             GOSUB 9200
080             GO TO 100
081          END
082          GO TO 9999
083       END
084       HDR.KEY=ENTRY ;IF MODE = '' THEN INT.HDR.KEY=ENTRY
085       IF MODE='' THEN
086          INT.HDR.KEY=HDR.KEY
087          MATREAD HDR.REC FROM HDR.FILE,INT.HDR.KEY THEN
088             IF CHANGE.HIST # '' THEN MAT OLD.REC=MAT HDR.REC
089             MODE="C"
090             IF HDR.REC(19):HDR.REC(20):HDR.REC(21):HDR.REC(22) = '' THEN
091                * GET THE OFFSETS FROM THE ACORD.FORMS
092                READV HDR.REC(19) FROM ACORD.FORMS.FILE,INT.HDR.KEY,4 ELSE HDR.R
    EC(19) = '' ;* BG HORIZ
093                READV HDR.REC(20) FROM ACORD.FORMS.FILE,INT.HDR.KEY,5 ELSE HDR.R
    EC(20) = '' ;* BG VERT
094                READV HDR.REC(21) FROM ACORD.FORMS.FILE,INT.HDR.KEY,6 ELSE HDR.R
    EC(21) = '' ;* FG HORIZ
095                READV HDR.REC(22) FROM ACORD.FORMS.FILE,INT.HDR.KEY,7 ELSE HDR.R
    EC(22) = '' ;* FG VERT
096                FOR X = 19 TO 22
097                   HDR.REC(X) = ICONV(HDR.REC(X),'MR2')
098                NEXT X
099             END
```

Appendix H - Page 2

Document Image File Maintenance (Main Logic) Program
ACORD.FORMS.MAIN (Version 2.1)

```
100        GOSUB 9400 ;***** DISPLAY FOREGROUND
101      END ELSE
102        IF NOT(ADD.RECORDS) THEN PRMT.KEY='109~':ENTRY;GOSUB 9200;GO TO 10
    0
103        MODE="A"
104      END
105      LI.KEY=EXT.HDR.FILE:"*":INT.HDR.KEY
106      PROCESS=1
107      GOSUB 9700
108      IF PRMT.KEY # '' THEN
109         GOSUB 9200
110         MODE='';GOSUB 9450
111         GO TO 100
112      END
113      IF MODE[1,1]="C" THEN GO TO 8000
114    END
115
116 110  REF.FILE="";HELP.KEY="ACORD.FORMS.110";LENG=40;ILEN=0
117      HRZ=36;VRT=2;CON="";PATT='0X';MASK="L#40";MAN="";FIELD.NO=2;DY.TAB=1:A
    M:1
118      OLDVALUE=HDR.REC(3)
119      AMC=3;VMC=0;SVMC=0
120      GOSUB 9000 ;***** STD.INPUT
121      HDR.REC(3)=ENTRY
122
123 115  REF.FILE="";HELP.KEY="ACORD.FORMS.115";LENG=1;ILEN=0
124      HRZ=77;VRT=2;CON="MCA":VM:"";PATT='0X';MASK="L#1";MAN="";FIELD.NO=3;DY
    .TAB=1
125      OLDVALUE=HDR.REC(2)
126      AMC=2;VMC=0;SVMC=0
127      IF OLDVALUE="" THEN OLDVALUE="P"
128      GOSUB 9000 ;***** STD.INPUT
129      BEGIN CASE
130         CASE ENTRY="P"
131         CASE ENTRY="L"
132         CASE 1
133            PRMT.KEY=67
134            GOSUB 9200 ;***** STD.MESSAGE
135            GO TO 115
136      END CASE
137      HDR.REC(2)=ENTRY
138
139 120  LIS=1
140      LIS.INFO<LIS,5>=DCOUNT(HDR.REC(4)<1>,VM)
141      GOSUB 8600
142      REF.FILE="";HELP.KEY="ACORD.FORMS.120";LENG=3;ILEN=0
143      HRZ=1;VRT=5+LIS.INFO<LIS,2>;CON="MCN":VM:"MR0";PATT='0N';MASK="R#3";MA
    N="LINE";FIELD.NO=4;DY.TAB=2:AM:2
144      OLDVALUE=LIS.INFO<LIS,3>
145      AMC="";VMC="";SVMC=""
146      IF LIS.RTN THEN
147         LIS.RTN = LIS.RTN + 2
148         IF LIS.RTN = 4 THEN LIS.RTN = 0 ;! GOING TO A SPECIFIC LINE
149      END ELSE
```

Appendix H - Page    3

Document Image File Maintenance (Main Logic) Program
ACORD.FORMS.MAIN (Version 2.1)

```
150        GOSUB 9000
151        END
152        CRT @(HRZ,VRT):OLDVALUE MASK:
153        IF ENTRY[1,1]="." THEN ENTRY=ENTRY[2,99]
154        LIS.ATTRS=4:AM:5:AM:6:AM:7:AM:8:AM:9:AM:10:AM:23:AM:""
155        BEGIN CASE
156           CASE ENTRY=OLDVALUE      ;***** PROCESS FIRST LIS FIELD
157           CASE ENTRY[1,1]="E"      ;***** JUMP OUT OF THIS LIS SET LOOKING TO NEXT FIELD
158              GO TO 1209
159           CASE ENTRY[1,1]="N"      ;***** JUMP OUT OF THIS LIS SET LOOKING TO FINISH BUT NOT FILE
160              GO TO 1209
161           CASE ENTRY[1,1]="F"      ;***** JUMP OUT OF THIS LIS SET LOOKING TO FINISH AND FILE
162              GO TO 1209
163           CASE ENTRY[1,2]="++"     ;***** LAST PAGE
164              LIS.INFO<LIS,3>=9999
165              GO TO 120
166           CASE ENTRY[1,2]="--"     ;***** FIRST PAGE
167              LIS.INFO<LIS,3>=1
168              GO TO 120
169           CASE ENTRY[1,1]="+"      ;***** NEXT PAGE
170              LIS.INFO<LIS,3>=LIS.INFO<LIS,3> + LIS.INFO<LIS,4>
171              GO TO 120
172           CASE ENTRY[1,1]="-"      ;***** PREVIOUS PAGE
173              LIS.INFO<LIS,3>=LIS.INFO<LIS,3> - LIS.INFO<LIS,4>
174              GO TO 120
175           CASE NUM(ENTRY)          ;***** GO TO SPECIFIC LINE
176              LIS.INFO<LIS,3>=ENTRY
177              GO TO 120
178           CASE ENTRY[1,1]="K"      ;***** KILL THIS LINE
179              PRMT.KEY=41
180              GOSUB 9210
181              IF ANS="Y" THEN
182                 FOR X=1 TO X + 1 UNTIL LIS.ATTRS<X>=''
183                    HDR.REC(LIS.ATTRS<X>)=DELETE(HDR.REC(LIS.ATTRS<X>),1,LIS.INFO<LIS,3>,0)
184                 NEXT X
185              END
186              LIS.INFO<LIS,1>=0
187              GO TO 120
188           CASE ENTRY[1,1]="L"      ;***** INSERT A NEW LINE
189              IF LIS.INFO<LIS,3>+1 > LIS.INFO<LIS,6> THEN
190                 PRMT.KEY = "392~":LIS.INFO<LIS,6>
191                 GOSUB 9200
192                 GO TO 120
193              END
194              LIS.INFO<LIS,3>=LIS.INFO<LIS,3> + 1
195                 FOR X=1 TO X + 1 UNTIL LIS.ATTRS<X>=''
196                    HDR.REC(LIS.ATTRS<X>)=INSERT(HDR.REC(LIS.ATTRS<X>),1,LIS.INFO<LIS,3>,0,"")
197                 NEXT X
198              LIS.INFO<LIS,1>=0
```

Document Image File Maintenance (Main Logic) Program
ACORD.FORMS.MAIN (Version 2.1)

```
199           ENTRY=LIS.INFO<LIS,3>
200           GOSUB 8600
201         CASE ENTRY[1,1]="I"        ;***** INSERT A NEW LINE IN FRONT OF THIS L
    INE
202           IF LIS.INFO<LIS,3>+1 > LIS.INFO<LIS,6> THEN
203             PRMT.KEY = "392~":LIS.INFO<LIS,6>
204             GOSUB 9200
205             GO TO 120
206           END
207           FOR X=1 TO X + 1 UNTIL LIS.ATTRS<X>=''
208             HDR.REC(LIS.ATTRS<X>)=INSERT(HDR.REC(LIS.ATTRS<X>),1,LIS.INFO<
    LIS,3>,0,"")
209           NEXT X
210           LIS.INFO<LIS,1>=0
211           ENTRY=LIS.INFO<LIS,3>
212           GOSUB 8600
213         CASE ENTRY[1,1]="D"        ;***** DUPE A LINE
214           IF LIS.INFO<LIS,3>+1 > LIS.INFO<LIS,6> THEN
215             PRMT.KEY = "392~":LIS.INFO<LIS,6>
216             GOSUB 9200
217             GO TO 120
218           END
219           PRMT.KEY=312
220           LENG = 3
221           GOSUB 9220
222           IF ANS#'E' AND ANS#"" AND NUM(ANS) THEN
223             FOR X=1 TO X + 1 UNTIL LIS.ATTRS<X>=''
224               HDR.REC(LIS.ATTRS<X>)=INSERT(HDR.REC(LIS.ATTRS<X>),1,LIS.INFO<
    LIS,3>,0,HDR.REC(LIS.ATTRS<X>)<1,ANS>)
225             NEXT X
226           END
227           LIS.INFO<LIS,1>=0
228           GO TO 120
229         CASE 1                     ;* CATCH-ALL
230           PRMT.KEY=43
231           GOSUB 9200 ;***** STD.MESSAGE
232           GO TO 120
233         END CASE
234       LIS.INFO<LIS,3>=ENTRY
235
236 130   LIS=1
237       LIS.INFO<LIS,5>=DCOUNT(HDR.REC(4)<1>,VM)
238       GOSUB 8600
239       REF.FILE="";HELP.KEY="ACORD.FORMS.130";LENG=6;ILEN=0
240       HRZ=5;VRT=5+LIS.INFO<LIS,2>;CON="MR2":VM:"MR2";PATT='0X';MASK="R#6";MA
    N="";FIELD.NO=5;DY.TAB=2
241       OLDVALUE=HDR.REC(4)<1,LIS.INFO<LIS,3>>
242       AMC=4;VMC=LIS.INFO<LIS,3>;SVMC=0
243       IF OLDVALUE="" THEN
244         IF VMC > 1 THEN OLDVALUE = HDR.REC(AMC)<1,VMC-1>
245       END
246       GOSUB 9000 ;***** STD.INPUT
247       HDR.REC(4)<1,LIS.INFO<LIS,3>>=ENTRY
248
```

Appendix H - Page    5

Document Image File Maintenance (Main Logic) Program
ACORD.FORMS.MAIN (Version 2.1)

```
249 140   LIS=1
250       LIS.INFO<LIS,5>=DCOUNT(HDR.REC(4)<1>,VM)
251       GOSUB 8600
252       REF.FILE="";HELP.KEY="ACORD.FORMS.140";LENG=6;ILEN=0
253       HRZ=12;VRT=5+LIS.INFO<LIS,2>;CON="MR2":VM:"MR2";PATT='0X';MASK="R#6";M
      AN="";FIELD.NO=6;DY.TAB=2
254       OLDVALUE=HDR.REC(5)<1,LIS.INFO<LIS,3>>
255       AMC=5;VMC=LIS.INFO<LIS,3>;SVMC=0
256       IF OLDVALUE="" THEN
257          IF VMC > 1 THEN OLDVALUE = HDR.REC(AMC)<1,VMC-1>
258       END
259       GOSUB 9000 ;***** STD.INPUT
260       HDR.REC(5)<1,LIS.INFO<LIS,3>>=ENTRY
261
262 150   LIS=1
263       LIS.INFO<LIS,5>=DCOUNT(HDR.REC(4)<1>,VM)
264       GOSUB 8600
265       REF.FILE="";HELP.KEY="ACORD.FORMS.150";LENG=6;ILEN=0
266       HRZ=19;VRT=5+LIS.INFO<LIS,2>;CON="MR2":VM:"MR2";PATT='0X';MASK="R#6";M
      AN="";FIELD.NO=7;DY.TAB=2
267       OLDVALUE=HDR.REC(6)<1,LIS.INFO<LIS,3>>
268       AMC=6;VMC=LIS.INFO<LIS,3>;SVMC=0
269       IF OLDVALUE="" THEN
270          IF VMC > 1 THEN OLDVALUE = HDR.REC(AMC)<1,VMC-1>
271       END
272       GOSUB 9000 ;***** STD.INPUT
273       HDR.REC(6)<1,LIS.INFO<LIS,3>>=ENTRY
274
275 160   LIS=1
276       LIS.INFO<LIS,5>=DCOUNT(HDR.REC(4)<1>,VM)
277       GOSUB 8600
278       REF.FILE="";HELP.KEY="ACORD.FORMS.160";LENG=6;ILEN=0
279       HRZ=26;VRT=5+LIS.INFO<LIS,2>;CON="MR2":VM:"MR2";PATT='0X';MASK="R#6";M
      AN="";FIELD.NO=8;DY.TAB=2
280       OLDVALUE=HDR.REC(7)<1,LIS.INFO<LIS,3>>
281       AMC=7;VMC=LIS.INFO<LIS,3>;SVMC=0
282       IF OLDVALUE="" THEN
283          IF VMC > 1 THEN OLDVALUE = HDR.REC(AMC)<1,VMC-1>
284       END
285       GOSUB 9000 ;***** STD.INPUT
286       HDR.REC(7)<1,LIS.INFO<LIS,3>>=ENTRY
287
288 165   LIS=1
289       LIS.INFO<LIS,5>=DCOUNT(HDR.REC(4)<1>,VM)
290       GOSUB 8600
291       REF.FILE="";HELP.KEY="ACORD.FORMS.165";LENG=3;ILEN=0
292       HRZ=33;VRT=5+LIS.INFO<LIS,2>;CON="MCN":VM:"MR0";PATT='0N';MASK="R#3";M
      AN="Y";FIELD.NO=9;DY.TAB=2
293       OLDVALUE=HDR.REC(8)<1,LIS.INFO<LIS,3>>
294       AMC=8;VMC=LIS.INFO<LIS,3>;SVMC=0
295       IF OLDVALUE="" THEN
296          IF VMC > 1 THEN OLDVALUE = HDR.REC(AMC)<1,VMC-1>
297       END
298       GOSUB 9000 ;***** STD.INPUT
```

Appendix H - Page   6

Document Image File Maintenance (Main Logic) Program
ACORD.FORMS.MAIN (Version 2.1)

```
299      HDR.REC(8)<1,LIS.INFO<LIS,3>>=ENTRY
300
301 166  LIS=1
302      LIS.INFO<LIS,5>=DCOUNT(HDR.REC(4)<1>,VM)
303      GOSUB 8600
304      REF.FILE="";HELP.KEY="ACORD.FORMS.166";LENG=1;ILEN=0
305      HRZ=37;VRT=5+LIS.INFO<LIS,2>;CON="MCN":VM:"MR0";PATT='ON';MASK="R#1";M
    AN="Y";FIELD.NO=10;DY.TAB=2
306      OLDVALUE=HDR.REC(9)<1,LIS.INFO<LIS,3>>
307      AMC=9;VMC=LIS.INFO<LIS,3>;SVMC=0
308      IF OLDVALUE="" THEN
309         IF VMC > 1 THEN OLDVALUE = HDR.REC(AMC)<1,VMC-1>
310      END
311      GOSUB 9000 ;***** STD.INPUT
312      BEGIN CASE
313         CASE ENTRY=0
314         CASE ENTRY=1
315         CASE ENTRY=2
316         CASE ENTRY=3
317         CASE 1
318            PRMT.KEY=67
319            GOSUB 9200 ;***** STD.MESSAGE
320            GO TO 166
321      END CASE
322      HDR.REC(9)<1,LIS.INFO<LIS,3>>=ENTRY
323 1689    * CONTINUE
324
325 167  LIS=1
326      LIS.INFO<LIS,5>=DCOUNT(HDR.REC(4)<1>,VM)
327      GOSUB 8600
328      REF.FILE="";HELP.KEY="ACORD.FORMS.167";LENG=4;ILEN=0
329      HRZ=39;VRT=5+LIS.INFO<LIS,2>;CON="MCN":VM:"MR0";PATT='ON';MASK="R#4";M
    AN="";FIELD.NO=11;DY.TAB=2
330      OLDVALUE=HDR.REC(10)<1,LIS.INFO<LIS,3>>
331      AMC=10;VMC=LIS.INFO<LIS,3>;SVMC=0
332      IF OLDVALUE="" THEN
333         IF VMC > 1 THEN OLDVALUE = HDR.REC(AMC)<1,VMC-1>
334      END
335      GOSUB 9000 ;***** STD.INPUT
336      HDR.REC(10)<1,LIS.INFO<LIS,3>>=ENTRY
337
338 168  LIS=1
339      LIS.INFO<LIS,5>=DCOUNT(HDR.REC(4)<1>,VM)
340      GOSUB 8600
341      REF.FILE="";HELP.KEY="ACORD.FORMS.168";LENG=35;ILEN=0
342      HRZ=44;VRT=5+LIS.INFO<LIS,2>;CON="";PATT='0X';MASK="L#35";MAN="";FIELD
    .NO=12;DY.TAB=2
343      OLDVALUE=HDR.REC(23)<1,LIS.INFO<LIS,3>>
344      AMC=23;VMC=LIS.INFO<LIS,3>;SVMC=0
345      GOSUB 9000 ;***** STD.INPUT
346      HDR.REC(23)<1,LIS.INFO<LIS,3>>=ENTRY
347      LIS.INFO<LIS,3>=LIS.INFO<LIS,3> + 1
348      GO TO 120
349 1209 * CONTINUE WITH NEXT FIELD
```

Appendix H - Page   7

Document Image File Maintenance (Main Logic) Program
ACORD.FORMS.MAIN (Version 2.1)

```
350
351 170   LIS=2
352       LIS.INFO<LIS,5>=DCOUNT(HDR.REC(11)<1>,VM)
353       GOSUB 8600
354       REF.FILE="";HELP.KEY="ACORD.FORMS.170";LENG=3;ILEN=0
355       HRZ=1;VRT=11+LIS.INFO<LIS,2>;CON="MCN":VM:"MR0";PATT='ON';MASK="R#3";M
    AN="LINE";FIELD.NO=13;DY.TAB=3:AM:2
356       OLDVALUE=LIS.INFO<LIS,3>
357       AMC="";VMC="";SVMC=""
358       IF LIS.RTN THEN
359          LIS.RTN = LIS.RTN + 2
360          IF LIS.RTN = 4 THEN LIS.RTN = 0 ;! GOING TO A SPECIFIC LINE
361       END ELSE
362          GOSUB 9000
363       END
364       CRT @(HRZ,VRT):OLDVALUE MASK:
365       IF ENTRY[1,1]="." THEN ENTRY=ENTRY[2,99]
366       LIS.ATTRS=11:AM:12:AM:""
367       BEGIN CASE
368          CASE ENTRY=OLDVALUE       ;***** PROCESS FIRST LIS FIELD
369          CASE ENTRY[1,1]="E"       ;***** JUMP OUT OF THIS LIS SET LOOKING TO
    NEXT FIELD
370             GO TO 1709
371          CASE ENTRY[1,1]="N"       ;***** JUMP OUT OF THIS LIS SET LOOKING TO
    FINISH BUT NOT FILE
372             GO TO 1709
373          CASE ENTRY[1,1]="F"       ;***** JUMP OUT OF THIS LIS SET LOOKING TO
    FINISH AND FILE
374             GO TO 1709
375          CASE ENTRY[1,2]="++"      ;***** LAST PAGE
376             LIS.INFO<LIS,3>=9999
377             GO TO 170
378          CASE ENTRY[1,2]="--"      ;***** FIRST PAGE
379             LIS.INFO<LIS,3>=1
380             GO TO 170
381          CASE ENTRY[1,1]="+"       ;***** NEXT PAGE
382             LIS.INFO<LIS,3>=LIS.INFO<LIS,3> + LIS.INFO<LIS,4>
383             GO TO 170
384          CASE ENTRY[1,1]="-"       ;***** PREVIOUS PAGE
385             LIS.INFO<LIS,3>=LIS.INFO<LIS,3> - LIS.INFO<LIS,4>
386             GO TO 170
387          CASE NUM(ENTRY)           ;***** GO TO SPECIFIC LINE
388             LIS.INFO<LIS,3>=ENTRY
389             GO TO 170
390          CASE ENTRY[1,1]="K"       ;***** KILL THIS LINE
391             PRMT.KEY=41
392             GOSUB 9210
393             IF ANS="Y" THEN
394                FOR X=1 TO X + 1 UNTIL LIS.ATTRS<X>=''
395                   HDR.REC(LIS.ATTRS<X>)=DELETE(HDR.REC(LIS.ATTRS<X>),1,LIS.INFO<
    LIS,3>,0)
396                NEXT X
397             END
398             LIS.INFO<LIS,1>=0
```

Appendix H - Page   8

Document Image File Maintenance (Main Logic) Program
ACORD.FORMS.MAIN (Version 2.1)

```
399             GO TO 170
400           CASE ENTRY[1,1]="L"        ;***** INSERT A NEW LINE
401             IF LIS.INFO<LIS,3>+1 > LIS.INFO<LIS,6> THEN
402               PRMT.KEY = "392~":LIS.INFO<LIS,6>
403               GOSUB 9200
404               GO TO 170
405             END
406             LIS.INFO<LIS,3>=LIS.INFO<LIS,3> + 1
407               FOR X=1 TO X + 1 UNTIL LIS.ATTRS<X>=''
408                 HDR.REC(LIS.ATTRS<X>)=INSERT(HDR.REC(LIS.ATTRS<X>),1,LIS.INFO<
        LIS,3>,0,"")
409               NEXT X
410             LIS.INFO<LIS,1>=0
411             ENTRY=LIS.INFO<LIS,3>
412             GOSUB 8600
413           CASE ENTRY[1,1]="I"        ;***** INSERT A NEW LINE IN FRONT OF THIS L
        INE
414             IF LIS.INFO<LIS,3>+1 > LIS.INFO<LIS,6> THEN
415               PRMT.KEY = "392~":LIS.INFO<LIS,6>
416               GOSUB 9200
417               GO TO 170
418             END
419               FOR X=1 TO X + 1 UNTIL LIS.ATTRS<X>=''
420                 HDR.REC(LIS.ATTRS<X>)=INSERT(HDR.REC(LIS.ATTRS<X>),1,LIS.INFO<
        LIS,3>,0,"")
421               NEXT X
422             LIS.INFO<LIS,1>=0
423             ENTRY=LIS.INFO<LIS,3>
424             GOSUB 8600
425           CASE ENTRY[1,1]="D"        ;***** DUPE A LINE
426             IF LIS.INFO<LIS,3>+1 > LIS.INFO<LIS,6> THEN
427               PRMT.KEY = "392~":LIS.INFO<LIS,6>
428               GOSUB 9200
429               GO TO 170
430             END
431             PRMT.KEY=312
432             LENG = 3
433             GOSUB 9220
434             IF ANS#'E' AND ANS#"" AND NUM(ANS) THEN
435               FOR X=1 TO X + 1 UNTIL LIS.ATTRS<X>=''
436                 HDR.REC(LIS.ATTRS<X>)=INSERT(HDR.REC(LIS.ATTRS<X>),1,LIS.INFO<
        LIS,3>,0,HDR.REC(LIS.ATTRS<X>)<1,ANS>)
437               NEXT X
438             END
439             LIS.INFO<LIS,1>=0
440             GO TO 170
441           CASE 1                     ;* CATCH-ALL
442             PRMT.KEY=43
443             GOSUB 9200 ;***** STD.MESSAGE
444             GO TO 170
445           END CASE
446           LIS.INFO<LIS,3>=ENTRY
447
448 180    LIS=2
```

Appendix H - Page 9

Document Image File Maintenance (Main Logic) Program
ACORD.FORMS.MAIN (Version 2.1)

```
449       LIS.INFO<LIS,5>=DCOUNT(HDR.REC(11)<1>,VM)
450       GOSUB 8600
451       REF.FILE="";HELP.KEY="ACORD.FORMS.180";LENG=6;ILEN=0
452       HRZ=6;VRT=11+LIS.INFO<LIS,2>;CON="MR2":VM:"MR2";PATT='0X';MASK="R#6";M
      AN="";FIELD.NO=14;DY.TAB=3
453       OLDVALUE=HDR.REC(11)<1,LIS.INFO<LIS,3>>
454       AMC=11;VMC=LIS.INFO<LIS,3>;SVMC=0
455       IF OLDVALUE="" THEN
456          IF VMC > 1 THEN OLDVALUE = HDR.REC(AMC)<1,VMC-1>
457       END
458       GOSUB 9000 ;***** STD.INPUT
459       HDR.REC(11)<1,LIS.INFO<LIS,3>>=ENTRY
460
461 190   LIS=2
462       LIS.INFO<LIS,5>=DCOUNT(HDR.REC(11)<1>,VM)
463       GOSUB 8600
464       REF.FILE="";HELP.KEY="ACORD.FORMS.190";LENG=6;ILEN=0
465       HRZ=14;VRT=11+LIS.INFO<LIS,2>;CON="MR2":VM:"MR2";PATT='0X';MASK="R#6";
      MAN="";FIELD.NO=15;DY.TAB=3
466       OLDVALUE=HDR.REC(12)<1,LIS.INFO<LIS,3>>
467       AMC=12;VMC=LIS.INFO<LIS,3>;SVMC=0
468       IF OLDVALUE="" THEN
469          IF VMC > 1 THEN OLDVALUE = HDR.REC(AMC)<1,VMC-1>
470       END
471       GOSUB 9000 ;***** STD.INPUT
472       HDR.REC(12)<1,LIS.INFO<LIS,3>>=ENTRY
473       LIS.INFO<LIS,3>=LIS.INFO<LIS,3> + 1
474       GO TO 170
475 1709 * CONTINUE WITH NEXT FIELD
476
477 200   LIS=3
478       LIS.INFO<LIS,5>=DCOUNT(HDR.REC(14)<1>,VM)
479       GOSUB 8600
480       REF.FILE="";HELP.KEY="ACORD.FORMS.200";LENG=3;ILEN=0
481       HRZ=1;VRT=14+LIS.INFO<LIS,2>;CON="MCN":VM:"MR0";PATT='0N';MASK="R#3";M
      AN="LINE";FIELD.NO=16;DY.TAB=4:AM:2
482       OLDVALUE=LIS.INFO<LIS,3>
483       AMC="";VMC="";SVMC=""
484       IF LIS.RTN THEN
485          LIS.RTN = LIS.RTN + 2
486          IF LIS.RTN = 4 THEN LIS.RTN = 0 ;! GOING TO A SPECIFIC LINE
487       END ELSE
488          GOSUB 9000
489       END
490       CRT @(HRZ,VRT):OLDVALUE MASK:
491       IF ENTRY[1,1]="." THEN ENTRY=ENTRY[2,99]
492       LIS.ATTRS=13:AM:14:AM:16:AM:17:AM:18:AM:15:AM:""
493       BEGIN CASE
494          CASE ENTRY=OLDVALUE      ;***** PROCESS FIRST LIS FIELD
495          CASE ENTRY[1,1]="E"      ;***** JUMP OUT OF THIS LIS SET LOOKING TO
      NEXT FIELD
496             GO TO 2009
497          CASE ENTRY[1,1]="N"      ;***** JUMP OUT OF THIS LIS SET LOOKING TO
      FINISH BUT NOT FILE
```

Appendix H - Page   10

Document Image File Maintenance (Main Logic) Program
ACORD.FORMS.MAIN (Version 2.1)

```
498              GO TO 2009
499           CASE ENTRY[1,1]="F"      ;***** JUMP OUT OF THIS LIS SET LOOKING TO
     FINISH AND FILE
500              GO TO 2009
501           CASE ENTRY[1,2]="++"     ;***** LAST PAGE
502              LIS.INFO<LIS,3>=9999
503              GO TO 200
504           CASE ENTRY[1,2]="--"     ;***** FIRST PAGE
505              LIS.INFO<LIS,3>=1
506              GO TO 200
507           CASE ENTRY[1,1]="+"      ;***** NEXT PAGE
508              LIS.INFO<LIS,3>=LIS.INFO<LIS,3> + LIS.INFO<LIS,4>
509              GO TO 200
510           CASE ENTRY[1,1]="-"      ;***** PREVIOUS PAGE
511              LIS.INFO<LIS,3>=LIS.INFO<LIS,3> - LIS.INFO<LIS,4>
512              GO TO 200
513           CASE NUM(ENTRY)          ;***** GO TO SPECIFIC LINE
514              LIS.INFO<LIS,3>=ENTRY
515              GO TO 200
516           CASE ENTRY[1,1]="K"      ;***** KILL THIS LINE
517              PRMT.KEY=41
518              GOSUB 9210
519              IF ANS="Y" THEN
520                 FOR X=1 TO X + 1 UNTIL LIS.ATTRS<X>=''
521                    HDR.REC(LIS.ATTRS<X>)=DELETE(HDR.REC(LIS.ATTRS<X>),1,LIS.INFO<
     LIS,3>,0)
522                 NEXT X
523              END
524              LIS.INFO<LIS,1>=0
525              GO TO 200
526           CASE ENTRY[1,1]="L"      ;***** INSERT A NEW LINE
527              IF LIS.INFO<LIS,3>+1 > LIS.INFO<LIS,6> THEN
528                 PRMT.KEY = "392~":LIS.INFO<LIS,6>
529                 GOSUB 9200
530                 GO TO 200
531              END
532              LIS.INFO<LIS,3>=LIS.INFO<LIS,3> + 1
533                 FOR X=1 TO X + 1 UNTIL LIS.ATTRS<X>=''
534                    HDR.REC(LIS.ATTRS<X>)=INSERT(HDR.REC(LIS.ATTRS<X>),1,LIS.INFO<
     LIS,3>,0,"")
535                 NEXT X
536              LIS.INFO<LIS,1>=0
537              ENTRY=LIS.INFO<LIS,3>
538              GOSUB 8600
539           CASE ENTRY[1,1]="I"      ;***** INSERT A NEW LINE IN FRONT OF THIS L
     INE
540              IF LIS.INFO<LIS,3>+1 > LIS.INFO<LIS,6> THEN
541                 PRMT.KEY = "392~":LIS.INFO<LIS,6>
542                 GOSUB 9200
543                 GO TO 200
544              END
545                 FOR X=1 TO X + 1 UNTIL LIS.ATTRS<X>=''
546                    HDR.REC(LIS.ATTRS<X>)=INSERT(HDR.REC(LIS.ATTRS<X>),1,LIS.INFO<
     LIS,3>,0,"")
```

Appendix H - Page   11

Document Image File Maintenance (Main Logic) Program
ACORD.FORMS.MAIN (Version 2.1)

```
547              NEXT X
548              LIS.INFO<LIS,1>=0
549              ENTRY=LIS.INFO<LIS,3>
550              GOSUB 8600
551           CASE ENTRY[1,1]="D"        ;***** DUPE A LINE
552              IF LIS.INFO<LIS,3>+1 > LIS.INFO<LIS,6> THEN
553                 PRMT.KEY = "392~":LIS.INFO<LIS,6>
554                 GOSUB 9200
555                 GO TO 200
556              END
557              PRMT.KEY=312
558              LENG = 3
559              GOSUB 9220
560              IF ANS#'E' AND ANS#"" AND NUM(ANS) THEN
561                 FOR X=1 TO X + 1 UNTIL LIS.ATTRS<X>=''
562                    HDR.REC(LIS.ATTRS<X>)=INSERT(HDR.REC(LIS.ATTRS<X>),1,LIS.INFO<
      LIS,3>,0,HDR.REC(LIS.ATTRS<X>)<1,ANS>)
563                 NEXT X
564              END
565              LIS.INFO<LIS,1>=0
566              GO TO 200
567           CASE 1                     ;* CATCH-ALL
568              PRMT.KEY=43
569              GOSUB 9200 ;***** STD.MESSAGE
570              GO TO 200
571           END CASE
572        LIS.INFO<LIS,3>=ENTRY
573
574 210    LIS=3
575        LIS.INFO<LIS,5>=DCOUNT(HDR.REC(14)<1>,VM)
576        GOSUB 8600
577        REF.FILE="";HELP.KEY="ACORD.FORMS.210";LENG=6;ILEN=0
578        HRZ=5;VRT=14+LIS.INFO<LIS,2>;CON="MR2":VM:"MR2";PATT='0X';MASK="R#6";M
      AN="";FIELD.NO=17;DY.TAB=4
579        OLDVALUE=HDR.REC(13)<1,LIS.INFO<LIS,3>>
580        AMC=13;VMC=LIS.INFO<LIS,3>;SVMC=0
581        IF OLDVALUE="" THEN
582           IF VMC > 1 THEN OLDVALUE = HDR.REC(AMC)<1,VMC-1>
583        END
584        GOSUB 9000 ;***** STD.INPUT
585        HDR.REC(13)<1,LIS.INFO<LIS,3>>=ENTRY
586
587 220    LIS=3
588        LIS.INFO<LIS,5>=DCOUNT(HDR.REC(14)<1>,VM)
589        GOSUB 8600
590        REF.FILE="";HELP.KEY="ACORD.FORMS.220";LENG=6;ILEN=0
591        HRZ=12;VRT=14+LIS.INFO<LIS,2>;CON="MR2":VM:"MR2";PATT='0X';MASK="R#6";
      MAN="";FIELD.NO=18;DY.TAB=4
592        OLDVALUE=HDR.REC(14)<1,LIS.INFO<LIS,3>>
593        AMC=14;VMC=LIS.INFO<LIS,3>;SVMC=0
594        IF OLDVALUE="" THEN
595           IF VMC > 1 THEN OLDVALUE = HDR.REC(AMC)<1,VMC-1>
596        END
597        GOSUB 9000 ;***** STD.INPUT
```

Appendix H - Page   12

Document Image File Maintenance (Main Logic) Program
ACORD.FORMS.MAIN (Version 2.1)

```
598         HDR.REC(14)<1,LIS.INFO<LIS,3>>=ENTRY
599
600  225   LIS=3
601         LIS.INFO<LIS,5>=DCOUNT(HDR.REC(14)<1>,VM)
602         GOSUB 8600
603         REF.FILE="";HELP.KEY="ACORD.FORMS.225";LENG=1;ILEN=0
604         HRZ=19;VRT=14+LIS.INFO<LIS,2>;CON="MCA":VM:"";PATT='0X';MASK="L#1";MAN
     ="";FIELD.NO=19;DY.TAB=4
605         OLDVALUE=HDR.REC(16)<1,LIS.INFO<LIS,3>>
606         AMC=16;VMC=LIS.INFO<LIS,3>;SVMC=0
607         IF OLDVALUE="" THEN OLDVALUE='H'
608         GOSUB 9000 ;***** STD.INPUT
609         BEGIN CASE
610            CASE ENTRY='H'
611            CASE ENTRY='V'
612            CASE 1
613              PRMT.KEY=67
614              GOSUB 9200 ;***** STD.MESSAGE
615              GO TO 225
616         END CASE
617         HDR.REC(16)<1,LIS.INFO<LIS,3>>=ENTRY
618
619  226   LIS=3
620         LIS.INFO<LIS,5>=DCOUNT(HDR.REC(14)<1>,VM)
621         GOSUB 8600
622         REF.FILE="";HELP.KEY="ACORD.FORMS.226";LENG=2;ILEN=0
623         HRZ=21;VRT=14+LIS.INFO<LIS,2>;CON="MCN":VM:"MR0";PATT='ON';MASK="R#2";
     MAN="Y";FIELD.NO=20;DY.TAB=4
624         OLDVALUE=HDR.REC(17)<1,LIS.INFO<LIS,3>>
625         AMC=17;VMC=LIS.INFO<LIS,3>;SVMC=0
626         IF OLDVALUE="" THEN
627            IF VMC > 1 THEN OLDVALUE = HDR.REC(AMC)<1,VMC-1>
628         END
629         GOSUB 9000 ;***** STD.INPUT
630         HDR.REC(17)<1,LIS.INFO<LIS,3>>=ENTRY
631
632  228   LIS=3
633         LIS.INFO<LIS,5>=DCOUNT(HDR.REC(14)<1>,VM)
634         GOSUB 8600
635         REF.FILE="";HELP.KEY="ACORD.FORMS.228";LENG=1;ILEN=0
636         HRZ=24;VRT=14+LIS.INFO<LIS,2>;CON="MCA":VM:"";PATT='0X';MASK="L#1";MAN
     ="Y";FIELD.NO=21;DY.TAB=4
637         OLDVALUE=HDR.REC(18)<1,LIS.INFO<LIS,3>>
638         AMC=18;VMC=LIS.INFO<LIS,3>;SVMC=0
639         IF OLDVALUE="" THEN OLDVALUE='B'
640         GOSUB 9000 ;***** STD.INPUT
641         BEGIN CASE
642            CASE ENTRY='M'
643            CASE ENTRY='B'
644            CASE 1
645              PRMT.KEY=67
646              GOSUB 9200 ;***** STD.MESSAGE
647              GO TO 228
648         END CASE
```

Appendix H - Page 13

Document Image File Maintenance (Main Logic) Program
ACORD.FORMS.MAIN (Version 2.1)

```
649         HDR.REC(18)<1,LIS.INFO<LIS,3>>=ENTRY
650
651  230   LIS=3
652         LIS.INFO<LIS,5>=DCOUNT(HDR.REC(14)<1>,VM)
653         GOSUB 8600
654         REF.FILE="";HELP.KEY="ACORD.FORMS.230";LENG=53;ILEN=0
655         HRZ=26;VRT=14+LIS.INFO<LIS,2>;CON="";PATT='0X';MASK="L#53";MAN="";FIEL
     D.NO=22;DY.TAB=4
656         OLDVALUE=HDR.REC(15)<1,LIS.INFO<LIS,3>>
657         AMC=15;VMC=LIS.INFO<LIS,3>;SVMC=0
658         GOSUB 9000 ;***** STD.INPUT
659         HDR.REC(15)<1,LIS.INFO<LIS,3>>=ENTRY
660         LIS.INFO<LIS,3>=LIS.INFO<LIS,3> + 1
661         GO TO 200
662  2009 * CONTINUE WITH NEXT FIELD
663
664  240   REF.FILE="";HELP.KEY="ACORD.FORMS.240";LENG=6;ILEN=0
665         HRZ=30;VRT=12;CON="MR2":VM:"MR2";PATT='0X';MASK="R#6";MAN="";FIELD.NO=
     23;DY.TAB=5:AM:1
666         OLDVALUE=HDR.REC(19)
667         AMC=19;VMC=0;SVMC=0
668         GOSUB 9000 ;***** STD.INPUT
669         HDR.REC(19)=ENTRY
670
671  250   REF.FILE="";HELP.KEY="ACORD.FORMS.250";LENG=6;ILEN=0
672         HRZ=44;VRT=12;CON="MR2":VM:"MR2";PATT='0X';MASK="R#6";MAN="";FIELD.NO=
     24;DY.TAB=5
673         OLDVALUE=HDR.REC(20)
674         AMC=20;VMC=0;SVMC=0
675         GOSUB 9000 ;***** STD.INPUT
676         HDR.REC(20)=ENTRY
677
678  260   REF.FILE="";HELP.KEY="ACORD.FORMS.260";LENG=6;ILEN=0
679         HRZ=59;VRT=12;CON="MR2":VM:"MR2";PATT='0X';MASK="R#6";MAN="";FIELD.NO=
     25;DY.TAB=5
680         OLDVALUE=HDR.REC(21)
681         AMC=21;VMC=0;SVMC=0
682         GOSUB 9000 ;***** STD.INPUT
683         HDR.REC(21)=ENTRY
684
685  270   REF.FILE="";HELP.KEY="ACORD.FORMS.270";LENG=6;ILEN=0
686         HRZ=73;VRT=12;CON="MR2":VM:"MR2";PATT='0X';MASK="R#6";MAN="";FIELD.NO=
     26;DY.TAB=5
687         OLDVALUE=HDR.REC(22)
688         AMC=22;VMC=0;SVMC=0
689         GOSUB 9000 ;***** STD.INPUT
690         HDR.REC(22)=ENTRY
691
692       * END OF KERNELS
693  8000 BEGIN CASE
694         CASE MODE='A'  ; MODE='CA'
695         CASE MODE='AC' ; MODE='C'
696       END CASE
697       IF SKIP.FLAG=998 THEN
```

Appendix H - Page   14

Document Image File Maintenance (Main Logic) Program
ACORD.FORMS.MAIN (Version 2.1)

```
698       PRE.STORE=INSERT(PRE.STORE,1,1,0,'F')
699       SKIP.FLAG=0
700     END ELSE
701       SKIP.FLAG=0
702     END
703     FIELD.NO=LAST.FIELD.NO
704     MAN=''
705     REF.FILE=''
706     HELP.KEY=FIELD(PGM.NAME,'$',1):'.8000'
707     PRMT.KEY=SCREEN.PROMPT
708     LENG=SCREEN.PROMPT.LEN
709     GOSUB 9220
710     IF ANS[1,1]='.' THEN ANS=ANS[2,99]
711     BEGIN CASE
712   CASE ANS = 'F'  ;* FILE AND CREATE THE PRINT IMAGE
713     GOSUB 8100
714     SAVE.KEY = INT.HDR.KEY
715     GOSUB 8200
716     PRMT.KEY = 155
717     GOSUB 9210
718     BEGIN CASE
719       CASE ANS = 'Y'
720         DATA SAVE.KEY
721         CRT CLR:PROTECT.MODE.OFF:
722         PGMS.KEY = 'STD.FORMS.BUILDER' ;GOSUB 8950
723         CRT PROTECT.MODE.ON:
724         GOSUB 9300
725       CASE 1
726         GOSUB 9450
727     END CASE
728     GO TO 10
729    CASE ANS='F'
730     $INCLUDE USER.BP FILE.INCLUDE
731    CASE ANS='D'
732     $INCLUDE USER.BP DELETE.INCLUDE
733    CASE ANS='Q';* QUIT
734     GOSUB 8200
735     GOSUB 9450
736     GO TO 10
737    CASE ANS = 'S'  ;* SCREEN CALL
738     HELP.KEY = ''
739     X = 0
740     LOOP
741       X = X + 1
742       SC.HRZ = CALLED.SCREENS<X,2>
743       SC.VRT = CALLED.SCREENS<X,3>
744     UNTIL CALLED.SCREENS<X,1> = '' DO
745       CRT PROTECT.MODE.OFF:@(SC.HRZ+1,SC.VRT):R.BOUNDRY:@(SC.HRZ-1,SC.VRT
  ):L.BOUNDRY:
746       PRMT.KEY = 500
747       GOSUB 9210
748       CRT PROTECT.MODE.OFF:@(SC.HRZ-1,SC.VRT):TRM.RESET.NV:PROTECT.MODE.O
  N:
749       BEGIN CASE
```

Appendix H - Page 15

Document Image File Maintenance (Main Logic) Program
ACORD.FORMS.MAIN (Version 2.1)

```
750            CASE ANS = 'Y'
751              PGMS.KEY = CALLED.SCREENS<X,1>
752              GOSUB 8900
753              GOSUB 9500
754            CASE ANS = 'E'
755              X = 99
756            END CASE
757          REPEAT
758          CASE ANS[1,1] = CHAR(9) AND CURRENT.TRAN = 'DIS'
759            PRMT.KEY = '498~<Tab>'
760            GOSUB 9200
761          CASE ANS[1,1]=CHAR(9);* TAB
762            ENTRY = ANS
763            DY.TAB=1
764            GO TO 9020
765          CASE ANS[1,1] = CHAR(11) AND CURRENT.TRAN = 'DIS'
766            PRMT.KEY = '498~<Up Arrow>'
767            GOSUB 9200
768          CASE ANS[1,1]=CHAR(11);* UP ARROW
769            ENTRY = ANS
770            FIELD.NO=LAST.FIELD.NO - ANS[2,3] + 1
771            GO TO 9010
772          CASE ANS[1,1] = CHAR(10) AND CURRENT.TRAN = 'DIS'
773            PRMT.KEY = '498~<Down Arrow>'
774            GOSUB 9200
775          CASE ANS[1,1]=CHAR(10);* DOWN ARROW
776            ENTRY = ANS
777            DY.TAB=1
778            GO TO 9020
779          CASE ANS[1,1] = CHAR(30) AND CURRENT.TRAN = 'DIS'
780            PRMT.KEY = '498~<Home>'
781            GOSUB 9200
782          CASE ANS[1,1]=CHAR(30);* HOME
783            ENTRY = ANS
784            DY.TAB=1
785            GO TO 9020
786          CASE INDEX(ANS,';',1) AND CURRENT.TRAN = 'DIS'
787            PRMT.KEY = '498~Line Item #'
788            GOSUB 9200
789          CASE INDEX(ANS,';',1)
790            ENTRY = FIELD(ANS,';',2)
791            ANS = FIELD(ANS,';',1)
792            IF ANS GE 1 AND ANS LE 5 THEN NULL ELSE ANS = 1
793            LIS.RTN = 2
794            GO TO 8090
795          CASE INDEX(ANS,'++',1)
796            ANS = FIELD(ANS,'+',1)
797            IF ANS GE 1 AND ANS LE 5 THEN NULL ELSE ANS = 1
798            LIS.RTN = 1
799            ENTRY = '++'
800            GO TO 8090
801          CASE INDEX(ANS,'--',1)
802            ANS = FIELD(ANS,'-',1)
803            IF ANS GE 1 AND ANS LE 5 THEN NULL ELSE ANS = 1
```

Appendix H - Page 16

Document Image File Maintenance (Main Logic) Program
ACORD.FORMS.MAIN (Version 2.1)

```
804            LIS.RTN = 1
805            ENTRY = '--'
806            GO TO 8090
807         CASE INDEX(ANS,'+',1)
808            ANS = FIELD(ANS,'+',1)
809            IF ANS GE 1 AND ANS LE 5 THEN NULL ELSE ANS = 1
810            LIS.RTN = 1
811            ENTRY = '+'
812            GO TO 8090
813         CASE INDEX(ANS,'-',1)
814            ANS = FIELD(ANS,'-',1)
815            IF ANS GE 1 AND ANS LE 5 THEN NULL ELSE ANS = 1
816            LIS.RTN = 1
817            ENTRY = '-'
818            GO TO 8090
819         CASE ANS # '' AND NUM(ANS) AND CURRENT.TRAN = 'DIS'
820            PRMT.KEY = '498~Line Item #'
821            GOSUB 9200
822         CASE ANS # '' AND NUM(ANS)
823            ENTRY = ANS
824            ANS = 1
825            LIS.RTN = 2
826 8090    ON ANS GO TO 120,170,200
827         CASE 1
828            PRMT.KEY='13'
829            GOSUB 9200
830         END CASE
831         GO TO 8000
832 8100 * UPDATING ROUTINE
833         IF ACF.SYS.REC(7) # '' AND CURRENT.TRAN # 'DIS' THEN
834            * WRITE AUDIT RECORD INTO SCRIPT FILE
835            AUDIT.STOP = TIME()
836            STD.ARG(1) = PGM.NAME
837            STD.ARG(2) = 'DATA ENTRY'
838            PGMS.KEY = 'STD.AUDIT.FLOW' ;GOSUB 8900
839            AUDIT.START = TIME()
840         END
841      * UPDATE THE ACORD.FORMS FILE RECORD WITH OFFSETS
842      WRITEV OCONV(HDR.REC(19),'MR2') ON ACORD.FORMS.FILE,INT.HDR.KEY,4 ;* BG HORIZ
843      WRITEV OCONV(HDR.REC(20),'MR2') ON ACORD.FORMS.FILE,INT.HDR.KEY,5 ;* BG VERT
844      WRITEV OCONV(HDR.REC(21),'MR2') ON ACORD.FORMS.FILE,INT.HDR.KEY,6 ;* FG HORIZ
845      WRITEV OCONV(HDR.REC(22),'MR2') ON ACORD.FORMS.FILE,INT.HDR.KEY,7 ;* FG VERT
846         $INCLUDE USER.BP UPDATE.INCLUDE
847         RETURN
848 8200 * RESET ROUTINE
849         $INCLUDE USER.BP RESET.INCLUDE
850 LIS.INFO<1> = 1:VM:1:VM:1:VM:5:VM:VM:999:VM:1:VM:"":VM:"":VM:"":VM:""
851 LIS.ATTR.LIST<1> = 4:VM:5:VM:6:VM:7:VM:8:VM:9:VM:10:VM:23
852 LIS.INFO<2> = 1:VM:1:VM:1:VM:2:VM:VM:999:VM:1:VM:"":VM:"":VM:"":VM:""
853 LIS.ATTR.LIST<2> = 11:VM:12
```

Appendix H - Page 17

Document Image File Maintenance (Main Logic) Program
ACORD.FORMS.MAIN (Version 2.1)

```
854      LIS.INFO<3> = 1:VM:1:VM:1:VM:8:VM:VM:999:VM:1:VM:"":VM:"":VM:"":VM:""
855      LIS.ATTR.LIST<3> = 13:VM:14:VM:16:VM:17:VM:18:VM:15
856      * MARKER $$50
857      HDR.KEY=''
858      INT.HDR.KEY=''
859      LIS.RTN=0
860      RETURN
861 8300 * UPDATE RTN UPON PGM EXIT
862      * MARKER $$60
863      RETURN
864 8400 * RTN UPON PGM EXIT
865      * MARKER $$70
866      RETURN
867 8500 * RTN UPON RECORD DELETION
868      * MARKER $$80
869      RETURN
870 8600 * LIS ACTIVE PAGE DETERMINATION AND DISPLAY
871      PROCESS = LIS
872      PGMS.KEY = "STD.LIS.DISPLAY" ; GOSUB 8900
873      IF LIS.RTN = 3 THEN
874         LIS.RTN = 0
875         RETURN TO 8000
876      END
877      RETURN
878 *
879 * STANDARD CALL ROUTINE
880 *
881 $INCLUDE USER.BP STD.CALL.INCLUDE$1
882 *
883 * STANDARD EXECUTE ROUTINE
884 *
885 $INCLUDE USER.BP STD.EXECUTE.INCLUDE$1
886 *
887 9000 PGMS.KEY = 'STD.INPUT' ;GOSUB 8900
888      IF DEBUG.FLAG THEN
889         PROCESS = 1
890         GOSUB 8
891      END
892      BEGIN CASE
893         CASE ENTRY[1,1]=CHAR(11) ;* UP ARROW
894            IF DY.TAB<2>=2 THEN;* THIS IS A LIS FIELD
895               IF LIS.INFO<LIS,3> > 1 THEN;* MOVE UP A LINE
896                  LIS.INFO<LIS,3>=LIS.INFO<LIS,3> - ENTRY[2,3]
897                  RETURN TO 9010
898               END ELSE;* JUMP UP OUT OF LIS SET
899                  NULL
900               END
901            END
902            FIELD.NO=FIELD.NO - ENTRY[2,3]
903            IF FIELD.NO < 1 THEN FIELD.NO=1
904            IF FIELD.NO=1 AND MAIN.SCREEN THEN
905               IF EXT.INT.KEY AND MODE='C' THEN
906                  NULL
907               END ELSE
```

Appendix H - Page 18

Document Image File Maintenance (Main Logic) Program
ACORD.FORMS.MAIN (Version 2.1)

```
908            PRMT.KEY = "4"
909            GOSUB 9210
910            IF ANS = "Y" THEN
911              GOSUB 8200
912              GOSUB 9450
913            END ELSE
914              FIELD.NO=2
915            END
916          END
917        END
918        RETURN TO 9010
919      CASE ENTRY[1,1]=CHAR(10)  ;* DOWN ARROW
920        IF DY.TAB<2>=2 THEN;* THIS IS A LIS FIELD
921          LIS.INFO<LIS,3>=LIS.INFO<LIS,3> + ENTRY[2,3]
922          RETURN TO 9010
923        END
924        FIELD.NO=FIELD.NO + ENTRY[2,3]
925        RETURN TO 9010
926      CASE ENTRY[1,1]=CHAR(30);*HOME
927        DY.TAB=1
928        RETURN TO 9020
929      CASE ENTRY[1,1]=CHAR(9);*UP OR DOWN TAB
930        BEGIN CASE
931          CASE MODE[1,1]='C' AND ENTRY[2,5] > 0
932            DY.TAB=DY.TAB<1> + 1
933          CASE 1
934            IF DY.TAB<2> # '' THEN
935              DY.TAB=DY.TAB<1> - 1
936              IF DY.TAB < 1 THEN DY.TAB=1
937            END
938        END CASE
939        RETURN TO 9020
940      CASE ENTRY[1,2]=ESC2:"Q"  ;* QUIT THIS TRANSACTION
941        PRE.STORE=INSERT(PRE.STORE,1,1,0,'Q')
942        RETURN TO 8000
943      CASE ENTRY[1,2]=ESC2:"F" AND MODE[1,1]='C';* FILE THIS TRANSACTION
944        PRE.STORE=INSERT(PRE.STORE,1,1,0,'F')
945        RETURN TO 8000
946      CASE ENTRY[1,2]=ESC2:"N" AND MODE[1,1]='C';* GO TO ACCEPTANCE PROMPT
947        RETURN TO 8000
948      CASE 1
949    END CASE
950    RETURN
951 9010   ON FIELD.NO GO TO 100,110,115,120,130,140,150,160,165,166,167,168,
     170,180,190,200,210,220,225,226,228,230,240,250,260,270
952      GO TO 8000
953 9020   ON DY.TAB GO TO 110,120,170,200,240
954      GO TO 8000
955 9200 CRT BELL:
956      $INCLUDE USER.BP MESSAGE.INCLUDE
957      RETURN
958 9300 PROCESS=1;* DISPLAY BG
959      PGMS.KEY = SCREEN.SUB ;GOSUB 8900
```

Appendix H - Page 19

Document Image File Maintenance (Main Logic) Program
ACORD.FORMS.MAIN (Version 2.1)

```
960       RETURN
961 9400  PROCESS=2;* DISPLAY FG
962 9410  PGMS.KEY = SCREEN.SUB ;GOSUB 8900
963       RETURN
964 9450  PROCESS=3;* CLEAR FG
965       PGMS.KEY = SCREEN.SUB ;GOSUB 8900
966       RETURN
967 9500 * DISPLAY BG & FG
968       GOSUB 9300
969       GOSUB 9400
970       RETURN
971 9600 * GENERATE HISTORY RECORD
972      * MARKER $$100
973       RETURN
974 *
975 9700  PGMS.KEY = 'STD.LOCK' ;GOSUB 8900
976       RETURN
977 *
978 9725 *
979      * MARKER $$102
980       RETURN
981 *
982 9900  PGMS.KEY = 'STD.OPEN' ;GOSUB 8900
983       IF PRMT.KEY # '' THEN
984          GOSUB 9200
985          ABORT
986       END
987       RETURN
988 *
989 9999  IF DEBUG.FLAG THEN
990          PROCESS = 4
991          GOSUB 8
992       END
993       RETURN
994 *
995      * MARKER $$90
996 END
```

[405] 1 items listed out of 1 items.

Appendix H - Page 20

Document Image File Maintenance (Display Routines) Program
ACORD.FORMS.BGFG (Version 2.1)

```
    ACORD.FORMS$2.1.BGFG
001 SUBROUTINE ACORD.FORMS$2.1.BGFG
002 GO TO 9
003 *******************************************************
004 * Creative Information Systems CO. Inc.               *
005 * Copyright 1989 Creative Information Systems CO. Ltd *
006 *******************************************************
007 *
008 *
009 *
010 *
011 *
012 *
013 *
014 *
015 *
016 *
017 *
018 *
019 *
020 *
021 *
022 *
023 *
024 *
025 $INCLUDE EQUATES SYSTEM.COMMON
026 *
027 $INCLUDE EQUATES TERMINAL
028 *
029 $INCLUDE USER.BP ACORD.FORMS$2.1.MAIN.EQUATES.INCLUDE
030 9    IF DEBUG.FLAG THEN
031        CRT @(0,22):CL:PGM.NAME:'.BGFG DEBUG':
032        INPUT DUMMY,1:
033        CRT @(0,22):CL:
034      END
035      ON PROCESS<1> GO TO 100,200,300,400
036      ABORT
037 100  * BACKGROUND TEXT STRING
038      PRINT CLR:PROTECT.MODE.ON:START.BG:@(0,0):\Ref: ACRD.FRMS$2.1\:@(23,0)
    :CRT.LOGO:
039      PRINT @(23,1):\ACORD Forms Generation Parameters\:@(76,1):\P/L\:
040      PRINT @(0,2):\ACORD Form #:\:@(23,2):\Description:\:
041      PRINT @(0,3):\-------------------------------- Lines and Boxes --------
    -----------------------\:
042      PRINT @(0,4):\Line  Horiz  Vert  Height  Width  Wt T Patt ----- Commen
    ts --------------------\:
043      PRINT @(1,10):\- Check off Boxes -\:@(23,10):\----------------- Printi
    ng Offsets ---------------------\:
044      PRINT @(23,11):\------- Background --------   -------- Foreground -----
    --\:
045      PRINT @(23,12):\Horiz:\:@(38,12):\Vert:\:@(52,12):\Horiz:\:@(67,12):\V
    ert:\:
046      PRINT @(0,13):\------Horiz---Vert-O-Pt-Wt----- Background Text -------
    -------------------------\:
```

Document Image File Maintenance (Display Routines) Program
ACORD.FORMS.BGFG (Version 2.1)

```
047       PRINT END.BG:
048     * END OF BG LINES
049       RETURN
050 200 * DISPLAY THE RECORD
051       ON PROCESS<2> GO TO 201,202,203
052       CRT @(14,2):FIELD(HDR.KEY,"*",1)'L#8':
053       CRT @(36,2):HDR.REC(3)'L#40':
054       CRT @(77,2):HDR.REC(2)'L#1':
055 201   LIS=1
056       LIS.INFO<LIS,5> = DCOUNT(HDR.REC(4)<1>,VM)
057       PAGE.INDX = ((LIS.INFO<LIS,1> - 1) * LIS.INFO<LIS,4>) + 1
058       IF PAGE.INDX > LIS.INFO<LIS,5> + 1 THEN
059          PAGE.INDX = 1
060          LIS.INFO<LIS,1> = 1
061       END
062       LIS.OFFSET = 0
063       FOR LIS.X = 0 TO LIS.INFO<LIS,4> - 1
064          CRT @(1,5+LIS.OFFSET):CL:OCONV(PAGE.INDX+LIS.X,'MR0')'R#3':
065          CRT @(5,5+LIS.OFFSET):OCONV(HDR.REC(4)<1,PAGE.INDX+LIS.X,0>,'MR2')'R#6':
066          CRT @(12,5+LIS.OFFSET):OCONV(HDR.REC(5)<1,PAGE.INDX+LIS.X,0>,'MR2')'R#6':
067          CRT @(19,5+LIS.OFFSET):OCONV(HDR.REC(6)<1,PAGE.INDX+LIS.X,0>,'MR2')'R#6':
068          CRT @(26,5+LIS.OFFSET):OCONV(HDR.REC(7)<1,PAGE.INDX+LIS.X,0>,'MR2')'R#6':
069          CRT @(33,5+LIS.OFFSET):OCONV(HDR.REC(8)<1,PAGE.INDX+LIS.X,0>,'MR0')'R#3':
070          CRT @(37,5+LIS.OFFSET):OCONV(HDR.REC(9)<1,PAGE.INDX+LIS.X,0>,'MR0')'R#1':
071          CRT @(39,5+LIS.OFFSET):OCONV(HDR.REC(10)<1,PAGE.INDX+LIS.X,0>,'MR0')'R#4':
072          CRT @(44,5+LIS.OFFSET):HDR.REC(23)<1,PAGE.INDX+LIS.X,0>'L#35':
073          LIS.OFFSET = LIS.OFFSET + LIS.INFO<LIS,7>
074       NEXT LIS.X
075       IF PROCESS<2> = 1 THEN RETURN
076 202   LIS=2
077       LIS.INFO<LIS,5> = DCOUNT(HDR.REC(11)<1>,VM)
078       PAGE.INDX = ((LIS.INFO<LIS,1> - 1) * LIS.INFO<LIS,4>) + 1
079       IF PAGE.INDX > LIS.INFO<LIS,5> + 1 THEN
080          PAGE.INDX = 1
081          LIS.INFO<LIS,1> = 1
082       END
083       LIS.OFFSET = 0
084       FOR LIS.X = 0 TO LIS.INFO<LIS,4> - 1
085          CRT @(1,11+LIS.OFFSET):CL:OCONV(PAGE.INDX+LIS.X,'MR0')'R#3':
086          CRT @(6,11+LIS.OFFSET):OCONV(HDR.REC(11)<1,PAGE.INDX+LIS.X,0>,'MR2')'R#6':
087          CRT @(14,11+LIS.OFFSET):OCONV(HDR.REC(12)<1,PAGE.INDX+LIS.X,0>,'MR2')'R#6':
088          LIS.OFFSET = LIS.OFFSET + LIS.INFO<LIS,7>
089       NEXT LIS.X
090       IF PROCESS<2> = 2 THEN RETURN
091       CRT @(30,12):OCONV(HDR.REC(19),'MR2')'R#6':
```

Document Image File Maintenance (Display Routines) Program
ACORD.FORMS.BGFG (Version 2.1)

```
092         CRT @(44,12):OCONV(HDR.REC(20),'MR2')'R#6':
093         CRT @(59,12):OCONV(HDR.REC(21),'MR2')'R#6':
094         CRT @(73,12):OCONV(HDR.REC(22),'MR2')'R#6':
095 203     LIS=3
096         LIS.INFO<LIS,5> = DCOUNT(HDR.REC(14)<1>,VM)
097         PAGE.INDX = ((LIS.INFO<LIS,1> - 1) * LIS.INFO<LIS,4>) + 1
098         IF PAGE.INDX > LIS.INFO<LIS,5> + 1 THEN
099            PAGE.INDX = 1
100            LIS.INFO<LIS,1> = 1
101         END
102         LIS.OFFSET = 0
103         FOR LIS.X = 0 TO LIS.INFO<LIS,4> - 1
104            CRT @(1,14+LIS.OFFSET):CL:OCONV(PAGE.INDX+LIS.X,'MR0')'R#3':
105            CRT @(5,14+LIS.OFFSET):OCONV(HDR.REC(13)<1,PAGE.INDX+LIS.X,0>,'MR2')
    'R#6':
106            CRT @(12,14+LIS.OFFSET):OCONV(HDR.REC(14)<1,PAGE.INDX+LIS.X,0>,'MR2'
    )'R#6':
107            CRT @(19,14+LIS.OFFSET):HDR.REC(16)<1,PAGE.INDX+LIS.X,0>'L#1':
108            CRT @(21,14+LIS.OFFSET):OCONV(HDR.REC(17)<1,PAGE.INDX+LIS.X,0>,'MR0'
    )'R#2':
109            CRT @(24,14+LIS.OFFSET):HDR.REC(18)<1,PAGE.INDX+LIS.X,0>'L#1':
110            CRT @(26,14+LIS.OFFSET):HDR.REC(15)<1,PAGE.INDX+LIS.X,0>'L#53':
111            LIS.OFFSET = LIS.OFFSET + LIS.INFO<LIS,7>
112         NEXT LIS.X
113         IF PROCESS<2> = 3 THEN RETURN
114       * END OF FG LINES
115         RETURN
116 300   * CLEAR THE FOREGROUND
117         IF TRM.LEVEL THEN PRINT CLR.FG:; RETURN
118         CRT @(14,2):SPACE(9):
119         CRT @(36,2):SPACE(41):
120         CRT @(77,2):SPACE(2):
121         FOR LIS.X = 5 TO 9
122            CRT @(0,LIS.X):CL:
123         NEXT LIS.X
124         FOR LIS.X = 11 TO 12
125            CRT @(0,LIS.X):CL:
126         NEXT LIS.X
127         CRT @(30,12):SPACE(7):
128         CRT @(44,12):SPACE(7):
129         CRT @(59,12):SPACE(7):
130         CRT @(73,12):SPACE(7):
131         FOR LIS.X = 14 TO 21
132            CRT @(0,LIS.X):CL:
133         NEXT LIS.X
134       * END OF FG CLEAR LINES
135         RETURN
136 400   * DISPLAY THE ACTIVE HISTORY RECORD
137         ON PROCESS<2> GO TO 401,402,403
138         CRT @(22,2):TRM.NV:@(13,2):" ":@(14,2):FIELD(HDR.KEY,"*",1)'L#8':
139         CRT @(76,2):TRM.NV:@(35,2):VISUAL.REC<3>:@(36,2):ACTIVE.REC<3>'L#40':
140         CRT @(78,2):TRM.NV:@(76,2):VISUAL.REC<2>:@(77,2):ACTIVE.REC<2>'L#1':
141 401     LIS=1
142         LIS.INFO<LIS,5> = DCOUNT(ACTIVE.REC<4>,VM)
```

Document Image File Maintenance (Display Routines) Program
ACORD.FORMS.BGFG (Version 2.1)

```
143        PAGE.INDX = ((LIS.INFO<LIS,1> - 1) * LIS.INFO<LIS,4>) + 1
144        IF PAGE.INDX > LIS.INFO<LIS,5> + 1 THEN
145           PAGE.INDX = 1
146           LIS.INFO<LIS,1> = 1
147        END
148        IF LIS.INFO<LIS,9> # "" THEN
149           ACTIVE.REC<LIS.INFO<LIS,9>,LIS.INFO<LIS,10>+0,LIS.INFO<LIS,11>+0> =
    DCOUNT(ACTIVE.REC<LIS.INFO<LIS,8>>,VM)
150        END
151        LIS.OFFSET = 0
152        LIS.AC = DCOUNT(LIS.ATTR.LIST<LIS>,VM)
153        FOR LIS.X = 0 TO LIS.INFO<LIS,4> - 1
154           FOR LAC = 1 TO LIS.AC
155              IF VISUAL.REC<LIS.ATTR.LIST<LIS,LAC>,PAGE.INDX+LIS.X,0> = "" THEN
    VISUAL.REC<LIS.ATTR.LIST<LIS,LAC>,PAGE.INDX+LIS.X,0> = TRM.RESET.NV
156           NEXT LAC
157           CRT @(1,5+LIS.OFFSET):OCONV(PAGE.INDX+LIS.X,'MR0')'R#3':
158           CRT @(11,5+LIS.OFFSET):TRM.NV:@(4,5+LIS.OFFSET):VISUAL.REC<4,PAGE.IN
    DX+LIS.X,0>:@(5,5+LIS.OFFSET):OCONV(ACTIVE.REC<4,PAGE.INDX+LIS.X,0>,'MR2')'
    R#6':
159           CRT @(18,5+LIS.OFFSET):TRM.NV:@(11,5+LIS.OFFSET):VISUAL.REC<5,PAGE.I
    NDX+LIS.X,0>:@(12,5+LIS.OFFSET):OCONV(ACTIVE.REC<5,PAGE.INDX+LIS.X,0>,'MR2'
    )'R#6':
160           CRT @(25,5+LIS.OFFSET):TRM.NV:@(18,5+LIS.OFFSET):VISUAL.REC<6,PAGE.I
    NDX+LIS.X,0>:@(19,5+LIS.OFFSET):OCONV(ACTIVE.REC<6,PAGE.INDX+LIS.X,0>,'MR2'
    )'R#6':
161           CRT @(32,5+LIS.OFFSET):TRM.NV:@(25,5+LIS.OFFSET):VISUAL.REC<7,PAGE.I
    NDX+LIS.X,0>:@(26,5+LIS.OFFSET):OCONV(ACTIVE.REC<7,PAGE.INDX+LIS.X,0>,'MR2'
    )'R#6':
162           CRT @(36,5+LIS.OFFSET):TRM.NV:@(32,5+LIS.OFFSET):VISUAL.REC<8,PAGE.I
    NDX+LIS.X,0>:@(33,5+LIS.OFFSET):OCONV(ACTIVE.REC<8,PAGE.INDX+LIS.X,0>,'MR0'
    )'R#3':
163           CRT @(38,5+LIS.OFFSET):TRM.NV:@(36,5+LIS.OFFSET):VISUAL.REC<9,PAGE.I
    NDX+LIS.X,0>:@(37,5+LIS.OFFSET):OCONV(ACTIVE.REC<9,PAGE.INDX+LIS.X,0>,'MR0'
    )'R#1':
164           CRT @(43,5+LIS.OFFSET):TRM.NV:@(38,5+LIS.OFFSET):VISUAL.REC<10,PAGE.
    INDX+LIS.X,0>:@(39,5+LIS.OFFSET):OCONV(ACTIVE.REC<10,PAGE.INDX+LIS.X,0>,'MR
    0')'R#4':
165           CRT @(79,5+LIS.OFFSET):TRM.NV:@(43,5+LIS.OFFSET):VISUAL.REC<23,PAGE.
    INDX+LIS.X,0>:@(44,5+LIS.OFFSET):ACTIVE.REC<23,PAGE.INDX+LIS.X,0>'L#35':
166           LIS.OFFSET = LIS.OFFSET + LIS.INFO<LIS,7>
167        NEXT LIS.X
168        IF PROCESS<2> = 1 THEN RETURN
169 402    LIS=2
170        LIS.INFO<LIS,5> = DCOUNT(ACTIVE.REC<11>,VM)
171        PAGE.INDX = ((LIS.INFO<LIS,1> - 1) * LIS.INFO<LIS,4>) + 1
172        IF PAGE.INDX > LIS.INFO<LIS,5> + 1 THEN
173           PAGE.INDX = 1
174           LIS.INFO<LIS,1> = 1
175        END
176        IF LIS.INFO<LIS,9> # "" THEN
177           ACTIVE.REC<LIS.INFO<LIS,9>,LIS.INFO<LIS,10>+0,LIS.INFO<LIS,11>+0> =
    DCOUNT(ACTIVE.REC<LIS.INFO<LIS,8>>,VM)
178        END
```

Document Image File Maintenance (Display Routines) Program
ACORD.FORMS.BGFG (Version 2.1)

```
179        LIS.OFFSET = 0
180        LIS.AC = DCOUNT(LIS.ATTR.LIST<LIS>,VM)
181        FOR LIS.X = 0 TO LIS.INFO<LIS,4> - 1
182          FOR LAC = 1 TO LIS.AC
183            IF VISUAL.REC<LIS.ATTR.LIST<LIS,LAC>,PAGE.INDX+LIS.X,0> = "" THEN
   VISUAL.REC<LIS.ATTR.LIST<LIS,LAC>,PAGE.INDX+LIS.X,0> = TRM.RESET.NV
184          NEXT LAC
185          CRT @(1,11+LIS.OFFSET):OCONV(PAGE.INDX+LIS.X,'MR0')'R#3':
186          CRT @(12,11+LIS.OFFSET):TRM.NV:@(5,11+LIS.OFFSET):VISUAL.REC<11,PAGE
   .INDX+LIS.X,0>:@(6,11+LIS.OFFSET):OCONV(ACTIVE.REC<11,PAGE.INDX+LIS.X,0>,'M
   R2')'R#6':
187          CRT @(20,11+LIS.OFFSET):TRM.NV:@(13,11+LIS.OFFSET):VISUAL.REC<12,PAG
   E.INDX+LIS.X,0>:@(14,11+LIS.OFFSET):OCONV(ACTIVE.REC<12,PAGE.INDX+LIS.X,0>,
   'MR2')'R#6':
188          LIS.OFFSET = LIS.OFFSET + LIS.INFO<LIS,7>
189        NEXT LIS.X
190        IF PROCESS<2> = 2 THEN RETURN
191        CRT @(36,12):TRM.NV:@(29,12):VISUAL.REC<19>:@(30,12):OCONV(ACTIVE.REC<
   19>,'MR2')'R#6':
192        CRT @(50,12):TRM.NV:@(43,12):VISUAL.REC<20>:@(44,12):OCONV(ACTIVE.REC<
   20>,'MR2')'R#6':
193        CRT @(65,12):TRM.NV:@(58,12):VISUAL.REC<21>:@(59,12):OCONV(ACTIVE.REC<
   21>,'MR2')'R#6':
194        CRT @(79,12):TRM.NV:@(72,12):VISUAL.REC<22>:@(73,12):OCONV(ACTIVE.REC<
   22>,'MR2')'R#6':
195 403    LIS=3
196        LIS.INFO<LIS,5> = DCOUNT(ACTIVE.REC<14>,VM)
197        PAGE.INDX = ((LIS.INFO<LIS,1> - 1) * LIS.INFO<LIS,4>) + 1
198        IF PAGE.INDX > LIS.INFO<LIS,5> + 1 THEN
199          PAGE.INDX = 1
200          LIS.INFO<LIS,1> = 1
201        END
202        IF LIS.INFO<LIS,9> # "" THEN
203          ACTIVE.REC<LIS.INFO<LIS,9>,LIS.INFO<LIS,10>+0,LIS.INFO<LIS,11>+0> =
   DCOUNT(ACTIVE.REC<LIS.INFO<LIS,8>>,VM)
204        END
205        LIS.OFFSET = 0
206        LIS.AC = DCOUNT(LIS.ATTR.LIST<LIS>,VM)
207        FOR LIS.X = 0 TO LIS.INFO<LIS,4> - 1
208          FOR LAC = 1 TO LIS.AC
209            IF VISUAL.REC<LIS.ATTR.LIST<LIS,LAC>,PAGE.INDX+LIS.X,0> = "" THEN
   VISUAL.REC<LIS.ATTR.LIST<LIS,LAC>,PAGE.INDX+LIS.X,0> = TRM.RESET.NV
210          NEXT LAC
211          CRT @(1,14+LIS.OFFSET):OCONV(PAGE.INDX+LIS.X,'MR0')'R#3':
212          CRT @(11,14+LIS.OFFSET):TRM.NV:@(4,14+LIS.OFFSET):VISUAL.REC<13,PAGE
   .INDX+LIS.X,0>:@(5,14+LIS.OFFSET):OCONV(ACTIVE.REC<13,PAGE.INDX+LIS.X,0>,'M
   R2')'R#6':
213          CRT @(18,14+LIS.OFFSET):TRM.NV:@(11,14+LIS.OFFSET):VISUAL.REC<14,PAG
   E.INDX+LIS.X,0>:@(12,14+LIS.OFFSET):OCONV(ACTIVE.REC<14,PAGE.INDX+LIS.X,0>,
   'MR2')'R#6':
214          CRT @(20,14+LIS.OFFSET):TRM.NV:@(18,14+LIS.OFFSET):VISUAL.REC<16,PAG
   E.INDX+LIS.X,0>:@(19,14+LIS.OFFSET):ACTIVE.REC<16,PAGE.INDX+LIS.X,0>'L#1':
215          CRT @(23,14+LIS.OFFSET):TRM.NV:@(20,14+LIS.OFFSET):VISUAL.REC<17,PAG
   E.INDX+LIS.X,0>:@(21,14+LIS.OFFSET):OCONV(ACTIVE.REC<17,PAGE.INDX+LIS.X,0>,
```

Document Image File Maintenance (Display Routines) Program
ACORD.FORMS.BGFG (Version 2.1)

```
        'MR0')'R#2':
216        CRT @(25,14+LIS.OFFSET):TRM.NV:@(23,14+LIS.OFFSET):VISUAL.REC<18,PAG
    E.INDX+LIS.X,0>:@(24,14+LIS.OFFSET):ACTIVE.REC<18,PAGE.INDX+LIS.X,0>'L#1':
217        CRT @(79,14+LIS.OFFSET):TRM.NV:@(25,14+LIS.OFFSET):VISUAL.REC<15,PAG
    E.INDX+LIS.X,0>:@(26,14+LIS.OFFSET):ACTIVE.REC<15,PAGE.INDX+LIS.X,0>'L#53':

218        LIS.OFFSET = LIS.OFFSET + LIS.INFO<LIS,7>
219     NEXT LIS.X
220     IF PROCESS<2> = 3 THEN RETURN
221     * END OF HISTORY FG LINES
222     RETURN
223 END
```

[405] 1 items listed out of 1 items.

Appendix H - Page 26

What is claimed is:

1. An office automation system comprising:
   (a) a host computer;
   (b) a plurality of terminals operating in a character-mode and in communication with said host computer, said plurality of terminals having access to a common database of information;
   (c) means for adding, changing and deleting data used in common by said plurality of terminals; and
   (d) means for interrupting a current task within an application program of an office automation system performed at a current level in an operating system of said office automation system comprising:
      (1) means for responding to a request by an operator for a new task at a new level in said operating system;
      (2) means for suspending said current task at said current level for the duration of an interruption, thereby suspending said current task;
      (3) means for initiating said new task at said new level;
      (4) means for completing said new task in response to instruction by said operator;
      (5) means for returning to said suspended current task;
      (6) means for restoring a display of said suspended current task at any of said plurality of terminals, thereby restoring said current task; and
      (7) means for resolving said restored current task.

2. The office automation system of claim 1 wherein said means for responding to a request by an operator for a new task at a new level in said operating system comprises:
   (a) means for the operator to select said new program for performing said new task at said new level;
   (b) means for establishing communications with said new level, and
   (c) means for entering a command to access a new program.

3. The office automation system of claim 2 wherein said means for entering a command to access a new program comprises means for insuring that said new program is a validly cataloged program; and said means for establishing communications with said new level comprises means for insuring that said new level is less than the twelfth level in said operating system.

4. An office automation system comprising:
   (a) a host computer;
   (b) a plurality of terminals operating in a character mode in communication with the host computer;
   (c) means for associating one or more tasks with each terminal communicating with the host computer, wherein the host computer comprises a processor and means for performing the functions of storing, updating and displaying the contents of a database that is accessed and maintained in common by said plurality of terminals, each of said functions of storing, updating and displaying comprising all or part of a task that the system is capable of performing in response to entries from any of said plurality of terminals;
   (d) means for executing a specified entry by an operator of any of said plurality of terminals to communicate to the host computer an instruction to interrupt the current task run by a first application program and to perform some other unrelated task run by a second application program;
   (e) means for storing information as of the moment that the terminal associated with each task signals the host computer that the task is to be interrupted, said information specifying the environment of each task;
   (f) means for associating a level identifier with each of said terminals, said level identifier being incremented as such terminal interrupts each of a succession of tasks and being decremented whenever such terminal completes a task;
   (g) means for associating with each interrupted task the level identifier associated with the terminal at the time the task was interrupted; and
   (h) means, responsive to the completion of a task at a terminal, for recreating the total environment of the previously interrupted task that is associated with the terminal and a specific level a identifier, wherein said specific level identifier is the level identifier that was associated with said terminal at the time the previously interrupted task was interrupted, comprising:
      (1) means for running the program associated with the previously interrupted task;
      (2) means for replicating the background and foreground of the display associated with the previously interrupted task, and
      (3) means for placing the cursor at its position when the task was interrupted.

5. The office automation system of claim 4, wherein said means for associating one or more tasks with each terminal communicating with the host computer, and the means for running the program associated with the previously interrupted task, are a function of an operating system resident on said host computer, and wherein said means for storing information specifying the environment of each task as of the moment that the terminal associated with the task signals the host computer that the task is to be interrupted, said means for associating a level identifier with each of said terminals, said means for associating with each interrupted task the level identifier associated with the terminal at the time the task was interrupted, and said means for re-creating the total environment of the previously interrupted task that is associated with the terminal and a specific level identifier, wherein said specific level identifier is the level identifier that was associated with said terminal at the time the previously interrupted task was interrupted, are functions of one or more applications programs on said host computer.

6. The office automation system of claim 4 further comprising means for interrupting a task and proceeding to an unrelated task up to twelve times.

7. The office automation system of claim 4 further comprising means for preventing system log off without exiting from interrupted tasks.

8. The office automation system of claim 4 further comprising means for executing a planned interruption wherein the current tasking application program interrupts itself in favor of passing information to another tasking application program.

9. An office automation system comprising a host computer, a plurality of terminals in communication with the host computer, said plurality of terminals having access to a common database of information, a plurality of printers having means for generating graphical output in response to information communicated in a page description language, said printers also being in communication with the host computer, and further comprising:
   (a) means for performing the functions of storing, updating and displaying the contents of a database used in common by said plurality of terminals, each of said functions of storing, updating and displaying comprising all or part of a task that the system is capable of performing in response to entries from any of said plurality of terminals;

(b) means for maintaining an audit history of the database which can be displayed on at least one of said terminals;

(c) means for interrupting a current task within an application program of an office automation system performed at a current level in an operating system of said office automation system comprising:

(1) means for responding to a request by an operator for a new task at a new level in said operating system;

(2) means for suspending said current task at said current level for the duration of an interruption, thereby suspending said current task;

(3) means for initiating said new task at said new level;

(4) means for completing said new task in response to instruction by said operator;

(5) means for returning to said suspended current task;

(6) means for restoring a display of said suspended current task at any of said plurality of terminals, thereby restoring said current task; and (7) means for resolving said restored current task; and (d) means for generating a signal to one of said printers in an appropriate page description language for the production of output of a variety of forms containing variable data from said common database of information.

10. An office automation system comprising:

(a) a host computer;

(b) a plurality of character-mode terminals in communication with the host computer;

(c) means for associating one or more tasks with each terminal communicating with the host computer, each of said terminals being adapted to communicate to the host computer that a task is being interrupted;

(d) the host computer, including a processor and means for performing the functions of storing, updating and displaying the contents of a database that is accessed and maintained in common by a plurality of said terminals, each of said functions of storing, updating and displaying comprising all or part of a task that the system is capable of performing in response to entries from any of at least a plurality of said terminals;

(e) means for storing information specifying the environment of each task as of the moment that the terminal associated with the task signals the host computer that the task is to be interrupted, wherein said environment comprises a cursor and a display, and said display comprises a background and a foreground;

(f) means for associating a level identifier with each of said terminals, said level identifier being incremented as such terminal interrupts each of a succession of tasks and being decremented whenever such terminal completes a task;

(g) means for associating with each interrupted task the level identifier associated with the terminal at the time the task was interrupted;

(h) means, responsive to the completion of a task at a terminal, for recreating the total environment of the previously interrupted task that is associated with the terminal and a specific level identifier, wherein said specific level identifier is the level identifier that was associated with said terminal at the time the previously interrupted task was interrupted, comprising:

(1) means for running the program associated with the previously interrupted task;

(2) means for replicating the background and foreground of the display associated with the previously interrupted task, and (3) means for placing the cursor at its position when the task was interrupted.

11. The office automation system of claim 10, wherein said means for associating one or more tasks with each terminal communicating with the host computer, and the means for running the program associated with the previously interrupted task, are a function of an operating system resident on said host computer, and wherein said means for storing information specifying the environment of each task as of the moment that the terminal associated with the task signals the host computer that the task is to be interrupted, said means for associating a level identifier with each of said terminals, said means for associating with each interrupted task the level identifier associated with the terminal at the time the task was interrupted, and said means for re-creating the total environment of the previously interrupted task that is associated with the terminal and a specific level identifier, wherein said specific level identifier is the level identifier that was associated with said terminal at the time the previously interrupted task was interrupted, are functions of one or more applications programs on said host computer.

12. An office automation system comprising:

(a) a host computer;

(b) a plurality of terminals operating in a character-mode in communication with the host computer, wherein each of said plurality of terminals are adapted to communicate to the host computer that a task is being interrupted;

(c) means for associating one or more tasks with each terminal communicating with the host computer, wherein the host computer comprises a processor and means for performing the functions of storing, updating and displaying the contents of a database that is accessed and maintained in common by said plurality of terminals, each of said functions of storing, updating and displaying comprising all or part of a task that the system is capable of performing in response to entries from any of said plurality of terminals;

(d) means for storing information specifying the environment of each task as of the moment that the terminal associated with the task signals the host computer that the task is to be interrupted, wherein said environment comprises a cursor and a display, and said display comprises a background and a foreground;

(e) means for associating a level identifier with each of said terminals, said level identifier being incremented as such terminal interrupts each of a succession of tasks and being decremented whenever such terminal completes a task;

(f) means for associating with each interrupted task the level identifier associated with the terminal at the time the task was interrupted; and (g) means, responsive to the completion of a task at a terminal, for recreating the total environment of the previously interrupted task that is associated with the terminal and a specific level identifier, wherein said specific level identifier is the level identifier that was associated with said terminal at the time the previously interrupted task was interrupted, comprising:

(1) means for running the program associated with the previously interrupted task;

(2) means for replicating the background and foreground of the display associated with the previously interrupted task; and (3) means for placing the cursor at its position when the task was interrupted.

13. The office automation system of claim 1 wherein said means for suspending said current task further comprises means for allowing up to twelve successive said interruptions.

14. The office automation system of claim 1 further comprising means for preventing said operator from logging off said automation system without resolving said current task.

15. The office automation system of claim 1 wherein said means for responding to a request by an operator for said new task comprises:

(a) means for accessing a menu, and (b) means for selecting a new program for performing said new task from said menu.

16. The office automation system of claim 1 wherein said means for restoring a display of said suspended current task comprises:

(a) means for replicating a background display associated with said suspended current task;

(b) means for replicating a foreground display associated with said suspended current task, and (c) means for repositioning the cursor to the same location when said current task was suspended.

17. The office automation system of claim 1 wherein said means for resolving said restored current task comprises means for continuing to process data in said restored current task.

18. The office automation system of claim 1 wherein said means for resolving said restored current task comprises means for quitting from said restored current task.

19. The office automation system of claim 1 wherein said office automation system is an office automation system of an insurance agency.

* * * * *